(12) United States Patent
Jerger et al.

(10) Patent No.: US 6,321,334 B1
(45) Date of Patent: Nov. 20, 2001

(54) ADMINISTERING PERMISSIONS ASSOCIATED WITH A SECURITY ZONE IN A COMPUTER SYSTEM SECURITY MODEL

(75) Inventors: Michael S. Jerger, Kirkland; Jeffrey A. Bisset, Issaquah; Craig T. Sinclair, Redmond; Michael J. Toutonghi, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/116,514

(22) Filed: Jul. 15, 1998

(51) Int. Cl.[7] ........................................ G06F 12/24
(52) U.S. Cl. .............................. 713/200; 713/201
(58) Field of Search ........................ 713/200, 201, 713/202

(56) References Cited

U.S. PATENT DOCUMENTS

| | | |
|---|---|---|
| 5,678,041 | 10/1997 | Baker et al. . |
| 5,684,951 | 11/1997 | Goldman et al. . |
| 5,796,942 | 8/1998 | Esbensen . |
| 5,828,893 | 10/1998 | Wied et al. . |
| 5,835,726 | 11/1998 | Schwed et al. . |
| 5,919,247 | 7/1999 | Van Hoff et al. . |
| 5,930,792 | 7/1999 | Polcyn . |
| 5,940,843 | 8/1999 | Zucknovich et al. . |
| 5,958,005 | 9/1999 | Thorne et al. . |
| 5,958,051 | 9/1999 | Renaud et al. . |
| 5,963,142 | 10/1999 | Zinsky et al. . |
| 5,987,611 | 11/1999 | Freund . |
| 5,991,878 | 11/1999 | McDonough et al. . |
| 6,041,412 | * 3/2000 | Timson et al. .................... 713/200 |
| 6,138,238 | * 10/2000 | Scheifler et al. .................. 713/200 |

OTHER PUBLICATIONS

S.M. Bellovin et al., "Network Firewalls," *IEEE Communications Magazine*, Sep. 1994, pp. 50–57.

* cited by examiner

*Primary Examiner*—Ly V. Hua
(74) *Attorney, Agent, or Firm*—Christensen O'Connor Johnson Kindness PLLC

(57) ABSTRACT

Computer-based systems and methods are disclosed for a comprehensive security model for managing foreign content downloaded from a computer network. The methods and systems include the configuration of a system security policy that is stored on a host computer. The system security policy includes one or more independently configurable security zones. Each security zone corresponds to a group of network locations and may have one or more associated configurable protected operations that control the access to the host system by foreign content downloaded from the computer network. A protected operations may have one or more associated configurable permissions that define the capabilities of the protected operation. Each permission may be defined by one or more parameters and each parameter may be defined by one or more primitives. The permissions may be defined to enable the permission, disable the permission, or prompt the user when the permission is required. The permission may also be configured to the "fine grained" level of the primitives. Default permission levels that provide predefined parameter and primitive entries that are grouped as high security, medium security, and low security may be selected by the user at most levels of the configuration.

109 Claims, 82 Drawing Sheets

```
; PermissionDataSet INI encoding
;
; Sample INI File
;
;
```
— 1202

```
; A semi-colon (;) at the beginning of a line signifies a
; comment to the end of the current line.

; AllowActiveX tells the sign tool to sign with full ActiveX
; permissions, in addition to any other permissions.
;[AllowActiveX]

; If the FullyTrusted section exists, all other
; permissions are ignored.
;[FullyTrusted]

;
; ExecutionPermission                                      — 1230a
;
[com.ms.security.permissions.ExecutionPermission]
; If Unrestricted is true, the other settings are ignored.
;Unrestricted=true
Unrestricted=false                                          } 1232a
IncludeNames=*.exe;*.txt;activextest
ExcludeNames=foo.exe ;
; ClientStoragePermission
;                                                           — 1230b
[com.ms.security.permissions.ClientStoragePermission]
; Limit is in bytes.
Limit=100
RoamingFiles=true      } 1232b
GlobalExempt=true

; FileIOPermission
;
; ⟵ 1216
[com.ms.security.permissions.FileIOPermission] ⟵ 1230c
IncludeRead=*.txt;foo.mdb ⟵ 1214
ExcludeRead=crayon
IncludeWrite=89kandaf;-l?daf;s
ExcludeWrite=s;-lddaf
IncludeDelete=45*.4;*.*.*.*;****a;??4nf      } 1232c
ExcludeDelete=ff4nf
ReadFileURLCodebase=true ;
; MultimediaPermission
;
[com.ms.security.permissions.MultimediaPermission] ⟵ 1230d
; No specific settings required for MultimediaPermission  } 1232d ;
; NetIOPermission
;
[com.ms.security.permissions.NetIOPermission] ⟵ 1230e
IncludeConnectIPs=1.2.3.4:1-102
ExcludeConnectIPs=
IncludeBindIPs=4.4.4.4:4-55,97;4.4.4.4:4
ExcludeBindIPs=4.4.4.4:8
IncludeMulticastIPs=
ExcludeMulticastIPs=
IncludeConnectHosts=www.microsoft.com:80
;IncludeConnectHosts=www.microsoft.com
ExcludeConnectHosts=
IncludeBindHosts=                                } 1232e
ExcludeBindHosts=
IncludeMulticastHosts=
ExcludeMulticastHosts=
IncludeConnectGlobalPorts=3-100, 999
ExcludeConnectGlobalPorts=43, 999
IncludeBindGlobalPorts=43
ExcludeBindGlobalPorts=
ConnectToFileURLCodebase=true
ConnectToNonFileURLCodebase=true

*Figure 12B*

; PrintingPermission
;
[com.ms.security.permissions.PrintingPermission] ⟵ 1230f
; No specific settings required for PrintingPermission } 1232f ;
; PropertyPermission
;
[com.ms.security.permissions.PropertyPermission] ⟵ 1230g
; If Unrestricted is true, the other settings
; are ignored.
Unrestricted=false
AllowedSuffixes=applet;foobar          } 1232g
IncludedProperties=*system*
ExcludedProperties=*cryptsystem*

;
; ReflectionPermission
;
[com.ms.security.permissions.ReflectionPermission] ⟵ 1230h
PublicSame=true
PublicDifferent=true
PublicSystem=true
DeclaredSame=true                      } 1232h
DeclaredDifferent=true
DeclaredSystem=true ;
; RegistryPermission
;
[com.ms.security.permissions.RegistryPermission] ⟵ 1230i
IncludeOpen=hk*
ExcludeOpen=*N
IncludeRead=fdjl
ExcludeRead=
IncludeWrite=*?5$$
ExcludeWrite=gd5$$                     } 1232i
IncludeDelete=*
ExcludeDelete=d
IncludeCreate=*
ExcludeCreate=s

*Figure 12C*

; SecurityPermission
;
[com.ms.security.permissions.SecurityPermission] — 1230j
; No specific settings required for SecurityPermission } 1232j ; SystemStreamsPermission
;
[com.ms.security.permissions.SystemStreamsPermission] — 1230k
SetSysIn=true
SetSysOut=true } 1232k
SetSysErr=true ; ThreadPermission
;
[com.ms.security.permissions.ThreadPermission] — 1230l
AllThreadGroups=true
AllThreads=true } 1232l ; UIPermission
;
[com.ms.security.permissions.UIPermission] — 1230m
ClipboardAccess=true
TopLevelWindows=true
NoWarningBanners=false } 1232m
FileDialogs=true
EventQueueAccess=true ; UserFileIOPermission
;
[com.ms.security.permissions.UserFileIOPermission] — 1230n
CanRead=true
CanWrite=true } 1232n © 1997 Microsoft Corporation. All rights reserved. Terms of use.

*Figure 12D*

DIRECTIONAL SET
RELATIONSHIPS
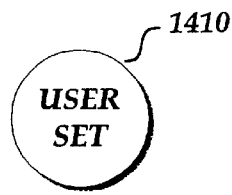
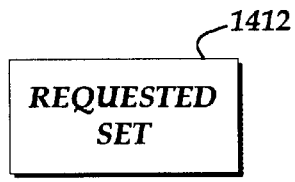
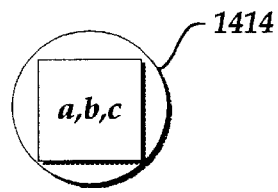
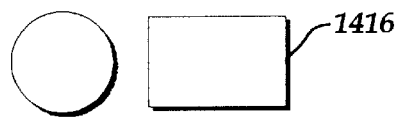
EQUAL          EMPTY
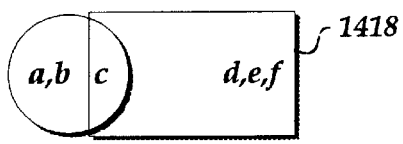
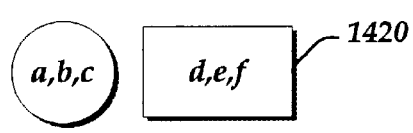
OVERLAP          DISJOINT
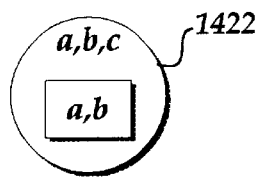
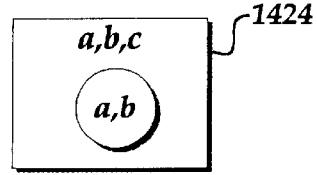
SUBSET          SUPERSET
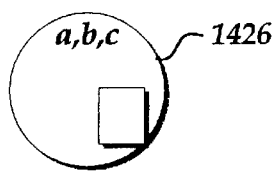
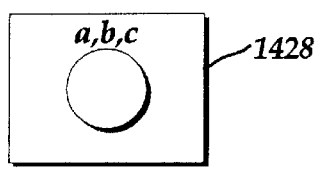
EMPTY SUBSET          EMPTY SUPERSET
*Figure 14A*

|  | EMPTY | EMPTY SUBSET | EMPTY SUPERSET | OVERLAP | DISJOINT | SUBSET | EQUAL | SUPERSET |
|---|---|---|---|---|---|---|---|---|
| OVERLAP | OVERLAP | OVERLAP | OVERLAP | OVERLAP | DISJOINT | OVERLAP | OVERLAP | OVERLAP |
| DISJOINT | DISJOINT | DISJOINT | DISJOINT | DISJOINT | DISJOINT | DISJOINT | DISJOINT | DISJOINT |
| SUBSET | SUBSET | SUBSET | DISJOINT | OVERLAP | DISJOINT | SUBSET | SUBSET | DISJOINT |
| EQUAL | EQUAL | SUBSET | SUPERSET | OVERLAP | DISJOINT | SUBSET | EQUAL | SUPERSET |
| SUPERSET | SUPERSET | DISJOINT | SUPERSET | OVERLAP | DISJOINT | DISJOINT | SUPERSET | SUPERSET |

*FIGURE 16B*

TABLE 18-1 – ROW RESULT MERGING

|  | Overlap | Disjoint | Subset | Equal | Superset |
|---|---|---|---|---|---|
| Overlap | Overlap | Overlap | Subset | Subset | Overlap |
| Disjoint | Overlap | Disjoint | Subset | Subset | Overlap |
| Subset | Subset | Subset | Subset | Subset | Subset |
| Equal | Subset | Subset | Subset | Equal | Equal |
| Superset | Overlap | Overlap | Subset | Equal | Superset |

TABLE 18-2 – COLUMN RESULT MERGING

|  | Overlap | Disjoint | Subset | Equal | Superset |
|---|---|---|---|---|---|
| Overlap | Overlap | Overlap | Overlap | Superset | Superset |
| Disjoint | Overlap | Disjoint | Overlap | Superset | Superset |
| Subset | Overlap | Overlap | Subset | Equal | Superset |
| Equal | Superset | Superset | Equal | Equal | Superset |
| Superset | Superset | Superset | Superset | Superset | Superset |

TABLE 18-3 – ADJUSTMENT FOR CONSUMPTION FROM TARGET EXPRESSION

| Original result | Biased result |
|---|---|
| Overlap | Overlap |
| Disjoint | Disjoint |
| Subset | Overlap |
| Equal | Superset |
| Superset | Superset |

TABLE 18-4 – ADJUSTMENT FOR CONSUMPTION FROM SOURCE EXPRESSION

| Original result | Biased result |
|---|---|
| Overlap | Overlap |
| Disjoint | Disjoint |
| Subset | Subset |
| Equal | Subset |
| Superset | Overlap |

*Figure 18X*

TABLE 18-5

| Original result | Inverted result |
|---|---|
| Overlap | Overlap |
| Disjoint | Disjoint |
| Subset | Superset |
| Equal | Equal |
| Superset | Subset |

TABLE 18-6 – FLOWCHART TO USE FOR MERGING GROUPS FROM THE EXPRESSIONS.

|  | Match | Skip | Consume | End |
|---|---|---|---|---|
| Match | CopyMatch1 | CopyMatch1 | Advance2 | CopyMatch1 |
| Skip | CopyMatch2 | CopySkips | Advance2 | CopySkips |
| Consume | Advance1 | Advance1 | CopyConsume | TrailConsume1 |
| End | CopyMatch2 | CopySkips | TrailConsume2 | (Stop merging) |

TABLE 18-7 – MERGING "EXTRA DATA" COMPARISON RESULTS WITH EXPRESSION COMPARISON RESULTS.  *18Y316*

|  | Empty | Empty subset | Empty superset | Overlap | Disjoint | Subset | Equal | Superset |
|---|---|---|---|---|---|---|---|---|
| Overlap | Overlap | Overlap | Overlap | Overlap | Disjoint | Overlap | Overlap | Overlap |
| Disjoint | Disjoint | Disjoint | Disjoint | Disjoint | Disjoint | Disjoint | Disjoint | Disjoint |
| Subset | Subset | Subset | Disjoint | Overlap | Disjoint | Subset | Subset | Disjoint |
| Equal | Equal | Subset | Superset | Overlap | Disjoint | Subset | Equal | Superset |
| Superset | Superset | Disjoint | Superset | Overlap | Disjoint | Disjoint | Superset | Superset |

TABLE 18-8 SAMPLE EXPRESSION COMPARISONS AND INTERSECTIONS.

| Expression 1 | Expression 2 | Relationship | Intersection |
|---|---|---|---|
| *? | *? | equal | |
| *? | ? | superset | |
| *?? | ?? | superset | |
| ?*? | ?? | superset | |
| ??*? | ??? | superset | |
| ??*?? | ???? | superset | |
| ?*?*? | ??? | superset | |
| *?*? | ?? | superset | |
| *?* | ? | superset | |
| *??*?* | ??? | superset | |
| *a?a | *a?*a | subset | |
| ?*a* | b*a* | superset | |
| *?a* | b*a* | superset | |
| ?*?a | a?*?? | overlap | a?*?a |
| ??*a | a??* | overlap | a*?a |
| ?*a | a??*a | superset | |
| ?*a | a?a* | overlap | a?a;a?a*a |
| ??*a | a???* | overlap | a*??a |
| ?a* | a??* | overlap | aa?* |
| ?* | a?? | superset | |
| ??* | a?? | superset | |
| abc | *? | subset | |
| ?*a | *? | subset | |
| *a? | *b | overlap | *ab |
| a*a* | a*?* | subset | |
| *a*? | *? | subset | |
| a*? | *? | subset | |
| *ba | ?a | overlap | ba |
| ? | a | superset | |
| ? | ? | equal | |
| ?? | ? | disjoint | |
| ??? | ??? | equal | |
| a | ?? | disjoint | |
| a | ?a | disjoint | |
| ab | a? | subset | |
| abc | a?? | subset | |
| *a | ???a | superset | |
| *a | ???ba | superset | |
| ???ab | x*b | overlap | x??ab |
| ???a | x*a | overlap | x??a |
| *a | a?aa* | overlap | a?aa;a?aa*a |
| *a | aa?a* | overlap | aa?a;aa?a*a |

*Figure 18Z*

| | | | |
|---|---|---|---|
| *a | ?a*? | overlap | ?a*a |
| *a | ?a?* | overlap | ?a*a |
| *a | ?? | overlap | ?a |
| *a | ??* | overlap | ?*a |
| *a* | ??* | overlap | *a?*;*?a* |
| *a* | ?* | subset | |
| *a* | ? | overlap | a |
| *a* | a | superset | |
| a*?a* | a*a*?a* | superset | |
| a*?a* | *a*a* | subset | |
| a*?a* | *?a* | subset | |
| a*?a* | a*aa* | superset | |
| a*?a* | ?a* | overlap | aa*a* |
| a | a | equal | |
| a | b | disjoint | |
| ab | a | disjoint | |
| a* | a* | equal | |
| a* | a | superset | |
| "" | "" | equal | |
| ? | "" | disjoint | |
| "" | * | subset | |
| a* | "" | disjoint | |
| a | "" | disjoint | |
| *a | a | superset | |
| *a | *a | equal | |
| *a | a* | overlap | a;a*a |
| *a | ba | superset | |
| *a | bcdefga | superset | |
| a*c | *c | subset | |
| a*b*c | abc | superset | |
| a*b*c | a*b*c | equal | |
| a*d*c | a*c | subset | |
| *abcd | abcd | superset | |
| *abcd | abcde | disjoint | |
| *abcd | abcd* | overlap | abcd;abcd*abcd |
| *a*b | *ab | superset | |
| *a*b | *cab | superset | |
| *abc*d | *bcd | overlap | *abcd;*abc*bcd |
| abc*d | *bcd | overlap | abcd;abc*bcd |
| *ab*cd | *abc*d | overlap | *abcd;*abc*cd |
| ab*c | ab* | subset | |
| a*bc | ab*c | overlap | abc;ab*bc |
| *bc | abc* | overlap | abc*bc;abc |
| *abc | bc* | overlap | bc*abc |
| a*bc | ab*bc | superset | |
| *a*b | *ab | superset | |
| *a*a* | *aa* | superset | |
| a*b*c | a*d*c | overlap | a*b*d*c;a*d*b*c |
| *a?a | *a?*a | subset | |
| a* | *a* | subset | |

*Figure 18AA*

*Tables associated with figures for subtraction sets*

Table 19-1

|  | Overlap | Disjoint | Subset | Equal | Superset | Empty Subset | Empty Superset |
|---|---|---|---|---|---|---|---|
| Subset | Operation A | Operation A | Operation A | Subset | Subset | Operation A | Subset |
| Equal | Operation C | Operation C | Superset | Equal | Subset | Superset | Subset |
| Superset | Operation C | Operation C | Superset | Superset | Superset | Superset | Operation C |

Table 19-2

| Original Comparison Result | Inverted Comparison Result |
|---|---|
| Superset | Subset |
| Subset | Superset |
| Empty Superset | Empty Subset |
| Empty Subset | Empty Superset |
| Equal | Equal |
| Disjoint | Disjoint |
| Empty | Empty |
| Overlap | Overlap |

Table 19-3

|  |  | E1complete | False | False | True | True |
|---|---|---|---|---|---|---|
|  |  | E1outside | False | True | False | True |
| E2outside | E2complete |  |  |  |  |  |
| False | False |  | Overlap | Overlap | Overlap | Overlap |
| False | True |  | Overlap | Overlap | Subset | Subset |
| True | False |  | Overlap | Overlap | Superset | Superset |
| True | True |  | Overlap | Subset | Superset | Equal |

| | | | | NEW MERGE RESULTS | | | | |
|---|---|---|---|---|---|---|---|---|
| PREVIOUS/ACCUMULATED MERGE RESULTS | | 1 | 2 | 3 | 4 | 5 | 6 | 7 | 8 |
| | A | | OVERLAP | DISJOINT | SUBSET | EQUAL | SUPERSET | EMPTY SUBSET | EMPTY |
| | B | EMPTY | OVERLAP | DISJOINT | SUBSET | EQUAL | SUPERSET | EMPTY SUBSET | EMPTY |
| | C | EMPTY SUBSET | OVERLAP | DISJOINT | SUBSET | SUBSET | OVERLAP | DISJOINT | EMPTY SUBSET |
| | D | EMPTY SUPERSET | OVERLAP | DISJOINT | OVERLAP | SUPERSET | SUPERSET | EMPTY SUBSET | EMPTY SUPERSET |
| | E | DISJOINT | OVERLAP | DISJOINT | OVERLAP | OVERLAP | OVERLAP | DISJOINT | DISJOINT |
| | F | OVERLAP | OVERLAP | OVERLAP | OVERLAP | OVERLAP | OVERLAP | OVERLAP | OVERLAP |
| | G | SUBSET | OVERLAP | OVERLAP | SUBSET | SUBSET | OVERLAP | OVERLAP | SUBSET |
| | H | SUPERSET | OVERLAP | OVERLAP | OVERLAP | SUPERSET | SUPERSET | SUPERSET | SUPERSET |
| | I | EQUAL | OVERLAP | OVERLAP | SUBSET | EQUAL | SUPERSET | SUPERSET | EQUAL |

ADMINISTERING PERMISSIONS ASSOCIATED WITH A SECURITY ZONE IN A COMPUTER SYSTEM SECURITY MODEL

FIELD OF THE INVENTION

The present invention relates to the field of software and, in particular, to methods and systems for a comprehensive security model for managing active content downloaded from a computer network.

BACKGROUND OF THE INVENTION

In recent years, there has been a tremendous proliferation of computers connected to a global computer network known as the Internet. A "client" computer connected to the Internet can download digital information from "server" computers connected to the Internet. Client application and operating system software executing on client computers typically accept commands from a user and obtain data and services by sending requests to server applications running on server computers connected to the Internet. A number of protocols are used to exchange commands and data between computers connected to the Internet. The protocols include the File Transfer Protocol (FTP), the HyperText Transfer Protocol (HTTP), the Simple Mail Transfer Protocol (SMTP), and the "Gopher" document protocol.

The HTTP protocol is used to access data on the World Wide Web, often referred to as "the Web." The World Wide Web is an area within the Internet that stores HTML documents. The World Wide Web is made up of numerous Web sites around the world that maintain and distribute Web documents. A Web site may use one or more Web server computers that are able to store and distribute documents in one of a number of formats including the HyperText Markup Language (HTML). An HTML document can contain text, graphics, audio clips, and video clips, as well as metadata or commands providing formatting information. HTML documents also include embedded "links" that reference other data or documents located on the local computer or network server computers.

A Web browser is a client application, software component, or operating system utility that communicates with server computers via standardized protocols such as HTTP, FTP and Gopher. Web browsers receive documents from the computer network and present them to a user. Microsoft Internet Explorer, available from Microsoft Corporation, of Redmond, Wash., is an example of a popular Web browser.

An intranet is a local area network containing servers and client computers operating in a manner similar to the World Wide Web described above. Additionally, a Web browser on an intranet can retrieve files from a file system server executing on the same computer as the Web browser, or on a remote computer on the local area network. A Web browser can retrieve files on the local area network using the "FILE" protocol, which comprises file system commands. Typically, all of the computers on an intranet are contained within a company or organization. Many intranets have a "firewall" that functions as a gateway between the intranet and the Internet, and prevents outside people from breaking into the computers of an organization. A "proxy server" is one well-known portion of a firewall.

In addition to data and metadata (data about data), HTML documents can contain embedded software components containing program code that perform a wide variety of operations on the host computer to which the document is downloaded. These software components expand the interactive ability of an HTML document and can perform other operations, such as manipulating data and playing audio or video clips. ActiveX is a specification developed by Microsoft Corporation for creating software components that can be embedded into an HTML document. Java is a well-known programming language that can be used to develop small computer applications called "applets" and standalone software components called "classes" which are transmitted with HTML documents when they are downloaded from Web servers to client computers. JavaScript and VBScript are scripting languages that are also used to extend the capabilities of HTML. JavaScript and VBScript scripts are embedded in HTML documents. A browser executes each script as it reaches the position in the script during interpretation of the HTML document.

Some software components transferred over the World Wide Web perform operations that are not desired by a user. This may occur either because a component developer intentionally programmed the software component to maliciously perform a harmful operation, or because an unintentional "bug" in the software causes the component to perform a harmful operation. In addition to components that are transferred with an HTML document or by the HTTP protocol, files transferred to a client computer utilizing other protocols, such as FTP, may include commands that perform harmful operations.

One way in which browsers have addressed the security problem presented by potentially harmful software components is to notify the user prior to performing a potentially harmful operation while the software component is running on the host system. The user is permitted to determine, prior to each operation, whether to allow the specified operation. For example, prior to installing a Java class, a browser may display a dialog window specifying the source of the Java class and allowing the user to decide whether or not to install the specified class. Similarly, the browser may present a dialog window to the user prior to downloading a file, executing a program, or executing a script. This security procedure can result in a user repeatedly being presented with dialog windows asking for permission to perform certain operations, interrupting the user's browsing session. Faced with frequent interruptions as the software component runs, a user may respond hastily and improperly.

It is desirable to have a mechanism that allows the fine-grained administration of the permissions given to a software component, or other active content, that is downloaded from a computer network to a host system. Preferably, the mechanism would automatically administer the decision to grant or deny permissions to the downloaded active content to perform certain protected operations on the host system. The mechanism would preferably administer permissions in zones by comparing a requested set of permissions that the active content requires to run with a set of permissions that has been pre-configured in a manner that reflects the risk that active content downloaded from that zone may be harmful to the host system. Additionally, it would be advantageous if the mechanism processed the permissions required by the active content without having to run the active content and that then to stored any granted permissions with the active content so that the permission comparison need only be conducted when the active content is first downloaded. The mechanism would also preferably be able to automatically compare many different types of permissions that may defined by a wide range of expressions. Further, a preferable mechanism would provide sets of predetermined security settings that represent varying levels of trust level that can be associated with a zone, or that provides a way for the user to configure the permission sets down to a very "fine-grained" level. The present invention is directed to providing such a mechanism.

SUMMARY OF THE INVENTION

In accordance with this invention, a system and a computer-based method of providing security when downloading foreign active content from a computer network is disclosed. Foreign active content is untrusted code that may attempt to run on a host system. The method includes configuring a system security policy to establish multiple security zone corresponding to a set of locations on a computer network. Each zone has a corresponding security configuration that specifies the actions to be taken when a protected operation is requested by active content downloaded from that security zone. During a Web browsing session, the mechanism of the invention determines the security zone corresponding to the network location currently being browsed. Prior to performing a protected operation, the mechanism of the invention determines the action to perform, based on the current Web site's security zone, the requested operation, and the security setting corresponding to the requested operation and the Web site's zone. The Web browser displays visual information indicating the security zone corresponding to a server computer when a Web document from the server computer is being displayed.

In accordance with other aspects of this invention, during a browsing session between a client computer and a server computer, when a document is received at the client computer the browser determines if the document wishes to perform any protected operations on the client computer. If the document requires access to a protected operation, the browser determines a security setting corresponding to the zone from which the document was retrieved. Depending on the configuration of the protected operation within the security zone, the browser may perform the protected operation, prevent the performance of the protected operation, or query a user whether to perform the protected operation and selectively perform the protected operation based on the user response.

In accordance with other aspects of this invention, the client computer may be located behind a firewall, and receive active content from server computers behind the firewall and remote server computers external to, or outside of, the firewall. The browser may be configured so that one security zone does not include any server computers that are external to the firewall and so that another security zone includes only server computers that are behind the firewall. Preferably, the browser is configured so that the security zone corresponding to the server computers external to the firewall specifies a higher level of security than the security zone corresponding to server computers protected by the firewall.

In accordance with the invention, the system security policy is comprised of a number of security zones that each have an associated zone security configuration that is enforced by a security manager application on the user's computer system. Each security zone is associated with one or more server computers that are grouped into the security zone according to the likelihood that the server computers within that security zone may contain harmful active content. The user may utilize one or more predefined security zones, configure custom security zones, or do nothing and accept a default set of predefined security zones.

In accordance with other aspects of the invention, each security zone has an associated zone security policy. The user may select one of a number of predefined zone security policies, configure a custom zone security policy, or do nothing and accept a default zone security policy for the security zone. In an actual embodiment of the invention, the predefined zone security policies define levels of security that that represent "high" security (most secure), "medium" security (more secure), and a "low" security (least secure). The custom security policy permits the user to customize the zone security policy to a level defined by the user's configuration of the same security components that make up the predefined "high", "medium", and "low" pre-configured security policy options.

In accordance with further aspects of the invention, configuration of the system security policy may include the configuration of progressively "finer grain" steps or levels. The "coarsest grain" level is the configuration of one or more security zones. Each security zone has a set of configurable protected operations that can be configured. For some protected operations that regulate active content, one or more sets of permissions can be configured. Permission sets can be configured for different contexts, for instance, different permission sets can be configured for active content that is digitally signed and for active content that is not digitally signed. Each permission set can have a number of permissions and each of the permissions may have a set of parameters. At the "finest grain" of configuration, the parameters can be configured using one or more primitives.

In accordance with the present invention, at the protected operations configuration level, the user may specify whether a protected operation is allowed (enabled), is not allowed (disabled), or if the user should be prompted to determine the action that should be taken. For some protected operations, it is desirable to specify a "finer grain" configuration of the actions that are available to the protected operation when it is simply "enabled." The right to perform an action on a host system requested by a subject of a protected operation is called a permission. The configuration of the permissions available to a protected operation, at the permission configuration level, is a level "down" in the configuration of the custom zone security policy. The user may specify at the permission configuration level those permissions that define a protected operation. The permission can be granted to the protected operation (enabled), denied to the protected operation (disabled) or the user prompted for instructions when the permission is required.

In addition to configuring protected operations within security zones, the permissions that define protected operations may be configured for the context of the active content that requests the privileged operations. For instance, the user could configure the permission to be enabled when the protected operation is requested by "signed" active content, and disabled when the protected operation is requested by "unsigned" active content. For example, in an actual embodiment of the invention, the administration of permissions available to Java applets and classes is a protected operation. The user may enable or disable individual permissions for Java applets and classes in permission sets that are applied depending on the context of the active content within a zone. A permission may be configured differently in different permission sets within the same security zone. For instance, a signed applet may request access to all files on the host system. In accordance with the invention, the access all files permission may be configured in one permission set to enable the access of all files when the applet is signed and configured differently in a second permission set to disable the access to all files permission when the applet is unsigned.

In accordance with further aspects of the invention, the capabilities of each permission may be defined by a set of "parameters" that can be configured at a parameter configuration level. In contrast to the configuration of the permissions at the permissions configuration level (a level "up") where all the capabilities of the permission are enabled, disabled, or set to require a prompt of the user, the configuration of the parameters at the parameter configuration level allows for the "fine grained" configuration of each permission. For instance, in an actual embodiment of the invention, the File I/O permission determines whether a Java applet can perform file operations on the user's computer. The File I/O permission includes parameters that determine if the File I/O permission has the right to read, write or delete files on the host computer. Parameters are defined using a number of primitive types. In accordance with the invention, a primitive is an expression that can represent values like "5", "true", "*.doc", include/exclude pairs and arrays of these types.

In accordance with the present invention, permissions for active content are grouped in one or more user permission sets that are stored in a system registry and associated with a security zone. Each security zone may have a number of differently-defined permission sets that are associated with active content having different attributes from within the same security zone. For example, in an actual embodiment of the invention, each security zone has three associated user permission sets that are stored with the zone configuration policy in the system registry: a trusted signed permission set, an untrusted signed permission set, and an unsigned permission set. If the retrieved active content is unsigned (has not been digitally signed) then the unsigned active content is granted a set of permissions corresponding to the unsigned permission set associated with the zone from which the active content was retrieved. If the retrieved active content is signed (has been digitally signed) then the present invention uses the trusted signed permission set and the untrusted signed permission set associated with the security zone from which the active content was downloaded to determine the permissions that will be granted to the active content, denied to the active content, or for which the user will be queried before the permission is granted.

In accordance with further aspects of the invention, the publisher of active content such as Java applets, classes or scripts, may externally attach a list of permissions to the active content that specifies the permissions the active content requires in order to run on the host computer. The list of permissions, or "requested permission set," is prepared by the publisher of the active content and preferably specifies the most restrictive set of permissions within which the active content can run. The present invention allows the publisher to specify each permission down to the parameter configuration level.

In accordance with another aspect of the invention, the publisher attaches the requested permission set to the outside of the active content so that the user computer does not have to run the active content in order to discover the permissions that the active content requires in order to run on the host system. The requested permission set may be included in a signed code package that also contains the computer executable instructions and other files associated with the active content. Requested permission sets may also be signed using a catalog file. A catalog file contains a manifest of hash values for other files such as cabinet files, class files, requested permissions initialization files, etc. The manifest is digitally signed, thereby authenticating the files listed in the manifest if the hash value in the manifest is equal to the newly calculated hash value of the file when it is downloaded. When the signed code package is downloaded to the user's computer, the present invention authenticates the identity of the publisher and verifies that the contents of the signed code package is identical to the information that was in the signed code package when it was signed. If the active content has not been digitally signed, the active content is granted only those permissions contained in the unsigned permission set.

If the active content has been signed, the identity of the publisher and the integrity of the downloaded signed code package are verified by the present invention. If this verification succeeds, the requested permission set is extracted from the signed code package or catalog file and then compared to the user's permission sets associated with the security zone that the signed code package was downloaded from. In an actual embodiment of the invention, the requested permission set from the signed code package is compared to the trusted signed permission set. If the requested permission set contains a subset of the permissions configured in the trusted signed permission set, the permissions requested in the requested permission set are granted and associated with the active content. If the requested permission set includes permissions, or parameters within permissions, that exceed those specified in the trusted signed permission set, the permissions in the requested permission set are compared to the untrusted signed permission set. The untrusted signed permission set may be either a deny set or a query set depending on the value of a Query/Deny flag associated with the untrusted signed permission set. If the untrusted signed permission set is a deny set and the untrusted signed permission set contains (intersects) any permissions, or parameters within permissions, that are within the requested permission set, the requested permission set is automatically denied and the active content is not run. If the untrusted signed permission set is flagged as a query set, the requested permissions must be a subset of the query set before the requested set will be granted. Any permission that is not in the query set is assumed to be in the denied set. Therefore, if the requested set is not a subset of the query set, there is at least one permission that is in the deny set and the requested set is rejected.

In accordance with further aspects of the invention, a requested permission set is automatically compared to a user permission set by the mechanism of the invention to determine if the permissions requested in the requested permission set exceed the permissions defined in the user permission set. The method and system of the invention first determines if there are any permissions in the requested permission set that are not in the user permission set.. If the permission is in the requested set and not in the permissions allowed by the user (the user permission set), the requested set is not automatically granted. If the permission is in the requested set and in the denied set then the content is not run. Next, corresponding permissions in the requested permission set and the user permission set are compared to each other. When the permissions compare themselves to each other, they compare parameter to corresponding parameter. To compare a parameter to a corresponding parameter, each primitive that defines a parameter in the requested permission set is compared to a primitive that defines a parameter in the user permission set.

Comparing the requested permission set to the user permission set involves comparing zero or more permissions in the requested permission set to zero or more corresponding permissions in the user permission set. Each permission may have one or more parameters that specify the capabilities of the permission. Each parameter may have one or more primitives that define the parameter. The method and system of the present invention automates these progressive comparisons in a manner that produces a directional result of each comparison and maintains the direction of the result. These results are successively merged to produce a directional comparison result that can be used in later decisions to determine an action to take. For example, when comparing a requested permission set to a user permission set, it is important to be able to determine if the requested permission set is a SUBSET of the user permission set or alternatively, if the user permission set is a SUBSET of the requested permission set. In this example, it is apparent that it is important to keep track of directional nature of the comparison result because in the former case it may be appropriate to grant the permission, while in the latter case it may not be appropriate to grant the permission.

In accordance with the invention, the direction of set comparison results is maintained while the results of many comparisons that may occur on many different levels are combined to produce a cumulative directional set result. In other words, a requested permission set compares to a user permission set, which requires that requested permissions compare to user permissions, which requires that a requested permission's parameters compare with a user's permission's parameters, which requires that the primitives that define a requested permission's parameter compare to a user's permission's primitives. Each comparison results in an answer that must be combined with the answers from all other comparisons in a manner that yields a meaningful combined answer that preserves the direction of the comparison in a directional result.

In an actual embodiment of the present invention, the comparison of a primitive to a primitive produces a cumulative directional primitive result. The cumulative directional primitive result of each parameter is then combined to produce a cumulative directional parameter result. The cumulative directional parameter result of each parameter is then combined to produce a cumulative directional permission result. Finally, the cumulative directional permission result of each permission is combined to produce a cumulative directional permission set result. Because the present invention performs the comparison and accumulates the results in a manner that maintains the direction of the comparison, the cumulative directional result may be used at any level to describe the directional results of all previous comparisons to that level.

In an actual embodiment of the invention, the cumulative directional permission set result is used to determine if the permissions in a user permission set should be granted, denied, or the user should be prompted for a choice of whether to grant or deny the permissions as a set. The present invention is not limited to this implementation, however. For instance, the cumulative permission result could be used to determine if an individual permission should be granted, denied, or the user prompted for the proper action. Other decisions could be based on the cumulative directional result at "lower levels" of the accumulation.

As will be readily appreciated from the foregoing description, a system and method of providing security when downloading active content formed in accordance with the invention provides a way of selectively restricting protective operations that can be performed by active content retrieved from a computer network, such that the restrictions may vary according to the level of trust that a user has for each security zone. The invention allows the user to configure a browser to a fine grain administration of privileges allowed to active content so that the different security zones and different contexts within those security zones reflect different levels of trust for each corresponding group of network locations. Default security settings corresponding to each security zone protected operation, permission and parameter among the security zones simplifies the process of configuring the browser. Allowing a user to modify the default settings provides users with customizable security to allow for differing situations or concerns. The invention minimizes the amount of disruption that may occur during a browsing session in order to determine the user's preferences. By allowing a user to configure the security settings at a time convenient to the user, the invention increases the likelihood that the user will carefully consider the choices involved in security configurations. The ability to customize the security of the host system to a fine grain level also permits more sophisticated users, such as system administrators, to tailor the security of browsers under the administrator's control to the specific security requirements of an organization.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 12A–D illustrate a sample initialization (.ini) file used for the declaring of a requested permission set in accordance with the present invention;

FIGS. 16A–B is a functional flow diagram illustrating the comparison of array primitives to assign a directional set comparison result, in accordance with the present invention;

FIGS. 19A–I are functional flow diagrams and associated lookup tables illustrating the process of comparing include/exclude pair primitives to assign a directional set comparison result, in accordance with the present invention;

FIG. 20 is a merge table used to merge two directional set comparison results to produce a single merged directional set comparison result, in accordance with the present invention;

DETAILED DESCRIPTION OF THE PREFERRED EMBODIMENT

Figure 1:
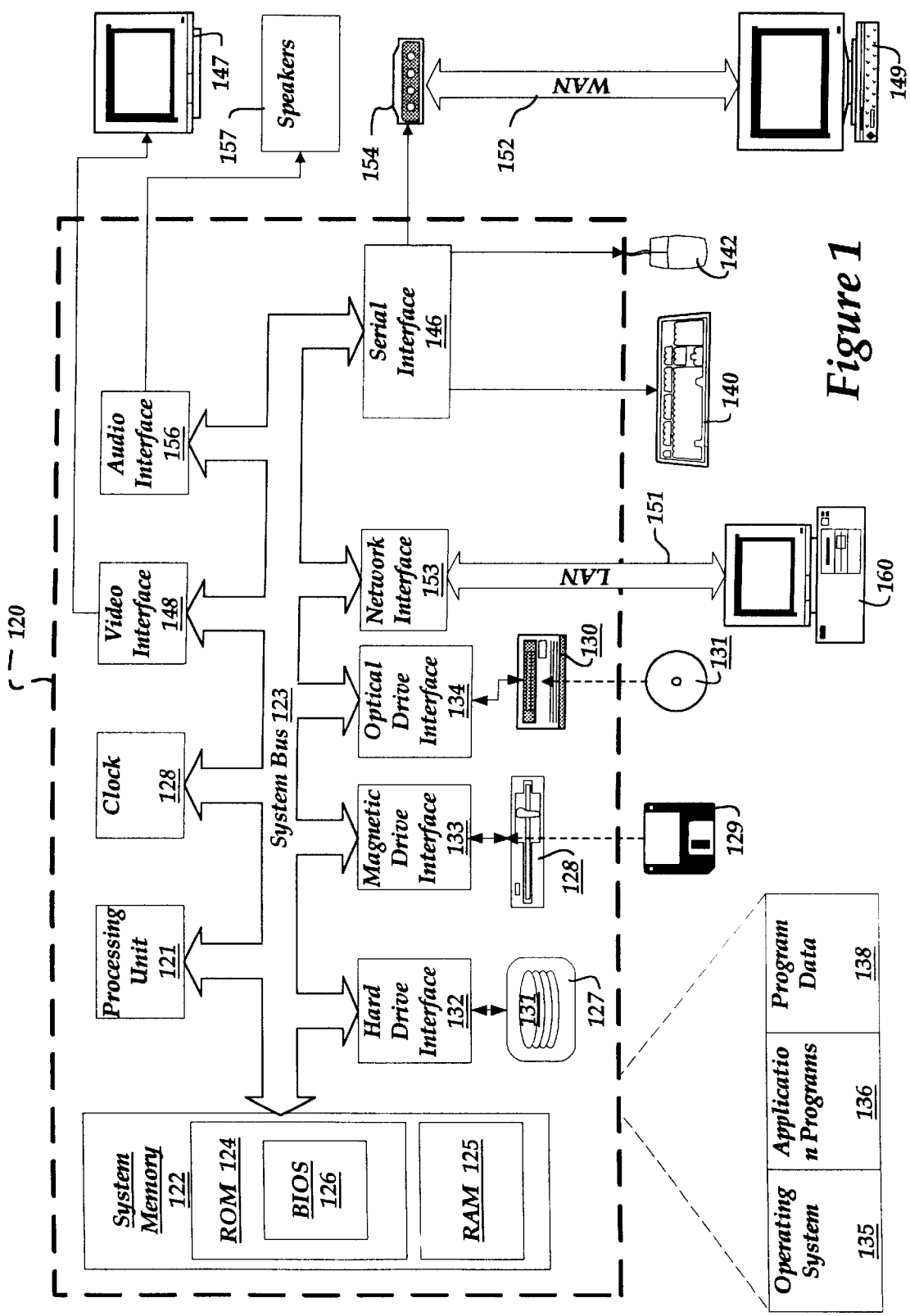
FIG. 1 is a block diagram of a general purpose computer system for implementing the present invention.

The present invention is a system and method for configuring and enforcing a system security policy that protects a users computer from potentially harmful active content received from a server computer. In an actual embodiment, the present invention is incorporated into the Microsoft Internet Explorer (version 4.0 or later), a Web browser available from Microsoft Corporation, Redmond, Wash. The Microsoft Internet Explorer contains a help file that describes in detail many of the features of the present invention. Further details on how to access the Microsoft Internet Explorer's help file are discussed below with reference to the security configuration user interface. While the following describes the present invention in terms of an actual embodiment of the invention that is incorporated into a World Wide Web browser, the present invention is not limited to applications on the World Wide Web and may be used in any computer environment, for instance, a single computer, a local area network, an intranet, a wide area network, or the Internet.

Web browsers commonly operate within the World Wide Web, which is a portion of a global computer network known as the Internet. The Internet is comprised of a plurality of server and client computers that are interconnected for the communication of digital data. A Web site is a computer network location that stores digital data. A Web site may correspond to one or more server computers, or to a subset of the data stored on a server computer. A server computer may include multiple Web sites. For example, the data contained within a directory structure stored on a server computer may correspond to a Web site. A Web site may be identified by a specification of an Internet domain, an Internet protocol (IP) address, or a directory path.

Web sites store digital data in groupings known as documents. The process of locating and receiving digital documents from Web sites is referred to as "browsing." A Web document may contain text, image data, sound data, format data and a variety of other information known to those skilled in the art. Web documents may also have "links" or references to various information stored on the same or another Web site at other locations. Increasing, Web documents also contain, or provide links to, "active content" that may provide some functionality either within the Web document, separately as a mini-application ("applet"), as a function library or class, or even as a full-scale computer program. As used herein, active content is defined as any computer-executable instructions that are downloaded (retrieved) from a server computer and that can run on a user's (or host) computer. Examples of active content are Java applets, Java classes, HTML scripts, Java scripts, VB scripts and ActiveX controls.

While the functionality provided by active content may provide many benefits to the user, this functionality comes with some risks to the user's system. Any code that runs on a user's computer has the potential to "harm" the user's system. For instance, malicious active content may purposefully delete files from the user's hard disk. Active content does not have to be "malicious" to be harmful to a user's system—"buggy" code can inadvertently do as much harm to a user's computer as code that is purposefully designed to do harm. It is a purpose of the present invention to provide a mechanism that allows the user to draw a balance between the advantages of allowing active content to run and the risks of letting that active content run on the user's computer. In accordance with the present invention, this balance between what the active content will be permitted to do on the user's computer and what the active content will be restricted from doing can be configured down to a very "fine grain" level and associated with the zone of where the active content was retrieved from and the context in which it was retrieved. The mechanism of the invention also enforces the security configuration once made.

The system security policy of the present invention is configured in progressively more "fine-grained levels" of configuration. As the configuration moves "down" the levels from the configuration of security zones to configuring primitives that define the parameters of a permission, the method and system of the present invention permit progressively "finer grain" control of just what the active content will be permitted to do on the user's system.

Once the configuration is completed, the invention provides a mechanism for comparing the information in the system security policy to the requirements of the downloaded active content. The invention advantageously provides for a requested permission set to be externally attached to the active content. The requested permission set specifies those permissions that the publisher of the active content asserts are necessary for the active content to run. The requested permission set is then compared by the mechanism of the present invention to one or more user permission sets (configured by the user) to determine if the requested permission set will be granted by the security manager. The method and system of the present invention to make this comparison between permission sets is described in detail below starting with the discussion of FIG. 13A.

Exemplary Computer System and Network

As well known to those familiar with the World Wide Web, a Web browser executes on a computer, such as a general purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, network Process, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including the system memory to the processing unit 121. The system bus 123 may be any one of several types of bus structures including a memory bus or memory controller, a peripheral bus, and a local bus using any of a variety of bus architectures. The system memory includes read only memory (ROM) 124 and random access memory (RAM) 125. A basic input/output system 126 (BIOS), containing the basic routines that helps to transfer information between elements within the personal computer 120, such as during start-up, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic disk 129 and a removable optical disk 131, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk drive 127, magnetic disk drive 128, optical disk drive 130, ROM 124 or RAM 25, including an operating system 135, one or more application programs 136, other program modules, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video interface 148. One or more speakers 157 are also connected to the system bus 123 via an interface, such as an audio interface 156. In addition to the monitor and speakers, personal computers typically include other peripheral output devices (not shown), such as printers.

The personal computer 120 may operate in a networked environment using logical connections to one or more remote computers, such as remote computers 149 and 160. Each remote computer 149 or 160 may be another personal computer, a server, a router, a network PC, a peer device or other common network node, and typically includes many or all of the elements described above relative to the personal computer 120. The logical connections depicted in FIG. 1 include a local area network (LAN) 151 and a wide area network (WAN) 152. Such networking environments are commonplace in offices, enterprise-wide computer networks, intranets and the Internet. As depicted in FIG. 1, the remote computer 160 communicates with the personal computer 120 via the local area network 151. The remote computer 149 communicates with the personal computer 120 via the wide area network 152.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Architecture of the Security Model

Figure 2:
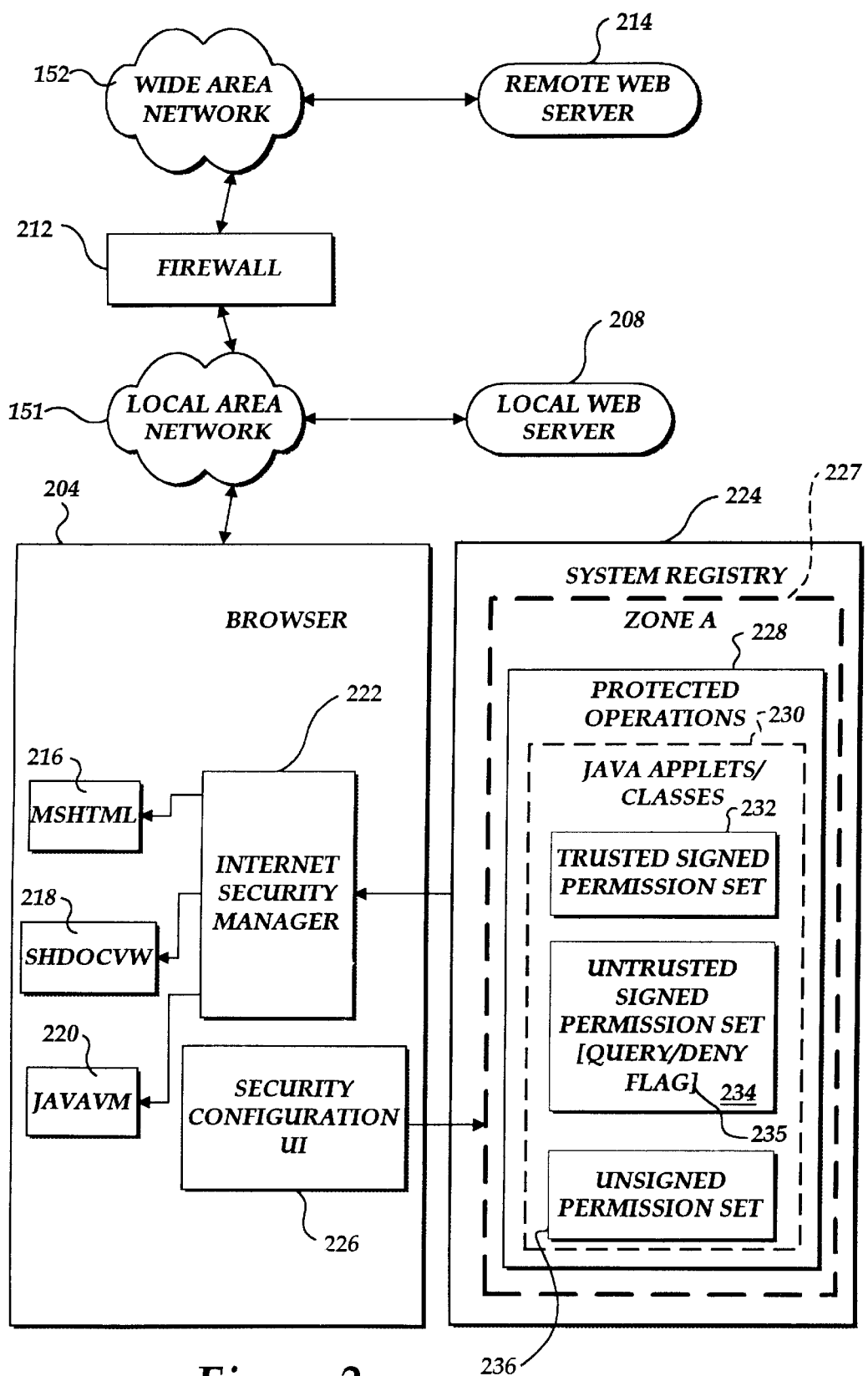
FIG. 2 is a block diagram illustrating an architecture of a security method and system in a browser operating on a computer network, in accordance with the present invention.

FIG. 2 illustrates the architecture of a security method and system formed in accordance with the present invention incorporated into a Web browser 204 communicating over a local area network 151 and a wide area network 152, such as the Internet. The local area network 151 functions as an intranet, connecting client computers executing Web browsers 204 to one or more local Web server computers 208. The local area network 151 communicates with the wide area network 152 through a firewall 212. The firewall 212 may comprise a computer that physically connects to the LAN 151 and the wide area network 152. Alternatively, the firewall 212 may comprise one or more computer programs executing on a computer connected to the LAN 151 and not intermediate to LAN 151 and the wide area network 152. The firewall 212 may include a component known as a proxy server. A proxy server ensures that the topology and addressing of the local area network 151 within the firewall 212 remains hidden from any program operating on the wide area network 152. A common function of a firewall 212 is to examine packets coming from the wide area network 152 and then either to let them through or block them according to a set of rules defined by the administrator of the local area network 151. A primary purpose of the security measures is to exclude potentially harmful content from reaching the local area network 151 that could adversely affect the programs and other data located on the local Web server 208.

The security provided by a firewall is essentially a "rough sort" that exclude content that may adversely affect the local web servers 208 connected to the local area network 151 without taking into consideration that it is sometimes desirable to download potentially harmful code from the wide area network. The present invention provides a method and system for allowing some of this potentially harmful content to be downloaded to the local area network while preserving the security of the local area network 151. In an actual embodiment of the invention, the security measures of the present invention are implemented in a browser 204 that is responsible for the download. The level of access given to active content downloaded from the wide area network is configurable in progressively more "fine-grained" levels that will be discussed in detail below.

The browser 204 includes a security configuration user interface 226 that is pictorially shown in FIGS. 4–9 (discussed below). The security configuration user interface 226 allows for the configuration of user permission sets that comprise progressively more "fine-grained" definitions of the permissions that an Internet security manager 222, which also forms part of the browser 204 will grant to active content coming from anywhere other than the local computer on which the Web browser is running. The security configuration user interface 226 allows the configuration of these actions by zone and by permission sets within zones. The configuration 227 of the security by configuration user interface 226 is stored in a system registry 224.

A remote Web server 214 communicates over the wide area network 152 to the Web browser 204. The remote Web server 214 may comprise one or more computer programs executing on the remote computer 149 illustrated in FIG. 1. As should be understood by those skilled in the art of computer systems, and others, the architecture illustrated in FIG. 2 is exemplary, and alternative architectures may be used without departing from the spirit of the invention. For example, the firewall 212 is not required by the invention. Similarly, the invention does not require both the local area network 151 and the local Web server 208. As illustrated in FIG. 1, the client computer executing the Web browser 204 may communicate with the wide area network via a modem 154. Additionally, a Web server may comprise a server program that executes on the same client computer executing the Web browser 204. In such a configuration, communication between a client computer and a server computer refers to communication between programs or software components executing on the same computer.

As depicted in FIG. 2, the Web browser 204 includes three components that perform operations in response to receiving documents from a local Web server 208 or a remote Web server 214: an MSHTML component 216, an SHDOCVW component 218, and a JAVAVM component 220. The MSHTML component 216 performs operations that control the display of an HTML page. The MSHTML component, in cooperation with additional components (not shown), also controls scripting. The SHDOCVW component 218 performs operations related to the user interface. The JAVAVM component 220 performs operations related to Java applets. The MSHTML component 216, the SHDOCVW component 218, and the JAVAVM component 220 perform similarly with respect to the mechanism of the present invention. Each of these components communicates with an Internet security manager 222.

The Internet security manager 222 performs operations to determine the security zone corresponding to a Web server and to determine the permissible operations corresponding to a security zone. The Internet security manager passes security information to the MSHTML component 216, the SHDOCVW component 218, and the JAVAVM component 220, when requested. The Internet security manager 222 illustrated in FIG. 2 communicates with the system registry 224. The system registry 224 operates as a database of information pertaining to application programs that execute on the personal computer 120 (FIG. 1). Windows 95 and Widows 98, available from Microsoft Corporation, of Redmond, Wash., are examples of operating systems that provide a system registry that is employed by application programs to store configuration information for subsequent retrieval.

The mechanism of the invention configures the Web browser to specify a plurality of zones. Each zone includes one or more Web sites, each Web site being situated on a corresponding computer network. The configuration includes information specifying a set of security settings corresponding to each zone. A security setting is a specification indicating an action to perform when a Web page from one of the zones requests a protected operation to be performed. During a Web browsing session, the mechanism of the invention determines the zone corresponding to the Web site currently being browsed. Prior to performing the protected operation, the mechanism of the invention determines the action to perform, based on the current Web site's zone, the requested operation, and the security setting corresponding to the requested operation and the Web site's zone. Depending upon the security setting, the Web browser may perform the requested operation, prevent the requested operation from being performed, or prompt the user for a decision as to whether to perform the requested operation. During the browsing of a Web site, the browser visually indicates the zone corresponding to the Web site.

As noted above, the security configuration user interface component 226 located within the browser 204 stores information pertaining to security in the system registry 224. At the broadest level, the security configuration user interface component 226 stores information representing the security settings corresponding to each security zone and the distribution of Web sites among the security zones. An exemplary zone configuration, denoted Zone A, is shown in block form within the system registry 224 illustrated in FIG. 2. The zone configuration may include a plurality of zones defined by the user, by a system administrator, or shipped as a default with the product incorporating the present invention. The configuration of Zone A (FIG. 2) includes settings for protected operations 228 that represent certain fundamental operations that if made available to active content have the potential to enable harm to the user's computer. A listing of the some of the protected operations that may be configured by the security configuration user interface 226 appears below.

For some protected operations, such as the permissions granted to active content downloaded from sources outside the user's computer, it is desirable to limit the permissions given to the active content to only those that the active content may legitimately require and that the user is comfortable granting. An actual implementation of the invention defines Java applets and classes 230 as a protected operation. The Java applets and classes 230 are assigned permissions that define the operations that the Java applet and classes 230 are permitted to access. These permissions are determined by the Internet security manager 222 by comparing them against a trusted signed permission set 232, an untrusted signed permission set 234, and an unsigned default permission set 236. The untrusted signed permission set 234 has an associated query/deny flag 235 stored in the system registry 224 that indicates whether the untrusted signed permission set 234 is a query set or a deny set. As will be discussed below, the three set 232, 234, 236 configuration is used by the present invention to determine the permissions granted to the Java applets and classes downloaded from Zone A 226. The security zone 226 is discussed in detail below.

The security configuration user interface 226 does not need to be part of the browser 204 and can be its own application or utility found in another application. For example, addition to the security configuration user interface 226 found in the Microsoft Internet Explorer, an actual embodiment of an alternate security configuration user interface that can also be used to edit the system security policy (FIG. 3) is found in the Internet Explorer Administration Kit (IEAK) available from Microsoft Corporation, Redmond, Wash. The IEAK has a help file containing information on using the security user interface 226 and the configuration of permissions within zones. As will be understood by those skilled in the art of computer programming and others, alternative mechanisms for storing and accessing the security configuration information may be used. For example, the security configuration information described as residing in the system registry 224 may alternatively reside in one or more data structures internal to the application or in files.

I. Configuration of the System Security Policy

Figure 3:
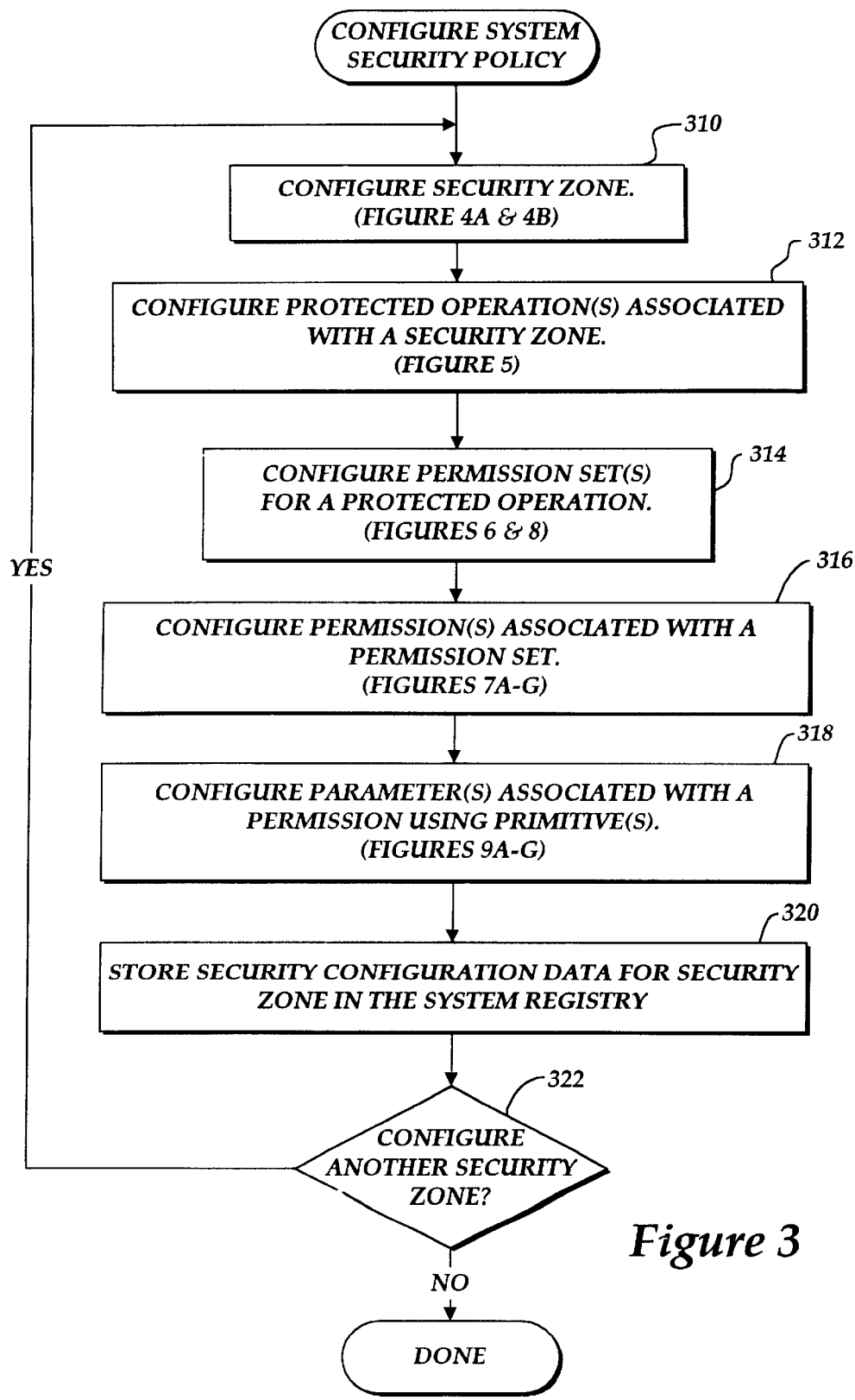
FIG. 3 is a functional flow diagram illustrating the process of configuring the security method and system of the present invention.

An overview of the configuration of the system security policy is illustrated in FIG. 3. As mentioned above, the configuration of the system security policy allows the configuration of progressively more "fine-grain" configuration levels. Each configuration level is a refinement of the previous configuration level. The configuration levels are discussed in detail below, but in overview are:

A. Configure a security zone (block 310) or accept a predefined set of security zones;
   1. Configure one or more protected operations (block 312) associated with each security zone defined in the previous level or accept a predefined set of protected operations;
   a) Configure one or more permission sets (block 314) for a protected operation defined in the previous level or accept a predefined set of permission sets;
      1) Configure one or more permissions for each permission set defined in the previous level (block 316) or accept a predefined set of permissions;
         (a) Configure one or more parameters (block 318) for each permission defined in the previous level using one or more primitives.

In the following discussion, a user is defined as anyone having the right to configure the system security policy. This can include the end user of the browser or a system administrator. As the user "drills down" through the configuration of the progressively more fine-grained definitions of the security policy, there is a corresponding level of sophistication that is required of the user. To provide for the varying levels of user sophistication, as indicated in the overview above, at most levels the user can select predefined settings that define the configuration from that level down.

A. Configuration of Security Zones

Figure 4A:
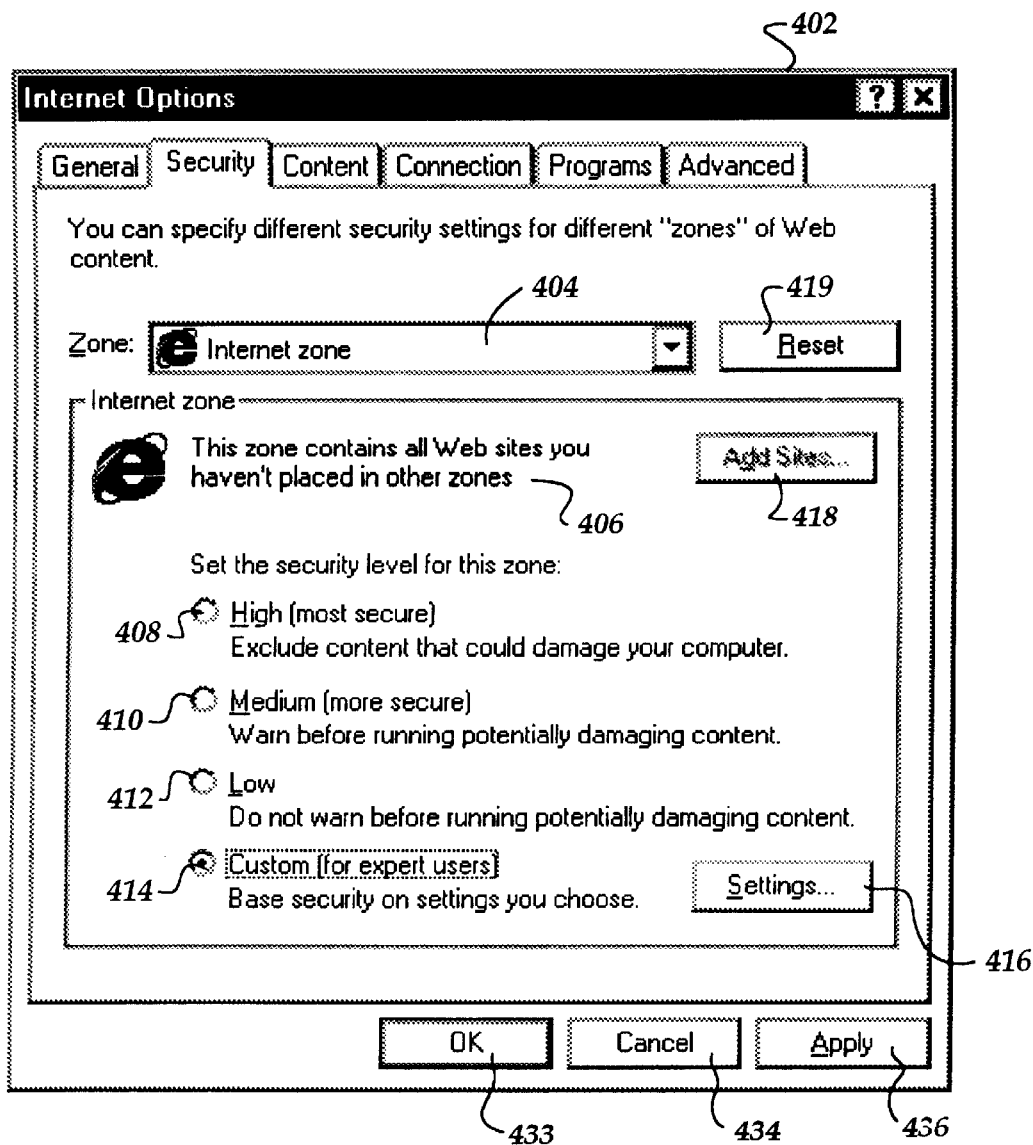
FIG. 4A is a pictorial representation of a "Internet Options" dialog window that exposes the Security tab in accordance with the present invention.
Figure 4B:
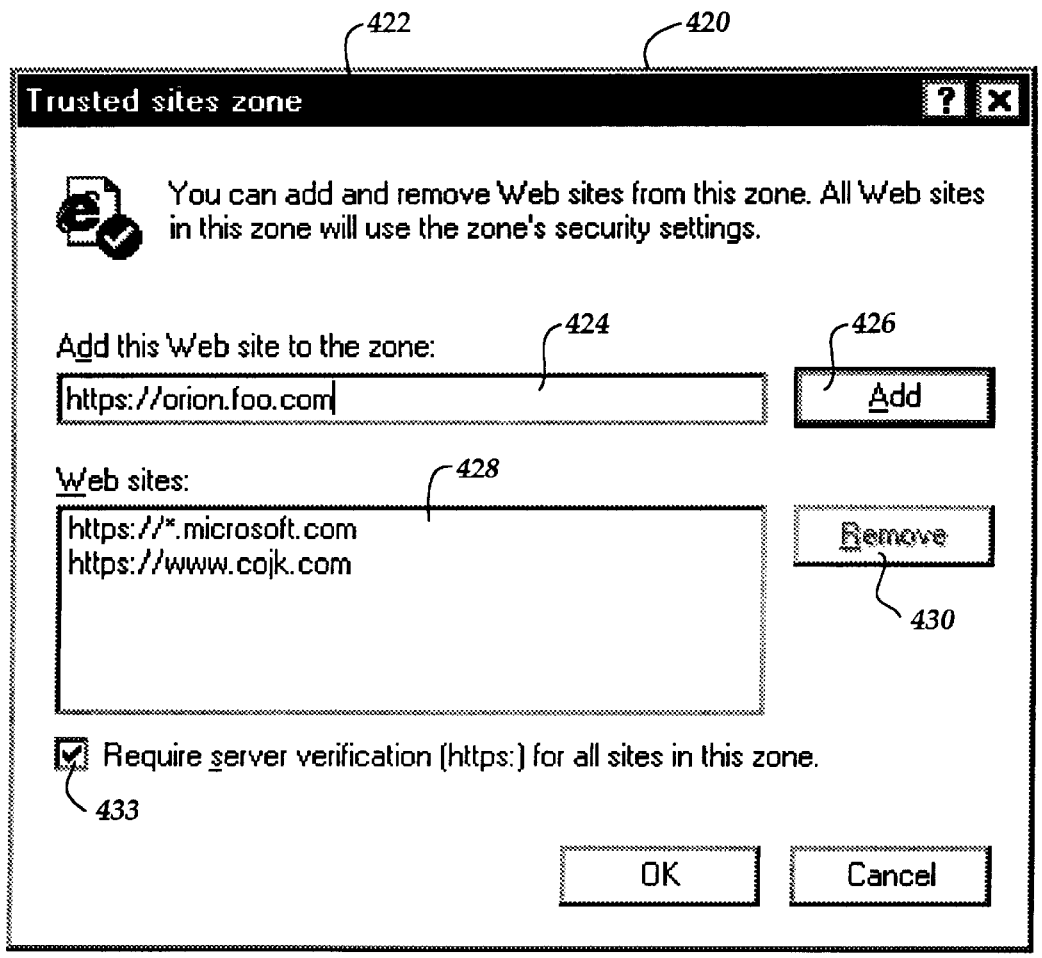
FIG. 4B is a pictorial representation of the "Trusted sites zone" dialog window produced in accordance with the present invention.

The highest level of configuration is the security zone configuration 310 exemplified by the security configuration user interface 226 dialog windows shown in FIGS. 4A and 4B. FIG. 4A illustrates an "Internet Options" dialog window 402 that is presented by the security configuration user interface component 226 to configure security zones. As depicted in FIG. 4A, a "zone" pull-down control 404 lists the different security zones. In one actual embodiment of the invention, four security zones are provided: a "local intranet" zone, a "trusted sites" zone, a "restricted sites" zone, and an "Internet" zone. The local intranet zone includes Web sites that reside on the local area network 151 (FIG. 2) and reside on the same side of the firewall 212 as the Web browser 204. The trusted sites zone includes Web sites that a user trusts. These are sites that a user believes have little risk that they contain files or documents that include harmful active content. Trusted sites may reside on the local area network 151 or the wide area network 152. The restricted sites zone includes sites that a user does not trust. In general, a user does not want to allow any operations to be performed in response to files or documents received from a restricted site that may allow potentially harmful active content to be executed. The Internet zone includes by default all Web sites that are not in the local intranet zone or have not been assigned to any other zone. While this actual embodiment of the invention provides four default security zones, additional custom zones may be configured by the user. Alternative embodiments could specify more zones, or less zones, or allow a user to create or delete security zones.

The Internet Options dialog window 402 includes a zone description static text control 406 that provides a short description of the zone selected in the zone pull down control 404. Some of the security zones are configurable, and allow a user to specify the Web sites that are included within the zone. In the actual embodiment referenced above, the local intranet zone, the trusted sites zone, and the restricted sites zone are configurable in this manner. When one of these configurable zones is selected in the zone pull down control 404 an "add sites" push-button control 418 is enabled. When a user selects the add sites push-button control 418, the Web browser 204 presents a "Web sites" dialog window 420 that allows a user to specify the Web sites corresponding to a security zone, illustrated in FIG. 4B and described below. The Web sites dialog window 420 provides a user with the ability to specify the Web sites corresponding to a security zone.

The title 422 of the Web sites dialog window 420 indicates the currently selected security zone from the Internet Options dialog window 402 (FIG. 4A). To add a Web site to the currently selected zone, a user enters the Web site address and a corresponding protocol in an "add" text box 424 and then selects an "add" button 426.

As discussed above, the Internet security manager 222 determines the security zone ID based on the address (URL) of the current Web page. The Internet security manager 222 parses the Web page address to determine the servers that are to be included in the zones according to the listing of domains within each zone. The domain has a number of sub-domains. The "top level" domain indicates a general classification or geographical location. The "second level domain" is registered to a particular user or organization. The last sub-domain is a server computer at the second level domain. For example, if the Web page address (URL) is:

http://www.microsoft.com/ie/plus/default.htm the corresponding top level domain is:

.com the corresponding second level domain is:

microsoft.com (registered to Microsoft Corporation, Redmond, Wash.)

and a server named "www" at microsoft.com is fully described as:

www.microsoft.com

The protocol specified in this URL is HTTP, which is used to retrieve a Web document located on the server www.microsoft.com at the path/ie/plus/default.htm. Documents can also be retrieved using other protocols such as the FTP or "FILE" protocol. For example, the corresponding address is in a local file system;

c:\documents\doc1.htm the corresponding domain is "c:\", the document is located at path \documents\doc1.htm, and the corresponding protocol is FILE, indicating a file system protocol.

Wildcard characters may be used to specify multiple domain names. In the present invention, wildcard characters include the "*" character (indicating zero or more characters) and the "?" character (indicating any single character). For instance the regular expression "*.microsoft.com" specifies all servers at the "microsoft.com" second level domain. If the expression is "web?.microsoft.com", this indicates all servers at microsoft.com beginning with the characters "web" followed by a single character (e.g., web1, web2, webX etc.). Preferably, when the Internet security manager 222 analyzes the expression, explicit specifications take precedence over general specifications. For example, if a system is configured with "office.microsoft.com" in a first zone, and "*.microsoft.com" in a second zone, a match with "office.microsoft.com" overrides the second specification of the more general *.microsoft.com and the Web site will be considered by the Internet security manager 222 to be part of the first zone.

A user may configure the Web browser 204 so that two different protocols corresponding to the same domain reside in two different security zones. For example, referring to the addresses illustrated above, the combination of HTTP and www.microsoft.com may be configured in the trusted sites security zone, while the combination of FTP and www.microsoft.com may be configured within the Internet security zone. A user may also specify a Web site using numeric IP addresses or a numeric range to include all Web sites having an IP address within the range.

The "Web sites" list box 428 (FIG. 4B) displays a list of Web sites that are currently configured within the currently selected security zone. To remove a Web site from a security zone, a user selects a Web site within the Web site list box 428 and selects the "remove" button 430. By selecting (checking) check box 432, the user is required to use the HTTPS protocol for all web sites entered. The HTTPS protocol is Web server software for Microsoft Windows NT available from Microsoft Corporation, Redmond, Wash. Among other advantages, the HTTPS protocol offers secure network connections and verification that the server purporting to send the information is actually the server sending the information.

As shown in FIG. 4A, most of the dialog windows presented by the security configuration user interface 226 have an "OK" or "Save" button 433, a "Cancel" button 434, and sometimes an "Apply" button 436. Pressing (by selecting with an input device such as a mouse or keyboard) the "OK" or "Save" button 433 causes the configuration indicated on the current dialog to be saved and exits the dialog. Pressing the "Cancel" button closes the current dialog without recording any configuration change made in the dialog. The "Apply" button 436, when available, saves and applies the configuration but does not exit the dialog. Other dialog windows (e.g., FIG. 5B) present a "Yes" button 514 that when pressed accepts the action suggested in the dialog window, a "No" button 516 that does not accept the action suggested in the dialog window, and a "More Info" or "Help" button 518 that accesses a help file that displays a dialog with an explanation of the dialog from which it is called. The help file may also be accessed for many of the individual controls within the dialog by selecting the control and pushing the "F1" key on the computer keyboard.

The Internet Options dialog window 402 also includes a mechanism for selecting a security level corresponding to each security zone. As depicted in FIG. 4A, a choice of four security levels is provided for each security zone (the Internet zone is currently displayed in the dialog window 402): high level 408, medium level 410, low level 412, and custom level 414. Each security level has a corresponding radio button control. The high security level 408 provides the most security, and excludes the greatest number of potentially damaging operations. The low security level 412 provides the lowest level of security and allows the most operations to be performed without warning the user. The custom security level 414 allows a user to customize the configuration for a security zone by specifying an action to be taken corresponding to each protected operation. The use of the custom security level is described in detail below. Alternate embodiments of the invention may include additional security levels or fewer security levels than the four levels depicted in FIG. 4A.

For each of the security zones, a user can specify the corresponding security level. Each security zone has a default security level, which is used if not changed by a user. The default security level for the local intranet zone is medium. The default security level for the trusted sites zone is low. The default security level for the restricted sites zone is high, and the default security level for the Internet zone is medium. When a user selects a security zone in the zone pull-down control 404, the security configuration UI component 226 indicates the corresponding security level by selecting the corresponding security level radio button 408, 410, 412, or 414. The zone security level can be reset to the default value for the zone by pressing reset button 419.

1). Configuration of Protected Operations

In the next level down of configuration, a set of protected operations is configured for each security zone (see, FIG. 3; block 312). When the custom security level radio button 414 is selected, a "settings" push-button 416 (FIG. 4A) is enabled. Pressing the settings push-button 416 causes the security configuration user interface 226 to display a "Security Settings" dialog window 502, illustrated in FIG. 5. The security settings dialog window 502 includes a protected operation settings window 504, which provides a list of protected operations that can be configured by the mechanism of the invention. For each protected operation a set of two or more corresponding settings is displayed with associated mutually exclusive radio buttons. A user can select a setting corresponding to each operation listed in the security settings dialog window 502 by selecting the associated radio button.

In one actual embodiment of the invention, the security configuration user interface, 226 provides settings for each of the protected operations listed below. Under each protected operation, the choices for each setting are listed with an "O" character representing the associated radio button for the selection.

- Script ActiveX Controls Marked "Safe for Scripting."
  - O   Enable
  - O   Prompt
  - O   Disable
- Run ActiveX Controls and Plug-Ins
  - O   Enable
  - O   Prompt
  - O   Disable
- Download Signed ActiveX Controls
  - O   Enable
  - O   Prompt
  - O   Disable
- Download Unsigned ActiveX Controls
  - O   Enable
  - O   Prompt
  - O   Disable
- Initialize and Script ActiveX Controls Not Marked As "Safe."
  - O   Enable
  - O   Prompt
  - O   Disable
- Java Permissions
  - O   Custom
  - O   Low safety
  - O   Medium safety
  - O   High safety
  - O   Disable Java
- Active Scripting
  - O   Enable
  - O   Prompt
  - O   Disable
- Scripting of Java Applets
  - O   Enable
  - O   Prompt
  - O   Disable
- File Download
  - O   Enable
  - O   Disable
- Font Download
  - O   Enable
  - O   Prompt
  - O   Disable
- Log-On
  - O   Automatic log-on only in Internet zone
  - O   Anonymous log-on
  - O   Prompt for user name and password
  - O   Automatic log-on with current user name and password
- Submit Nonencrypted Form Data
  - O   Enable
  - O   Prompt
  - O   Disable
- Launching Applications and Files in an IFRAME
  - O   Enable
  - O   Prompt
  - O   Disable
- Installation of Desktop Items
  - O   Enable
  - O   Prompt
  - O   Disable
- Drag and Drop or Copy and Paste Files
  - O   Enable
  - O   Prompt
  - O   Disable
- Software Channel Permissions
  - O   Low safety
  - O   Medium safety
  - O   High safety The set of protected operations can be extended within the present invention. A setting of "enable" corresponding to an operation indicates that the operation is to be performed, when requested, without warning the user. A setting of "disable" indicates that the corresponding operation is not to be performed. A setting of "prompt" indicates that, when the corresponding operation is requested, the Web browser should query the user for instructions or whether to proceed with the operation.

Figure 5A:
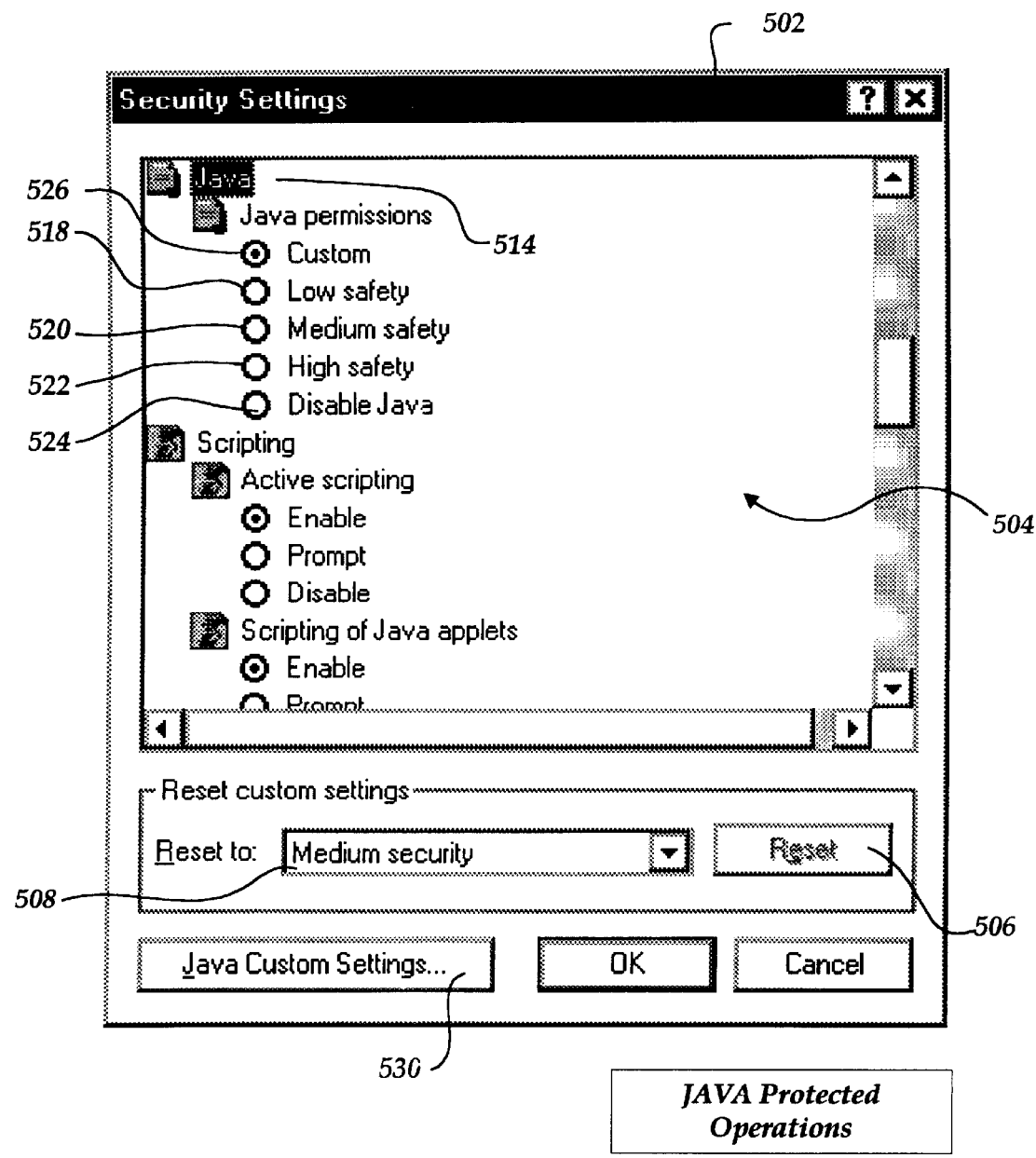
FIG. 5A is a pictorial representation of a "Security Settings" dialog window produced in accordance with the present invention.
Figure 5B:
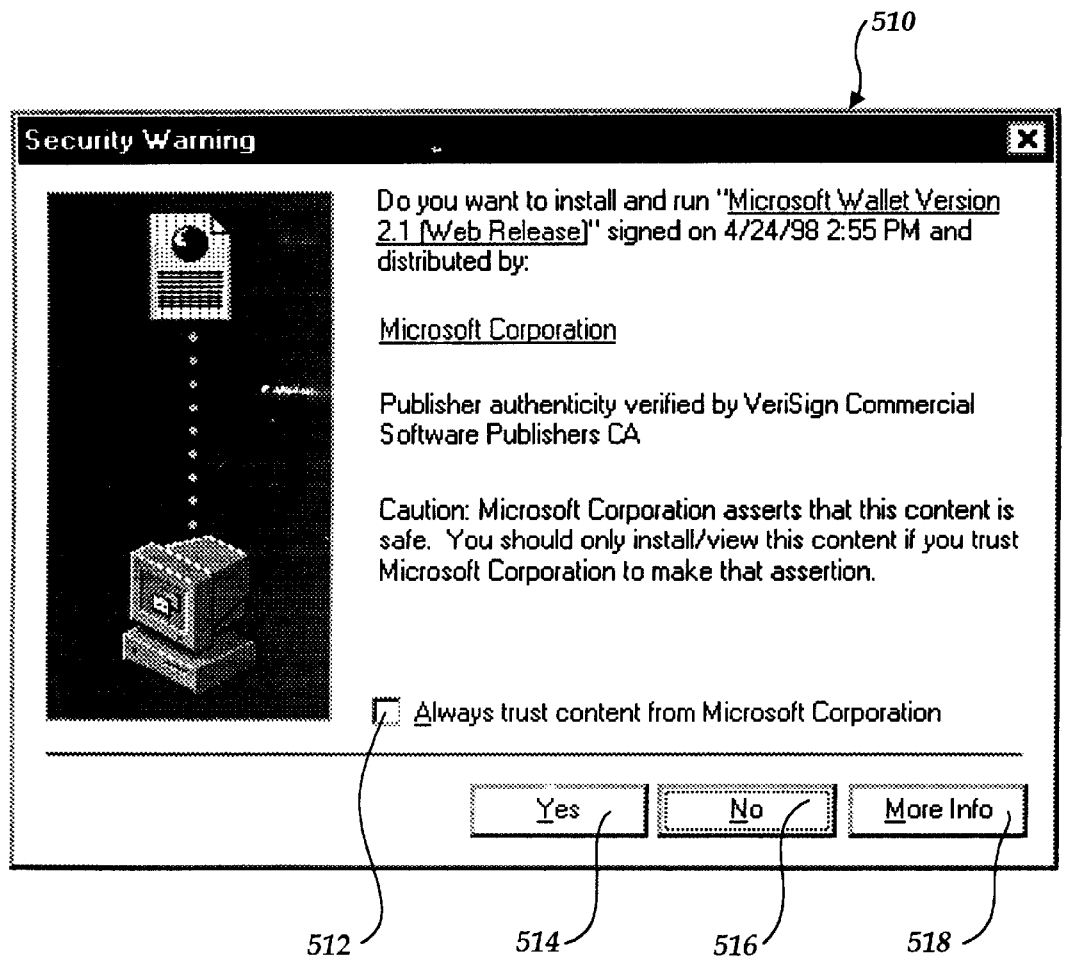
FIG. 5B is a pictorial representation of a "Security Warning" dialog window produced in accordance with the present invention.
Figure 6:
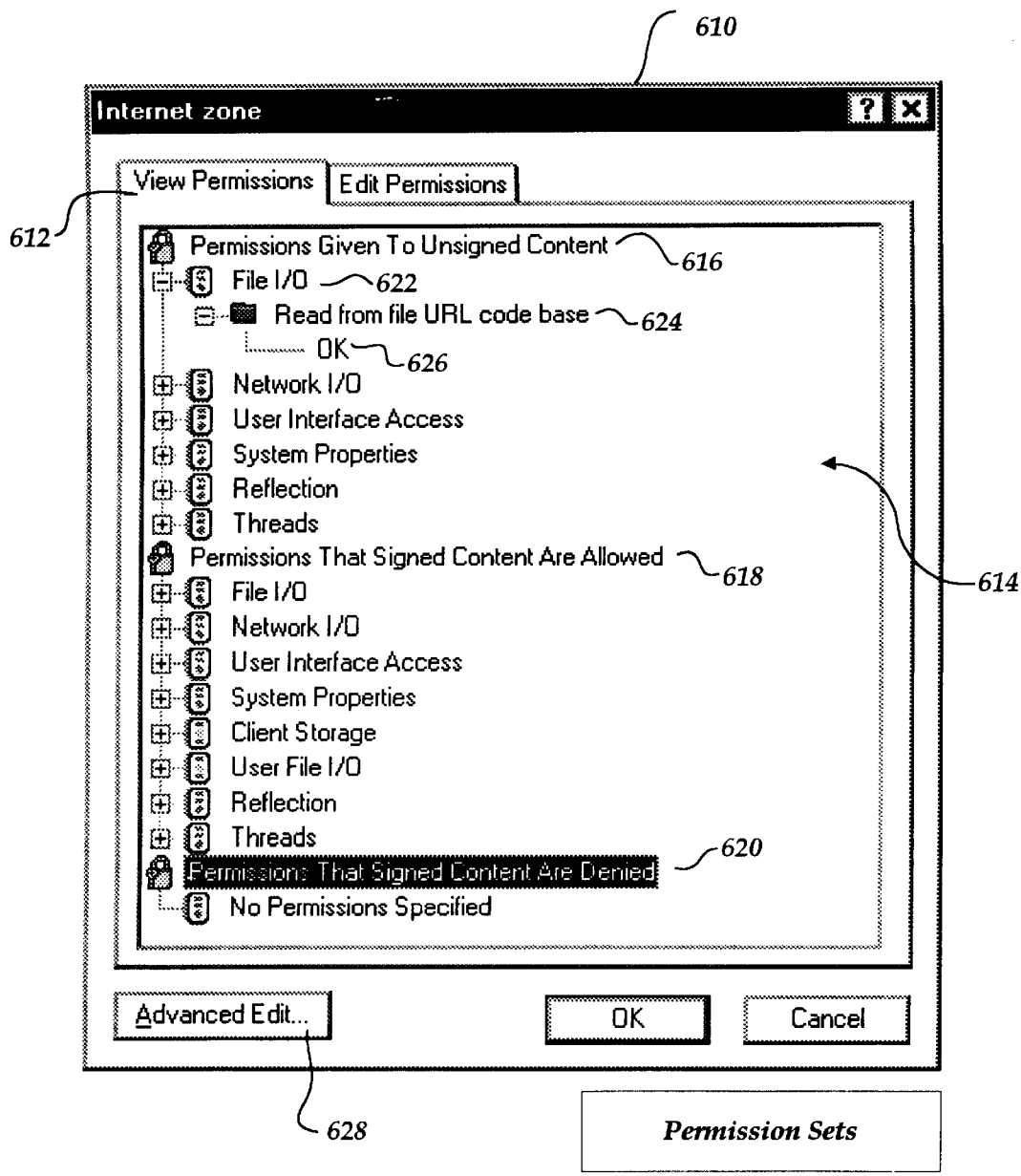
FIG. 6 is a pictorial representation of the "Internet zone" dialog window having a configuration menu for Java permissions on a "View Permissions" tab, in accordance with the present invention.

FIG. 5B illustrates an exemplary "security warning" dialog window 510 that is displayed in response to a request to perform an operation having a corresponding "prompt" setting. As illustrated in FIG. 5B, the security warning dialog window 510 preferably informs the user of the operation to be performed and the current Web site that is requesting the operation. The user can answer yes or no to indicate whether the operation is to be performed. As depicted in FIG. 5B, in one actual embodiment, the security warning dialog window 510 includes an "always trust software" checkbox 512. When a user selects this checkbox, all software that is properly digitally signed from the specified source is considered to be "trusted software."

The security settings dialog window 502 (FIG. 5A) also includes a "reset" push-button 506 and a "reset to" pull-down control 508. When a user presses the reset button 506, all of the settings corresponding to the protected operations in the custom security level are reset to the security level specified in the "reset to" pull-down control 508. The user can then make changes to individual settings in the protected operation settings control window 504.

Administering Permissions in Zones a) Configuration of Permission Sets for Certain Protected Operations For certain protected operations, it is advantageous to provide for a more "fine grained" configuration of security policy than the "enable", "disable" and "prompt" configuration options discussed above. The administration of active content from zones that are not fully trusted is an example of when fine grained configuration is particularly beneficial. The purpose of active content has progressed from displaying animation in Web documents to providing useful features and utilities that the user may wish to use. In general, however, the more functionality offered by the active content the more access and control that the active content must have to the host system.

Giving access and control to active content implies risk to the host system that the active content will perform some harmful action. The present invention allows the user to balance the risk of the active content performing harmful action versus the reward of the active content as advertised and to configure a security policy accordingly. By associating a security policy with a zone from which the active content is downloaded, the user can effectively assign a certain security policy to a group of Web sites having active content that pose similar risk.

Returning to FIG. 3, the fine-grained administration of the security settings for the individual protected operations is illustrated in a protected operations configuration block 312. Protected operations are defined by permissions grouped in permission sets. Permissions are configured in permission sets for use in the administration of permissions within zones, which is discussed in detail below (see FIG. 3, block 314).

The individual permissions for a protected operation associated with a security zone are configured in a block 314. In FIG. 5A, the configuration dialog window 504 shows a protected operation for Java classes and applets 514. The Java protected operation 514 has a set of constituent permissions which determine the capabilities that will be allowed to downloaded Java active content from the security zone being configured. At the configuration of the permissions level 314 (FIG. 3), the user can specify the low safety default set of permissions 518, the medium safety default set of permissions 520, or the high safety default set of permissions 522. The user can also select to disable any Java content 524 or to create a custom set of permissions 526. The selection of the custom set of permissions 526, low safety set of permissions 518, medium safety set of permissions 520, high safety set of permissions 522 or to disable Java active content 524 altogether is accomplished by selecting the radio button associated with each of these entries.

In FIG. 5A, the radio button associated with a custom set of Java permissions is shown as selected. The selection of the custom set of permissions 526 radio button exposes a Java custom settings button 530. The Java custom settings button 530 is pressed in order to reach an Internet zone configuration screen 610 illustrated in FIG. 6. The Internet zone configuration screen 610 includes a view permissions tab 612. The view permissions tab 612 exposes a hierarchical listing of the permissions associated with the Java applets and classes protected operation in three permission sets. The first permission set is displayed as the permissions given to unsigned content permission set 616. The second permissions set is the permissions that signed content are allowed permission set 618 and the third permissions set are the permissions that the signed content are denied 620. Under each of these three permission sets 616, 618, and 620 are a list of the configurable permissions in the permission set. Each permission has a set of parameters that define the scope of the permission. The hierarchical display in the permission listing window can be expanded and collapsed to reveal more or less information as desired by the user using a treeview control known to those skilled in the art. For instance, it is possible to expose below the file I/O permission the read-from file URL code base parameter 624. The read-from file URL code base parameter 624, in turn, can be opened to expose the setting of the parameter which is indicated to be "OK" 626.

The permissions that may be configured for unsigned content 616 are:

File I/O
Network I/O
User Interface Access
System Properties
Reflection
Threads

A similar set of permissions is listed for the permissions that signed content are allowed permission set 618 with the additional permissions:

Client Storage
User File I/O

The permissions that signed content is denied permission set 620 indicate that no permissions have currently been specified.

Custom permission sets may be defined for certain protected operations. In an actual embodiment of the invention, custom permission sets may be defined for Java applets and classes. However, the present invention also contemplates alternative embodiments for protected operations that regulate other active content. Permissions within each permission set 616, 618, and 620 are independently configurable.

1). Configure Permissions Associated with a Permission Set

The next level down in the progressively more fine-grain configuration of the system security policy is to configure the permissions associated with each permission set (see FIG. 3, block 316). FIGS. 7A–E illustrate the user configuration interface 226 for the configuration of individual permissions within a permission set. A detailed description of the permissions that may be configured for the invention as actually implemented in the Microsoft Internet Explorer are defined in detail in several published sources available to software developers through the Microsoft Web site ( www.microsoft.com) and the Microsoft Developer Network ("MSDN") subscription service available from Microsoft Corporation, Redmond, Wash. on CD-ROM. One of these published sources is entitled "Trust-Based Security For Java" <mk:@ivt:pdinet/good/java/htm/trust_based_security.htm> (MSDN Library CD, Apr. 19, 1998), incorporated herein by reference.

At this level of configuration, permissions can be configured for signed content and unsigned content permission sets. Signed content means content that has been digitally signed in such a manner that the integrity of the content and the identity of the publisher is guaranteed. The content is unsigned if the content does not have a digital signature. The creation and components of a digital signature are discussed in detail below.

The configuration of permissions indicated in FIGS. 7A–E allows the user to disable or enable groups of permissions or individual permissions. The edit permissions user interface 702 is exposed by selecting the edit permissions tab 704. The permissions are grouped under the permissions that will be configured for the unsigned content and a separate set of permissions that will be assigned to signed content. The permissions are displayed in a permission display window 706 which displays a hierarchy of the following permission configuration options:

- Unsigned Content
    Run Unsigned Content
        O   Run in a sandbox
        O   Disable
        O   Enable
        O   Additional Unsigned Permissions
            Access to all Files
                O   Disable
                O   Enable
            Access to all Network Addresses
                O   Disable
                O   Enable
            Execute
                O   Disable
                O   Enable
            Dialogs
                O   Disable
                O   Enable
            System Information
                O   Disable -continued

- ○ Enable
- Printing
  - ○ Disable
  - ○ Enable
- Protected Scratch Space
  - ○ Disable
  - ○ Enable
- User Selected File Access
  - ○ Disable
  - ○ Enable
- Signed Content
- Run Signed Content
  - ○ Prompt
  - ○ Disable
  - ○ Enable
    - Additional Signed Permissions
    - Access to all Files
      - ○ Prompt
      - ○ Disable
      - ○ Enable
    - Access to all Network Addresses
      - ○ Prompt
      - ○ Disable
      - ○ Enable
    - Execute
      - ○ Prompt
      - ○ Disable
      - ○ Enable
    - Dialogs
      - ○ Prompt
      - ○ Disable
      - ○ Enable
    - System Information
      - ○ Prompt
      - ○ Disable
      - ○ Enable
    - Printing
      - ○ Prompt
      - ○ Disable
      - ○ Enable
    - System Information
      - ○ Prompt
      - ○ Disable
      - ○ Enable
    - Printing
      - ○ Prompt
      - ○ Disable
      - ○ Enable
    - Protected Scratch Space
      - ○ Prompt
      - ○ Disable
      - ○ Enable
    - User Selected File Access
      - ○ Prompt
      - ○ Disable
      - ○ Enable Standard security for Java active content has been to run the code in a "sandbox" that provides very limited access to the host system resources. The user can elect to run unsigned active content in the sandbox by selecting radio button 708. The user can also choose to disable all permissions for unsigned content by selecting radio button 710. When the disable unsigned content radio button 710 is selected, the ability of the user to enable or disable individual permissions for running unsigned content is also disabled by "graying out" the remaining radio buttons under the additional unsigned permissions listing 712. Similarly, if the user chooses to enable all permissions for unsigned content by selecting the unsigned content enable radio button 714, all permissions are enabled for the unsigned content and the radio buttons are "grayed out" so that the user is unable to specify whether individual permissions for the unsigned content are enabled or disabled.

If the user desires to run the unsigned content in the sandbox but to provide additional unsigned permissions, the user selects the run in sandbox radio button 708. Individual permissions generally indicated by 716 can then be individually enabled or disabled by selecting the corresponding radio button. For instance, if the user desires to allow the active content downloaded from the security zone to be able to print, the user selects the enable radio button 718 under the printing permission 720 to enable printing.

As with most levels of granularity in configuration of security settings, it is possible to reset all of the actions to the default values provided in a high security, medium security, and low security permission defaults by selecting one of those options in the reset drop-down box 722 and pressing the reset button 724. The permissions may also be reset to a saved permissions set 726 by selecting the saved permissions option 726 in the reset to drop-down box 722 and pressing the reset button 724. A dialog inquires if the user would like to save the configuration as a saved permission set when the user exits the dialog window shown in FIGS. 7A–E. The configuration is written to the system registry 224 and the dialog window 702 is closed if the user invokes the "OK" button. If the user invokes the "Cancel" button 740, the dialog window 702 is closed and the new configuration is not saved in the system registry 224.

Figure 7A:
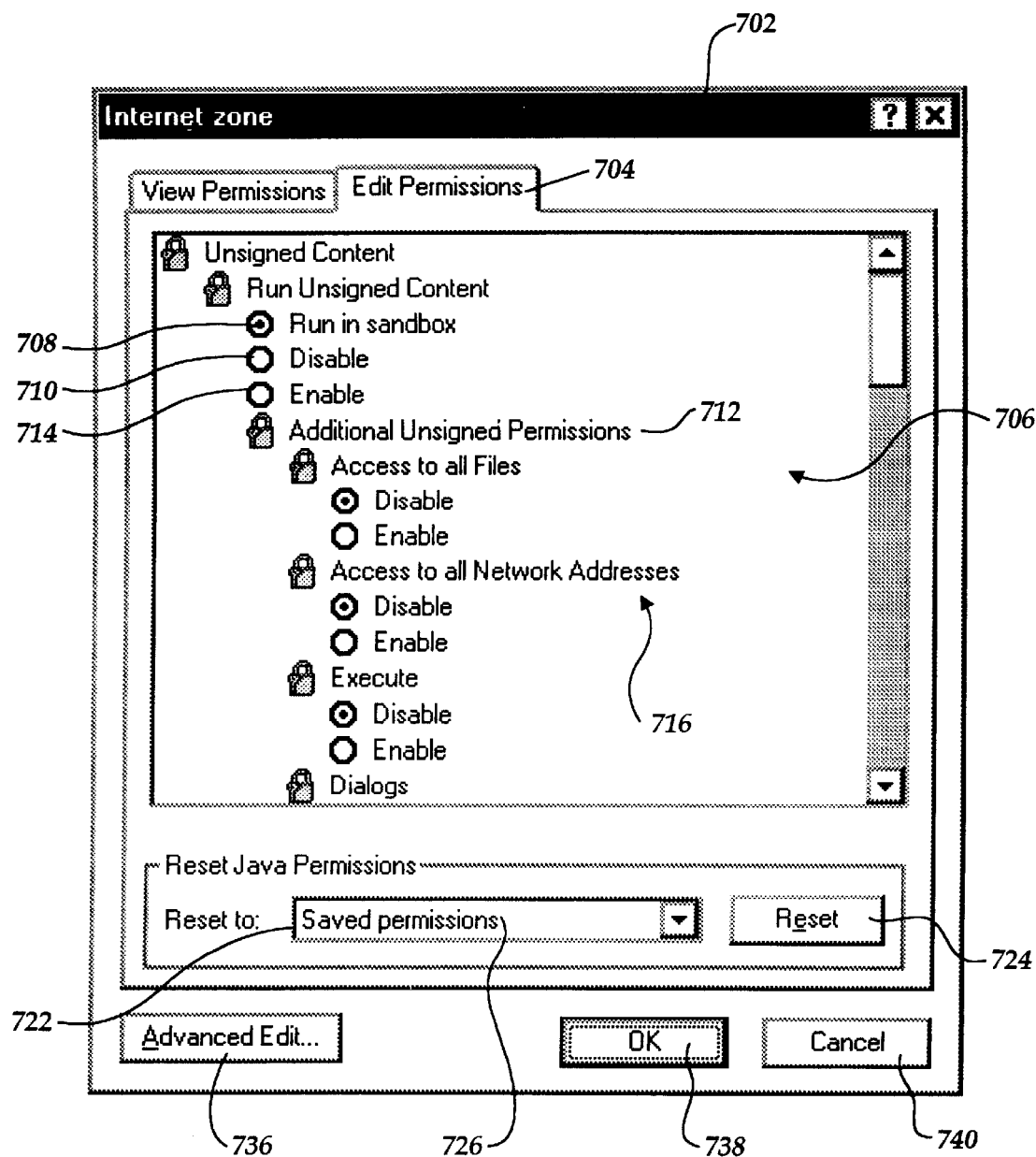
FIGS. 7A–E are pictorial representations of the "Internet zone" Java permissions window dialog displaying the "Edit Permissions" tab, in accordance with the present invention.
Figure 7B:
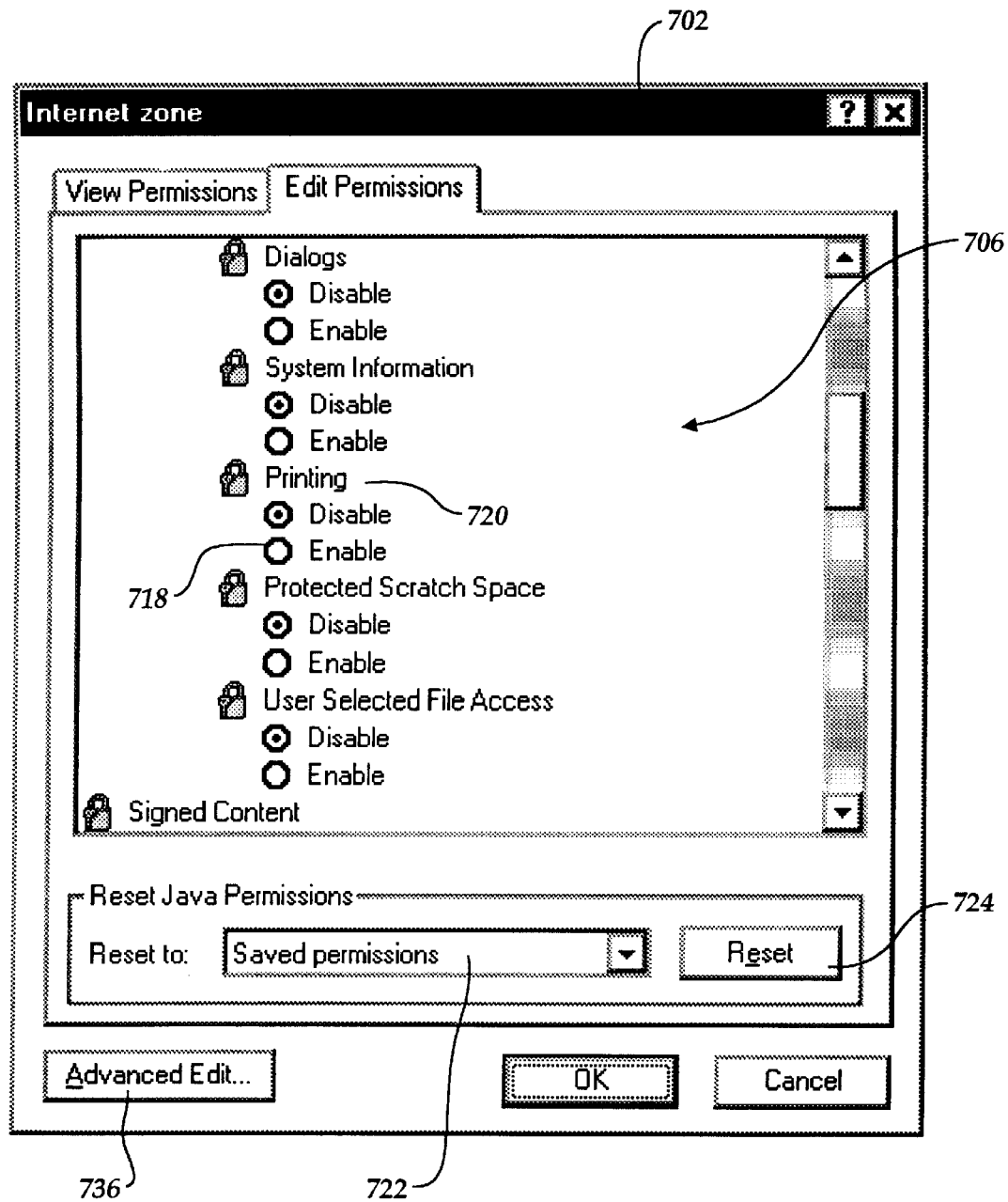
Figure 7C:
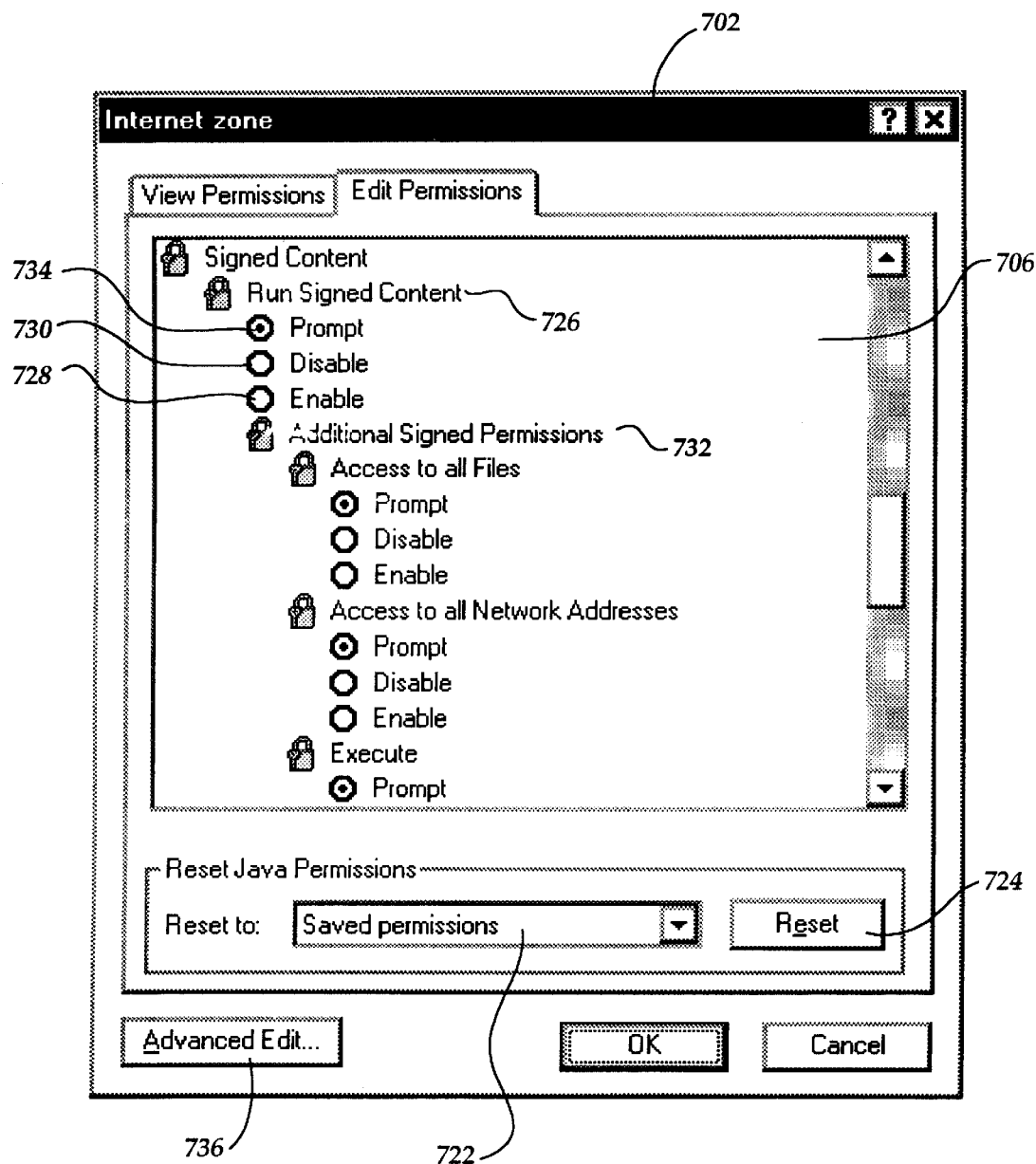
Figure 7D:
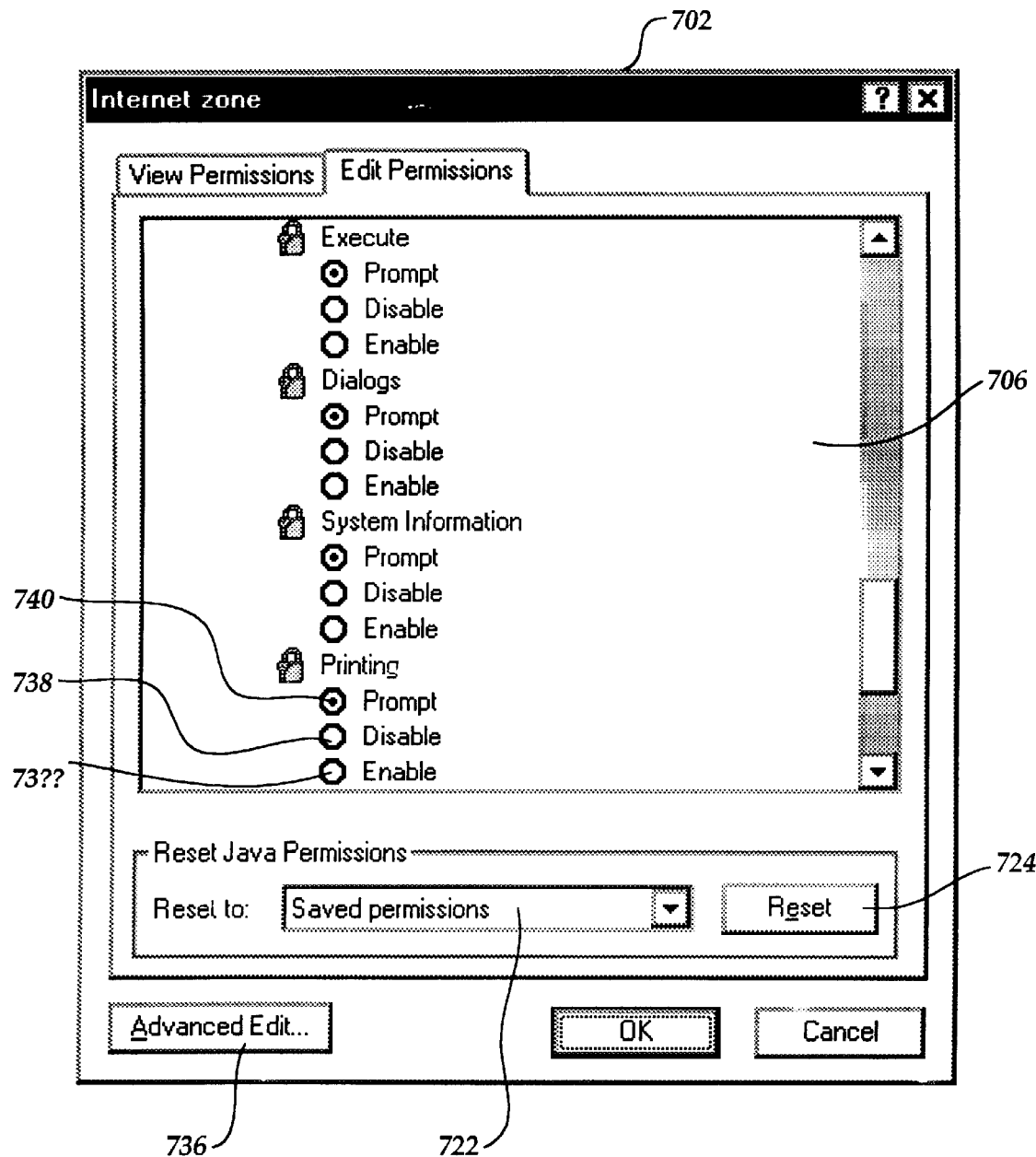
Figure 7E:
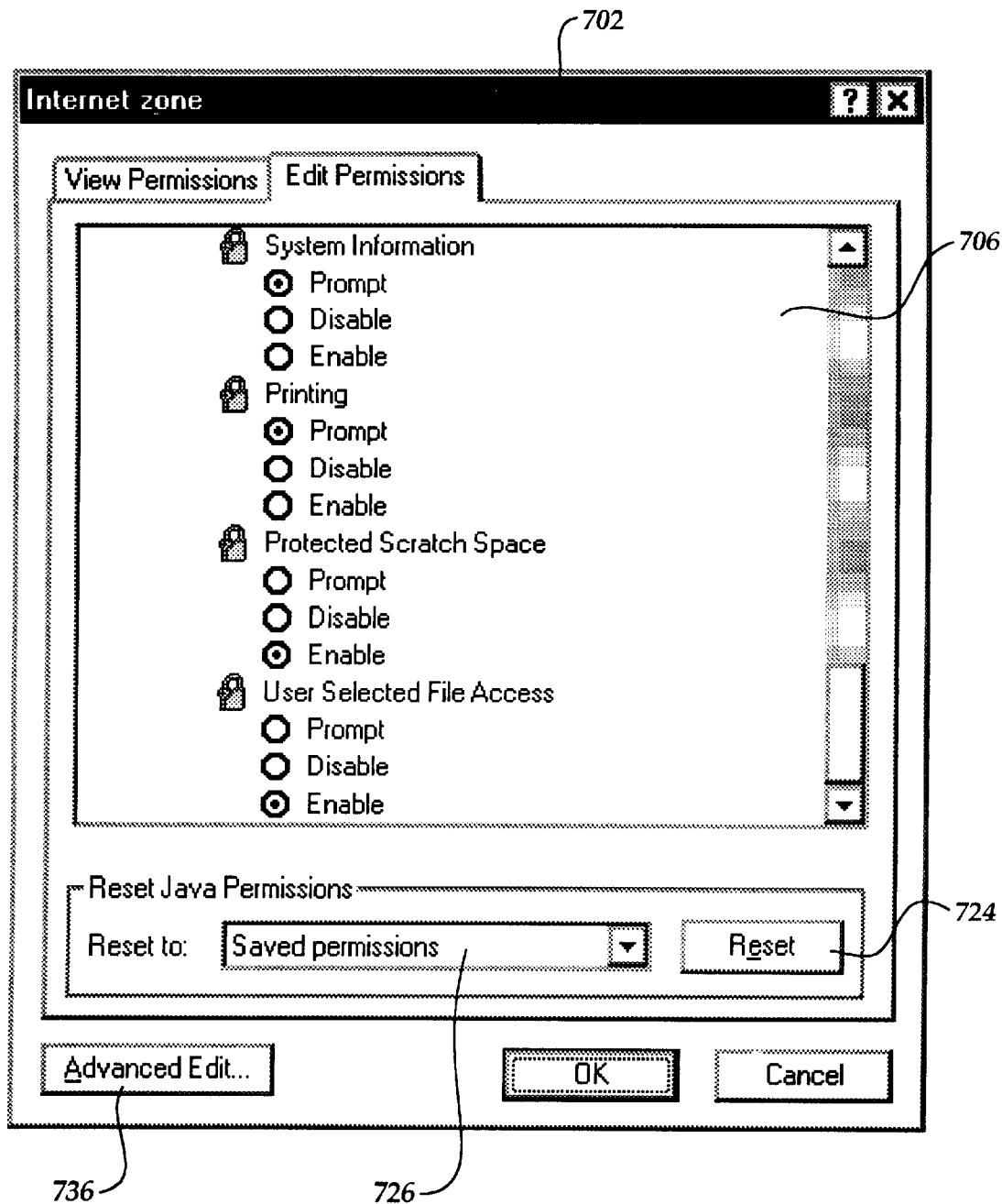

The configurations of the permissions for signed content is illustrated in FIGS. 7C–E. Signed content is inherently more trustworthy, but not necessarily trusted, because the code has been digitally signed by an identifiable publisher and the digital signature guarantees that the downloaded content is exactly what the publisher originally published. All permissions in the run signed content list 726 can be enabled by the user by selecting the enable signed content permissions radio button 728 or disabled by selecting the run signed content disable radio button 730. As described above with regard to the unsigned content, enabling or disabling the signed content by radio button 728 and 730 enables or disables all of the permissions listed under the additional signed permissions list 732 by graying-out the radio button for the individual permissions.

If the user wishes to be prompted before signed content is allowed to run, the user selects the signed content prompt radio button 734 and then individually configures the permissions within the additional signed permissions list 732. For instance, if the user wishes to allow signed content to print on the host system, the user will select the printing enable radio button 736. The user can deny the signed content the right to print by selecting the disable radio button 738 or can request that the system prompt the user before running any signed content by selecting the printing prompt radio button 740. If the prompt radio button 740 is selected, a user prompt would appear when the signed content is loaded in a user interface screen similar to the warning shown in FIG. 5A. The user interface screen identifies the publisher of the signed software and the permission requested. The security warning user interface 510 can also warn that permission should only be granted if the user trusts the publisher identified in the security warning as verified by the digital signature.

Figure 8:
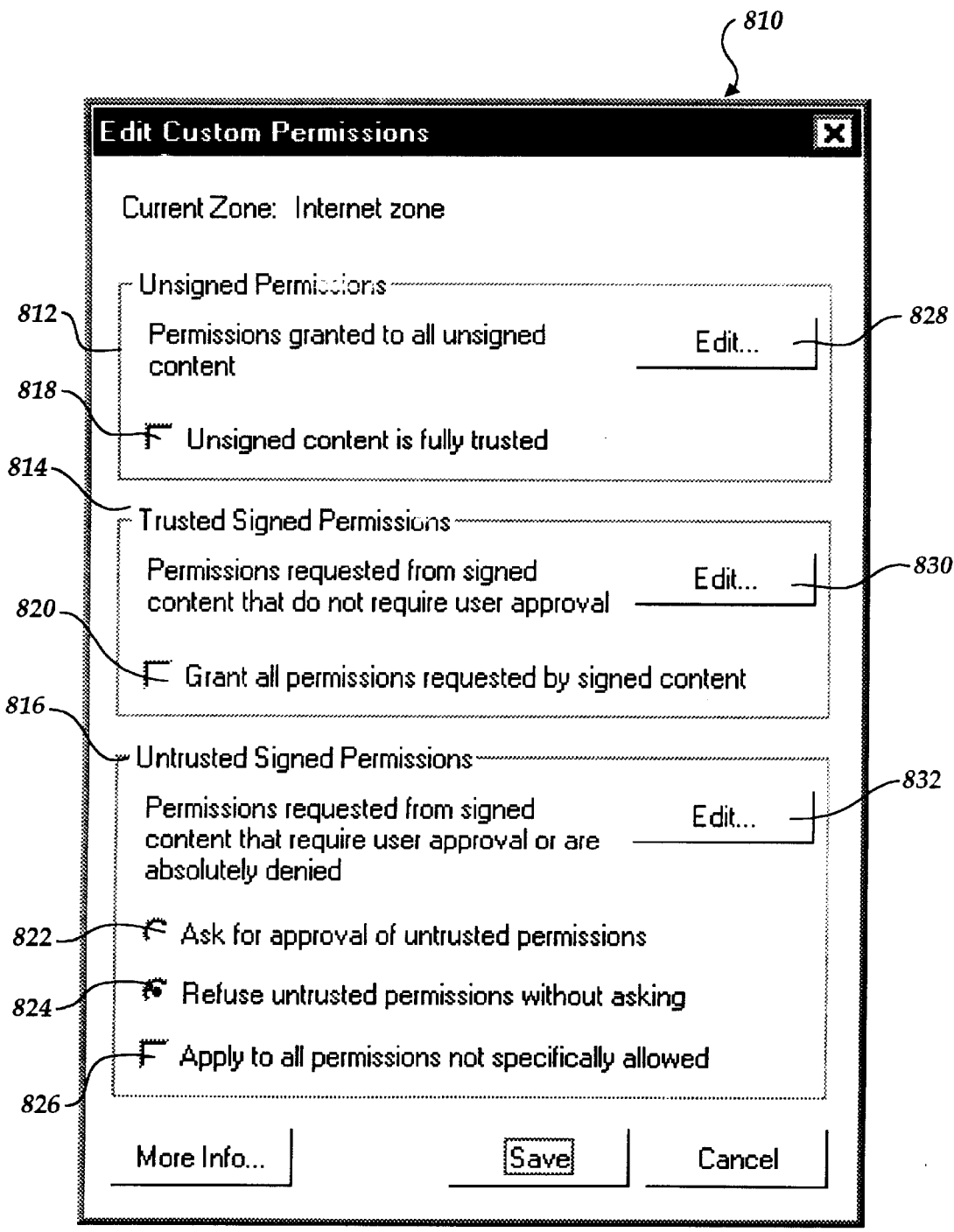
FIG. 8 is a pictorial representation of an "Edit Custom Permissions" dialog window, in accordance with the present invention.

The configuration user interfaces 226 for configuring custom permission sets is exposed by pushing the advanced edit button 736 (FIGS. 7A–E), which causes the security configuration user interface 226 shown in FIG. 8 to display. The edit custom permissions user interface 810 permits editing of the permission parameters within three permission sets associated with each security zone: unsigned permissions set 812, trusted signed permissions set 814, and untrusted signed permissions set 816. The unsigned permissions set 812 define a set of permissions that are granted to all unsigned content from the associated security zone. By selecting an unsigned content fully trusted check box 818, all permissions are granted to all unsigned content originating from the associated security zone. Because this option allows unsigned content full access to the host system, it is not recommended for zones such as the Internet zone where there can be significant amounts of anonymous (unsigned) malicious code. If the user selects the unsigned content fully trusted check box 818, a warning dialog box is displayed advising the user that this option is not recommended and offer the user the option to reconsider this important choice.

Signed permissions are grouped into two permission sets associated with each security zone: trusted signed permissions 814 and untrusted signed permissions 816. Trusted signed permissions 814 are permissions granted to signed content from that the user feels confident to allow to run without any user approval. Generally, permissions configured in the trusted signed permission set 814 should be more restrictively granted in permission sets associated with zones that are less trusted such as the Internet zone. The user may select a signed content grant all permissions check box 820 in order to allow all signed content within the associated zone to have all permissions. This unrestricted access to the host system is not recommended and the user will be presented with a warning dialog advising the user that this selection is not recommended and giving the user the chance to cancel.

The untrusted signed permissions set contains the permissions that the user wishes to be granted to signed active content that the user either does not wish to run and outright deny or alternatively wishes to be prompted before granting the permission. The user can select whether to ask for approval of all permissions configured as untrusted in the untrusted signed permission set by selecting an untrusted permissions prompt radio button 822. Alternately, the user can automatically refuse untrusted permissions (without being prompted) by selecting an untrusted permissions deny radio button 824. If the user selects an apply to all permissions not specifically allowed check box 826 and the untrusted permissions prompt radio button 822 is selected, the user will be prompted for all permissions that have not been specifically allowed for in the trusted signed permissions set. Alternatively, if the apply to all permissions not specifically allowed check box 826 is selected in combination with the untrusted permissions prompt radio button 824, the user will be prompted for all permissions not specifically allowed for in the trusted signed permissions set 814. The selection of the untrusted permissions prompt radio button 822 and the untrusted permissions deny radio button 824 sets the query/deny flag 235 in the system registry 224 indicating whether the untrusted signed permission set 234 is a query permission set or a deny permission set.

The configuration of the individual permissions within the three permission sets is accomplished by selecting a corresponding unsigned permissions set edit button 828 to edit the unsigned permissions set 812, selecting a trusted signed permissions set edit button 830 to edit the trusted signed permissions set 814 and selecting an unsigned signed permissions set edit button 832 to edit the untrusted signed permission set 816.

(a). Configuring the Parameters Associated with a Permission Using Primitives

Figure 9A:
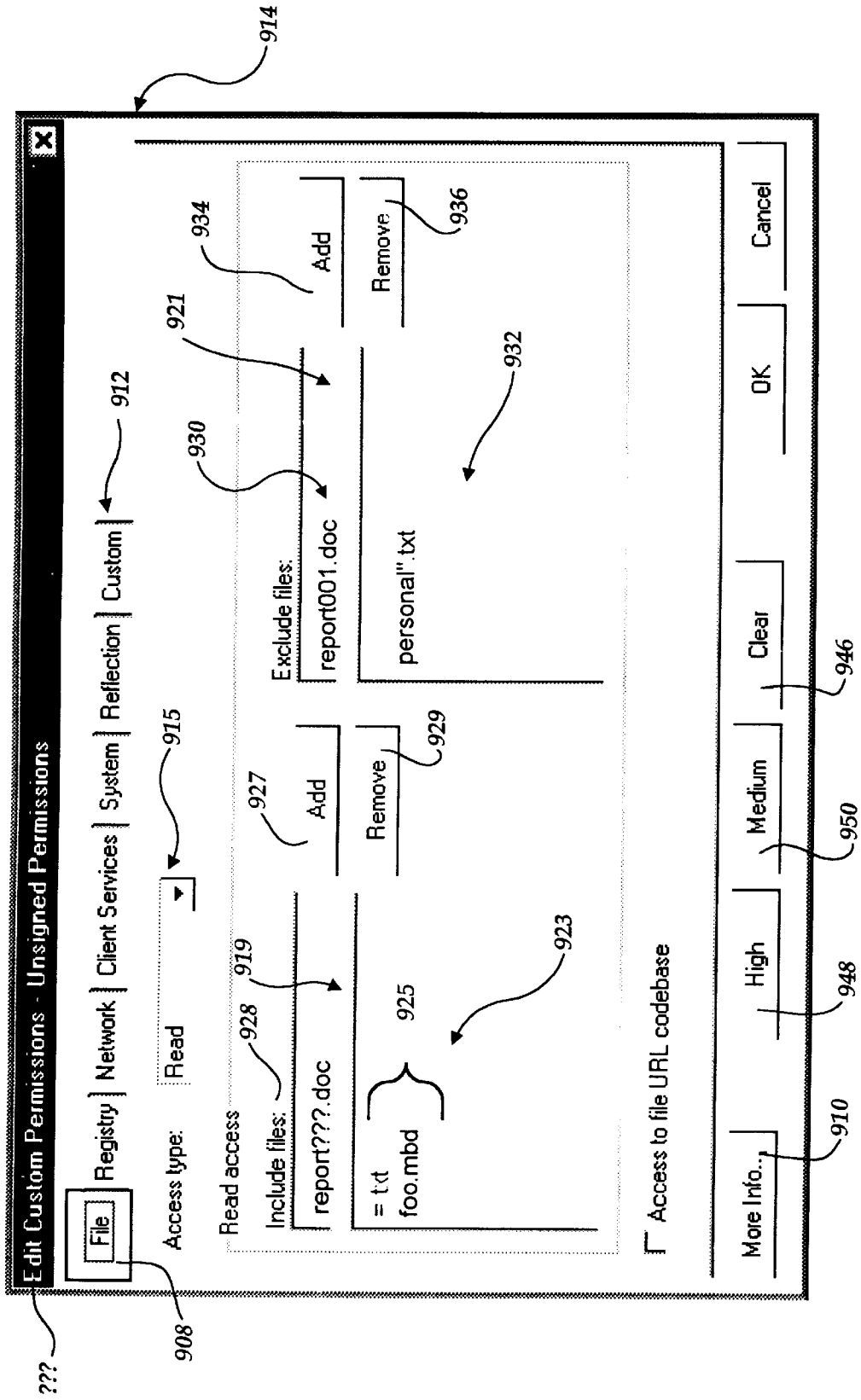
FIGS. 9A–G are pictorial representations of an "Edit Custom Permissions-Unsigned Permissions" dialog window, in accordance with the present invention.
Figure 9B:
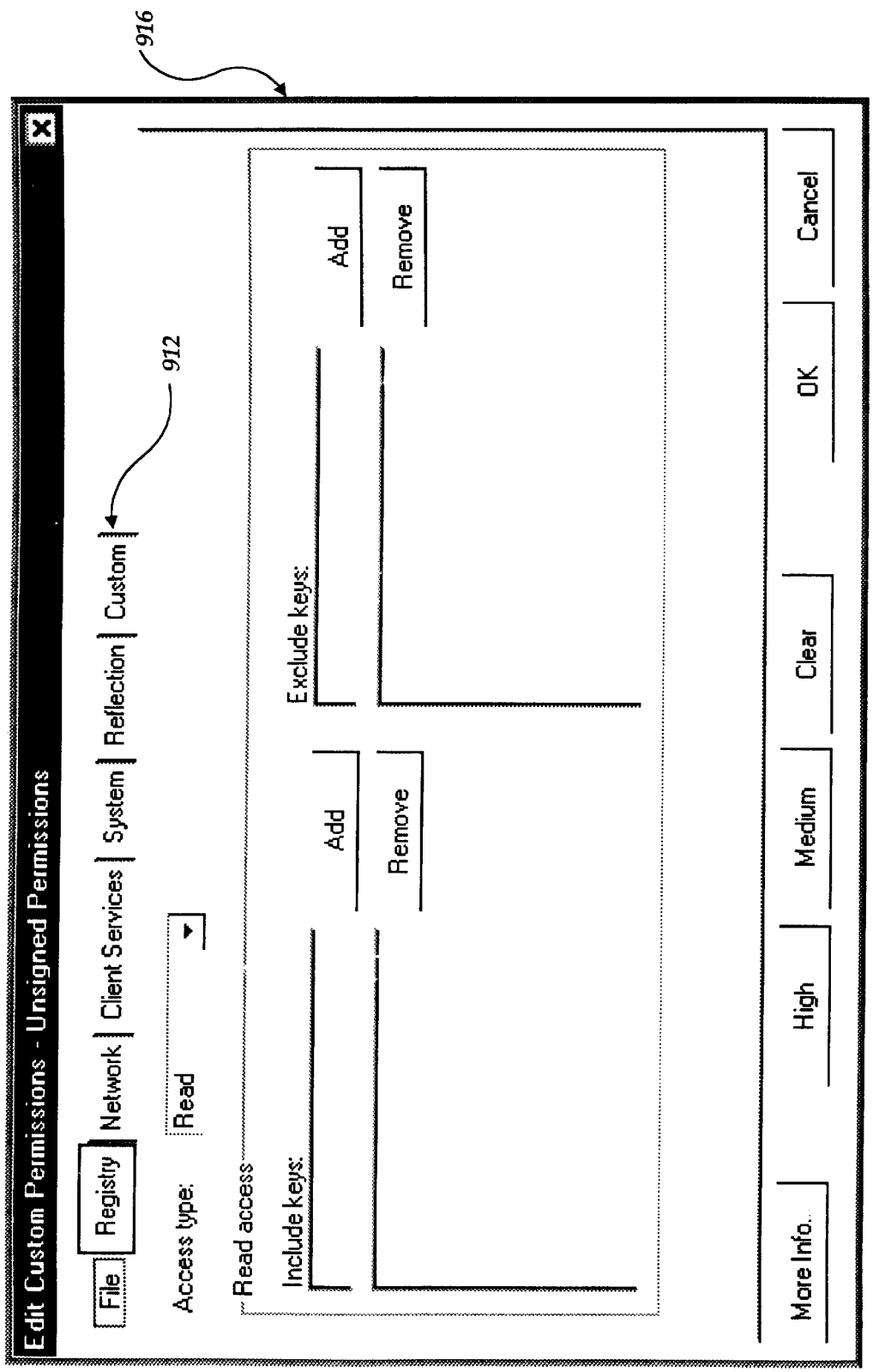
Figure 9C:
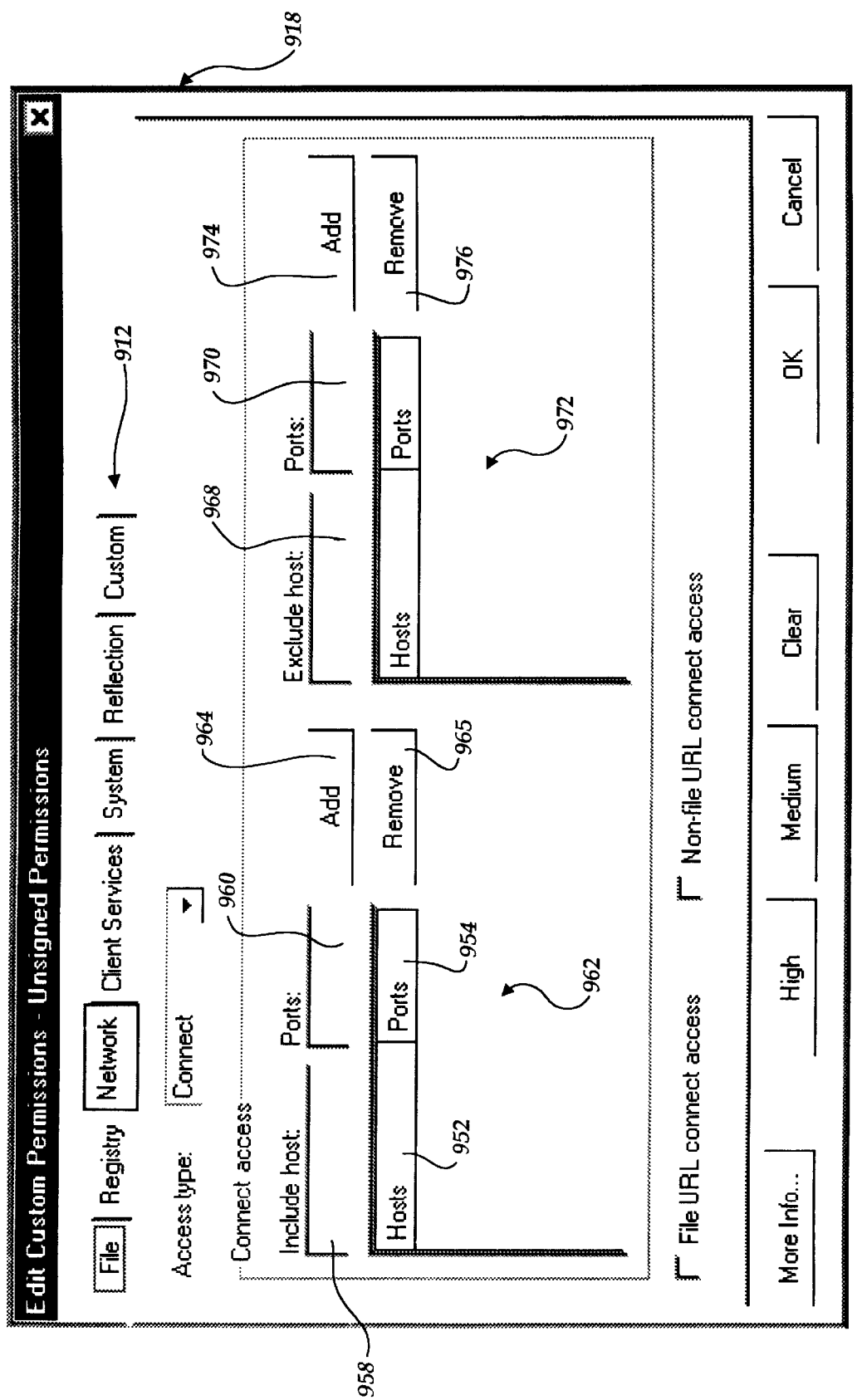
Figure 9D:
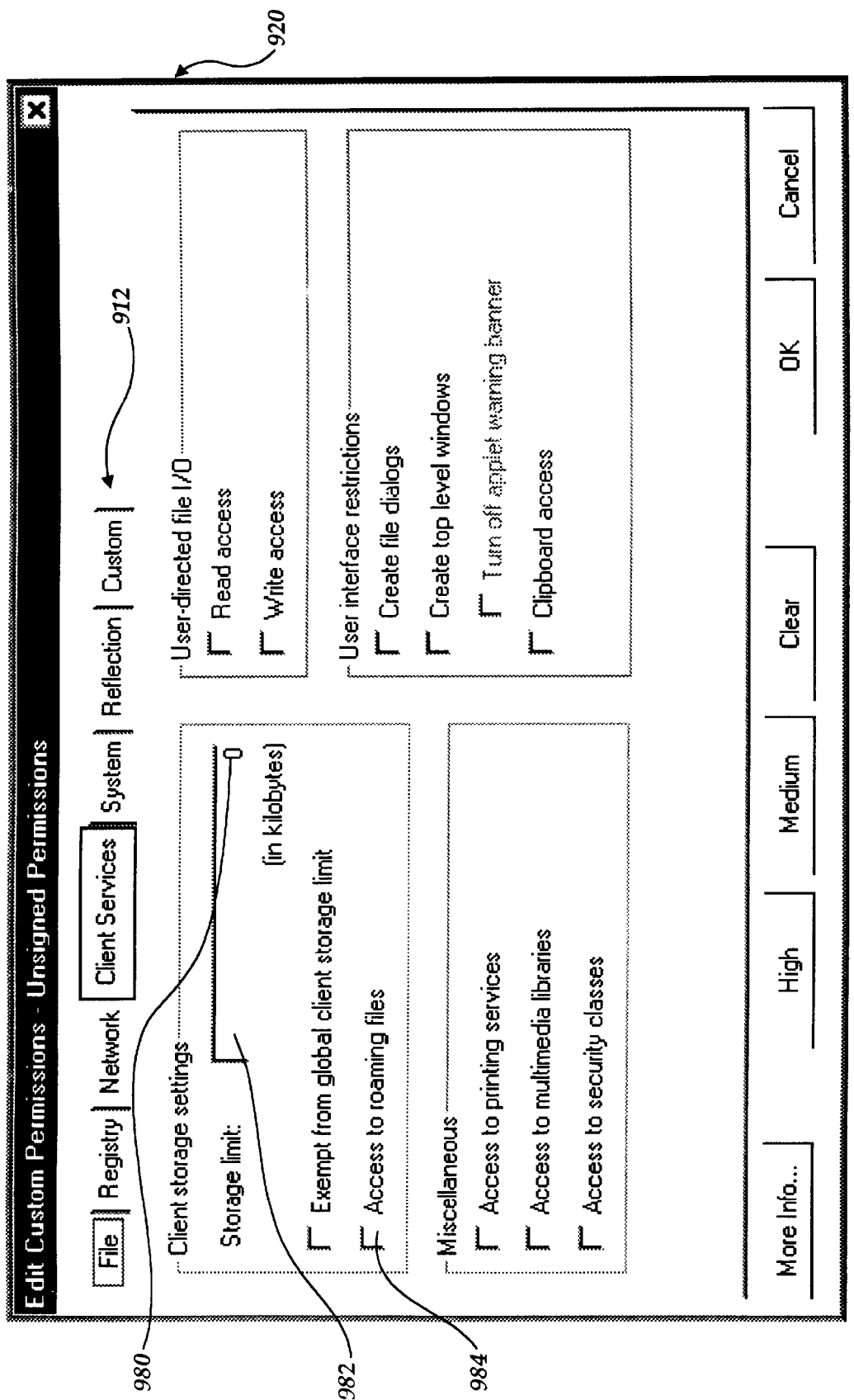
Figure 9E:
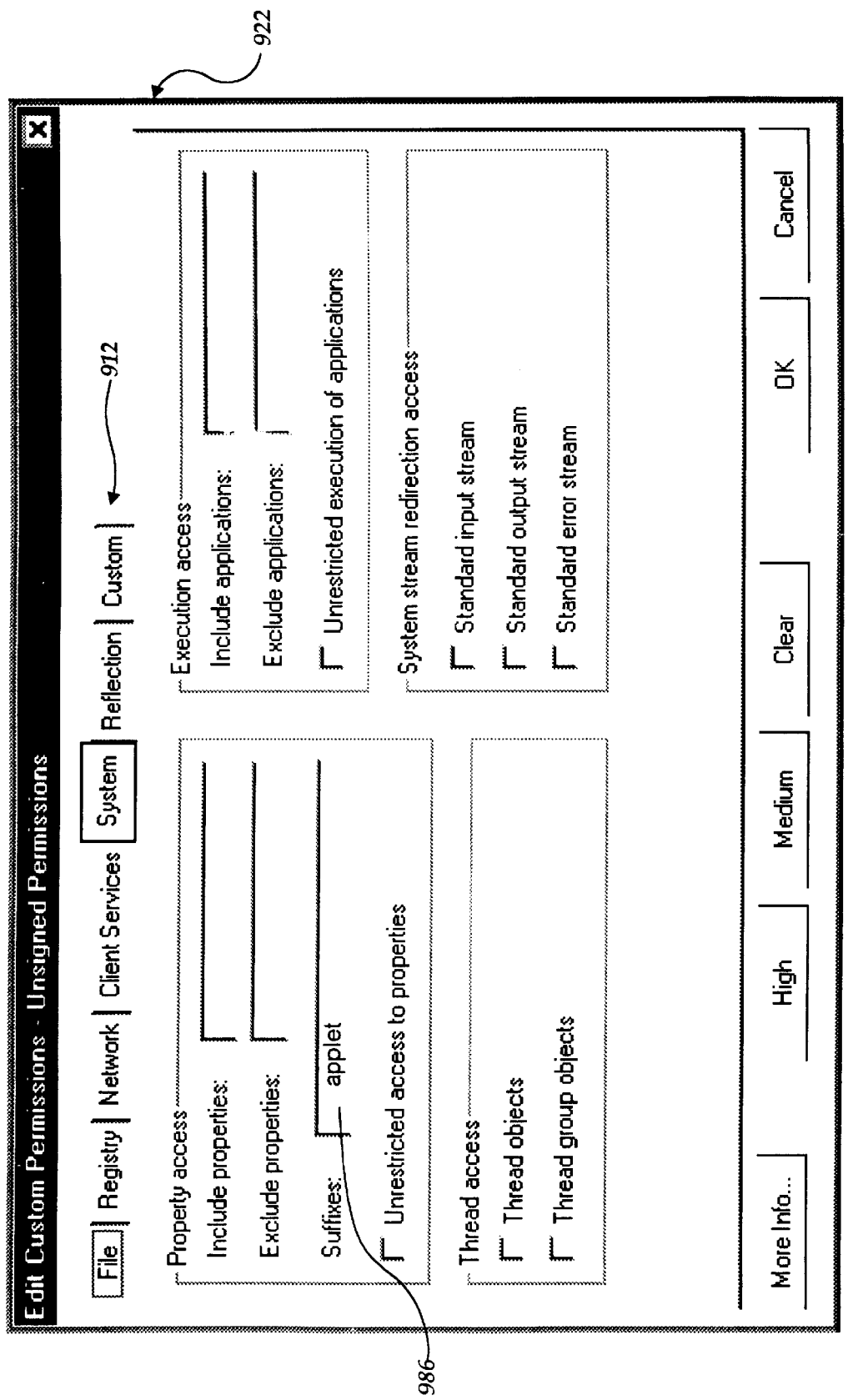
Figure 9F:
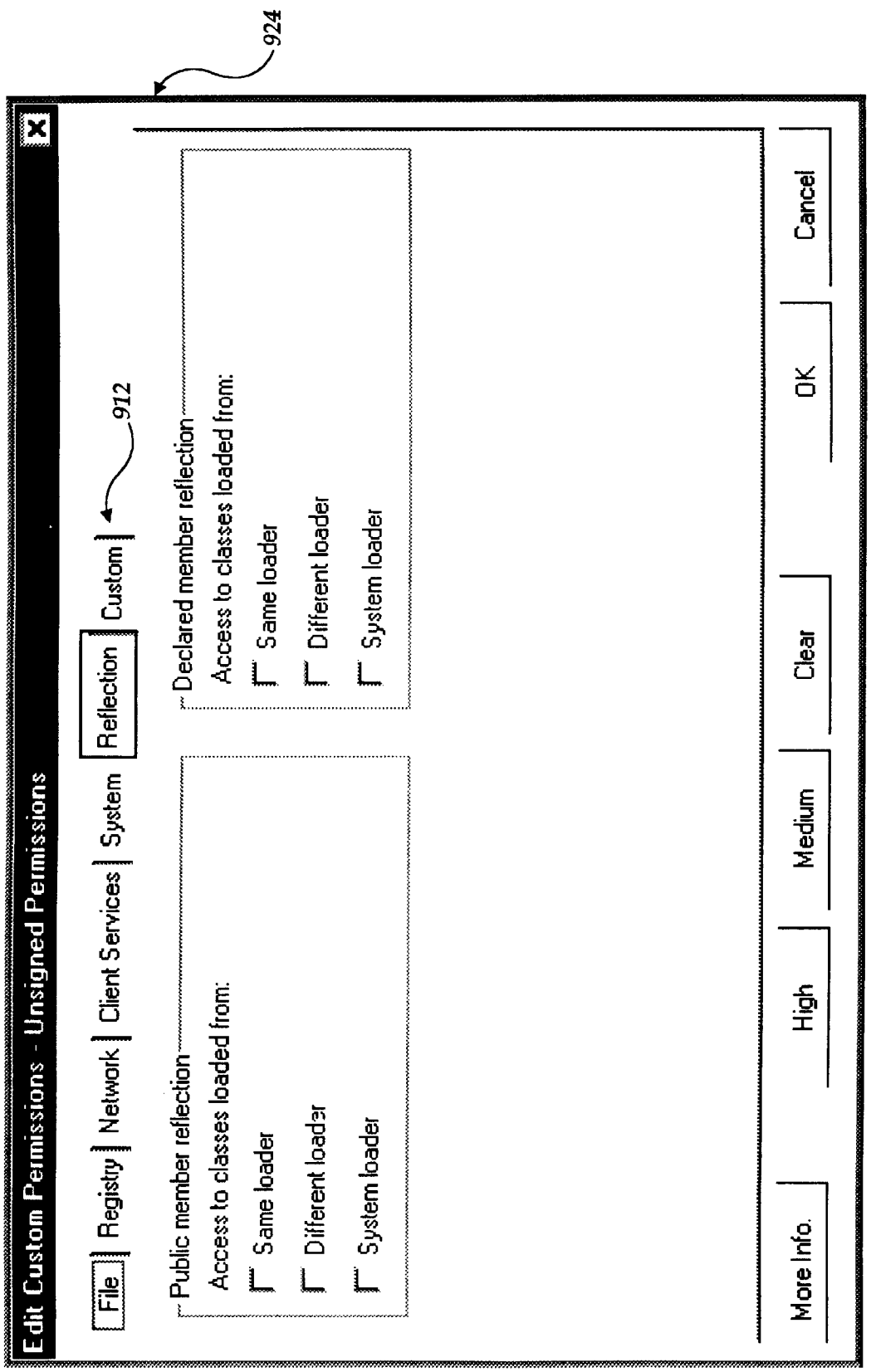
Figure 9G:
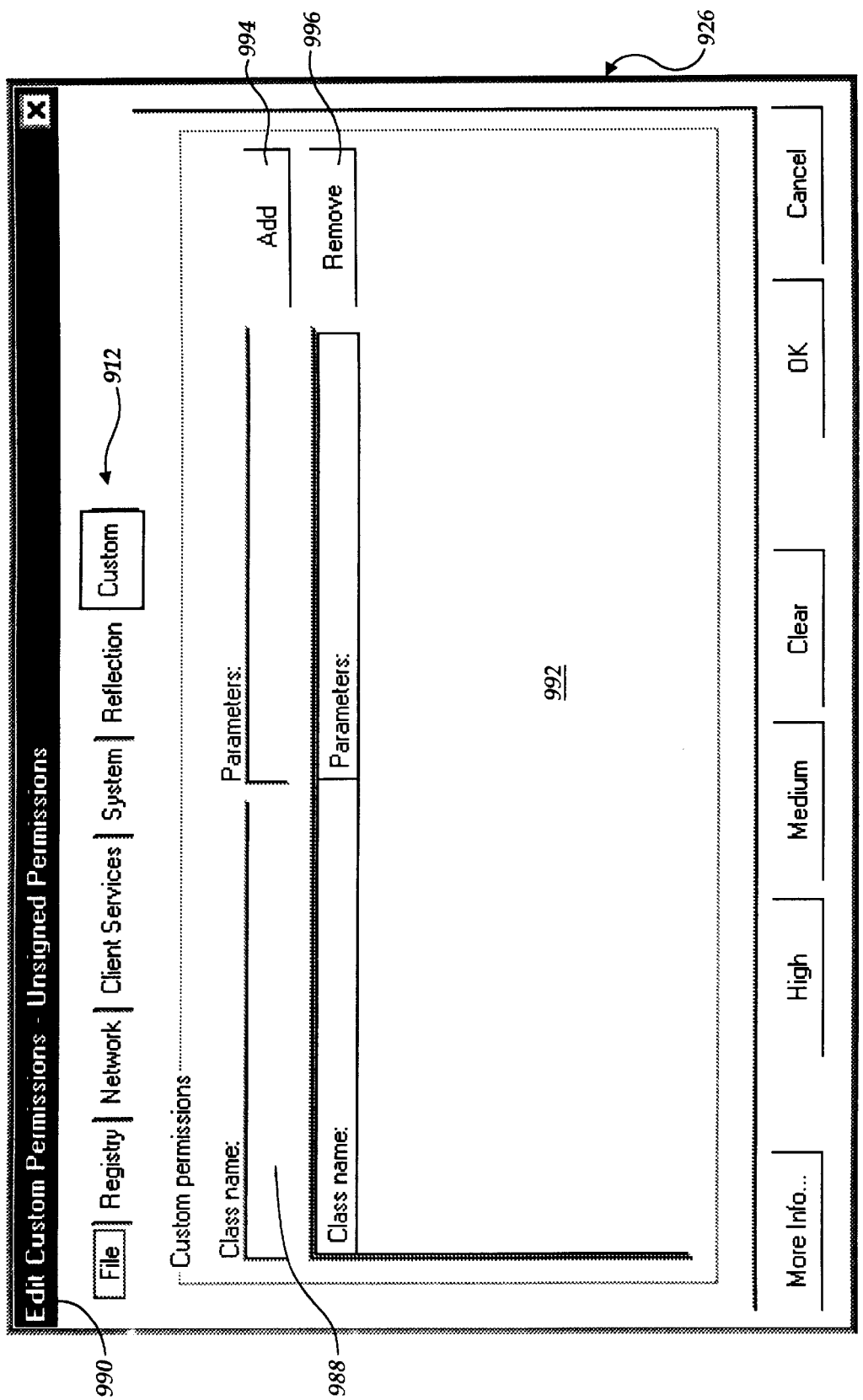

The lowest level down in the fine grain configuration of the system security policy is the configuration of the parameters associated with each permission (see FIG. 3; block 318). Permission editing dialog windows presented by the security configuration user interface 226 for setting the individual permissions within a permission set is shown in FIGS. 9A–G. An explanation of the function of each parameter that can be set for a given permission can be found in the Internet Explorer help file, incorporated herein by reference, which can be accessed by pushing the "More Info" button 910 in any dialog window or by selecting a permission in the dialog window and pressing the "F1" key on the keyboard. The permissions editing dialog windows include a series of permission selection tabs 912. Selecting one of these permission selection tabs 912 displays a corresponding dialog window with a group of permissions. A files permissions dialog window 914 is shown in FIG. 9A, a registry permission dialog window 916 is shown in FIG. 9B, a network permission dialog window 918 is shown in FIG. 9C, a client services permission dialog window 920 is shown in FIG. 9D, a system permission dialog 922 is shown in FIG. 9E, a reflection permission dialog window 924 is shown in FIG. 9F and the custom permission dialog window 926 is shown in FIG. 9G. The dialog windows shown in FIGS. 9A–G are general groupings of permissions and may each provide the interface for configuring several distinct permissions.

Referring to FIG. 9A, the file permission dialog 914 is illustrative of how a permission is configured by parameters entered into the file permission dialog 914. The file permission has a parameter for the access type. In FIG. 9A, the access type to be configured is shown in drop down box 915 as "read". The parameters for the read access type is defined by a primitive type referred to as an include/exclude pair. The include portion of the pair is entered into an include files text box 919 and the exclude portion of the primitive is entered into an exclude files text box 921. The include/exclude pair entered into text boxes 919 and 921 comprise regular expression primitives. The regular expression primitives shown in the text box 919 is a string that represents the files that the active code is given permission to read while running. The exclude files text box 921 contains a string that represents the files that the active code will not be permitted to read while it is running. Include files regular expressions that have previously been entered are displayed in an include files window 923. An add button 927 is pushed in order to add an include files regular expression primitive 928 to the include files window 923. To remove an item displayed in the include files window 922, the user selects one or more of the include files regular expression primitive 925 and then presses a remove button 929. Exclude files regular expression primitives 930 such as the one shown in the exclude files text box 921 are added and removed from the exclude files list window 932 by using an add button 934 and a remove button 936 in the same way just described for add button 927 and remove button 929.

Figure 9H:
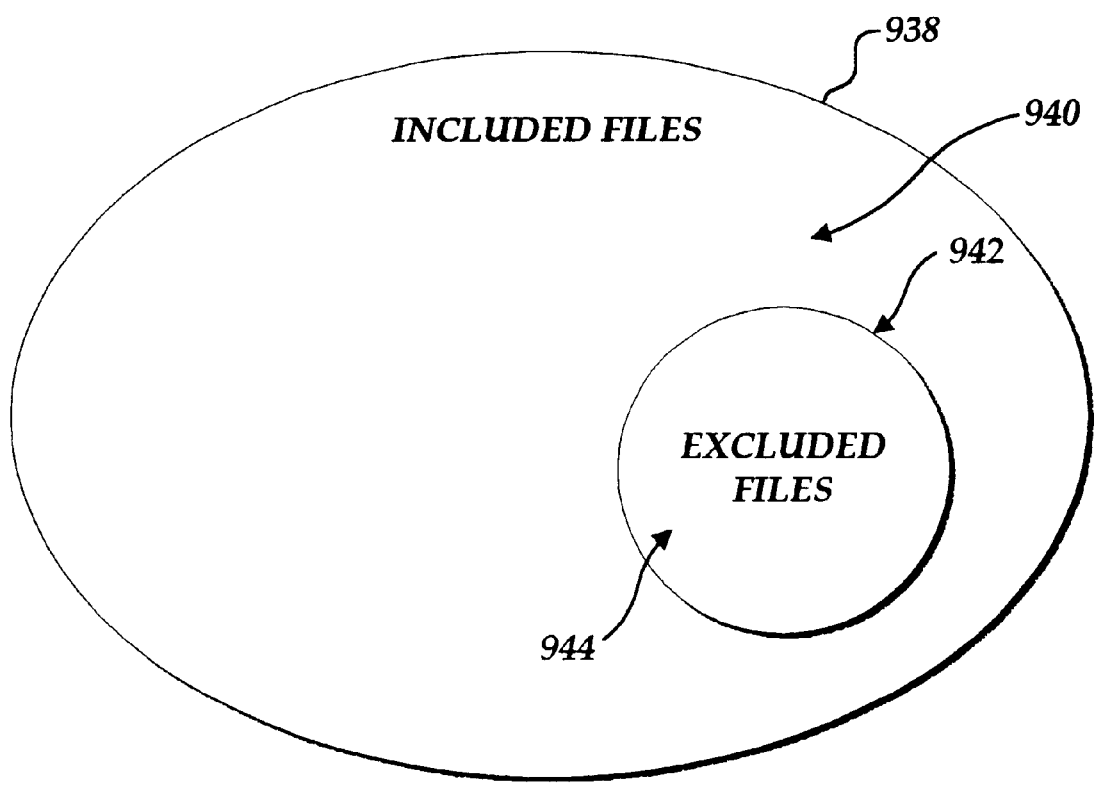
FIG. 9H is a Venn diagram illustrating an include/exclude pair primitive in accordance with the present invention.

FIG. 9H illustrates the concept of an include/exclude pair in more detail. The include files regular expression primitive defines a set of documents that the active content will be allowed to read according to this permission. If the user wishes to exclude files contained in this include files subset, the user enters a corresponding exclude files regular expression primitive 930 that defines a subset of files that are excluded from the included files set. This concept is illustrated in the Venn diagram shown in FIG. 9H where the area within outer ellipse 938 defines an inner region 940 representing all files included in an included files set defined by the included files regular expression primitive 928. The files excluded from the included files set is represented by the excluded files circle 942 that defines an excluded files region 944 that contains a set of files to be excluded from the included files set. In effect the included files regular expression primitive defines the set of files that are to be included in the set that the active content can access, while the excluded files regular expression primitive takes away a portion of the files specified by the included files set. For example, the included files regular expression primitive 928 shown in FIG. 9A (report???.doc) includes all files that begin with the letters "report", any three characters represented by the "???" wildcards and having the three letter extension ".doc". The exclude files regular expression primitive 930 removes from this set the files named "report001.doc". In another example, the included files regular expression primitive is "*.txt" and the excluded files regular expression primitive is "personal*.txt". This include files/exclude files pair grants the permission to the active content to read all files that have the extension ".txt" except for those files that begin with the letters "personal".

In Internet Explorer (an actual embodiment of the invention), it is possible to obtain a description of each component shown in the dialog window shown in FIGS. 9A–G by selecting the component and pushing the "F1" key on the keyboard 140. If the user wishes to begin the configuration of a dialog with no prior entries in the dialog window, the user can actuate a clear button 946. As an alternative to configuring the permissions in the unsigned permissions set manually, the user may select the high security setting by actuating a high button 948 or may select the medium security setting by actuating a medium button 950. The parameters for the write and delete privileges may be configured in a similar manner to the read privilege by selecting write and delete in the access type drop down box 915. The read, write, and delete permissions listed in the registry dialog window 916 FIG. 9B) are configured in much the same manner as just described for the file dialog window 914 and, thus, are not described further.

The network permissions dialog window 918 FIG. 9C) illustrates include/exclude pairs like those illustrated in FIG. 9H and described above but the include/exclude pair is comprised of an array that includes hosts 952 (server computers) and corresponding ports 954. Included hosts are inserted in an included hosts text box 958 along with their corresponding ports which are entered into an included port text box 960 and then added to the included hosts display window 962 by pushing an add button 964. Hosts are removed by selecting the host/port pair displayed in the window 962 and pressing a remove button 965. An example of an entry into the include hosts text box 958 would be "www*.microsoft.com" and the entry into the ports text box 960 would be 80. A corresponding entry into an exclude hosts text box 968 would be "www1.microsoft.com" with an entry in an associated exclude ports text box 970 of 80. The entries in the exclude hosts text box 968 and the exclude hosts ports text box 970 are entered into an excluded hosts display window 972 by actuating an add button 974. Entries in the excluded hosts display window 972 are removed by selecting an entry and pressing a remove button 976. The result of the include hosts "www*.microsoft.com:80" and the exclude hosts "www1.microsoft.com:80" is that all servers beginning with the letters "www" at the second level domain "microsoft.com" will be permitted connect access at port 80 except for the server named "www1.microsoft.com:80". Port 80 is associated with the World Wide Web connection. Other ports may be associated with other protocols and services known to those skilled in the art.

The client services dialog window 920 shown in FIG. 9D illustrates a parameter that is defined by a numerical limit primitive 980 that is entered into the storage limit text box 982. Other parameters are grouped by permissions in the clients services dialog 920. Some of these permissions contain parameters that are defined using Boolean primitives. For example, if the access to roaming files check box 984 is selected, the Boolean primitive associated with the access to roaming files check box 984 indicates true. Otherwise, the Boolean primitive indicates false. The numerical limit primitive 980 indicated in the storage limits text box 982 defines the upper limit of storage in kilobytes that the active content will be permitted to store on the host system. The system dialog box window 922 shown in FIG. 9E in the suffixes text box 986 contains a regular expression that refers to "applet".

The user can define custom permission in the custom dialog window 926 (FIG. 9G) by specifying a class name in the class name text box 988 and the associated parameters in the text box 990. These values are inserted into a custom permissions window 992 by actuating an add button 994 and removed from the custom window 992 by actuating a remove button 996. A description of the individual permissions and parameters may be found in the Internet Explorer help file and in the published references referred to above.

Returning to FIG. 3, after the user has configured the system security policy as is described above, the configuration data is stored (block 320) in the system registry 224. It will be apparent to one skilled in the art that the configuration information may be stored as the changes to the configuration are made, as each level is completed by selection of the "OK" or "Apply" button, all at once after the user confirms that the changes should be accepted, or a combination of the above. The decision 322 in FIG. 3 illustrates that multiple zones may be configured under the system and method of the present invention.

Declarative Permissions

The present invention includes a method and system for administering declarative permissions. Declarative permissions refer to the ability of an active content publisher to associate a requested permission set with a Java class, Java applet or other type of active content that requires certain permissions in order to run on a host system. Declarative permissions enable a publisher of active content to request only the permissions that are necessary to run the class. This capability enhances the security of the host system by ensuring that the class will only have access to protected operations that are absolutely necessary in order to run the class. As will be discussed in detail below, the requested permission set, which is declared by the publisher of active content, is compared to the trusted signed permission set 232 and the untrusted signed permissions set 234 associated with zone 226 from which the active content is downloaded to determine which permissions will be granted automatically to the class, which permissions will automatically been denied to the class, and which permissions will require a prompt to the user for instructions before the class is allowed to run on the host system.

Figure 10:
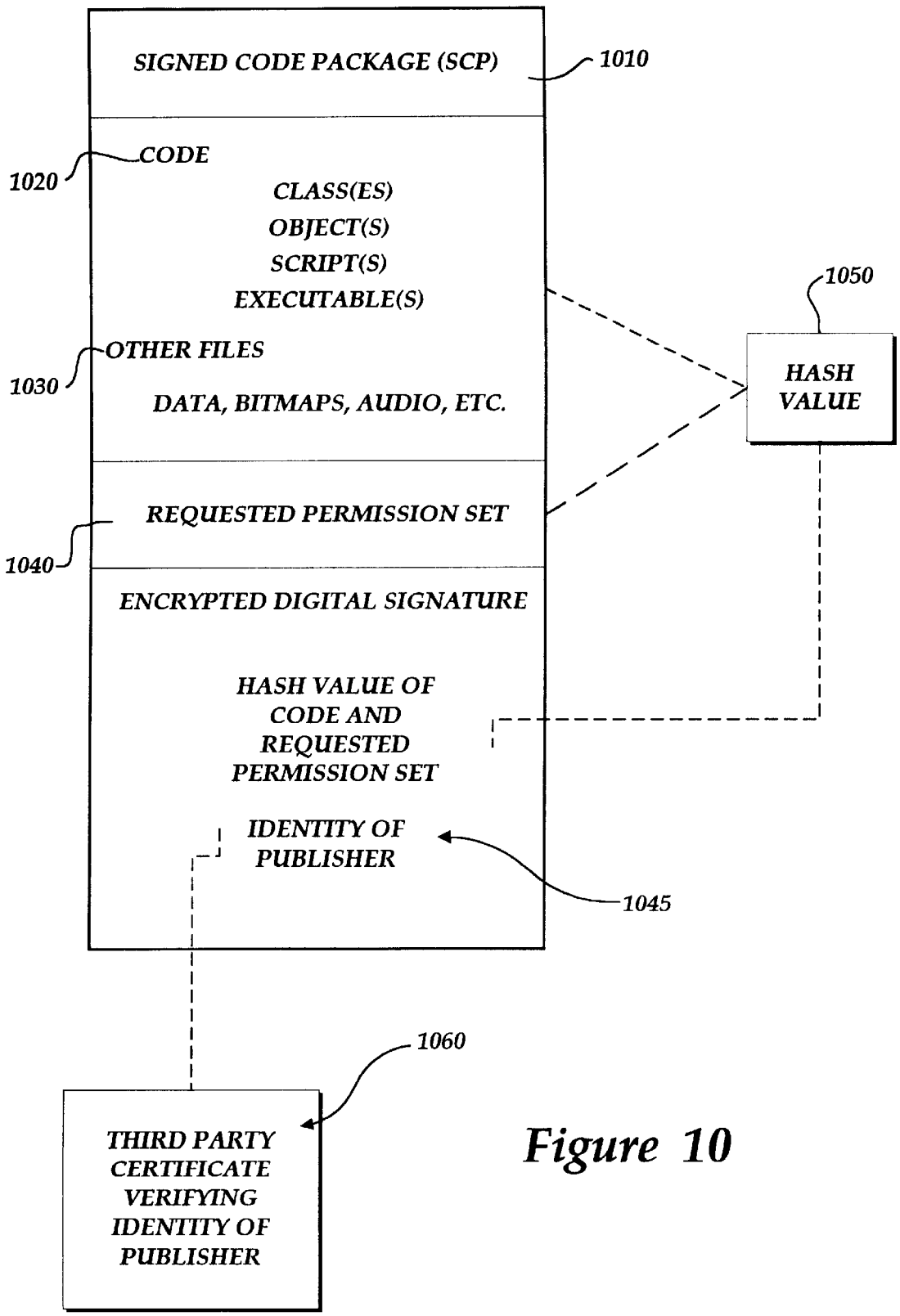
FIG. 10 is a block diagram illustrating a signed code package having an externally attached requested permission set in accordance with the present invention.

FIG. 10 illustrates a signed code package 1010 that contains the computer executable instructions 1020 for one or more classes, objects, scripts, executables, or other type of active content. The signed code package 1010 can also contain other types of associated files 1030 such as data files, bitmaps, and audio files. In accordance with the invention, a publisher of active content attaches a requested permission set 1040 to the signed code package 1010, which also contains a digital signature that identifies the publisher 1045. While an actual embodiment of the invention uses a signed code package 1010, the requested permission set may be stored separately from the active content. For instance, a catalog file contains a manifest of hash values for computer files. The hash value of the requested permission set 1040 (and files such as computer executable instructions 1020 and associated files 1030) could be included in the manifest maintained by the catalog file and verified, as discussed below, by comparing this original hash value to a newly computed hash value of the requested permission set.

A requested permission set formatted as an exemplary initialization (.ini) file is illustrated in FIGS. 12A–D and will be discussed below. In an actual embodiment of the present invention the signed code package 1010 comprises a cabinet file (.cab). A cabinet file is a file that contains a plurality of other files that have been compressed in a manner that the original files can be extracted at a later time. The signed code package is "digitally signed" by first computing a hash value for the code 1020, associated other files 1030 and the declarative requested permission set 1040. A hash value results from applying a "hash function" to the signed code package 1010 to produce a hash value 1050. A hash function is a mathematical algorithm that transforms a digital document, such as the signed code package, into a smaller representation of the document. The smaller representation of the document is the hash value corresponding to the document.

A "secure hash function" is a hash function that is designed so that it is computationally unfeasible to find two different documents that "hash" to produce identical hash values. A hash value produced by a secure hash function serves as a "digital fingerprint" of the document. If two separately produced hash values are equivalent, one can be certain to a very high degree of probability that the documents used to produce the respective hash functions are exactly the same. Similarly, if two hash values are not the same, the corresponding documents are not exactly the same.

As discussed in further detail below, the mechanism of the invention computes a new hash value corresponding to an electronic document, and compares the new hash value to the hash value that has been included in the digital signature of the document, in order to determine whether the documents are equivalent, and therefore whether the electronic document has changed since it was published. In one actual embodiment of the invention, a secure hash function known as "MD5" is used to create hash values. The MD5 secure hash function is published by RSA Laboratories of Redwood City, Calif., in a document entitled RFC 1321.

The hash value 1050 of the signed code package 1010 as of the time it is published is digitally encrypted using a public/private encoding algorithm and made part of the digital signature of the signed code package 1010. In other words, the private key of a publisher 1060 is used to encrypt the hash value 1050 of the signed code package 1010. In an actual embodiment of the invention, the encryption of the hash value 1050 is accomplished using a digital certificate 1060 that is issued by a third party certificate authority. A certificate authority publishes policies and acts to grant code signing authority, also known as X.509 certificates, based on criteria established in various specifications that the certificate authority publishes. The certificate authority manages the enrollment, renewal and revocation of certificates. As part of the process in granting a certificate, the certificate authority verifies various evidence submitted by a publisher when the publisher requests a certificate to ensure that the publisher is actually the individual or entity that it says it is. The inclusion of declarative permissions in the signed code package 1010 is an extension of the Authenticode specifications available from Microsoft Corporation, Redmond, Wash. The method of signing a cabinet file in accordance with the invention is described in detail entitled "Signing a Cabinet File with Java Permissions Using Signcode", <mk:@ivt:pdinet/good/java/htm/signcode.htm> (MSDN Library CD, April, 1998), incorporated herein by reference.

Figure 11:
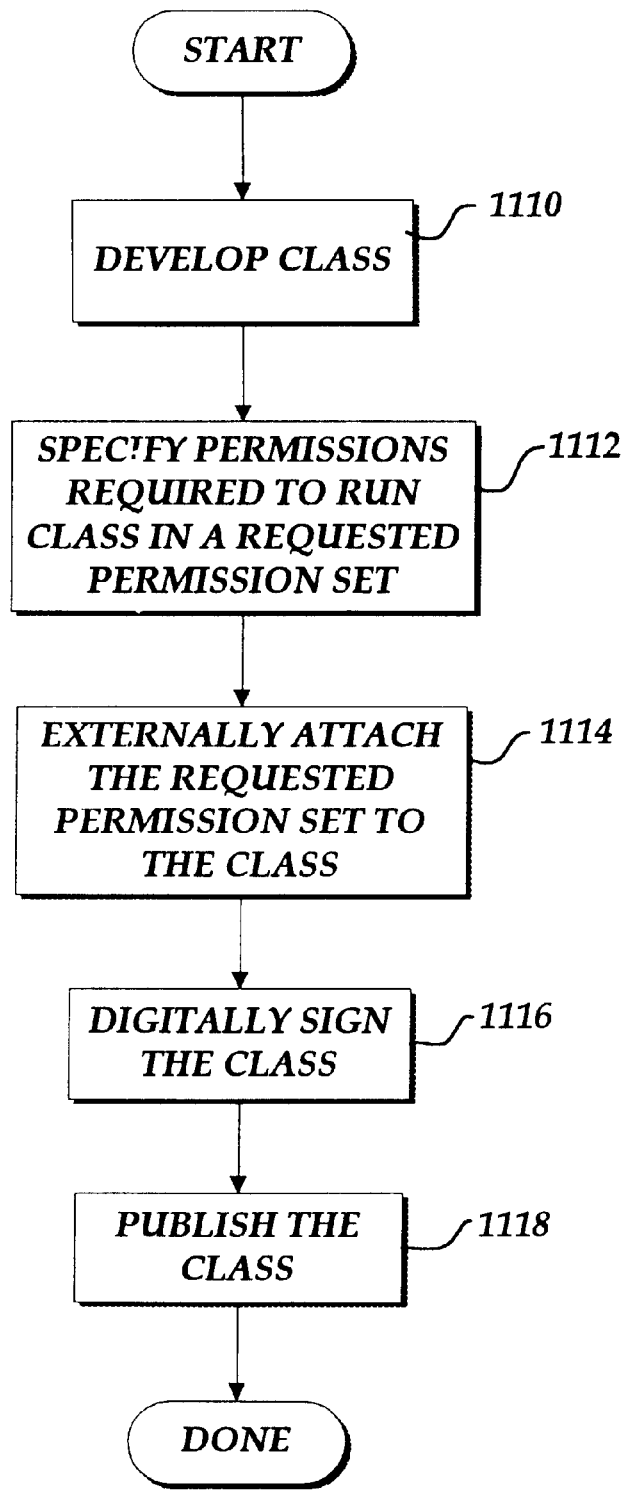
FIG. 11 is a functional flow diagram illustrating the process of creating and distributing active content with a requested permission set externally attached in accordance with the present invention.

An example development process for the developers of active content to take advantage of the declarative permissions capability of the present invention is shown in FIG. 11. The publisher first develops the computer-executable instructions for the class (or other active content) (block 1110) and then specifies the permissions that the class requires to run in a requested permissions set (block 1112). Preferably, the permissions that the publisher requests are the minimum permissions actually required by the class to run on the host system.

An exemplary initialization (.ini) file 1202 containing a requested permissions set in accordance with the invention is shown in FIGS. 12A–D. The requested permissions set .ini file contains a list of permissions with each permission referenced by a text string 1230*a*, 1230*b*, 1230*c*, . . . contained within square brackets. The text strings 1230*a*, 1230*b*, 1230*c*, etc., are followed by a list of setting parameters, 1232*a*, 1232*b*, 1232*c*, . . . unless the specific parameters are required. The permissions listed in the exemplary .ini file 1202 correspond to permissions that are defined for the host system, either in the predefined permission sets or in a custom permission set configured as illustrated in FIGS. 8 and 9A–G. For instance, the file I/O permission 908 (FIG. 9A) has a corresponding permission definition identified in the requested permissions set .ini file by the text string [com.ms.security.permissions.FileIOPermission] 1230*c* (FIG. 12B). The file I/O request and permission includes a series of exemplary parameter entries—IncludeRead, ExcludeRead, IncludeWrite, ExcludeWrite, IncludeDelete, ExcludeDelete and ReadFileURLCodeBase. The IncludeRead parameter 1212 corresponds to the entries made in the read access include files window 923 with the individual entries 925 shown in the window separated by semicolons following "IncludeRead=" entry in the .ini file 1202.

In the file I/O requested permission example shown in FIG. 12B the IncludeRead parameter 1212 includes a regular expression primitive "foo.mdb" 1214 and a regular expression primitive with a wildcard "*.txt" 1216. The ExcludeRead parameter 1218, which corresponds to the read access exclude files window 932 in FIG. 9A, includes a single regular expression primitive "crayon" 1220. Those skilled in the art will recognize that the format of the requested permissions .ini file is not important to the invention and could be accomplished by using many other formats as long as the implementation of the Internet security manager 222 recognizes the format of the requested permissions set. A description of the remaining permissions and parameters illustrated in FIGS. 12A and B may be found in a published source entitled "Java Permissions .INI Values Reference" <mk:@iut:pdinet/good/java/htm/sampleinitable.htm> (MSDN Library CD, April 1998), incorporated herein by reference.

Returning to FIG. 11, once the publisher develops the requested permissions set in the appropriate format, the publisher attaches the requested permissions set 1202 to the class (block 1114). The requested permission set 1202 is preferably externally attached to the class in the signed code package 1010. "Externally attached" means that the requested permission set is not part of the compiled code of the class and can be independently retrieved from the class for processing by the Internet security manager 222. External attachment of the requested permission set provides the significant advantage that the code does not need to be run by the host system in order to determine the permissions required by the class. Any code permitted to run on a host system is a security threat. This threat is completely avoided by adding a textual declaration of permissions outside of the computer-executable instructions set. Another advantage provided by the invention is that the code does not need to be recompiled in order to charge the permissions requested in the requested permission set 1202. In an actual embodiment of the invention, the requested permissions set is included as an authenticated attribute to the digital signature.

After the publisher has attached the requested permissions set to the class (block 1114), the entire signed code package 1010, including the code 1020 and the requested permission set 1202, is digitally signed (block 1116) using the private key associated with the publisher's certificate to encrypt the hash value calculated for the signed code package 1010. When the digital signature is decrypted using the public key associated with the private key by certificate holder, the identity of the publisher 1045 can be determined with a high degree of certainty because of the publisher's certificate registration 1060 with the certificate authority. In addition to the certificate 1060 that identifies the publisher, the digital signature is further authenticated by a second encryption of the digital signature using a certificate owned by the certificate authority. One significant advantage of a digital certificate is that the digital certificate establishes the identity of the publisher in a manner that the publisher can not repudiate the published code because it was published using the publisher's private key and decrypted using the corresponding public key.

When the digital signature is decrypted using the public key associated with the digital certificate 1060, the original hash value of the signed code package 1010 that was computed when the signed code package 1010 was published is obtained. The hash value of the signed code package is then recomputed by the Internet security manager 222 and compared to the original hash value included with the digital signature. If they match, the user can be assured with a high degree of certainty that the contents of the signed code package, including the computer-executable instructions 1020 of the class and the requested permissions set 1040, have not been altered since the class was published (in block 1118) by the publisher.

Figure 13A:
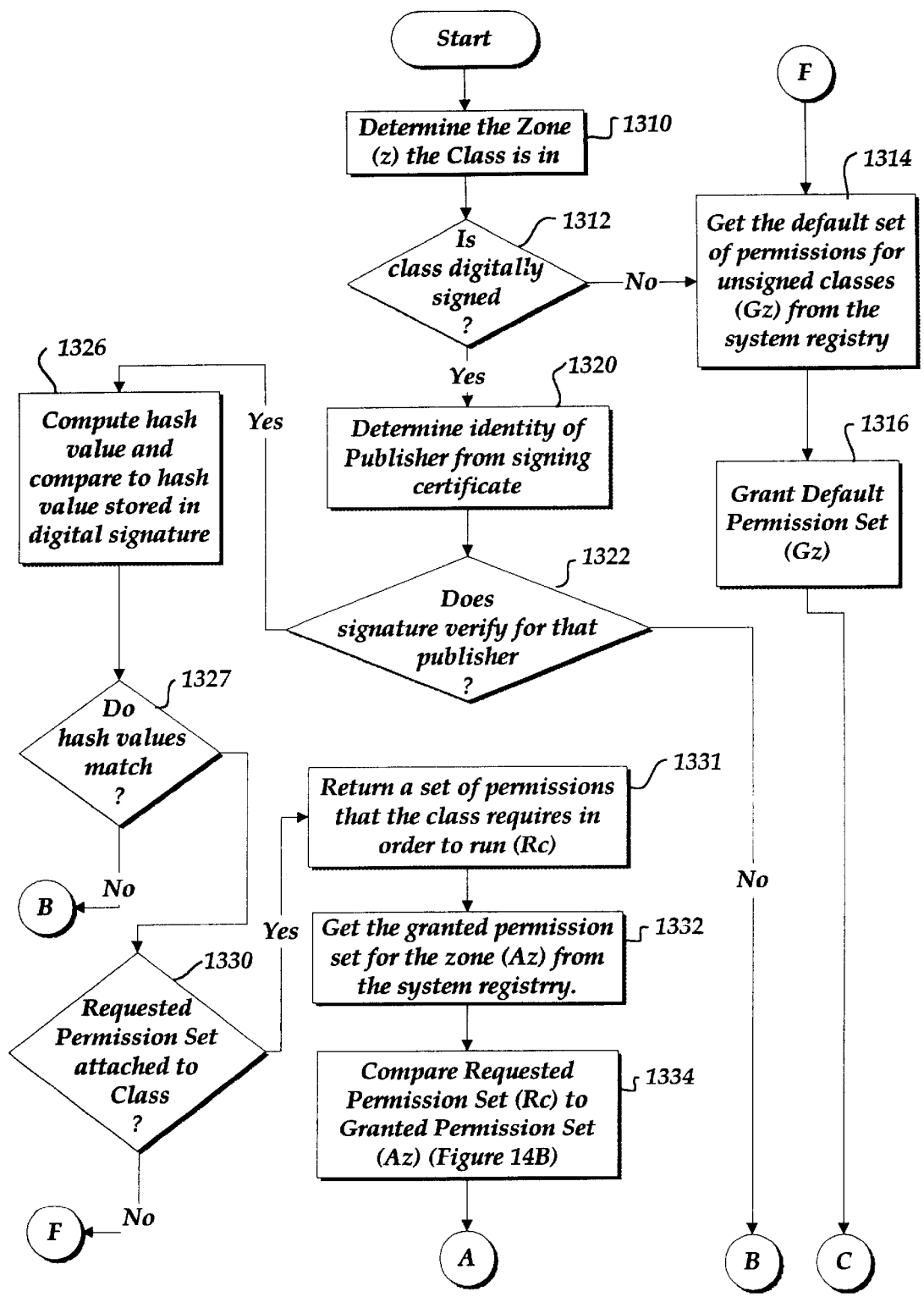
FIGS. 13A–C is a functional flow diagram showing the process of checking permissions requested by active content and storing granted permissions with the active content in accordance with the present invention.
Figure 13B:
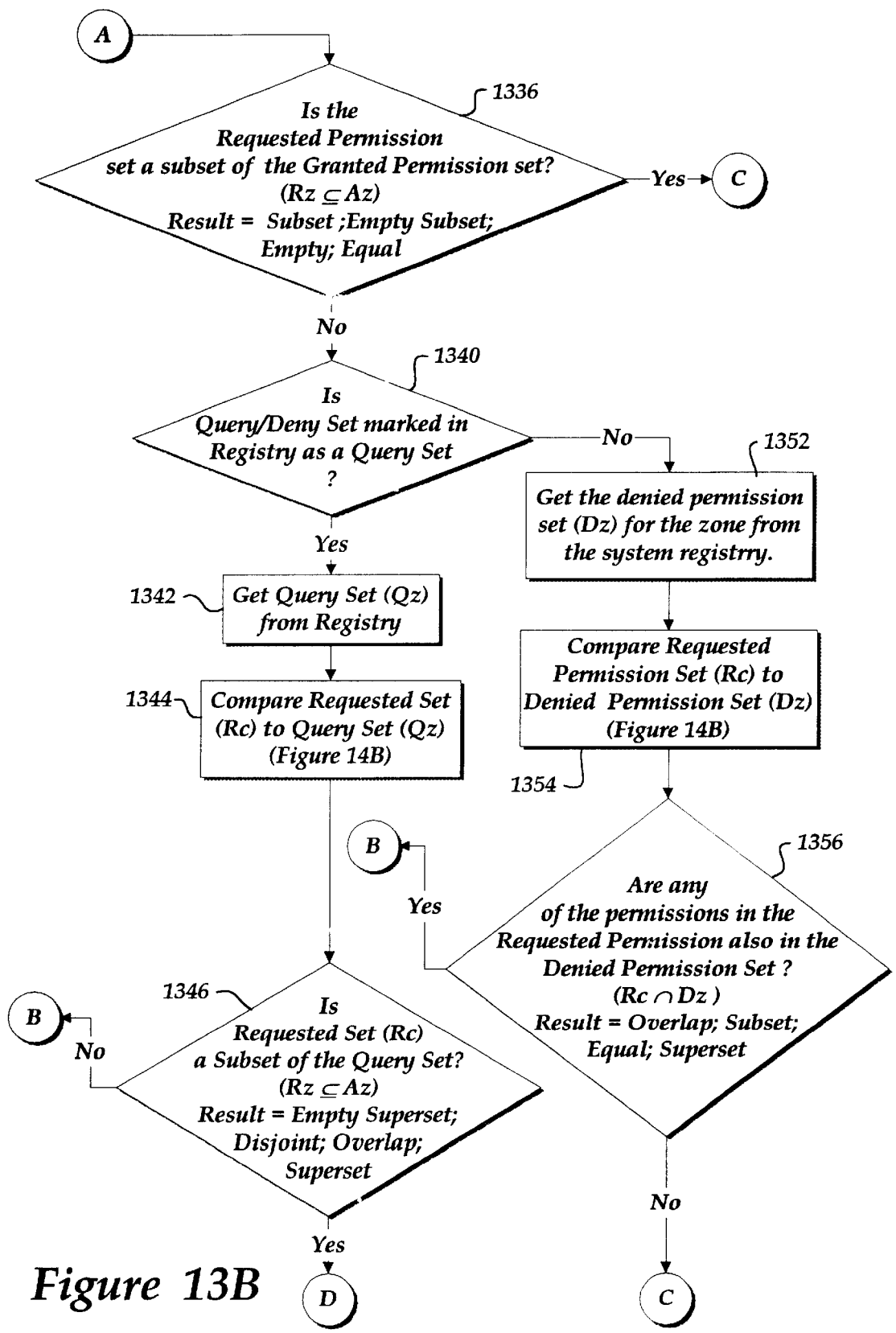
Figure 13C:
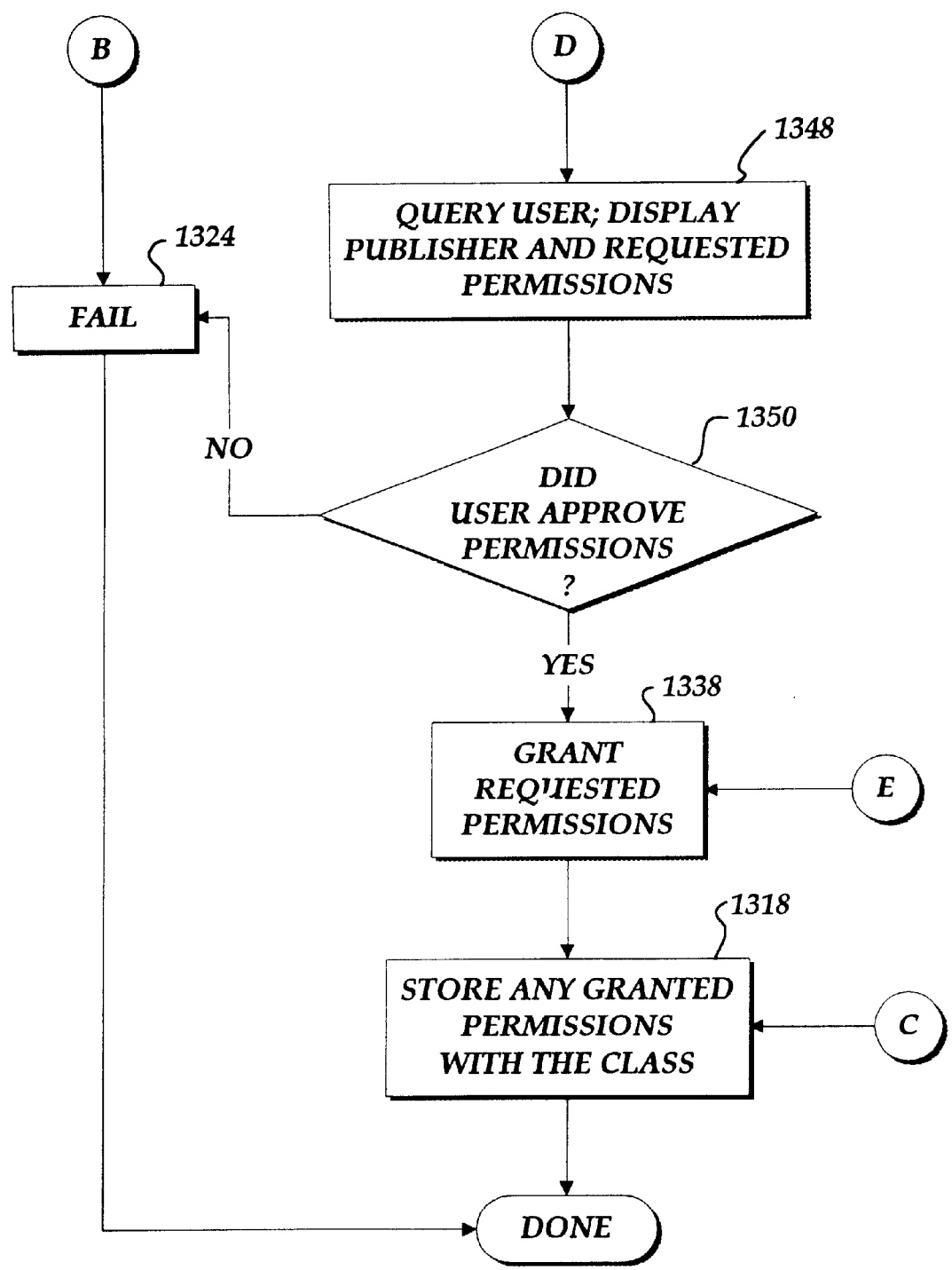

The method and system for processing the requested permission set is set forth in the functional flow diagram shown in FIG. 13. The Internet security manager 222 first determines the zone that the class was downloaded from (block 1310) when a class or other active content is first downloaded. The downloaded class 1010 is then checked in a signature verification decision (block 1312) to determine if the downloaded class has been digitally signed. If the class has not been digitally signed, then the Internet security manager 222 retrieves (block 1314) the unsigned default permissions set 236 for the zone 227 from which the class was downloaded. The Internet security manager 222 then grants the permissions contained in the unsigned permissions set (block 1316). The permissions granted (block 1316) are stored with the class (block 1318; FIG. 13C). The storage (block 1318) can either be temporary, if the class is temporarily downloaded, or permanent if the class is to be stored on the host system.

Returning to the digital signature decision (block 1312) in FIG. 13A, if the Internet security manager 222 determines that the class has been digitally signed, then the identity of the publisher is determined from the signing certificate (block 1320). A decision (block 1322) determines if the signature verifies for the asserted publisher. If the signature of the publisher does not verify, the process fails (block 1324; FIG. 13C), the code is not loaded, run or stored on the host system and no permissions are granted.

If the signature does verify as the publisher's (block 1322; FIG. 13A), then the Internet security manager 222 computes a new hash value for the signed code package 1010, as it has been received from the zone, and compares (block 1326) this hash value to the original hash value 1050 (FIG. 10) contained in the digital signature of the signed code package 1010. A failure of the new and the original hash values to match indicates that the contents of the signed code package 1010 have been altered or corrupted since the time that the signed code package 1010 was published by the publisher (block 1118; FIG. 11), the process fails (block 1324; FIG. 13C) and the class is not loaded, stored or run and no permissions are assigned.

If the original and the new hash values do match, as determined in the hash value comparison decision (block 1327), the set of permissions that the class requires to run is obtained. First, a decision (block 1330) determines if a requested permission set is externally attached to the class. If a permission set is not attached to the class, the default set of permissions is processed (block 1314), as is described above. If the decision (block 1330) determines that a requested permission set is attached, the requested permission set is retrieved (block 1331). Thereafter, the Internet security manager retrieves the trusted signed, i.e., granted, permission set 232 that is associated with the zone 226 from which the class was downloaded from the system registry 224 (block 1332). The granted permission set 232 is then compared to the requested permissions set (block 1334). If the requested permission set is a subset of the granted permission set, as each permission is defined by its parameters and primitives (block 1336; FIG. 13B), the permissions requested in the requested permission set are granted (block 1338; FIG. 13C).

If the requested permissions set 1202 is not a subset of the trusted signed, i.e., granted, permissions set 232 the Internet security manager determines in a query/deny set decision (block 1340) whether the untrusted signed permission set 234 is a query set or a deny set. In an actual embodiment of the invention, the Internet security manager 222 determines whether the untrusted signed permission set 234 is a query set or a deny set by reading a query/deny flag 235 that is stored in the system registry 224 and associated with the untrusted signed permission set 234. If the query/deny set decision (block 1340) determines that the untrusted signed permission set 234 is a query set, the untrusted signed (query) set 234 that is associated with zone 227 from which the class was downloaded is retrieved from the system registry 224 (block 1342). The Internet security manager 222 then compares the requested permissions set 1202 to the untrusted signed (query) permission set 234 (block 1344). If the requested permissions set is not a subset of the untrusted signed (query) permission set 234, the loading of the class fails (block 1324; FIG. 13C), the class is not loaded or run and no permissions are assigned.

If the requested permissions set is a subset of the untrusted signed (query) permission set 234, a dialog window displays the publisher and requested permissions to the user for approval or disapproval (block 1348, FIG. 13C). (See FIG. 5B for an exemplary prompt dialog box). A user decision not to approve the requested permissions is detected in a query approval permissions decision (block 1350), resulting in the process failing (block 1324), the class not loading or running, and no permissions being granted. A user decision to approve the request for the permissions is detected in a query approval decision (block 1350), resulting in the requested permissions being granted (block 1338). Permissions that are granted (block 1338) are stored with the class in memory and then stored (block 1318) with the class on the user's local storage if the class is to be retained over time.

If the decision (block 1340; FIG. 13B) is that the untrusted signed permission set 234 is a deny set, the untrusted signed (deny) permission set 234 is retrieved (block 1352; FIG. 13B) from the system registry 224 and compared (block 1354) to the requested permission set 1202. If any of the permissions in the requested permission set 1202 are also in the untrusted signed (deny) permission set 234, this is detected in a decision (block 1356; FIG. 13*b*), the process fails (block 1324; FIG. 13C), and the class is not loaded, run or saved. If none of the permissions in the requested permission set 1202 are in the untrusted signed (deny) permission set 234 (block 1356; FIG. 13C), the user is queried (block 1348) to approve or disapprove of the requested permission set.

While actual embodiment of the present invention uses unsigned, granted, and denied/query permission sets, the invention also contemplates alternative implementations for controlling active content based on set operations of other permission set types. For example, one or more sets can be used to implement control over active content of different types, i.e. signed, unsigned, size, or any other attribute.

In an actual embodiment, the method and system of the present invention is realized using an object-oriented programming paradigm. An object-oriented programming paradigm views blocks of computer-executable instructions and data as a collection of discrete objects that interact with other objects. One of the primary benefits of object-oriented programming is that the objects can easily and affordably be adapted to meet new needs by combining them in a modular fashion. An object is a unit of code comprising both routines and data (also called methods and properties) and is thought of as a discrete entity. The structural foundation for an object-oriented language is the object model. The goals of this model are encapsulation, persistence, polymorphism, abstraction, concurrency, and typing. The component object model (COM), the distributed component object model (DCOM), and object linking and embedding (OLE) produced by Microsoft Corporation of Redmond, Wash., are examples of object models. The present invention may be practiced under any of these object models or many others that are well known to those skilled in the art.

Objects communicate with each other through interfaces. Each object may have multiple interfaces. An interface exposes and defines access to the object's public properties and methods. For instance, in Microsoft's COM, all objects are required to support the IUnknown interface. The IUnknown interface includes a method named QueryInterface through which other objects in the global namespace (or a distributed namespace in a distributed system) can request and receive pointers to the objects' other interfaces. One of the primary advantages to interfaces is that a client object can continue to access the methods of a server object that are exposed through the interface regardless of whether the underlying code in the object is updated or changed for another reason.

In an actual embodiment of the invention, permissions are modeled as objects, or components of active code, that are attached to the downloaded classes according to the method and system described above with reference to FIG. 13. When a downloaded class is instantiated as an object, the permission objects associated with that class intercepts all protected operation requests received from the object while it is running and allow access to the underlying system objects only if allowed by the permission objects that have been granted.

Set Comparisons

The method and system of the present invention automates the comparison of a requested permission set with a user permission set to produce a directional set comparison result that is used to decide whether to grant permissions to active content, deny permissions to active content, or to prompt the user for instructions on what to do. In an actual embodiment of the invention, a requested permission set 1202 is compared to two user permission sets—the trusted signed permission set 232 and to the untrusted signed permission set 234. While the following discussion discusses an actual embodiment that compares permission sets, the present invention is not limited to this specific application and may be used in any application that would benefit from determining a directional set comparison result at any of a variety of different points (or levels) during the comparison.

A brief review of the preceding discussion might be helpful before continuing. The user configures a system security policy that is stored in the system registry 224 of a host computer. The system security policy is divided into configurable zones that group locations on a computer network according to the user's perception of the risk of running active content downloaded from that zone on the user's computer. Each zone 226 has a number of configurable protected operations 228. One or more of these protected operations 228 may administer active content downloaded from the zone 226. Each protected operation 228 may have a plurality of permission sets (e.g., 232, 234, 236) that may be defined for use in different contexts, such as applying a first and a second permission set to downloaded active content that is digitally signed and applying a third permission set when the active content is not digitally signed. Permission sets contain the definition of one or more configurable permissions (e.g.; those shown in FIG. 6). Each permission is defined by one or more configurable parameters (FIGS. 9*a–g*) and each parameter is defined by one or more primitives that can represent values like "*.txt", "mydoc.doc", "True", "80 ", "applet" and arrays of the various types of primitives.

A requested permission set 1202 is created by a third party publisher. The requested permission set 1202 contains the permissions that the publisher requests to be granted on the host system. The permissions in the requested permission set 1202 correspond to the permissions that can be configured in the user permission sets (e.g., 232 and 234). Like the permission configuration in a user permission set, the permissions in a requested permission set 1202 may be configured to the same "fine grained" level, i.e. down to the primitives level.

The mechanism of the invention maintains the direction of the comparison result during the comparison of permission sets because the comparison seeks to determine the result of comparing a "superior" set to an "inferior" set in the sense that the user permission set (the "superior set") limits the permissions that may be granted to the requested permission set (the "inferior set"). For instance, the trusted signed permission set 232 is "superior" to the "inferior"

requested permission set 1202 in that the permissions requested in the requested permission set 1202 must be contained in the trusted signed permission set 232 before the requested permissions will be granted. The comparison must also take into account that the parameters in a requested permission must be contained in the parameters in the corresponding user permission set, and that the primitives that define the requested parameter must be contained within primitives that define the corresponding user parameter. This same concept can be represented by set relationships, i.e., the requested permissions in the requested permission set must be a subset of the user permissions in the user permission set, the requested parameters in the requested permission must be a subset of the user parameters in the user permission and the requested primitives that define the requested parameters must be a subset of the user primitives that define the user parameters. In order to determine if the requested permission set is a subset of the user permission set, and not vice versa, a directional set comparison result must be maintained, and it is preferable that a method is provided to combine the directional set comparison results at and between the various levels of configuration to form a cumulative directional set comparison result that can be used to make decisions.

Directional set comparison results can also be determined under the present invention for comparisons that seek to determine how requested permission sets and user permission sets intersect (have common members). For instance, in an actual embodiment of the invention, if a requested permission (parameter, primitive) from the requested permission set has any part in common with a corresponding user permission (parameter, primitive) in the untrusted signed (deny) permission set, then the permission will be denied by the Internet security manager 222.

The present invention creates a meaningful cumulative directional set comparison result that tracks the relationship of the "superior" and the "inferior" permission set as the comparisons are made up the various levels. The following discussion will explain in detail the method and system of the invention for making these comparisons, creating the directional comparison results, and merging the directional comparison results into a single meaningful cumulative set comparison result that can be used by the Internet security manager 222, or another process, to automatically determine an action that should be taken when processing permissions.

In an actual embodiment of the invention, Java applets and classes 230 are defined as a protected operation 228. The Java applets and classes protected operation in this actual embodiment has three permission sets per zone: the trusted signed permission set 232, the untrusted signed permission set 234, and the unsigned permission set 236. Each of these permission sets 232, 234, and 236 is independently configurable by the user through configuration user dialogs such as those illustrated in FIGS. 9A–G or by implicitly or explicitly accepting the default configurations that are provided. The mechanism of the invention for comparing the trusted signed permission set 232 and the untrusted signed permission set 234 to the requested permission set 1202 is described in detail below.

As an example of the actual embodiment of the invention to give context to the discussion below, the Internet Zone has a Java permissions protected operation 516 (FIG. 5a), which has a FileIO permission 908 (FIG. 9A), which has a has a read parameter 909. The read parameter 909 is defined by one or more include files regular expression primitives (e.g., "*.txt"). The read parameter 909 may also be defined by one or more exclude files regular expression primitive (e.g., "mydoc.txt"). Regular expressions primitives, such as are used in the include files parameter and the exclude files parameter may contain wildcards ("*" or "?"). The include files and exclude files parameters form an include/exclude pair that together define the subset of files to which the read parameter 909 applies.

To facilitate keeping track of the directional nature of the comparisons between the requested set 1410 and the user set 1412, the method and system of the present invention define the following eight relationships depicted in FIG. 14A:

| Directional Set Comparison Result: | Explanation of the Directional Set Comparison Result | Illustrated in FIG. 14A as: |
|---|---|---|
| Empty | There is no items in either the user set or the requested set. | 1416 |
| Equal | The items in the user set are identical to the items in the requested set. | 1414 |
| Subset | The user set contains all of the items in the requested set, but there are some items in the user set that are not in the requested set. | 1422 |
| Superset | The requested set contains all of the items in the user set, but there are some items in the requested set that are not in the user set. | 1424 |
| Empty Subset | The requested set does not have any items and the user set does have some items. | 1426 |
| Empty Superset | The requested set has some items, but the user set does not have any items. | 1428 |
| Disjoint | The requested set has some items and the user set has some items but the requested set and the user set have no items in common. | 1420 |
| Overlap | The requested set has some items and the user set has some items but the requested set and the user set have only some items in common and each set contains one or more items that are not in the other set. | 1418 |

Figure 14B:
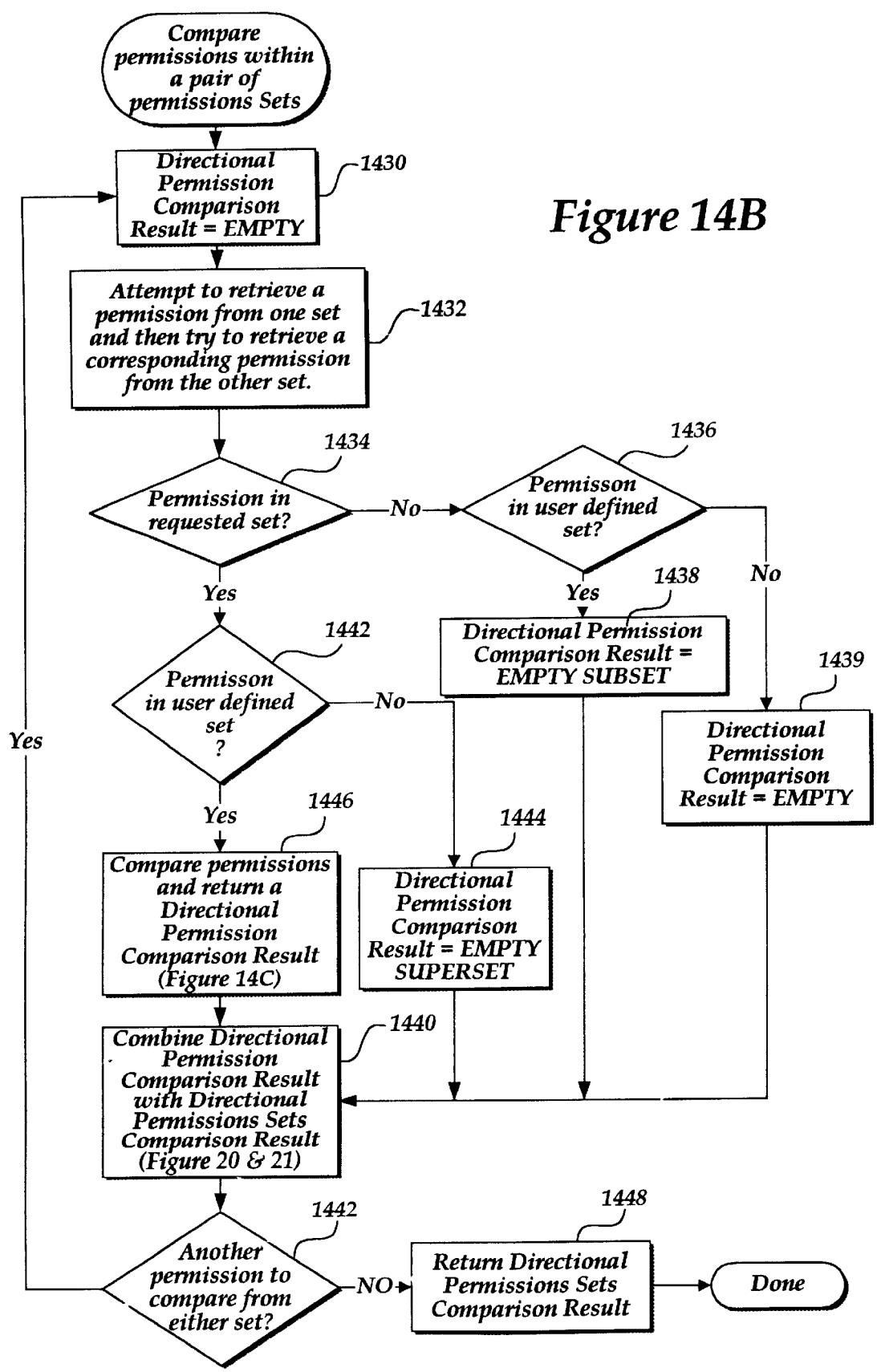
FIG. 14B is a functional flow diagram illustrating the process of comparing permission sets to assign a directional set comparison result in accordance with the present invention.

FIG. 14B is a functional flowchart illustrating the method and system of the present invention for comparing permission sets. FIG. 14B illustrates the system and method of the invention for comparing permission sets when: it is called (block 1334 FIG. 13A) to compare the requested permission set 1202 ("Rc") to the trusted signed (granted) permission set 232 ("Az"); when it is called (block 1344; FIG. 13B) to compare the requested permission set 1202 ("Rc") to the untrusted signed (query) permission set 232 ("Qz"); and when it is called (block 1356; FIG. 13b) to compare the requested permission set 1202 ("Rc") to the untrusted signed (denied) permission set 232 ("Dz").

The comparison of permission sets may include some or all of the following steps, depending on how the permission sets have been configured: determining a directional permissions sets comparison result (which may include determining and aggregating one or more directional permission comparison results); determining a directional permission comparison result (which may include determining and aggregating one or more directional parameter comparison results); and determining a directional parameter comparison result (which may include determining and aggregating one or more directional primitive comparison results). At the end of the process in FIG. 14B, the directional permissions sets comparison result is the accumulation of all of the "lower level" directional comparison results.

The first step in FIG. 14B initializes a variable designated DIRECTIONAL PERMISSIONS SETS COMPARISON RESULT to the value EMPTY (block 1430). Thereafter, the process attempts to retrieve (block 1432) a permission from one permission set and then tries to retrieve a corresponding permission from the other permission set. Then a test is made to determine if a permission has been retrieved from the requested set (block 1434). If no permission has been retrieved from the requested set, a test is made to determine if a permission has been retrieved from user defined set (block 1436). If no permission has been retrieved from the user defined set, a variable designated DIRECTIONAL PERMISSION COMPARISON RESULT is set equal to EMPTY (block 1439). If a permission has been retrieved from the user defined set, the variable DIRECTIONAL PERMISSION COMPARISON RESULT is set equal to EMPTY SUBSET (block 1438).

The DIRECTIONAL PERMISSION COMPARISON RESULT is then combined (block 1440) with the variable designated DIRECTIONAL PERMISSIONS SETS COMPARISON using the merge table illustrated in FIG. 20. FIG. 20 illustrates a plurality of merger cells identified by the intersection of a column numbered 1 through 8 and a row identified by letters A through I. For example, the cell reference "H3" refers to the cell at the intersection of row H with column 3, which has the value OVERLAP. The table 2010 is used to merge directional comparison set results by finding the value of the present designated DIRECTIONAL PERMISSIONS SETS COMPARISON RESULT (the Previous/Accumulated Merge Result) in column 1 and the value of the variable DIRECTIONAL PERMISSION COMPARISON RESULT (the New Merge Result) in row A. The intersection of the thusly found column and row in the table 2010 is a new designated DIRECTIONAL PERMISSIONS SETS COMPARISON RESULT value. For example, if the present DIRECTIONAL PERMISSIONS SETS COMPARISON RESULT value is EMPTY and the DIRECTIONAL PERMISSION COMPARISON RESULT value is EMPTY SUBSET, the new DIRECTIONAL PERMISSIONS SETS COMPARISON RESULT is EMPTY SUBSET.

Returning to FIG. 14B, if a permission has been retrieved from the requested set (block 1434), a test is made to determine if a permission has been retrieved from the user defined set (block 1442). If no permission has been retrieved from the user defined set (block 1442), DIRECTIONAL PERMISSION COMPARISON RESULT is set equal to EMPTY SUPERSET (block 1444) and combined with DIRECTIONAL PERMISSIONS SETS COMPARISON RESULT in accordance with the table illustrated in FIG. 20 (block 1440).

Figure 14C:
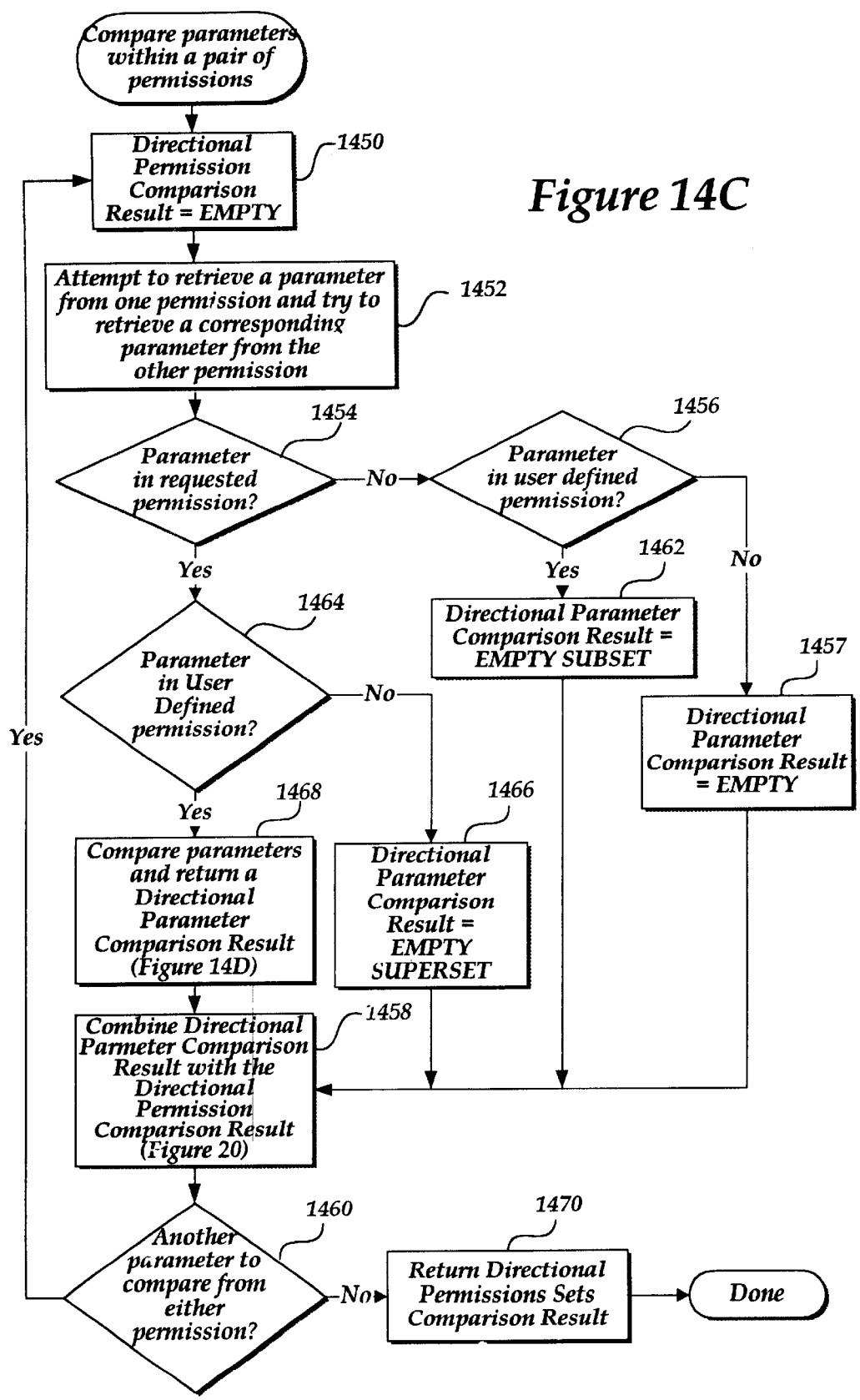
FIG. 14C is a functional flow diagram illustrating the process of comparing parameters within a pair of permissions to assign a directional set comparison result, in accordance with the present invention.

If a permission has been retrieved from the user defined set (block 1442) the retrieved requested set permission and the retrieved user defined set permission are compared (block 1446). How the comparison is accomplished is illustrated in FIG. 14C and described below. The end result of the comparison is the value of the DIRECTIONAL PERMISSION COMPARISON RESULT variable, which is combined with the DIRECTIONAL PERMISSIONS SETS COMPARISON RESULT variable (block 1440).

If there is another permission to process (decision block 1442), then the worker thread attempts (block 1432) to retrieve another pair of like permissions from the permission sets that are being compared, and the sequence of steps illustrated in FIG. 14B and described above are repeated. After all of the permissions have been processed, the final DIRECTIONAL PERMISSIONS SETS COMPARISON RESULT is returned (block 1448) to the block that called the FIG. 14B process (block 1336, 1346 or 1356).

Figure 21:
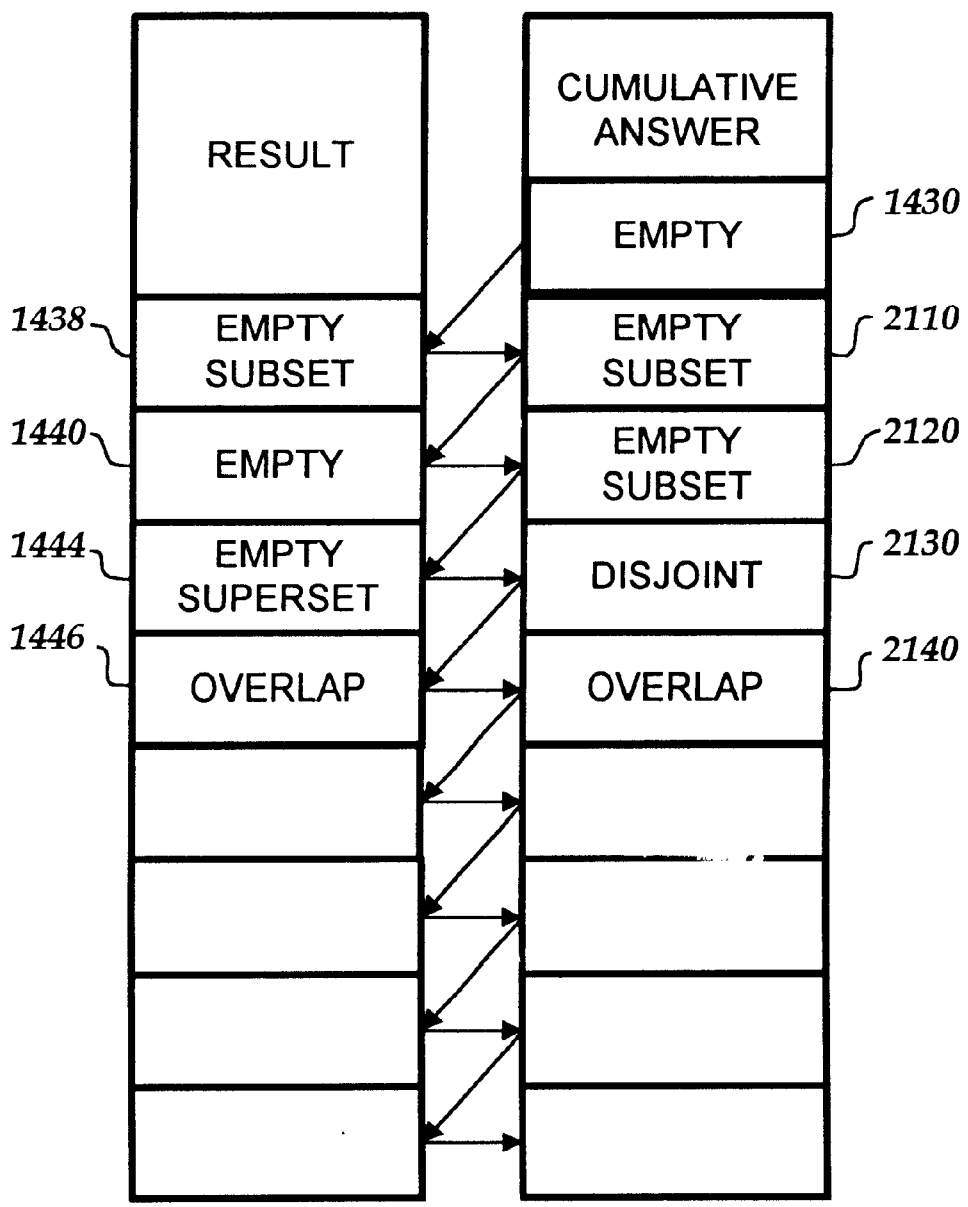
FIG. 21 is an illustration of an example for merging directional results, in accordance with the present invention.

FIG. 21 illustrates a sequence of DIRECTIONAL PERMISSION COMPARISON RESULT, DIRECTIONAL PERMISSIONS SETS COMPARISON RESULT combinations based on the table illustrated in FIG. 20.

In one actual embodiment, the process in FIG. 14B iterates through the permissions in the requested set, so block 1434 is always 'yes' and as permissions are found in the user set, a counter is incremented. At the end, if the counter does not equal the number of permissions in the user set, the DIRECTIONAL PERMISSIONS SETS RESULTS are merged with EMPTY SUBSET using the table in FIG. 20.

The method and system of the present invention for comparing parameters within a pair of permissions is illustrated in functional flow form in FIG. 14C. FIG. 14C is substantially identical to FIG. 14B except that FIG. 14C is at the parameter level and FIG. 14B is at the permission set level. First, a variable designated DIRECTIONAL PERMISSION COMPARISON RESULT is initialized to EMPTY (block 1450). Next, the process attempts to retrieve a parameter from one permission and then tries to retrieve a corresponding parameter from the other permission (block 1452). Thereafter, a test is made to determine if a parameter was retrieved from the requested permission (block 1454). If no parameter was retrieved from the requested permission, a test is made to determine if a parameter was retrieved from the user defined permission. If no parameter was retrieved from the user defined permission, a variable designated DIRECTIONAL PARAMETER COMPARISON RESULT is set equal to EMPTY (block 1457). If a parameter was retrieved from the user defined permissions, DIRECTIONAL PARAMETER COMPARISON RESULT is set equal to EMPTY SUBSET (block 1462). Thereafter, the DIRECTIONAL PARAMETER COMPARISON RESULT (the New Merge Result) is combined with the DIRECTIONAL PERMISSION COMPARISON RESULT (the Previous/Accumulated Merge Result) according to the merger table illustrated in FIG. 20 (block 1458).

If a parameter has been retrieved from the requested permission (block 1454), a test is made to determine if a parameter has been retrieved from the user defined permission (block 1464). If no parameter has been retrieved from the user defined permissions, DIRECTIONAL PARAMETER COMPARISON RESULT is set equal to EMPTY SUPERSET (1466) and combined with DIRECTIONAL PERMISSION COMPARISON RESULT (block 1458). Then, the DIRECTIONAL PARAMETER COMPARISON RESULT (the New Merge Result) is combined with the DIRECTIONAL PERMISSION COMPARISON RESULT (the Previous/Accumulated Merge Result) according to the merger table illustrated in FIG. 20 (block 1458).

If a parameter has been retrieved from the user defined permission (block 1464), the parameters are compared (block 1468) and the result retrieved as the DIRECTIONAL PARAMETER COMPARISON RESULT, which is combined with DIRECTIONAL PERMISSION COMPARISON RESULT (block 1458), as described above.

The parameters of a permission are generally known in advance based on the type of the permission. In one embodiment of the invention, there is no way to enumerate the parameters of a permission—they are simply known, by virtue of the type of the permission. For example, product documentation such as that referred to in other parts of this specification informs the user that the FileIO permission has read, write, and delete parameters. Thus, an actual embodiment of the invention will simply linearly perform the necessary options to compare and merge each of the predefined parameters of the permission. In this example, the process to compare two FileIO permissions will first initialize a variable named RESULT to the result of comparing the read parameters of the two permissions. Next, the process will compare the write parameters of the two permissions and merge this comparison result with RESULT (using FIG. 20), storing the merged result into variable RESULT. Finally, the process will compare the delete parameters of the two permissions, merge this comparison result with RESULT (using FIG. 20), and return the merged result to the calling process. Note that the process of comparing the FileIO permission conceptually follows the form of FIG. 14C, where tests 1454 and 1464 always follow the "yes" branch, and the blocks inside the loop are copied three times, one for each parameter.

Figure 14D:
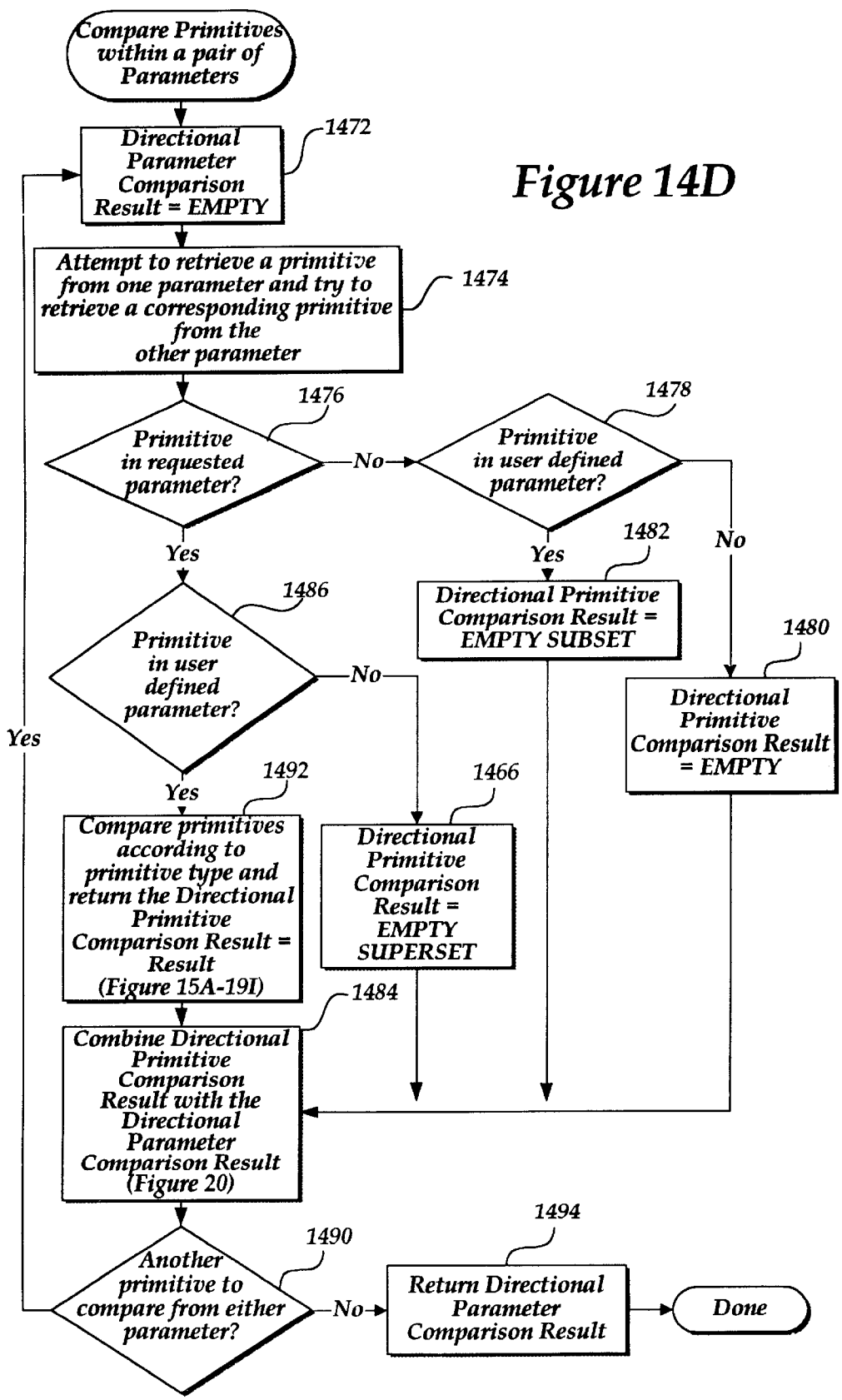
FIG. 14A illustrates the eight directional set comparison results of the present invention.

The method and system of the present invention for comparing primitives within a pair of parameters is illustrated in functional flow form in FIG. 14D. FIG. 14D is substantially identical to FIGS. 14B and 14C except that FIG. 14D is at the primitive level, FIG. 14C is at the permission level and FIG. 14B is at the permission set level. First, a variable designated DIRECTIONAL PARAMETER COMPARISON RESULT is initialized to EMPTY (block 1472). Next, the process attempts to retrieve a primitive from one parameter and then tries to retrieve a corresponding primitive from the other parameter (block 1474). Thereafter, a test is made to determine if a primitive was retrieved from the requested parameter (block 1476). If no primitive was retrieved from the requested parameter, a test is made to determine if a primitive was retrieved from the user defined parameter (block 1478). If no primitive was retrieved from the user defined parameter, a variable designated DIRECTIONAL PRIMITIVE COMPARISON RESULT is set equal to EMPTY (block 1480). If a parameter was retrieved from the user defined permissions, DIRECTIONAL PRIMITIVE COMPARISON RESULT is set equal to EMPTY SUBSET (block 1482). Thereafter, the DIRECTIONAL PRIMITIVE COMPARISON RESULT (the New Merge Result) is combined with the DIRECTIONAL PARAMETER COMPARISON RESULT (the Previous/Accumulated Merge Result) according to the merger table illustrated in FIG. 20 (block 1484).

If a primitive has been retrieved from the requested parameter (block 1476), a test is made to determine if a primitive has been retrieved from the user defined parameter (block 1486). If no primitive has been retrieved from the user defined parameters, DIRECTIONAL PRIMITIVE COMPARISON RESULT is set equal to EMPTY SUPERSET (1488) and the DIRECTIONAL PRIMITIVE COMPARISON RESULT (the New Merge Result) is combined with the DIRECTIONAL PARAMETER COMPARISON RESULT (the Previous/Accumulated Merge Result) according to the merger table illustrated in FIG. 20 (block 1484), as described above. If a primitive has been retrieved from the user defined parameters, then the two primitives are compared. The method and system of the present invention for comparing primitives of like type is illustrated in FIGS. 15A–19I and described below. Each primitive type returns a directional comparison result called RESULT to the parameters comparison process (FIG. 14d) and set equal to the DIRECTIONAL PRIMITIVES COMPARISON RESULT (block 1492), which is then combined with the DIRECTIONAL PARAMETER COMPARISON RESULT using the merger table illustrated in FIG. 20 (block 1484), as described above After the DIRECTIONAL PRIMITIVE COMPARISON RESULT has been combined with the DIRECTIONAL PARAMETER COMPARISON RESULT, a test is made to determine if another primitive needs to be processed (block 1490). If another primitive needs to be processed, the process cycles to the primitives retrieval block 1472 and the foregoing steps are repeated. After all of the primitives have been processed, the DIRECTIONAL PARAMETER COMPARISON RESULT is returned (block 1468) to the permissions comparison process (FIG. 14C) to be combined with the DIRECTIONAL PERMISSION COMPARISON RESULT (block 1458).

Once the DIRECTIONAL PARAMETER COMPARISON RESULT has been combined with the DIRECTIONAL PERMISSION COMPARISON RESULT (block 1458), a test is made to determine if another parameter needs to be processed (block 1460). If another parameter needs to be processed, the process cycles to the parameter retrieval block 1452 and the foregoing steps are repeated. After all of the parameters have been processed, the DIRECTIONAL PERMISSION COMPARISON RESULT is returned (block 1470) to the permissions comparison process (FIGS. 14B) to be combined with the DIRECTIONAL PERMISSIONS SETS COMPARISON RESULT (block 1440).

After the DIRECTIONAL PERMISSION COMPARISON RESULT has been combined with the DIRECTIONAL PERMISSIONS SET COMPARISON RESULT (block 1440), a test is made to determine if another permission needs to be processed (block 1442). If another permission needs to be processed, the process cycles to the permission retrieval block 1452 and the foregoing steps are repeated. After all of the permissions have been processed, the DIRECTIONAL PERMISSIONS SET COMPARISON RESULT is returned (block 1448) to the calling block (blocks 1336, 1346 or 1356) of FIGS. 13A and B to be processed as described above.

In the processes outlined by FIGS. 14B and FIG. 14C, the permissions and parameters were distinct units; no two permissions or parameters have overlapping meanings. Similarly, the process described by FIG. 14D only operates on primitive types with distinct values. There are primitive types that do not naturally follow this restriction as the permissions and their parameters do. For these more complex primitive types, a special process must be executed to account for the possibility of overlapping values. Wildcard expressions are the only primitive types used in the invention that require a special primitive list comparison process. The process for is described in detail below, starting with the discussion of FIG. 18A. In the context of FIG. 14D, this implies that lists of such complex types must be considered as a single macro primitive.

Figure 15A:
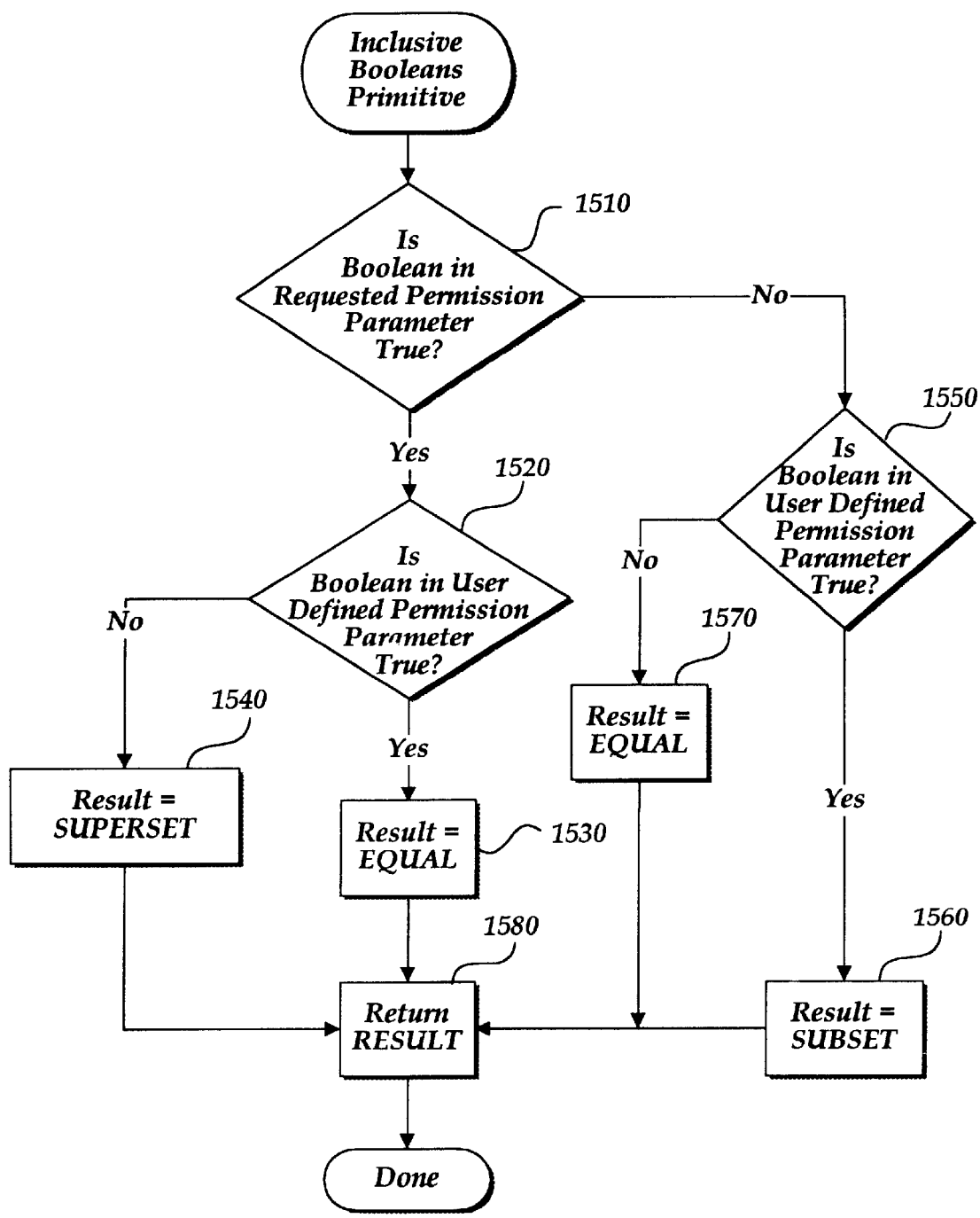
FIG. 15A is a functional flow diagram illustrating the process of assigning a directional set comparison result to the comparison of inclusive Boolean primitives, in accordance with the present invention.

If the primitives to be compared (block 1468; FIG. 14C) are inclusive Boolean primitives, the method and system of FIG. 15A is performed. If the inclusive Boolean primitive of the parameter in the requested permission is true (block 1510) and the inclusive Boolean primitive of the parameter in the user defined permission is also true (block 1520), RESULT is set to EQUAL (block 1530) and the RESULT is returned (block 1580).

If the inclusive Boolean primitive of the parameter in the requested permission is true (block 1510) but the inclusive Boolean primitive of the parameter in the user defined permission is not true (block 1520), RESULT is set to SUPERSET (block 1540) and RESULT is returned (block 1580). If the inclusive Boolean primitive of the parameter in the requested permission is false (block 1510) and the inclusive Boolean primitive of the parameter in the user defined permission is true (block 1550), RESULT is set to SUBSET (block 1560) and RESULT is returned (block 1580). If the inclusive Boolean primitive of the parameter in the requested permission is false (block 1510) and the inclusive Boolean primitive of the parameter in the defined permission is false (block 1550), RESULT is set to EQUAL (block 1570) and RESULT is returned (block 1580).

By way of example only, assume that the inclusive Boolean primitive of the parameter in the requested permission is true and the inclusive Boolean primitive of the parameter in the user defined permission is false, the returned RESULT (block 1580) is SUPERSET. Turning to FIG. 14D, assume that the existing value of DIRECTIONAL PARAMETER COMPARISON RESULT is DISJOINT. Referencing the table in FIG. 20, when DISJOINT (cell E1) is combined (block 1458) with SUPERSET (cell A6) the new DIRECTIONAL PARAMETER COMPARISON RESULT is OVERLAP (cell E6). If there are no more primitives to compare within the like parameters (FIG. 14D), the DIRECTIONAL PARAMETER COMPARISON RESULT of OVERLAP is returned (block 1494; FIG. 14D) to FIG. 14C (block 1468). Continuing the example, assuming the existing DIRECTIONAL PERMISSION COMPARISON RESULT is DISJOINT (cell E1) when OVERLAP (cell A2) is combined (block 1440) with DISJOINT (cell E1), the value of DIRECTIONAL PERMISSION COMPARISON RESULT is OVERLAP (cell E2). If this is the last parameter to compare, the DIRECTIONAL PERMISSION COMPARISON RESULT of OVERLAP is returned (block 1458; FIG. 14C) to FIG. 14B (block 1446). Continuing the example, assuming the existing DIRECTIONAL PERMISSIONS SETS COMPARISON RESULT is DISJOINT (cell E1) when OVERLAP (cell A2) is combined (block 1440) with DISJOINT (cell E1), the value of DIRECTIONAL PERMISSIONS SET COMPARISON RESULT is OVERLAP (cell E2). If there are not more permissions to compare, the DIRECTIONAL PERMISSIONS SET COMPARISON RESULT of OVERLAP is returned to the appropriate decision point (blocks 1336, 1346 or 1356) in the permission analysis process (FIGS. 13A–C).

If, for instance, OVERLAP is returned to the query decision block 1346, the query decision result would be yes and process would cycle to the query user display block 1348, which, as noted above, would cause a dialog to be displayed to the user requesting instructions on whether to approve or disapprove the permissions. Depending on the action taken, processing would continue as is described above with reference to FIGS. 13A–C.

The manner of processing the DIRECTIONAL PRIMITIVE COMPARISON RESULT returned by the primitive comparison step (block 1468) is the same regardless of the type of primitive that is being compared. The following discussion only addresses how the remaining primitive types are compared with the understanding that once a RESULT is returned and assigned to the DIRECTIONAL PRIMITIVE COMPARISON RESULT, further processing occurs in the manner generally outlined above.

Figure 15B:
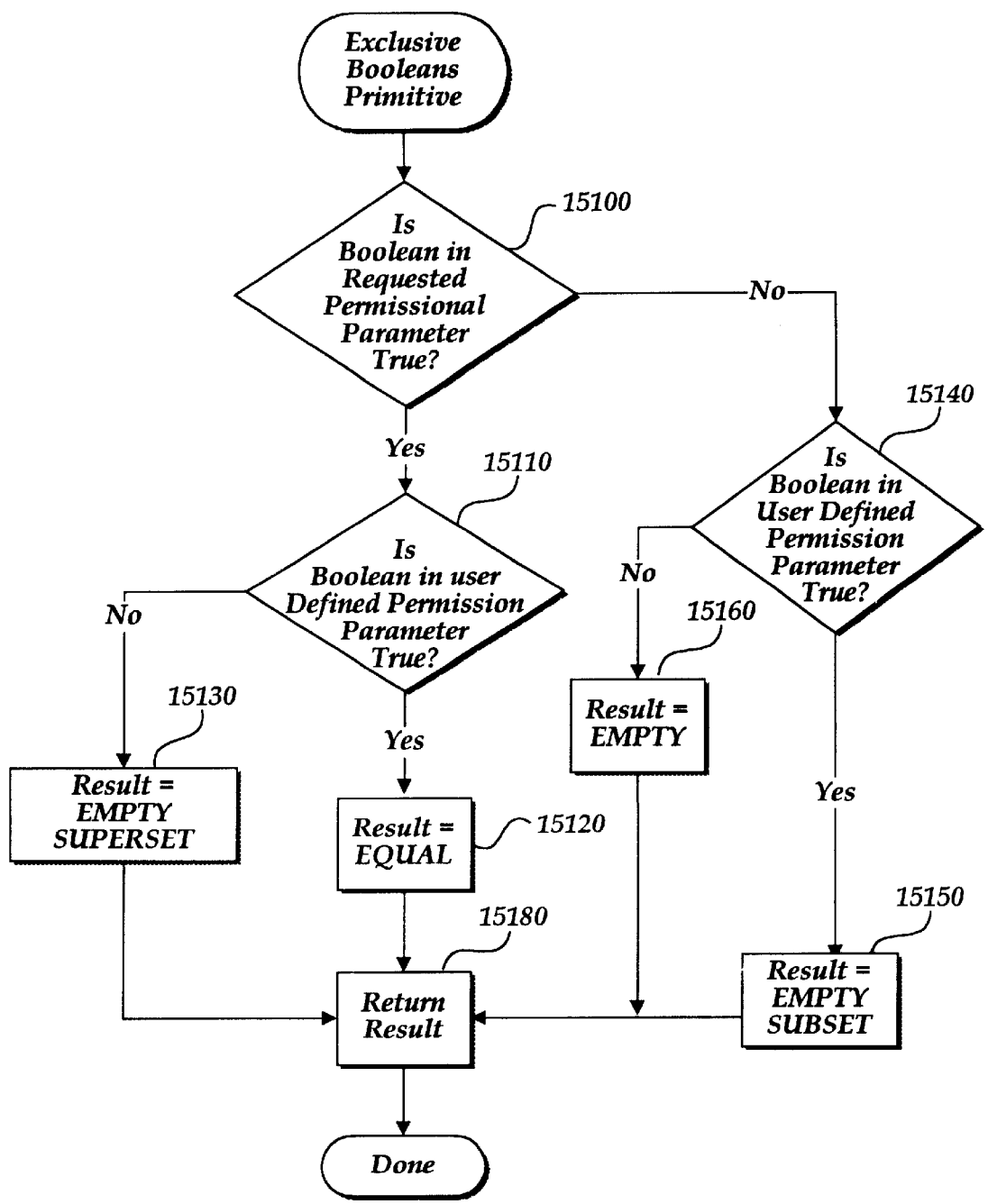
FIG. 15B is functional flow diagram illustrating the process of assigning a directional set comparison result to the comparison of exclusive Boolean primitives, in accordance with the present invention.

Comparison of exclusive Boolean primitives is illustrated in FIG. 15B. An exclusive Boolean primitive represents an action that is either allowed or disallowed, in contrast to an inclusive Boolean primitive wherein a "false" means that "part" of the action is allowed but to a lesser extent than a value of "true". If the exclusive Boolean primitive of the parameter in the requested permission is true (block 15100) and the exclusive Boolean primitive of the parameter in the user defined permission is true (block 15110), RESULT is set to EQUAL (block 15120) and the RESULT is returned (block 15180). If the exclusive Boolean primitive of the parameter in the requested permission is set to true (block 15100) but the exclusive Boolean primitive of the parameter in the user defined permission is false (block 15110), RESULT is set to EMPTY SUPERSET (block 15130) and RESULT is returned (block 15180). If the exclusive Boolean primitive of the parameter in the requested permission is false (block 15100), and the exclusive Boolean primitive of the parameter in the user defined permission is true (block 15140) RESULT is set to EMPTY SUBSET (block 15150) and RESULT is returned (block 15180). If the exclusive Boolean primitive of the parameter in the requested permission is false (block 15100) and the exclusive Boolean primitive of the parameter in the user defined permission is false (block 15140), RESULT is set to EMPTY (block 15160) and RESULT is returned (block 15180).

In an actual embodiment, the primitive type of a permission parameter is generally known, so the process for comparing the parameters is reduced to a linear process that simply compares the underlying primitive types. For example, the UserFileIOPermission consists of two parameters, each of which is an exclusive Boolean primitive type. The process for comparing the UserFileIOPermission is to first initialize a variable named RESULT to the result of comparing the read access exclusive Booleans of the two permissions. Next, the write access exclusive Booleans of the two permissions are compared, and the result is combined with RESULT using FIG. 20. Finally, RESULT is returned to the permission set comparison process (block 1440). Thus, because the types and quantities of the parameters are known, several steps from the permission comparison process are eliminated in the actual implementation, but still follow the spirit of the process.

Figure 16A:
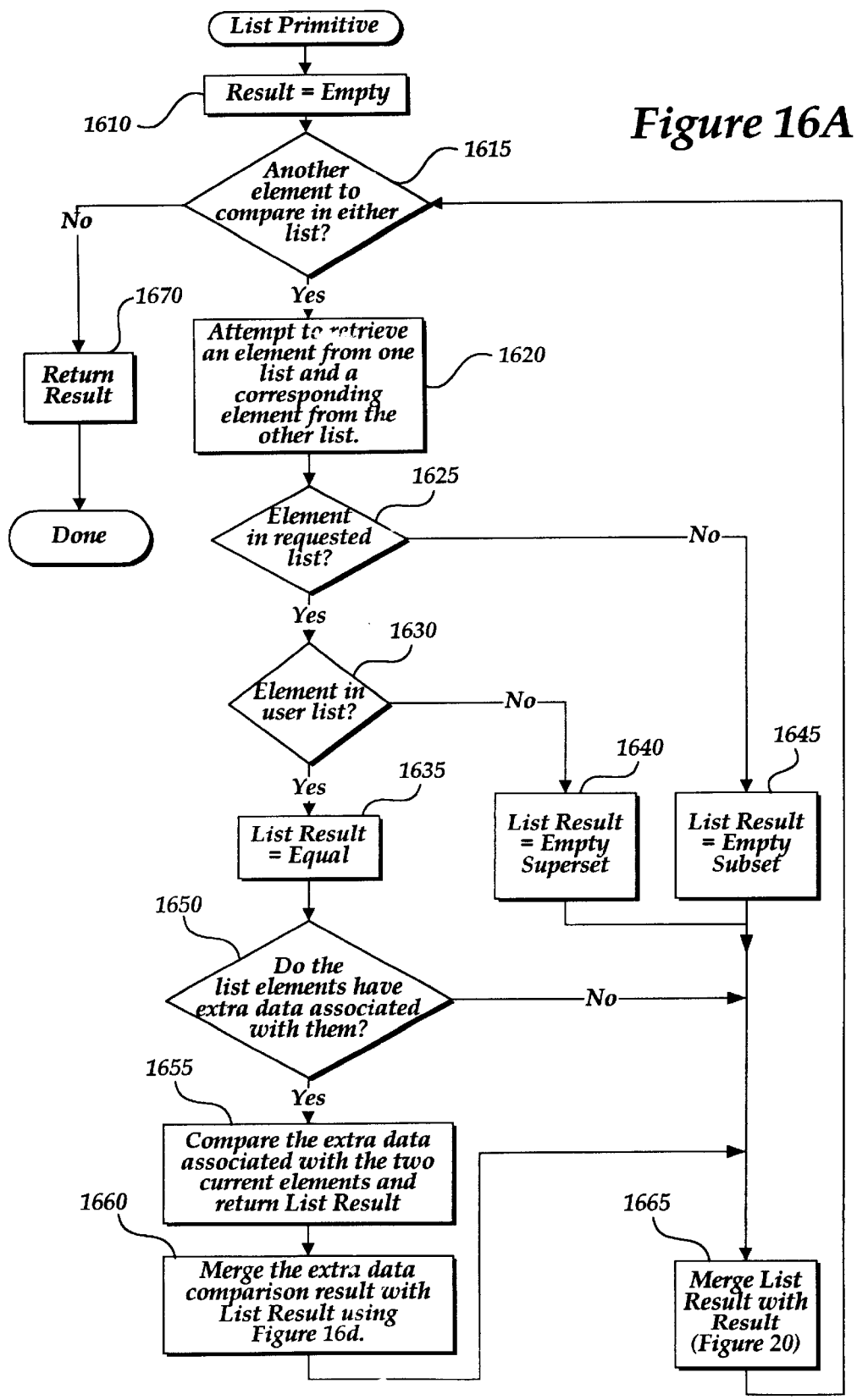

The method and system for comparing primitives consisting of ordered or unordered lists to produce a directional set relationship is illustrated in FIG. 16A. FIG. 16A is substantially similar to FIGS. 14B–D except that FIG. 16A is at the primitive level and has the additional step of merging extra data associated with the primitives being compared, to allow for nested structures. Extra data is specified, for example, in the Net permission. The Net permission has a primary list of integers, and each integer in the primary list can have a secondary list of integers associated with it. The primary list is the list of network addresses and the secondary list is the ports associated with the network addresses. If a secondary list is not specified, this implicitly means that all ports are specified for that network address.

First, a variable designated RESULT is initialized to EMPTY (block 1610). A test is made to determine if another element needs to be processed (block 1615) in either list. If another element needs to be processed, an attempt is made to retrieve an element from one list and then an attempt is made to retrieve a corresponding element from the other list (block 1620). Thereafter, a test is made to determine if an element was retrieved from the requested list (block 1625).

If an element has been retrieved from the requested list (block 1625), a test is made to determine if an element has been retrieved from the user defined list (block 1630). If an element has been retrieved from the user defined list, a variable designated LIST RESULT is set to EQUAL (block 1635). Next, a test is made to determine if the list elements have extra primitives associated with them (block 1650). If so, the associated primitives are compared (block 1655) and a variable designated EXTRA DATA COMPARISON RESULT is set to the result of the comparison of the extra data primitives. The EXTRA DATA COMPARISON RESULT is merged with LIST RESULT using the merger table illustrated in FIG. 16B to set a new value for the LIST RESULT.

If no element has been retrieved from the user defined list (block 1630), LIST RESULT is set equal to EMPTY SUPERSET (1640). If no element was retrieved from the requested list (block 1625), then it must have been retrieved from the user list, and LIST RESULT is set equal to EMPTY SUBSET (block 1645).

After the LIST RESULT has been set (blocks 1640, 1640 or 1660), the LIST RESULT is combined with the RESULT according to the merger table illustrated in FIG. 20 (block 1665). The process cycles to the remaining elements test block 1615 and the foregoing steps are repeated. After all of the elements have been processed, the RESULT is returned to the primitive comparison process (FIG. 14D) as the DIRECTIONAL PRIMITIVE COMPARISON RESULT (block 1492).

Figure 17:
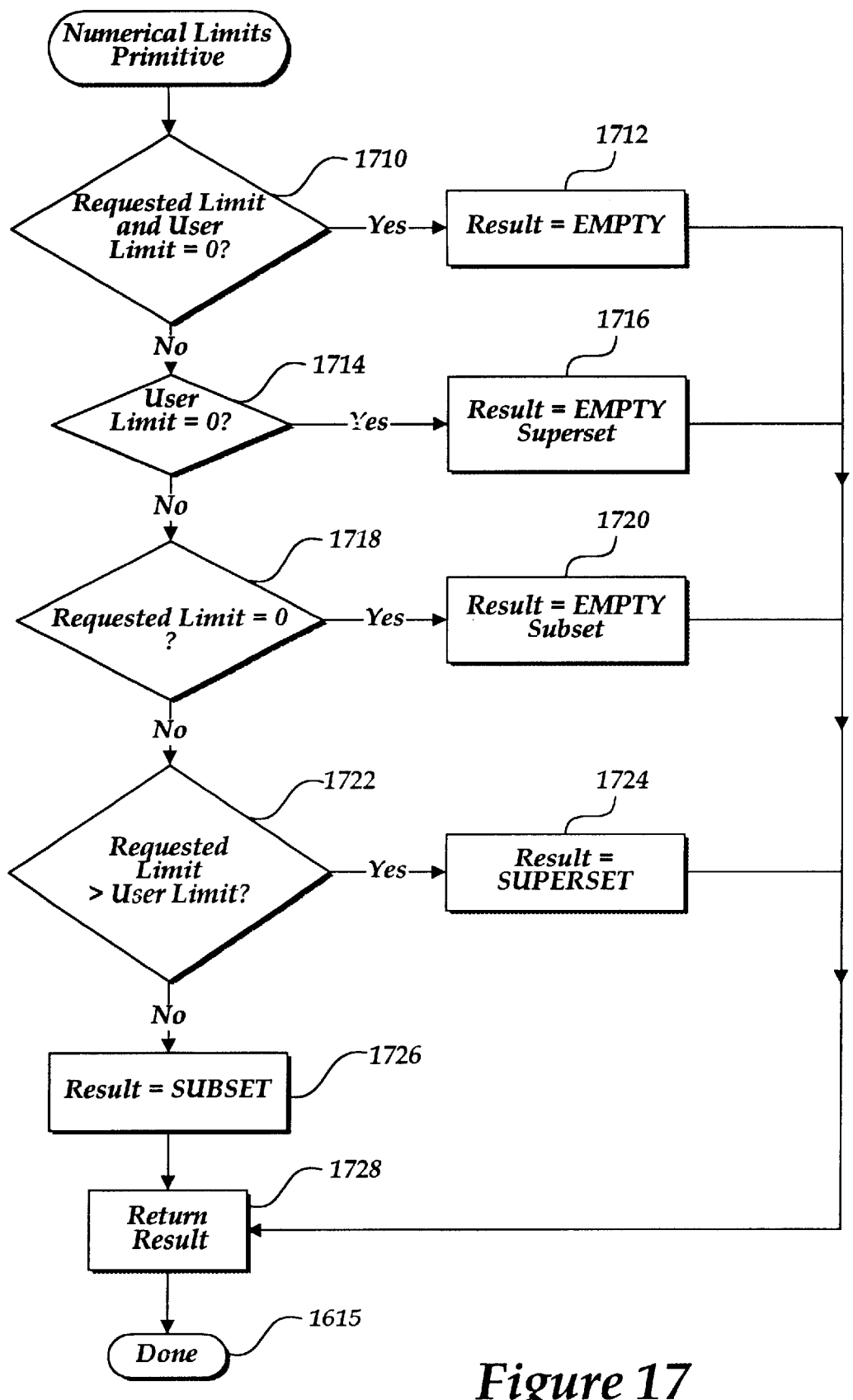
FIG. 17 is a functional flow diagram illustrating the comparison of numerical limits primitives to assign a directional set comparison result in accordance with the present invention.

The comparison of numerical limits primitives is illustrated in FIG. 17. If the requested permission limit and the user defined permission limit both equal zero (block 1710), RESULT is set to EMPTY (block 1712) and returned (block 1728). If the requested permission limit and user defined permission limit do not equal zero (block 1710), a test is made (block 1714) to determine if the user defined permission limit equals zero. If the user defined permission limit equals zero, RESULT is set to EMPTY SUPERSET (block 1716) and returned (block 1728). If the user defined permission limit is not zero, a test is made (block 1718) to determine if the requested permission limit equals zero. If the requested permission limit equals zero, RESULT is set to EMPTY SUBSET (block 1720) and returned (block 1728). If the requested permission limit is not equal to zero, a test is made (block 1722) to determine whether the requested permission limit is greater than the user defined permission limit. If the requested permission limit is greater than the user defined permission limit, RESULT is set to SUPERSET (block 1724) and returned (block 1728). If the requested permission limit is not greater than the user defined permission limit, RESULT is set to SUBSET (block 1726) and returned (block 1728).

Figure 18A:
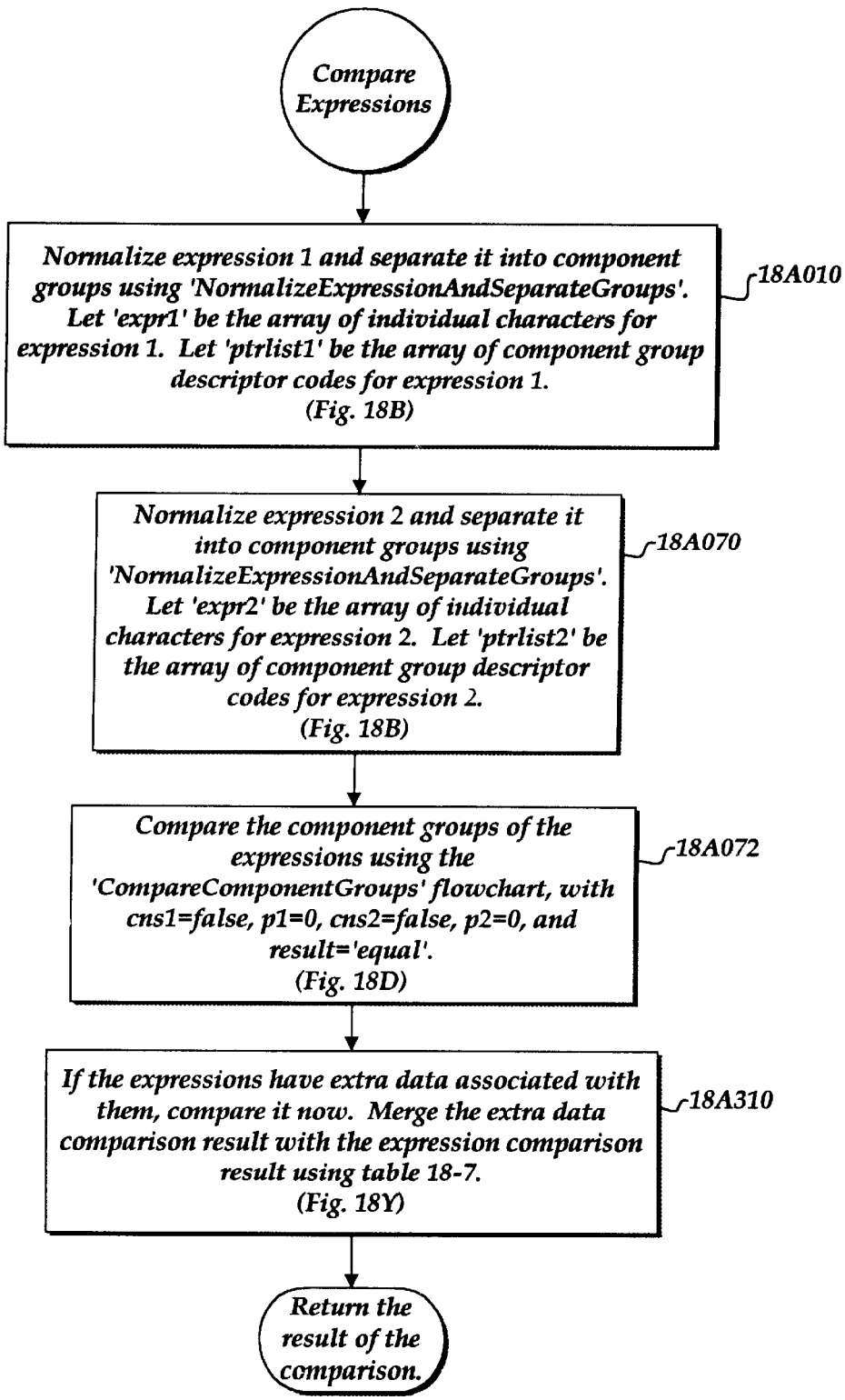
FIGS. 18A–Y are functional flow diagrams and associated look-up tables for the process of comparing regular expressions to assign a directional result, in accordance with the present invention.

The comparison of regular expressions and the assignment of a directional primitive RESULT is shown in FIGS. 18A–AA. A regular expression is a string of characters that provide a reference to an item or a set of items. For instance, a regular expression that references a file may be a character string such as "mydoc.doc". A regular expression that references a set of items contains one or more "wildcard" characters that represent one or many other characters. For instance, the regular expression "*.doc" is a regular expression that includes the wildcard character "*". In computer systems that use the Microsoft Windows operating system, the "*" character in a regular expression indicates that one or more characters may be substituted for the "*" character at the "*" wildcard's position in the regular expression. The regular expression, therefore, represents all regular expressions that end in the string ".doc", including "mydoc.doc". The Microsoft Windows operating system also recognizes the "?" wildcard character to represent that any single character can be substituted in the regular expression for the "?" character. An example of a regular expression that includes the "?" wildcard character is "???.doc", which indicates any regular expression that has three characters immediately followed by the ".doc" character string. Using this regular expression, a file named "aaa.doc" or "abc.doc" would be considered by the operating system to be an equivalent regular expression, while the filename "mydoc.doc" would not because it has more than three characters that precede the ".doc" character string.

Comparing Regular Expressions

The comparison of regular expressions to return a directional primitive comparison PERMISSION RESULT is illustrated in FIGS. 18A–18AA. FIG. 18A illustrates a method and system formed in accordance with this invention for comparing a first expression ("EXPRESSION1") and a second expression ("EXPRESSION2") in a functional flow diagram form. EXPRESSION1 is a regular expression that defines a parameter from the requested permission and EXPRESSION2 is a regular expression defines a corresponding parameter from the user defined permission.

To facilitate the comparison process, the expressions will be separated into "component groups". A single component is either a character, hereafter referred to as a "MATCH" component type; a wildcard "?", referred to as a "SKIP" type; or a wildcard "*", referred to as a "CONSUME" type. A component group is a contiguous region of like components.

A brief overview of the drawings associated with this process:

FIG. 18A describes at the highest level the process of comparing two expressions and initializes various variables used through the process.

Figure 18B:
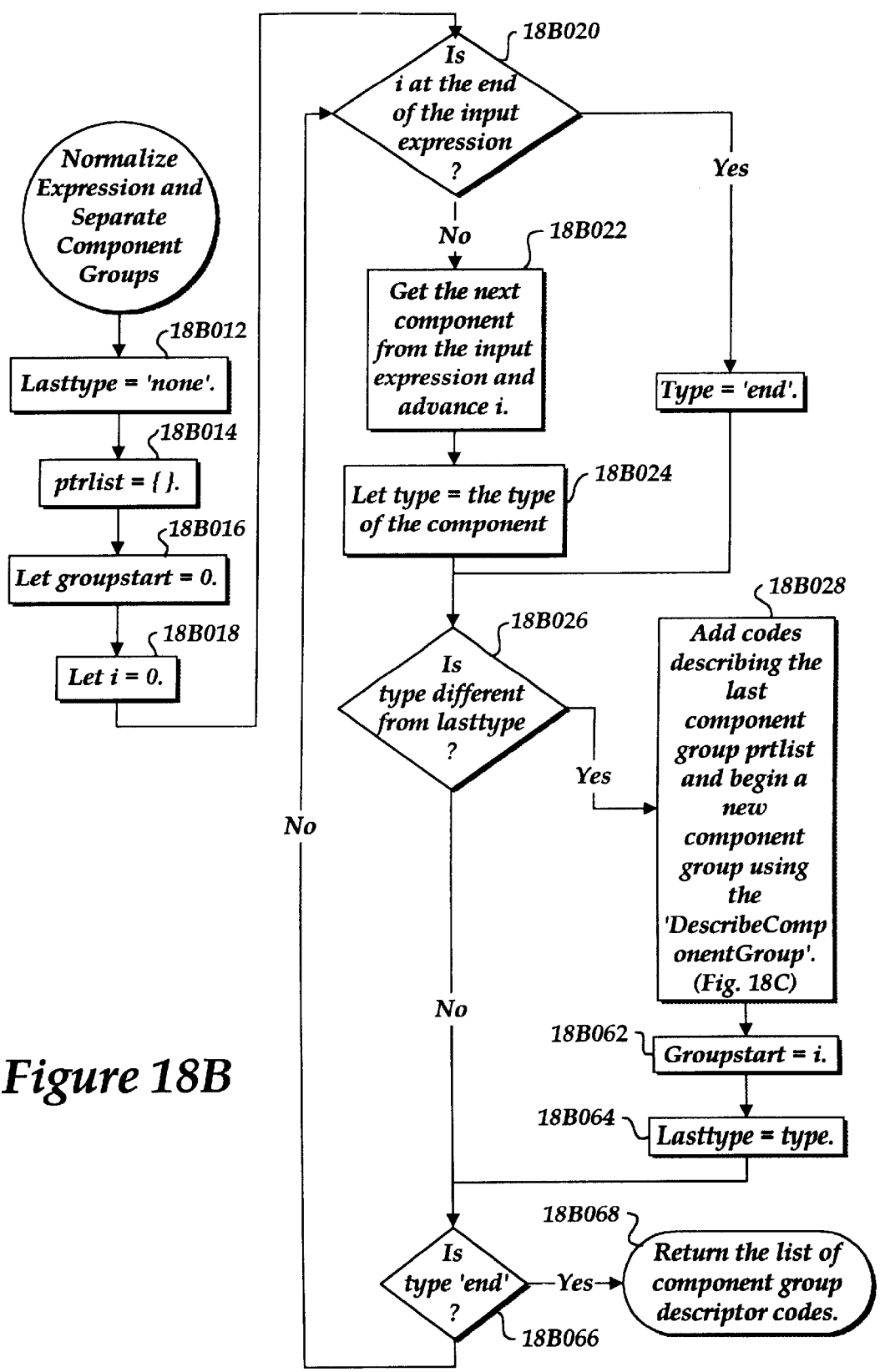
FIGS. 18Z–AA illustrate a plurality of example comparisons and the resulting directional set comparison result, in accordance with the present invention.

FIG. 18B begins the process of "normalizing" the expression and identifying component groups.

Figure 18C:
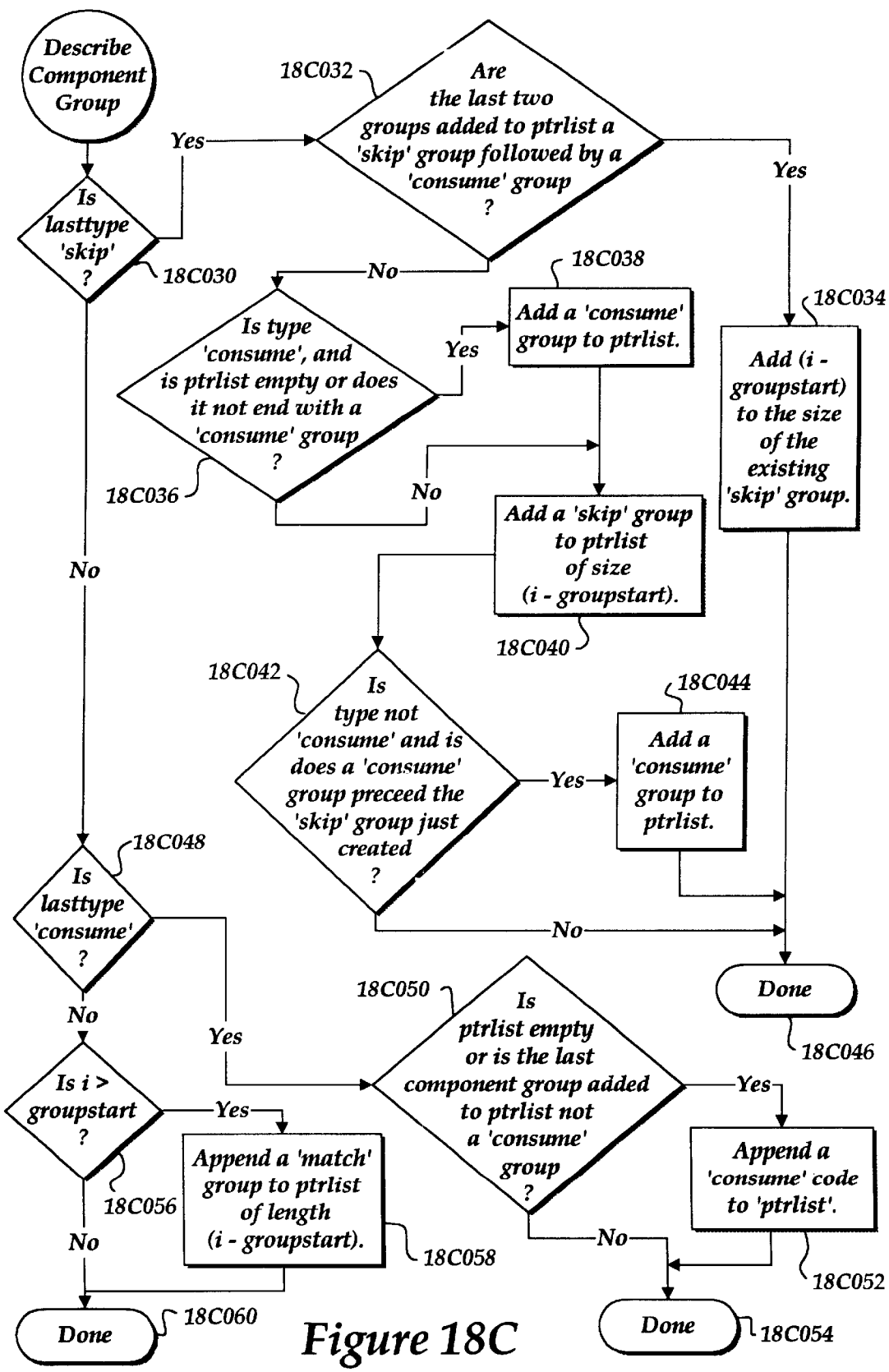

FIG. 18C, referred to by FIG. 18B, appends the appropriate codes to an array describing a component group.

Figure 18D:
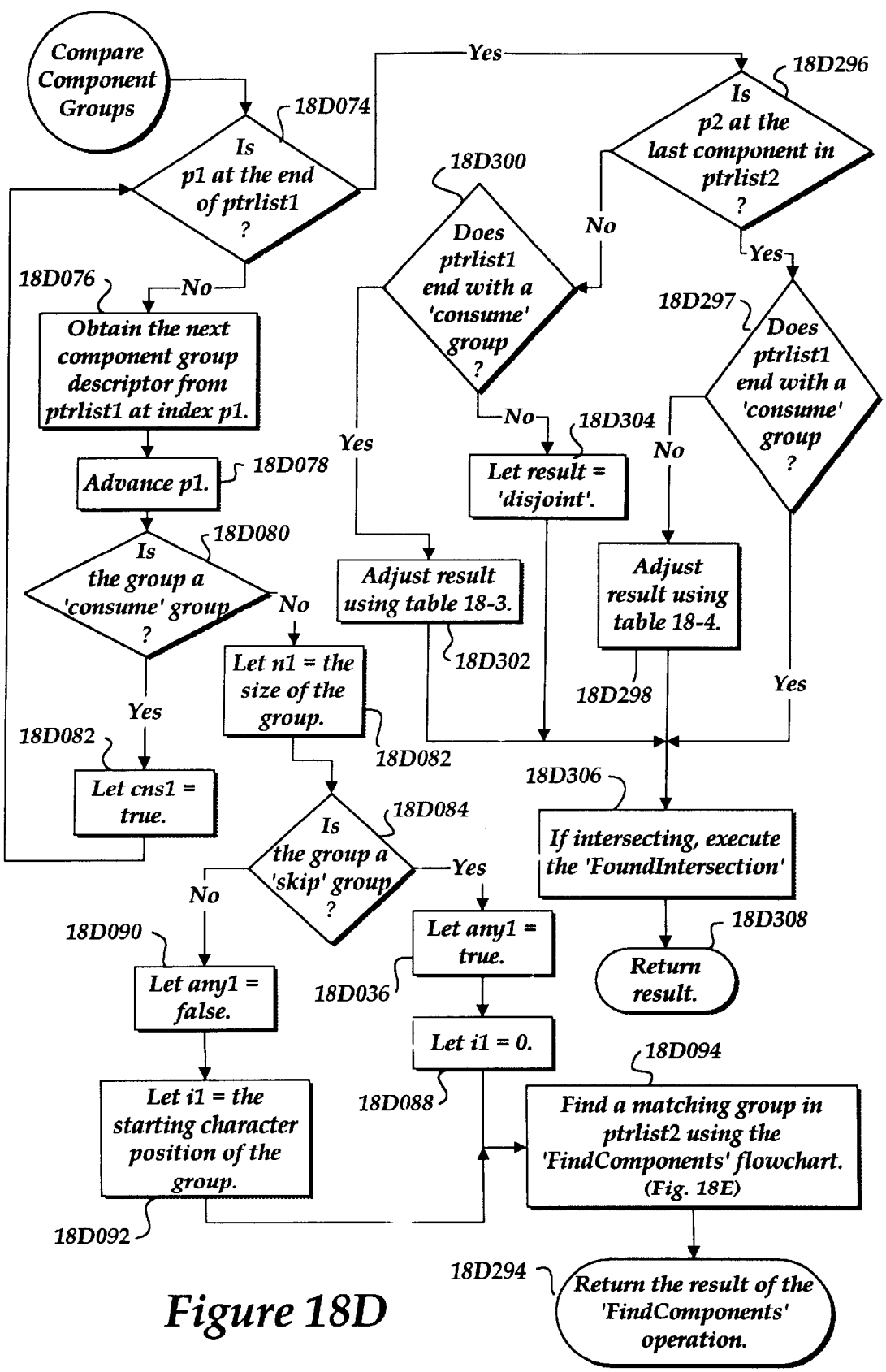

FIG. 18D is a recursive process that compares sequences of component groups in the expressions, when the current state of the comparison process is at the start of component groups in each expression.

Figure 18E:
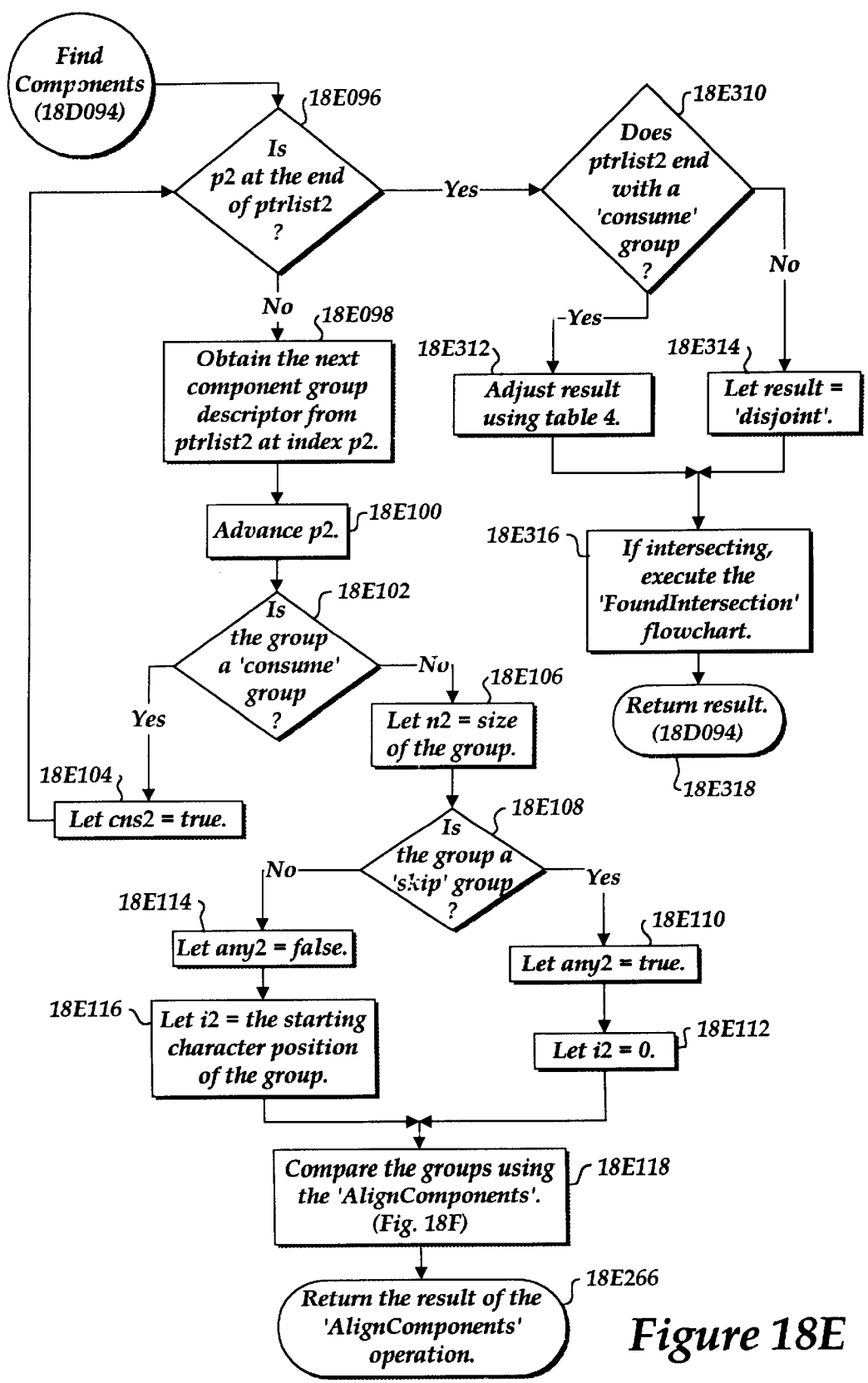

FIG. 18E is a recursive process that attempts to locate compatible components in EXPRESSION2, given a whole or partial component group from EXPRESSION1. The component group from EXPRESSION1 will be a SKIP group or a MATCH group, and a variable named CNS1 will be set to "true" if the component group was preceded by a CONSUME group.

Figure 18F:
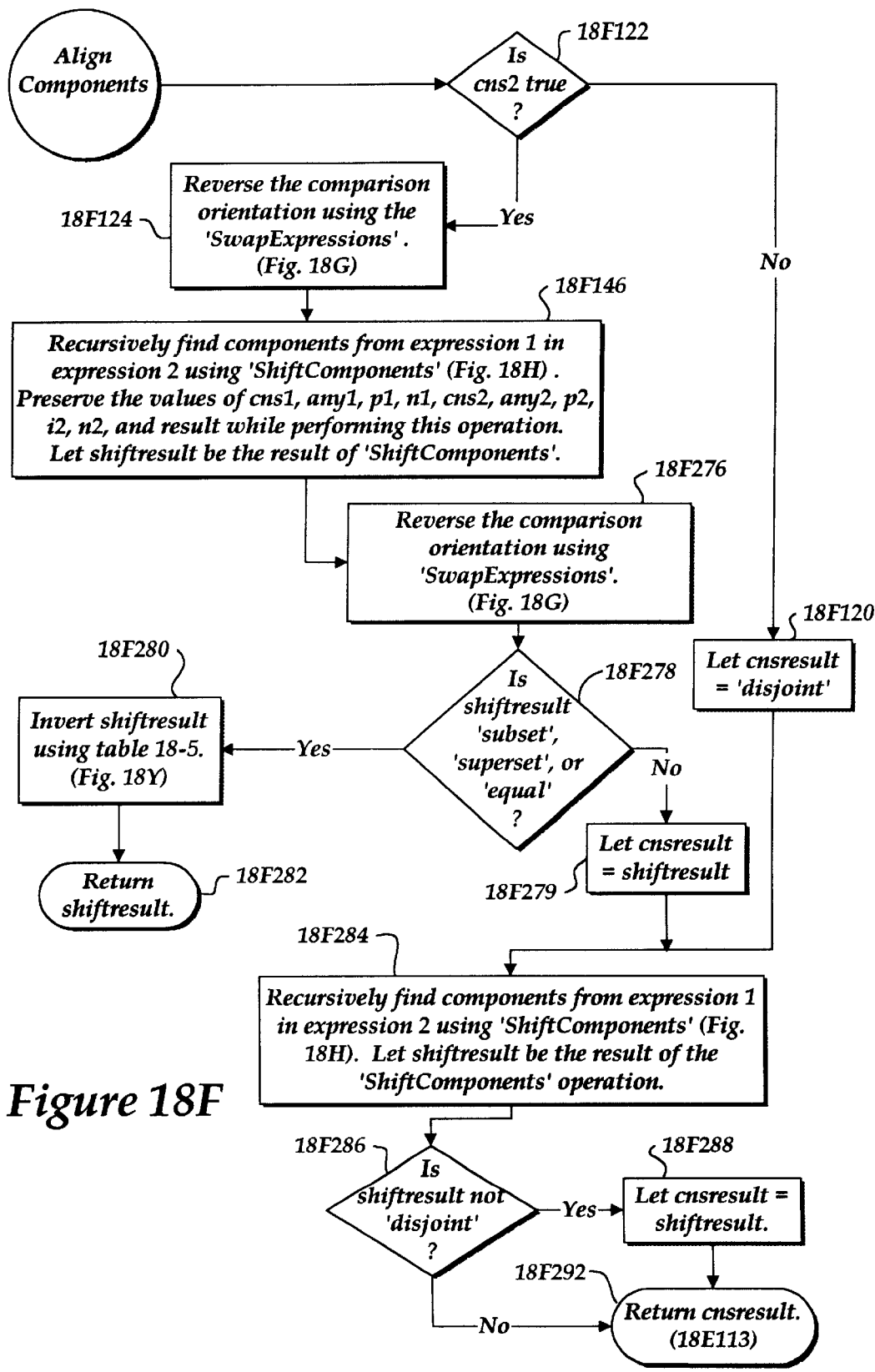

FIG. 18F is a recursive process that attempts to match whole or partial SKIP or MATCH groups from EXPRESSION1 against whole or partial SKIP or MATCH groups in EXPRESSION2; each group may or may not be preceded by a CONSUME group, as will be indicated by the CNS1 and CNS2 variables, respectively.

Figure 18G:
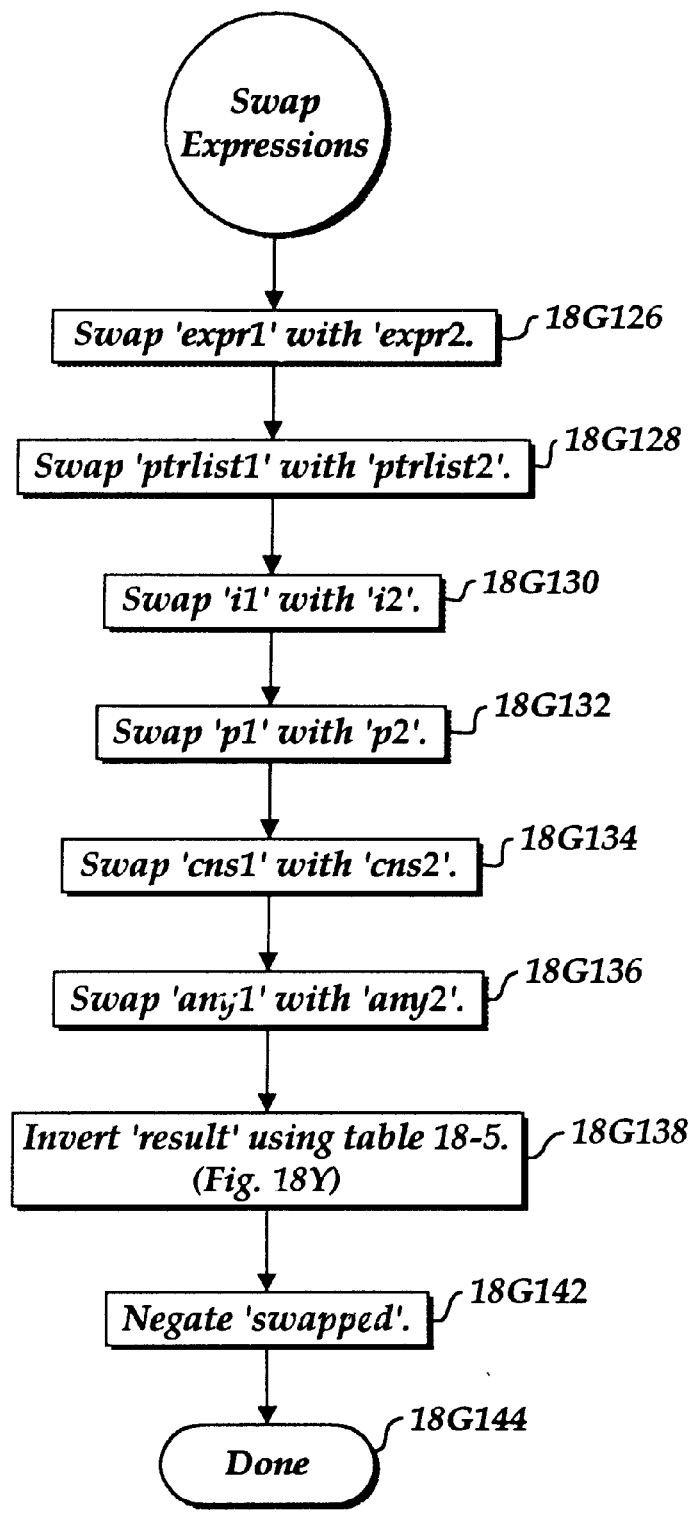

FIG. 18G is a process used to reverse the comparison orientation.

Figure 18H:
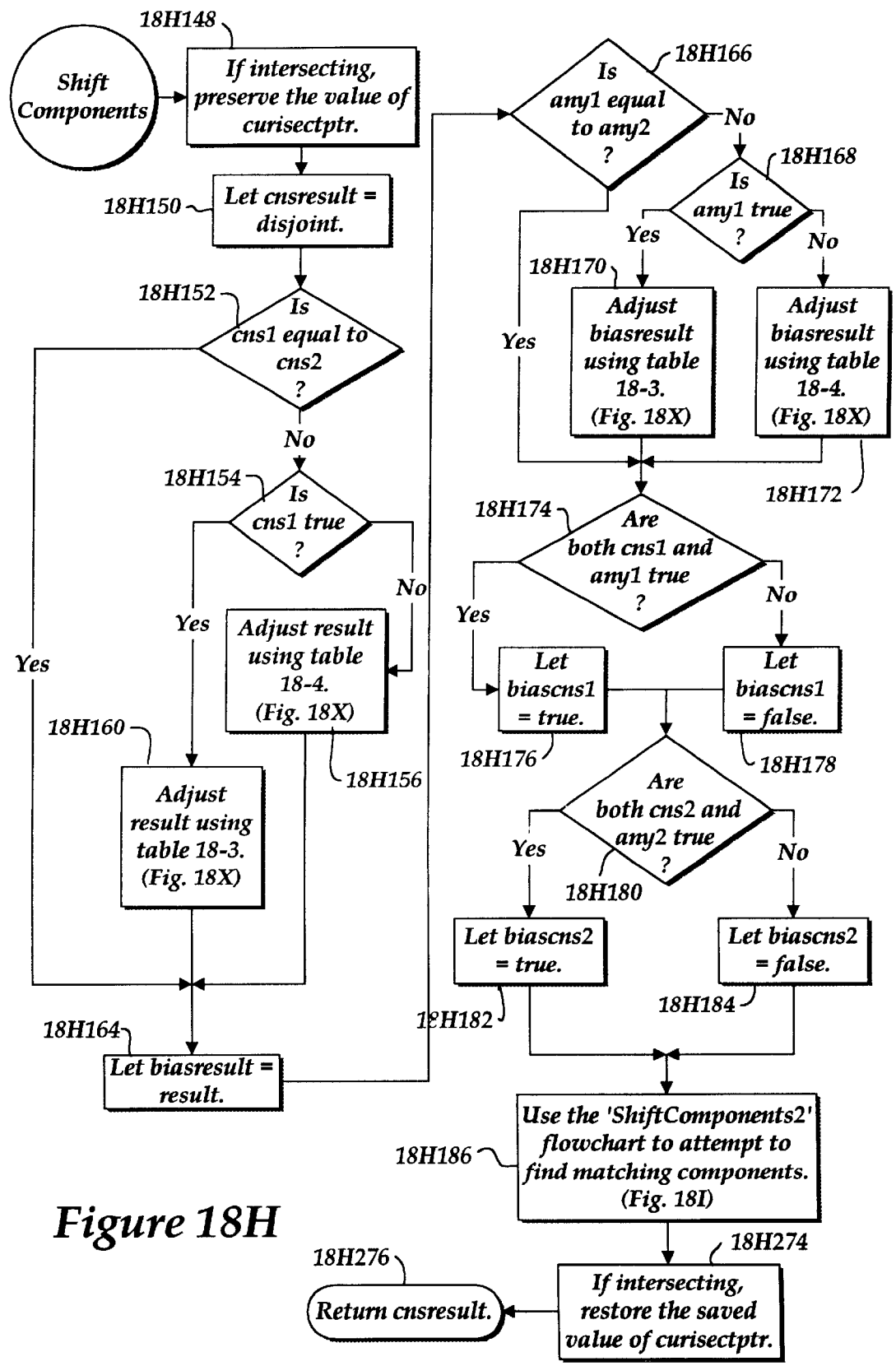
Figure 18I:
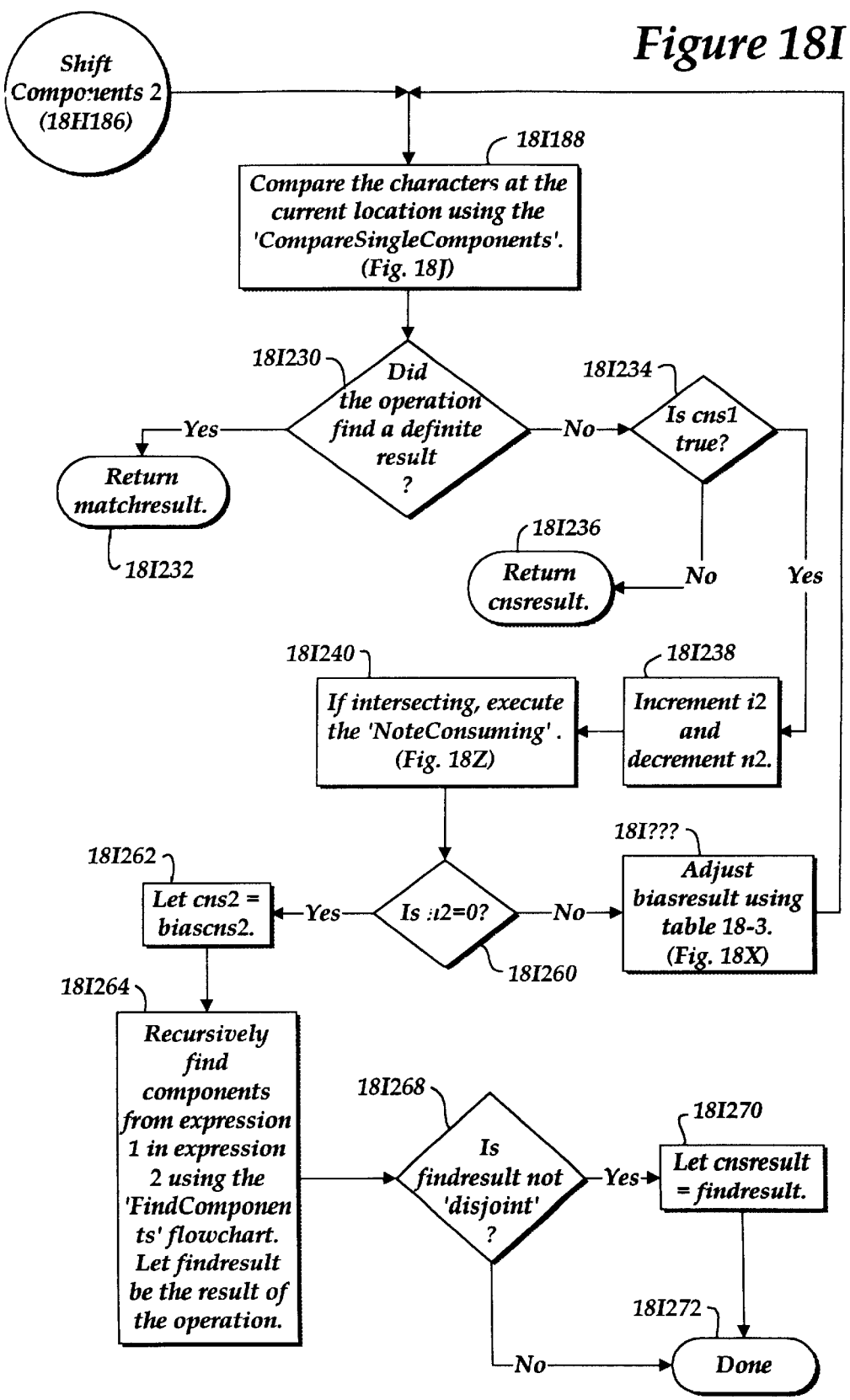
Figures 1, 18J:
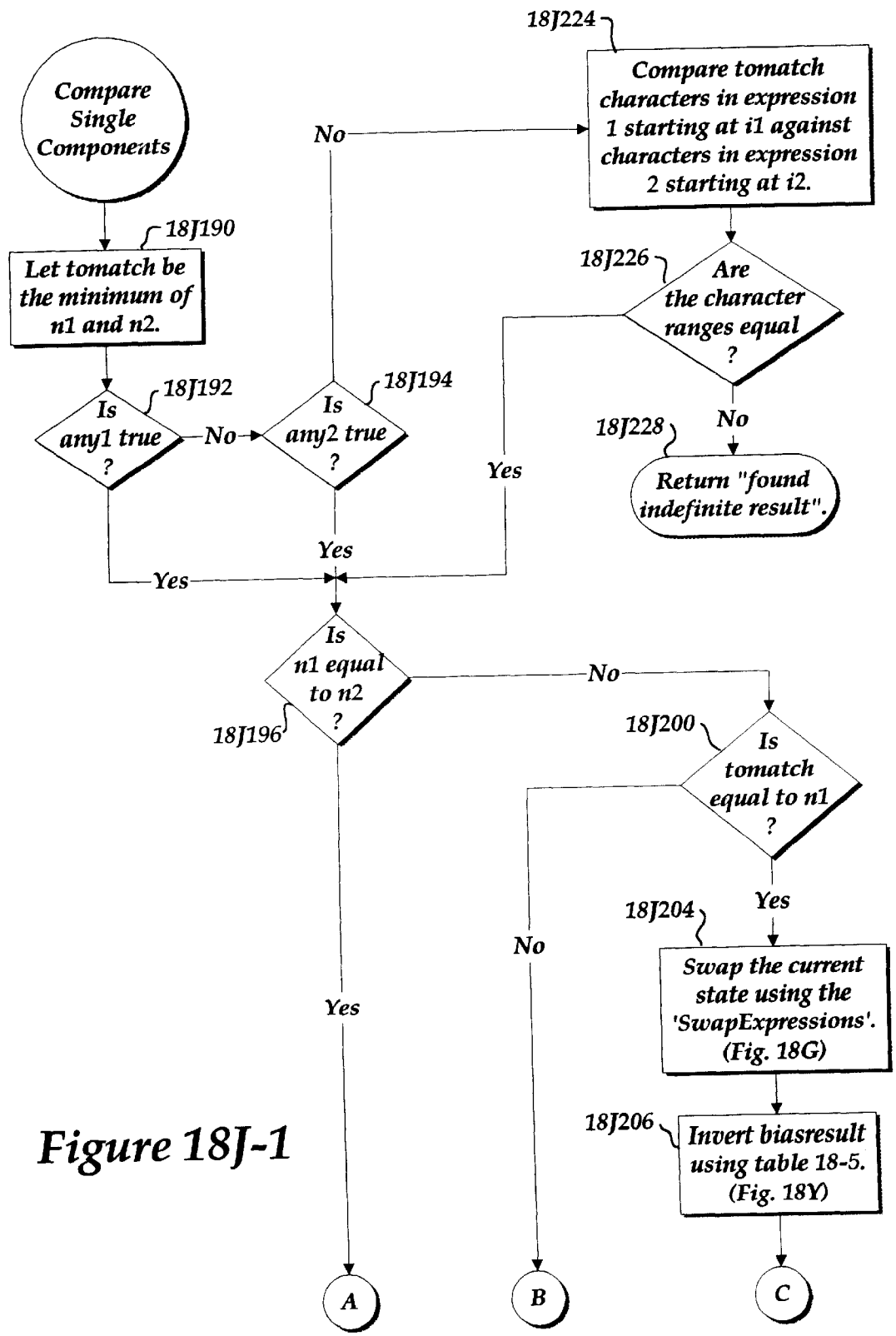
Figures 2, 18J:
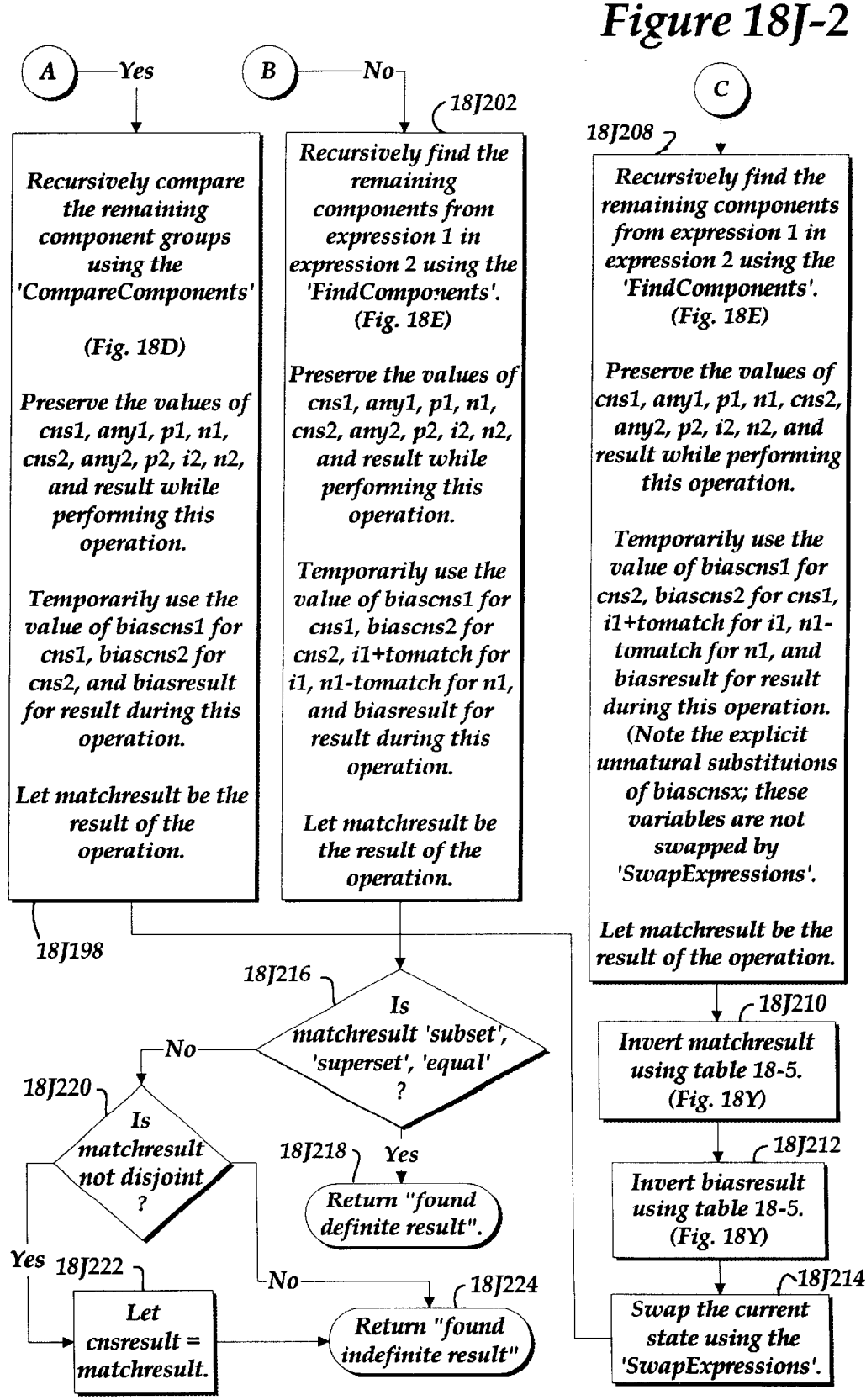

FIGS. 18H–J describe a recursive process that attempts to match whole or partial SKIP or MATCH groups from EXPRESSION1 against whole or partial SKIP or MATCH groups in EXPRESSION2. If the group from EXPRESSION1 is preceded by a CONSUME group, indicated by the CNS1 variable, components of the group from EXPRESSION2 will be skipped and the remaining components from EXPRESSION1 and EXPRESSION2 will be compared from the skipped location.

Referring to FIG. 18A, EXPRESSION1 is first normalized (block 18A010). This is accomplished by a NormalizeExpressionAndSeparateComponentGroups process illustrated in flowchart form in FIG. 18B. This process identifies the locations of "component groups" in the expression to later facilitate the comparison process. A single component is either a character, hereafter referred to as a "MATCH" component type; a wildcard "?", referred to as a "SKIP" type; or a wildcard "*", referred to as a "CONSUME" type. The process identifies the locations of contiguous regions of like component types and their lengths. It also "normalized" the input expression by removing degenerate cases such as consecutive CONSUME components, ensuring that SKIP groups that are adjacent to CONSUME groups are both preceded and followed by CONSUME groups, and reducing CONSUME-SKIP-CONSUME-SKIP-CONSUME patterns to simpler CONSUME-SKIP-CONSUME patterns.

As shown in FIG. 18B, the first step of the Normalize-ExpressionAndSeparateComponentGroups process is to set a variable designated LASTTYPE, which is the type of the last component that was discovered in the input expression, to NONE. Next a variable designated PTRLIST is set to {}, which means an empty array (block 18B014). The input expression is the value of EXPRESSION1 passed from block 18A010 in FIG. 18A. Next, a variable designated GROUPSTART, which tracks the start of the current component group being formed, is initialized to zero (block 18B016). Then, a variable designated I, which tracks the current location of the processing of the input expression, is initialized to zero (block 18B018).

The PTRLIST variable is an array that accumulates codes describing the locations of component groups in the input expression. The codes stored in the array depend on the component group type. For MATCH groups, this consists of a starting index into the original expression and a count of the number of characters to match. For SKIP groups, this consists of the number of characters to skip. For CONSUME groups, no additional information is needed. In the current embodiment, the codes are stored as variable-length sequences of integers. The first integer identifies the component group type. Because indices into the input expression will always be positive, a positive integer identifies a MATCH group, and also indicates the starting position of the group. Negative values for the first integer identity SKIP and CONSUME groups. For MATCH and SKIP groups, the number of characters to match or skip is indicated by the second integer. Thus, MATCH and SKIP groups are encoded as two integers; CONSUME groups are encoded as a single integer.

PTRLIST is an array that accumulates codes describing the locations of component groups in the input expression. The codes stored in the array depend on the component group type. For MATCH groups, this consists of a starting index into the original expression and a count of the number of characters to match. For SKIP groups, this consists of the number of characters to skip. For CONSUME groups, no additional information is needed. In the current embodiment, the codes are stored as variable-length sequences of integers. The first integer identifies the component group type. Because indices into the input expression will always be positive, a positive integer identifies a MATCH group, and also indicates the starting position of the group. Negative values for the first integer identify SKIP and CONSUME groups. For MATCH and SKIP groups, the number of characters to match or skip is indicated by the second integer. Thus, MATCH and SKIP groups are encoded as two integers; CONSUME groups are encoded as a single integer.

The NormalizeExpressionAndSeparateComponentGroups method processes each component in the input expression in a loop that begins with a test (block 18B020) that determines if I is at the end of the input expression. If I is not at the end of the input expression, the next component in the input string is retrieved for processing and I is incremented (block 18B022). The component is then analyzed and a variable designated TYPE is set to a value that is dependent on the nature of the component (block 18B024). If the component is a character, TYPE is set to MATCH. If the component is the wildcard "*", TYPE is set to CONSUME. If the component is the wildcard "?", TYPE is set to SKIP. Next, a test is made (block 18B026) to determine if the value of TYPE is different than the value of LASTTYPE. A difference indicates a new component group is beginning. If the answer to the test (block 18B026) is yes, codes describing the last component group are added to PTRLIST (such as pointer, length, type, etc.) and a new component group is then started and described (block 18B028) using the DescribeComponentGroup process illustrated in FIG. 18C.

The DescribeComponentGroup process shown in FIG. 18C begins with a test block (block 18C030) that determines whether LASTTYPE equals SKIP. If LASTTYPE equals SKIP, a test is made (block 18C032) to determine whether the last two component groups added to the PTRLIST array were a SKIP group followed by a CONSUME group. This checks for a "*?*?" variant, which if found, is collapsed into a "*??*" component group by extending the previous SKIP group. This is accomplished by adding the components defined by the length of the group (which is found by subtracting the current position of the processing minus where the group started) to the existing SKIP group already in the PTRLIST array (block 18C034). At this point, the DescribeComponentGroup method (FIG. 18C) is complete (block 18C046).

If the last two components added to the PTRLIST array were not a SKIP group followed by CONSUME group (block 18C032), an adjustment must be made to the PTRLIST array so that SKIP groups adjacent to a CONSUME group are both preceded and followed by a CONSUME group. This is accomplished by first making a test (block 18C036) to determine if the current group type is CONSUME and if the PTRLIST array is EMPTY or does not end with a CONSUME group. If the answer is yes, a CONSUME group is added to the PTRLIST array (block 18C038) before the SKIP group comprising the current group is added to the PTRLIST array (block 18C040) (with a group size equal to the difference between the current value of I and current value of GROUPSTART). If a CONSUME group is already present in the PTRLIST array (block 18C036), the SKIP group is added to the PTRLIST array (block 18C040) without adding an intervening CONSUME group to the PTRLIST array (block 18C038).

Next, a test is made (block 18C042) to determine if the type of the current group is not CONSUME and if a CONSUME group preceded the SKIP group just created. If the answer is yes, a CONSUME group is added to the PTRLIST array (block 18C044) and the process is done (block 18C046). If the current group is CONSUME and a CONSUME group preceded the SKIP group just created, the CONSUME groups and SKIP groups are balanced and the process in FIG. 18C is done (block 18C046).

If LASTTYPE was not a SKIP group (block 18C030), a test (block 18C048) is made to determine if LASTTYPE is a CONSUME group. If LASTTYPE is a CONSUME group, a test (block 18C050) is made to determine if PTRLIST is EMPTY or if the last component group added to PTRLIST was not a CONSUME group. If the answer is no, the process is done (block 18C054). If the answer is yes, a CONSUME group is added to the PTRLIST (block 18C052) and the process is done (block 18C054).

If LASTTYPE was not a CONSUME group (block 18C048), a test (block 18C056) is made to determine if I is greater than GROUPSTART. If I is not greater than GROUPSTART, the process is done (block 18C060). If I is greater than GROUPSTART LAST GROUP is an EMPTY string. If I is greater than GROUPSTART, a MATCH group is appended to the PTRLIST with a length of I minus GROUPSTART (block 18C058) and the process is done (block 18C060). When the process illustrated in FIG. 18C is done, processing returns to FIG. 18B (block 18B028). The returned PTRLIST is assigned to the variable PTRLIST1 which is array of the component group descriptor codes for EXPRESSION1.

Returning to FIG. 18B, after the DescribeComponentGroup process FIG. 18C) is complete, the value of GROUPSTART is set equal to the current value of I (block 18B062), which is the current location of the start of the next component group. Next, LASTTYPE is set to TYPE (block 18B064). This is done to remember the type of the current component as the type of the next component. After the foregoing steps are completed, or if TYPE is not different from LASTTYPE, a test (block 18B066) is made to determine if TYPE is END. If not, the process is repeated beginning with decision block 18B020. If TYPE variable is END, a list of the component group descriptor codes (PTRLIST) is returned (block 18B068) to the Compare Expression process (block 18A010).

Returning to FIG. 18A, EXPRESSION2 is normalized (block 18A070) using the NormalizeExpressionAndSeparateGroup process (FIG. 18B) in the same manner as just described for the normalization (block 18A010) of EXPRESSION1. The returned PTRLIST is assigned to the variable PTRLIST2, which is an array of the component group descriptor codes for EXPRESSION2.

Once EXPRESSION1 has been normalized into PTRLIST1 and EXPRESSION2 has been normalized into PTRLIST2, the component groups are compared (block 18A072) using a CompareComponentGroups process shown in flowchart form in FIG. 18D, with the variables CNS1 initialized to false, CNS2 initialized to false and RESULT initialized to EQUAL and pointers P1 and P2 initialized to zero.

Referring to FIG. 18D, the CompareComponentGroups flowchart begins with a test (block 18D074) to determine whether P1 is at the end of PTRLIST1. If not, the next component group is retrieved using a descriptor from PTRLIST1 (block 18D076) using the value of P1 as the index. P1 is then incremented (block 18D078). The component group descriptor just retrieved (block 18D076) is checked (block 18D080) to see if the group is a CONSUME group. If the group is a CONSUME group, CNS1 is set to true and the process cycles to the P1 at the end of PTRLIST1 test (block 18D074). If the group is not a CONSUME group (block 18D080), then N1 is set to the size of the group stored with the group descriptor of the component group being processed (block 18D082). The component group descriptor is then tested (block 18D084) to see if the group is a SKIP group. If the group is a SKIP group, a variable designated ANY1 is set to true (block 18D086) and a variable designated I1 is set equal to zero (block 18D088). If the group is not a SKIP group (block 18D084), ANY1 is set equal to false (block 18D090) and I1 is set equal to the starting character position of the group that is stored in the PTRLIST1 associated with the component group descriptor being processed (block 18D092).

Next, the CompareComponentGroups process attempts to find (block 18D094) a matching group in PTRLIST2 using a FindComponents process illustrated in flowchart form in FIG. 18E. At this point, P1 is pointing to the group in PTRLIST1 that follows the group that will be looked for in PTRLIST2. As described below, this relation is used later in the process for the intersection notations.

Turning to FIG. 18E, the FindComponents begins with a test (block 18E096) to determine if P2 is at the end of PTRLIST2. If P2 is not at the end of PTRLIST2, the next component group descriptor from the PTRLIST2 is retrieved at the index P2 (block 18E098). P2 is then incremented (block 18E100).

Next, a test (block 18E102) is made to determine whether the group is a CONSUME group. If the group is a CONSUME group, CNS2 is set to true (block 18E104) and the process cycles to test whether P2 is at the end of PTRLIST2 (block 18E096).

If the group is not a CONSUME group (block 18E102), a variable designated N2 is set (block 18E106) to the size of the group that is stored with the component group descriptor in PTRLIST2 at index P2. Then a test is made to determine if the component group is a SKIP group (block 18E108). If the group is a SKIP group, a variable designated ANY2 is set to true (block 18E110) and a variable designated I2 is set equal to zero (block 18E112). If the group is not a SKIP group, ANY2 is set to false (block 18E114) and I2 is set to the starting character position of the group that is stored with the component group descriptor in the PTRLIST2 (block 18E116).

At this point, both P1 and P2 reference the groups following the groups from PTRLIST1 and PTRLIST2. As discussed below, these values for P1 and P2 are used later in the method for the intersection notations. For CHARACTER groups, Ix points to the start of the characters to compare in EXPRx, and Nx is the number of characters to align. For SKIP groups, Ix is zero and Nx is the number of "?" characters. After the ANY2 variable has been set (block 18E110 or block 18E114) and the I2 variable has been set (block 18E112 or block 18E116) the component groups are compared (block 18E118) using an AlignComponents process illustrated in flowchart form in FIG. 18F.

In the first step of the AlignComponents process a test is made to determine if CNS2 is true (block 18F122). If CNS2 is true, the comparison orientation is reversed using a SwapExpressions process illustrated in flowchart form in FIG. 18G.

The SwapExpressions process temporarily switches EXPRESSION1 and its variables with EXPRESSION2 and its variables. For example, if comparing "a*" against "*?*" after performing the SwapExpressions procedure the comparison will be "*?*" against "a*." In other words, this procedure simply swaps the state of all comparisons/intersection variables. This can be accomplished in many computer languages by simply reversing the order of the parameters passed to a function.

Turning to FIG. 18G, first EXPR1 and EXPR2 are swapped (block 18G126), next the PTRLIST1 and PTRLIST2 arrays are swapped (block 18G128), then the values of I1 and I2 are swapped (block 18G130), next the values of P1 and P2 are swapped (block 18G132), then the values of CNS1 and CNS2 are swapped (block 18G134), next the values of ANY1 and ANY2 are swapped (block 18G136). Thereafter, the value of the RESULT variable is then inverted (block 18G138) using Table 18-5 illustrated in FIG. 18Y. Finally, the value of the variable SWAPPED is negated and the process returns (block 18G144) to the AlignComponents process (block 18F124, FIG. 18F). In some embodiments of this invention, not all of the variables swapped by the SwapExpressions process shown in FIG. 18F will be necessary. For brevity, a reference to this procedure simply indicates that the comparison/intersection orientation should be reversed, and the most efficient implementation of this procedure will depend largely on the language used and other implementation-specific details. In one actual embodiment of this invention, the SwapExpressions process is responsible only for swapping EXPR1/EXPR2, PTRLIST1/PTRLIST2, and negating SWAPPED. All other states are swapped by reversing parameters to procedures that follow from the foregoing generic description.

Returning to FIG. 18F, after the SwapExpressions process is finished (block 18G144), the AlignComponents process recursively finds (block 18F146) components from EXPRESSION1 in EXPRESSION2 using a ShiftComponents process illustrated in flowchart form in FIG. 18H. While this is done, the values of the variables CNS1, ANY1, P1, N1, CNS2, ANY2, P2, I2, N2, and RESULT are preserved. In languages that use pass-by-value function calling semantics, these variables may be preserved simply as part of the mechanics of calling a function, so that no explicit action to preserve these variables is required. The value of a variable designated SHIFTRESULT is assigned the value of the variable RESULT produced by the ShiftComponents process.

As shown in FIG. 18I, if a ShiftComponents process is being used for intersecting, the value of a variable designated CURISECTPTR is preserved during the operation (block 18H148). Next, CNSRESULT is set to DISJOINT (block 18H150). Next, the ShiftComponents process adjusts RESULT if one component group is preceded by a CONSUME group but the other group is not so preceded. This is accomplished starting with a test (block 18H152) to determine if CNS1 is equal to CNS2. If CNS1 equals CNS2 (block 18H152), no adjustment to RESULT is necessary. If CNS1 is not equal to CNS2, then a test is made to determine if CNS1 is true (block 18H154). If CNS1 is true, RESULT is adjusted (block 18H156) using Table 18-3 FIG. 18X). If CNS1 determines is not true (block 18H154), RESULT is adjusted (block 18H160) using Table 18-4 (FIG. 18X). After adjustment, or if no adjustment is required, a variable designated BIASRESULT is set equal to RESULT (block 18H164). BIASRESULT is used to represent comparing "?" groups against character groups, and is adjusted if consumption occurs.

After BIASRESULT is set equal to RESULT (block 18H164), a test is made to determine if ANY1 is equal to ANY2 (block 18H166). If ANY1 is not equal to ANY2, a test is made to determine if ANY1 is true (block 18H168). If ANY1 is true, BIASRESULT is adjusted (block 18H170) using Table 18-3 (FIG. 18X). If ANY1 is not true (block 18H168), the BIASRESULT is adjusted (block 18H172) using Table 18-4 (FIG. 18X).

If ANY1 equals ANY2 or after BIASRESULT is adjusted, a test is made (block 18H174) to determine if both CNS1 and ANY1 are true. If both CNS1 and ANY1 are true, a variable designated BIASCNS1 is set to true (block 18H176). If either the value of CNS1 or ANY1 is not true, BIASCNS1 is set to false (block 18H178). The state of BIASCNS1 indicates whether or not the group from PTRLIST1 can continue to be considered a consumer after a match is found. A consumer consumes groups.

After the value of BIASCNS1 is set (block 18H176 or block 18H178), a test is made to determine if CNS2 and ANY2 are both true (block 18H180). If both CNS2 and ANY2 are true, a variable designated BIASCNS2 is set to true (block 18H182). If either the value of CNS2 or ANY2 is not true, BIASCNS2 is set to false (block 18H184). Like BIASCNS1, the state of BIASCNS2 indicates whether or not the group from PTRLIST2 can continue to be considered a consumer after a match is found.

After BIASCNS2 is set (block 18H182 or block 18H184), a ShiftComponents2 process shown in flowchart form in FIG. 18I is used (block 18H186) to attempt to find matching components in the expressions being compared.

The ShiftComponents2 process illustrated in FIG. 18I begins by comparing characters at the current location (block 18I188) using a CompareSingleComponents process illustrated in flowchart form in FIG. 18J.

Referring to FIG. 18J, the CompareSingleComponents process begins by assigning the value of a variable designated TOMATCH to be the lesser of the value of N1 or N2 (block 18J190). As noted above, Nx is the number of characters to align. Thus, N1 is the number of PTRLIST1 characters and N2 is the number of PTRLIST2 characters. Next, ANY1 is checked to determine if it is true (block 18J192). If ANY1 is not true, ANY2 is checked to determine if it is true (block 18J194). If neither ANY1 or ANY2 is true, the number of characters in EXPRESSION1 represented by the variable TOMATCH, starting at the position equal to the value of I1, are compared to the characters in EXPRESSION2, starting at position indicated by the variable I2 (block 18J224). Then a test is made to determine if the character ranges are equal (block 18J226). If the character ranges are not equal, a "found indefinite result" message is returned (block 18J228) to the comparison call (block 18I188) of the ShiftComponents2 process illustrated in FIG. 18I.

At this point, if all of the characters or "?" characters of both groups have been exhausted, the method continues comparing the following groups in PTRLIST1 and PTRLIST2 using the current values of P1 and P2, respectively, as their starting points. In this regard, if the character ranges are equal (block 18J226) or if ANY1 or ANY2 are true (block 18J192 or block 18J194), a test is made to determine if N1 is equal to N2 (block 18J196).

If N1 is equal to N2 (block 18J196), the remaining component groups are recursively compared using the CompareComponentsGroups process illustrated in flowchart form in FIG. 18D, and discussed in detail in other portions of this application. While the CompareComponentsGroups process is being executed, the values of CNS1, ANY1, P1, N1, CNS2, ANY2, P2, I2, N2, and RESULT are preserved. Further the value of CNS1 is temporarily assigned the value of BIASCNS1, the value of CNS2 is temporarily assigned the value of BIASCNS2, and the value of RESULT is temporarily assigned the value of BIASRESULT. Also, the recursive comparison (block 18J198) sets the value of a variable designated MATCHRESULT to the result returned by the CompareComponentsGroups process.

If N1 is not equal to N2 (block 18J196), then the CompareSingleComponents process checks for characters or "?" characters remaining in one of the groups and then attempts to find them in the opposite expression. This part of the process is commenced by testing TOMATCH to determine if it is equal to N1 (block 18J200). If TOMATCH is not equal to N1, the CompareSingleComponents process recursively finds the remaining components from EXPRESSION1 in EXPRESSION2 using the FindComponents process illustrated in FIG. 18E and discussed in detail in other portions of this specification (block 18J202).

While the FindComponents process recursively finds the remaining components from EXPRESSION1 and EXPRESSION2 (block 18J202), the values of CNS1, ANY1, P1, N1, CNS2, ANY2, P2, I2, N2, and RESULT are preserved. Further, during the recursive find (block 18J202), the process temporarily uses the value of BIASCNS1 for CNS1, BIASCNS2 for CNS2, I1 plus the value of TOMATCH for I1, N1 minus the value of TOMATCH for N1, and the value of BIASRESULT for RESULT. MATCHRESULT is set to the value of the result returned by the FindComponents process.

If TOMATCH is equal to the value of N1 (block 18J200), the current state is swapped (block 18J204) using the SwapExpressions process illustrated in FIG. 18G and described above. After the swap, BIASRESULT is inverted (block 18J206) using Table 18-5 shown in FIG. 18Y. Next, the CompareSingleComponents process recursively finds (block 18J208) the remaining components from EXPRESSION1 in the EXPRESSION2 using the FindComponents process illustrated in FIG. 18E and discussed in detail in other portions of this specification. While the FindComponents process is being executed, the values of CNS1, ANY1, P1, N1, CNS2, ANY2, P2, I2, N2, and RESULT are preserved. Also during the execution of the FindComponents process, the method temporarily uses the value of BIASCNS1 for CNS2, BIASCNS2 for CNS1, I1 plus the value of TOMATCH for I1, the value of N1 minus the value of TOMATCH for N1, and BIASRESULT for RESULT. The temporary assignment of BIASCNS1 and BIASCNS2 is done because these variables are not swapped by the SwapExpressions procedure illustrated in FIG. 18G. MATCHRESULT is set to the value of the result returned by the FindComponents process.

After the value of MATCHRESULT is determined, the value is inverted (block 18J210) using Table 18-5 shown in FIG. 18Y. The CompareSingle-Components process then inverts (block 18J212) BIASRESULT using Table 18-5. Then the current states are swapped back (block 18J214) using the SwapExpressions process illustrated in FIG. 18G and described above.

After the value of MATCHRESULT has been found in the manner described above, the CompareSingleComponents process checks (block 18J216) to determine if MATCHRESULT is SUBSET, SUPERSET, or EQUAL. If MATCHRESULT is SUBSET, SUPERSET, or EQUAL, a "found definite result" message is returned (block 18J218) to the comparison call (block 18I188) in the ShiftComponents2 process illustrated in FIG. 18I. If MATCHRESULT is not SUBSET, SUPERSET, or EQUAL, MATCHRESULT is tested (block 18J220) to determine if it is not DISJOINT. If MATCHRESULT is not DISJOINT, CNSRESULT is set to the value of MATCHRESULT (block 18J222). If the value MATCHRESULT is not DISJOINT, or after CNSRESULT has been set to MATCHRESULT, the message "found indefinite result" is returned (block 18J224) to the comparison call (block 18I188) in the ShiftComponents2 process illustrated in FIG. 18I.

Returning to FIG. 18I, after a result is returned from the CompareSingleComponents process (FIG. 18J), the result is tested (block 18I230) to determine if a definite result was found. If a definite result was found, MATCHRESULT is returned from the ShiftComponent2 process to the ShiftComponents process illustrated in FIG. 18H (block 18H186).

If a definite result was not returned by the CompareSingleComponents process, CNS1 is tested (block 18I234) to determine if it is true. At this point, if the group from PTRLIST1 is not preceded by a consumer, nothing in the group from PTRLIST2 can be skipped. If the group from PTRLIST2 is a consumer, this will be dealt with by the AlignComponents process illustrated in FIG. 18F. If the test (block 18I234) determines that CNS is not true, CNSRESULT is returned (block 18I236) to the ShiftComponents process illustrated in FIG. 18H (block 18H186).

If CNS1 is true (block 18I234), the procedure next skips a single character or a "?" in the group from PTRLIST2 and tries to find a match in PTRLIST1. Skipping starts by incrementing I2 and decrementing N2 (block 18I238). If the ShiftComponents2 process is performing an intersection (discussed below), the NoteConsuming process illustrated in FIG. 18L is executed (block 18I240).

Figure 18K:
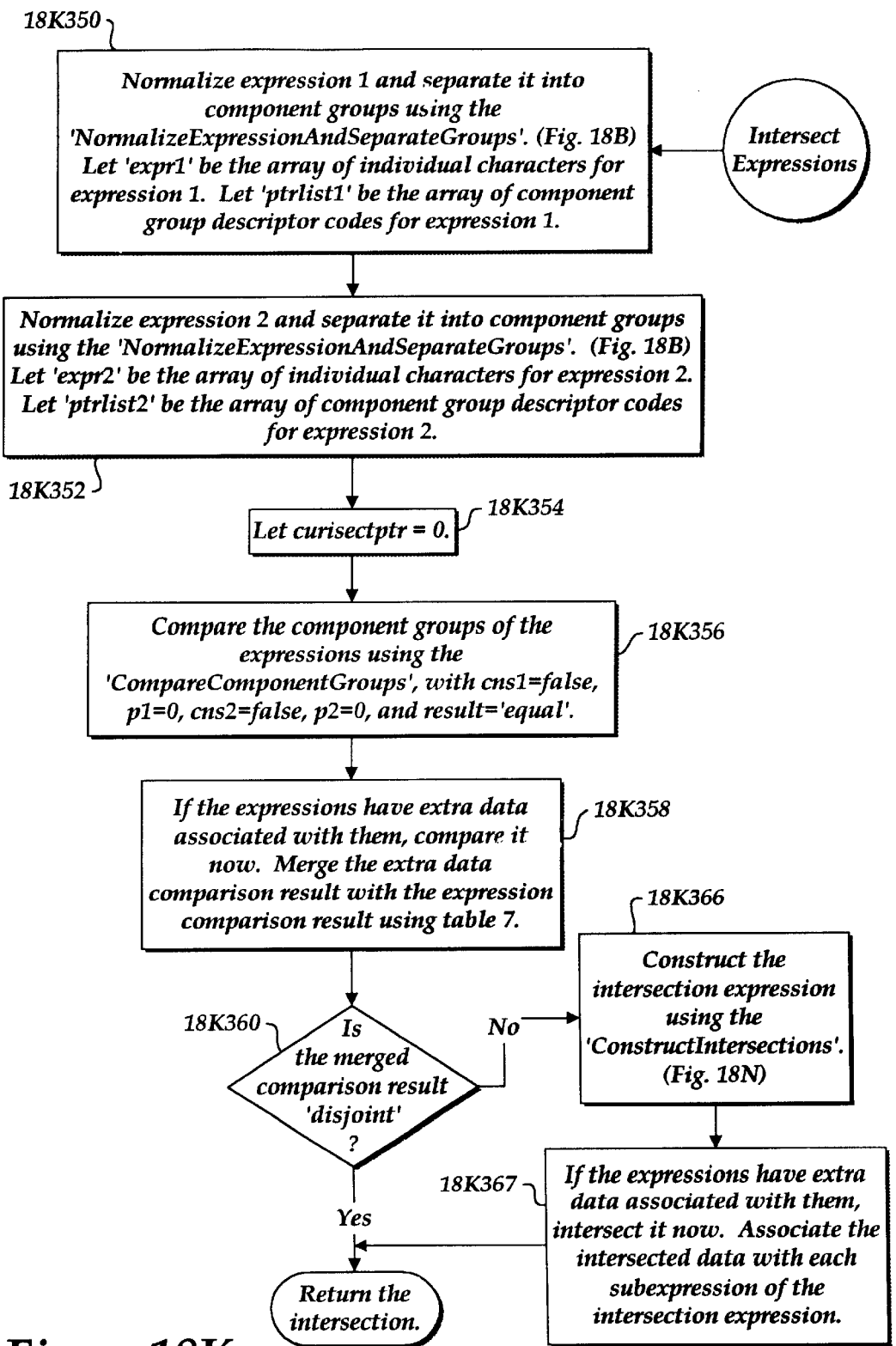
Figure 18L:
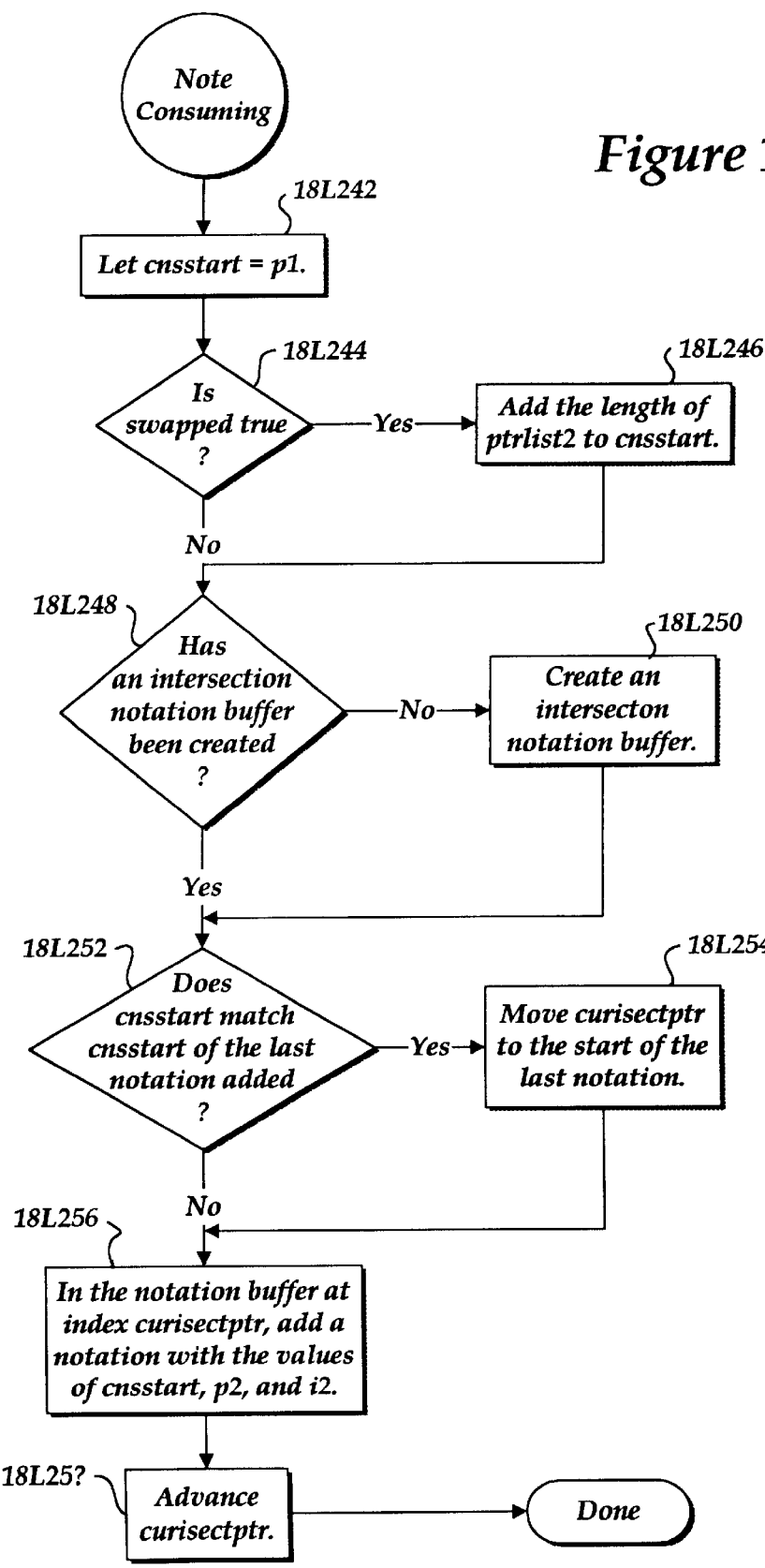

The NoteConsuming process illustrated in FIG. 18L begins by setting CNSSTART equal to P1 (block 18L242). P1 points to the group that follows the group that is actually doing the consumption. The NoteConsuming process (FIG. 18L) is never executed for trailing CONSUME groups. Thus, the execution of the NoteConsuming process means that there is a CONSUME group before the group that is just before the group indicated by P1. In other words, the last two group descriptors before P1 are either CONSUME and MATCH (characters x-y) or CONSUME and SKIP (n characters).

The next step in the NoteConsuming process is a test to determine if the variable SWAPPED (which indicates the existence of a swap) is true (block 18L244). In this regard, the value for P1 stored in the notation is encoded to indicate which expression was doing the consumption. If the original EXPRESSION2 was doing the consumption, then SWAPPED will be true, since after the swap, the original EXPRESSION2 is now EXPRESSION1. If SWAPPED is true, the length of PRTLIST2 is added to CNSSTART (block 18L246). In this regard, because P1 points after the group doing the consumption, it is possible to note a value of P1 that is the length of PTRLIST1. It is impossible to have a value of P1 equal to zero, so there is no need to add one or otherwise adjust this value to distinguish between the end of PTRLIST1 and the beginning of PTRLIST2.

If SWAPPED is not true (block 18L244), or after CNSSTART has been adjusted (block 18L246), a test is made (block 18L248) to determine if an intersection notation buffer has been created. If an intersection notation buffer has not been created, an intersection notation buffer is created (block 18L250). When creating the intersection notation buffer, the upper bound of the number of notations needed will be the sum of the maximum number of possible consumers in each expression, minus any trailing consumers. In the worst case, consumers are defined by a pattern of three characters, of the form "*?a", which results in two consumers. This means that the worst case number of characters per consumer is 1.5. Therefore, the worst case estimate of the number of notations is the sum of the expression character lengthy divided by 1.5. In an actual embodiment of the present invention, three integers are required for each notation, so twice the sum of the expression character lengths is used in the creation of the intersection notation buffer.

If an intersection buffer has been created (block 18L248) or after an intersection notation buffer has been created (block 18L250), a test is made (block 18L252) to determine whether the value of CNSSTART matches the value of CNSSTART of the last notation added. If the value of CNSSTART matches the value of CNSSTART of the last notation added, a variable designated CURISECTPTR is set or moved to the start of the last notation (block 18L254). This is done to extend the existing notation if the same group is consuming two consecutive target groups.

If the value of CNSSTART does not match the CNSSTART of the last notation added (block 18L252), or after CURISECTPTR has been adjusted (block 18L254), a notation with the values of CNSSTART, P2 and I2 is added to the notation buffer at the index CURISECTPTR (block 18I256). In an actual implementation of the invention, these are stored as three consecutive integers. CURISECTPTR is then incremented (block 18I258) and the process returns to the ShiftComponents2 procedure illustrated in FIG. 18I (block 18I240).

Returning to FIG. 18I, after the NoteConsuming process is ended, a test is made (block 18I260) to determine if N2 equals 0. If N2 is 0, CNS2 is set to BLASCNS2 (block 18I262). The step is not strictly necessary because conceptually, if the group being consumed is a SKIP group and was preceded by a CONSUME group, then the next group is implicitly preceded by a CONSUME group. An explicit CONSUME group has already been inserted by the NormalizeExpressionAndSeparateComponentGroups process illustrated in FIG. 18B for this case.

The ShiftComponents2 process (FIG. 18I) next determines if the entire group from the PTRLIST2 can be skipped by recursively finding components from EXPRESSION1 in EXPRESSION2 using the FindComponents process illustrated in FIG. 18E and discussed in detail in other portions of this specification. The result of the FindComponents process is returned as FINDRESULT (block 18I264). Next, a test is made to determine if FINDRESULT is anything other than DISJOINT (block 18I268). If FINDRESULT is not DISJOINT, CNSRESULT is set equal to FINDRESULT (block 18I270). CNSRESULT is returned to the ShiftComponents process (block 18H186) shown in FIG. 18H.

If N2 is not equal to zero (block 18I260), BIASRESULT is adjusted using Table 18-3 (FIG. 18X). Thereafter, the ShiftComponents2 process cycles to the compare characters at the current location step (block 18I188).

Returning to the ShiftComponents process illustrated in FIG. 18H, if the ShiftComponents process was being used while intersecting, the saved value of CURISECTPTR is restored (block 18H274) and, then, the value of CNSRESULT is returned (block 18H276) to the AlignComponents process illustrated in FIG. 18F (block 18F146).

Returning to FIG. 18F, the orientation of the expressions being compared that was reversed (block 18F124) is returned (block 18F276) to its original orientation using the SwapExpressions process illustrated in FIG. 18G, which is discussed in detail above. Next, the value of SHIFTRESULT is then checked (block 18F278) to determine if it equals SUBSET, SUPERSET or EQUAL. If the SHIFTRESULT is equal to SUBSET, SUPERSET or EQUAL, then the value of SHIFTRESULT is inverted (block 18F280) using Table 18-5 illustrated in FIG. 18Y. SHIFTRESULT is then returned (block 18F282) to the FindComponents process illustrated in FIG. 18E (block 18E118).

If SHIFTRESULT is not equal to SUBSET, SUPERSET, or EQUAL (block 18F278), CNSRESULT is set equal to SHIFTRESULT (block 18F279). If CNS2 is not true (block 18F122), CNSRESULT is set equal to DISJOINT. Thereafter, the AlignComponents process recursively finds (block 18F284) the components from EXPRESSION1 in EXPRESSION2 using the ShiftComponents process illustrated in FIG. 18H and discussed in detail above. The ShiftComponents process return is SHIFTRESULT. Next, a test is made to determine if SHIFTRESULT is not DISJOINT (block 18F286). If SHIFTRESULT is not DISJOINT, CNSRESULT is set equal to SHIFTRESULT (block 18F288).

CNSRESULT is then returned (block 18F292) to the FindComponents process illustrated in FIG. 18E (block 18E118). The result of the AlignComponents process (block 18E118) is then returned (block 18E266) to the FindComponents process shown in FIG. 18D (block 18D094).

Returning to FIG. 18E, if P2 is at the end of PTRLIST2 (block 18E096), which means that EXPRESSION1 is not at its end and/or EXPRESSION2 is at its end and has a trailing CONSUME group or is at its end and has no trailing CONSUME group, a test is made (block 18E310) to determine if PTRLIST2 ends with a CONSUME group. If the PTRLIST2 array ends with a CONSUME group, RESULT is adjusted (block 18E312) using Table 18-4 illustrated in FIG. 18X. If the PTRLIST2 array does not end with a CONSUME group, RESULT is set equal to DISJOINT (block 18E314). If EXPRESSION1 and EXPRESSION2 are intersecting a FoundIntersection process (FIG. 18M) illustrated and described below is executed (block 18E316). The result is then returned (block 18E318) to the FindComponentGroups process illustrated in FIG. 18D (block 18D094). The result returned from the FindComponents process (block 18D094) is then returned (block 18D294) as the result of the FindComponents process (FIG. 18D) to the CompareComponentsGroups process shown in FIG. 18A (block 18A072).

Returning to FIG. 18D, if P1 is at the end of PTRLIST1 (block 18D074), EXPRESSION1 is either at its end with a trailing CONSUME group or is at its end without a trailing CONSUME group; and EXPRESSION2 is either at its end without a trailing CONSUME group, at the trailing CONSUME group, or not at its end and not at a trailing CONSUME group. The remainder of the CompareComponentsGroups process looks for these conditions, beginning with a test (block 18D296) that determines if P2 is at the last component in the PTRLIST2 array. If P2 is at the last component in the PTRLIST2 array, P2 is pointing at the trailing CONSUME group of EXPRESSION2. If PTRLIST1 does not end with a trailing CONSUME group, the existing result must be merged with SUBSET. As a result, if P2 is at the last component in the PTRLIST2 array, a test (block 18D297) is made to determine whether the PTRLIST1 array ends with a CONSUME group. If the PTRLIST1 array does not end with a CONSUME group, then the existing result must be adjusted. This is accomplished using Table 18-4 illustrated in FIG. 18X (block 18D298).

If P2 is not at the last component in the PTRLIST2 array (block 18D296), EXPRESSION2 is either at its end without a trailing CONSUME group or not at its end and not at a trailing CONSUME group. It is known at this point that either EXPRESSION1 has a trailing "*" and EXPRESSION2 doesn't, or EXPRESSION1 has a trailing "*" and must CONSUME at least one more non-consume group from EXPRESSION2. If P2 is not at the last component in the PTRLIST2 array, a test (block 18D300) is made to determine if the PTRLIST1 array ends with a CONSUME group. If the PTRLIST1 array does end with a CONSUME group, the existing result is adjusted (block 18D302) using the Table 18-3 shown in FIG. 18X. If the PTRLIST1 array does not end with a CONSUME group, the existing result is set to DISJOINT (block 18D304).

The value of the result obtained from the foregoing steps (blocks 18D302, 18D304, 18D298, or 18D297) is processed further if intersecting (block 18D306) by executing the FoundIntersection process illustrated in FIG. 18M and discussed below. The RESULT is then returned (block 18D308) to the CompareComponentsGroups procedure call (block 18A072) shown in FIG. 18A.

Figure 18M:
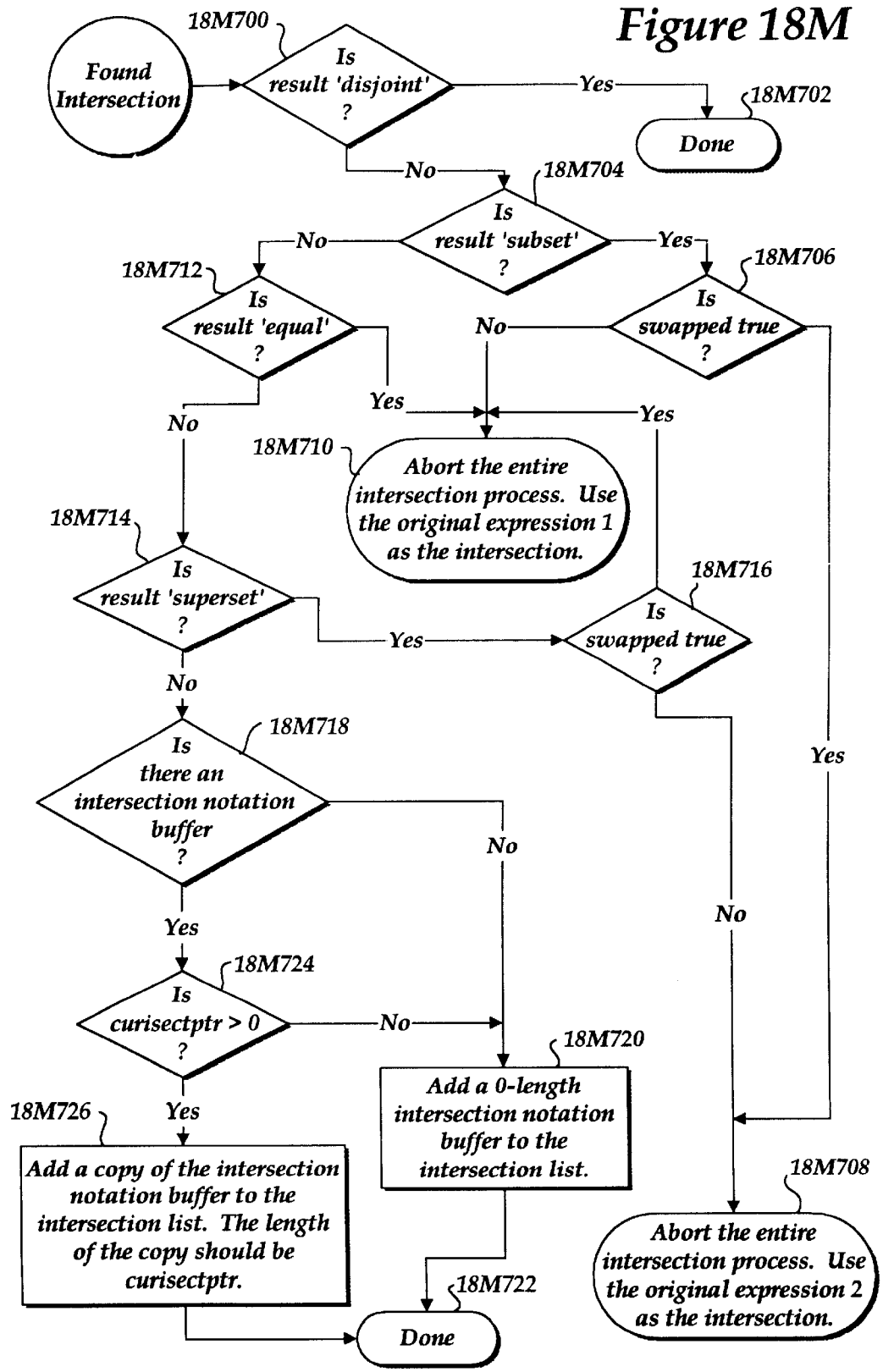

The FoundIntersection process illustrated in flowchart form in FIG. 18M begins with a test to determine if the present result is DISJOINT (block 18M700). If the present result is not DISJOINT, a possible intersection was not found and the FoundIntersection process ends. As a result, processing returns to the process that instituted the Found-Intersection process, i.e., the CompareComponentsGroups process (block 18D306).

If the present result is not DISJOINT, a test (block 18M704) is made to determine if the present result is SUBSET. If the present result is SUBSET, the state SWAPPED is tested (block 18M706). If SWAPPED is true, the entire intersection process is aborted and the original EXPRESSION2 is returned (block 18M708) as the intersection expression to the process that instituted the FoundIntersection process (i.e., block 18D306, FIG. 18D). If SWAPPED is not true, the entire intersection process is aborted and the original EXPRESSION1 is returned (block 18M710) as the intersection expression to the process that instituted the FoundIntersection process.

If the present result is not SUBSET, a test (block 18M712) is made to determine if the present result is EQUAL. If the expressions are equal, the intersection is either of the expressions, it doesn't matter which, because they are equal. If the present result is EQUAL (block 18M712), the entire intersection process is aborted and the original EXPRESSION1 is returned (block 18M710) as the intersection expression to the process that initiated the FoundIntersection process. If the present result is not EQUAL (block 18M712), a test (block 18M714) is made to determine if the present result is SUPERSET. If the present result is SUPERSET, a test (block 18M716) is made to determine if SWAPPED is true. If SWAPPED is true, the entire intersection process is aborted and the original EXPRESSION1 is returned as the intersection expression (block 18M710). If SWAPPED is not true, the entire intersection process is aborted and the original EXPRESSION2 is returned as the intersection expression (block 18M708).

If the present result is not SUPERSET, the present result must be OVERLAP, which requires that a copy of the current intersection notation buffer be stored for later construction of an expression comprising part of the intersection. This process begins with a test (block 18M718) to determine if there is an intersection notation buffer. If no intersection notation buffer exists, no consumption occurred. Since this buffer will not be modified, a global zero-length array can be used to be shared across all intersection operations to avoid memory waste. The zero-length intersection notation buffer is added (block 18M720) to the intersection list and the FoundIntersection process ends (block 18M722).

If an intersection notation buffer exists (block 18M718), a test (block 18M724) is made to determine if CURISECTPTR is greater than zero. If CURISECTPTR is greater than zero, a copy of the intersection notation buffer is added (block 18M726) to the intersection list. The length of the copy is equal to the value of CURISECTPTR. If CURISECTPTR is not greater than zero (block 18M724), a zero-length intersection notation buffer is added (block 18M720) to the intersection list. Following either step (block 18M726 or block 18M720) the FoundIntersection process ends and control is returned (block 18M722) to the process that instituted the FoundIntersection process (i.e., block 18D306, FIG. 18D).

Returning to FIG. 18D, after the FoundIntersection process is completed (block 18D308), the final result is returned to the process that instituted the CompareComponentGroups process. i.e., the CompareExpressions process (block 18A072, FIG. 18A).

Returning to FIG. 18A, if either of the expressions have extra data associated with them, they are compared (block 18A310). The extra data comparison result of the comparison is then merged with the result returned by the CompareComponentsGroups process using Table 18-7 illustrated in FIG. 18Y. The result returned by the CompareComponentsGroups process shown in the first column of Table 18-7 and the extra data comparison result is shown in the first row of Table 18-7. For example, if the result returned by the CompareComponentsGroups process is SUPERSET (cell 18Y314) and the extra data comparison result is SUBSET (cell 18Y316), the merged result is DISJOINT (cell 18Y318).

Intersecting Regular Expressions

The process for intersecting regular expressions is outlined by FIG. 18K. This process is used to compare include/exclude set primitives, when the include/exclude set is comprised of regular expression primitives. A brief description of the figures for this process:

FIG. 18K describes at the highest level the process of intersecting two expressions and initializes various variables used through the process.

FIG. 18L, referenced by the comparison process described above, makes note of where a CONSUME group from one expression matched one or more components from the other expression.

FIG. 18M, referenced by the comparison process described above, makes a copy of the notations created by the process described by FIG. 18L for later use in constructing part of the final intersection expression.

Figure 18N:
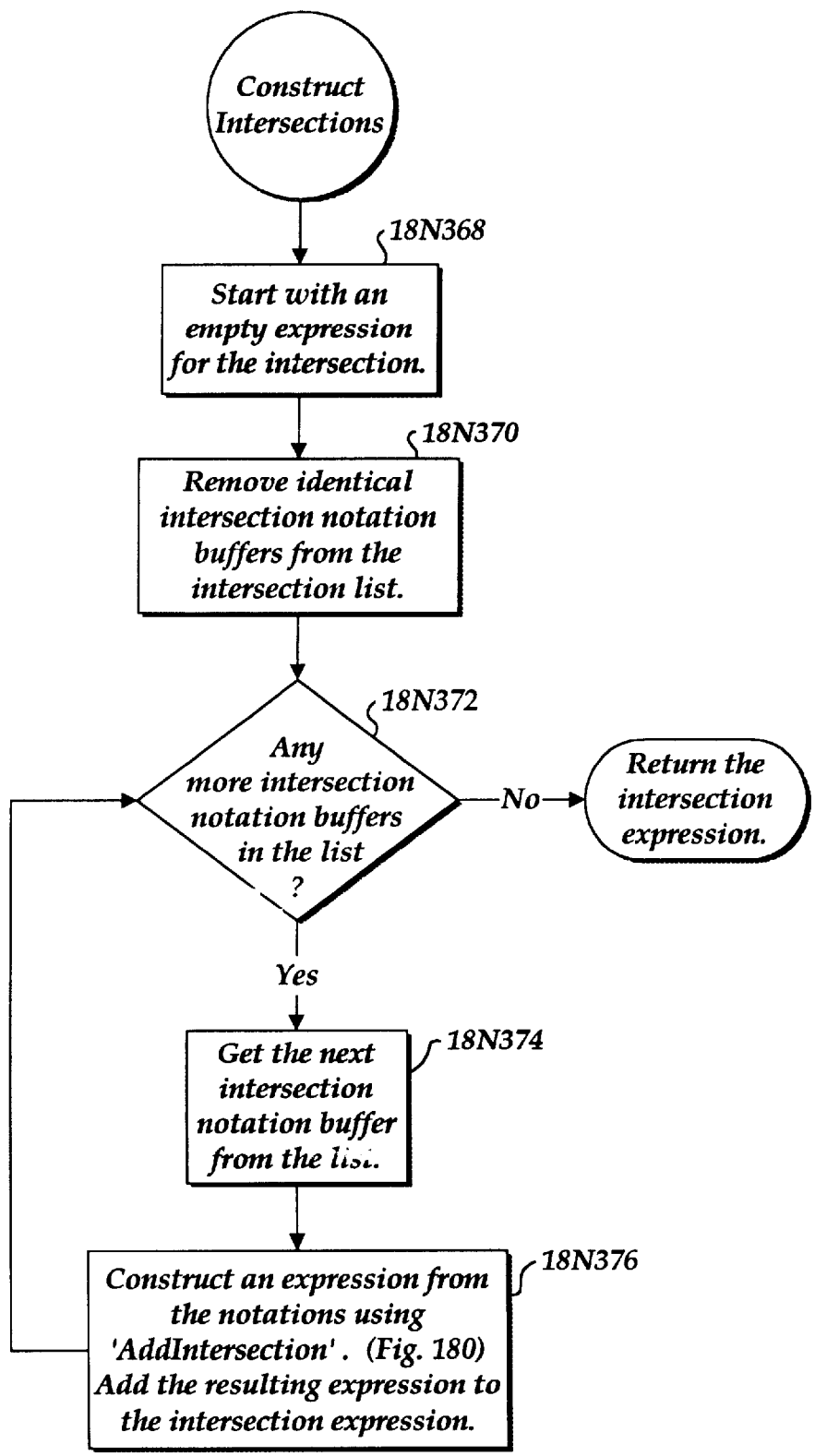

FIG. 18N, referenced at the end of the overall intersection process described by FIG. 18K, describes at the highest level the process of constructing an intersection expression using the notations created by the process described by FIG. 18M.

Figure 18O:
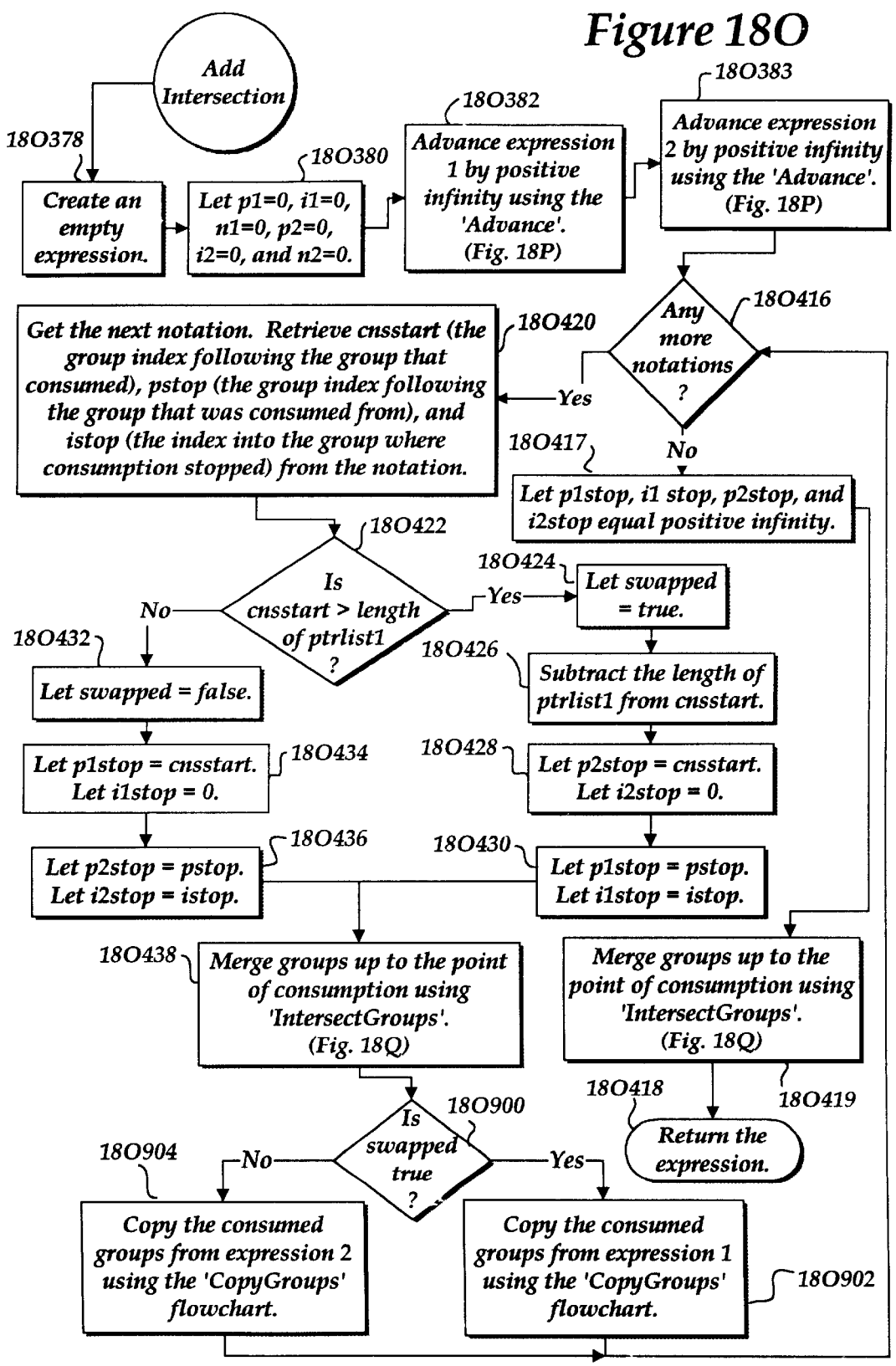

FIG. 18O describes the process of constructing an intersection from a single sequence of notations.

Figure 18P:
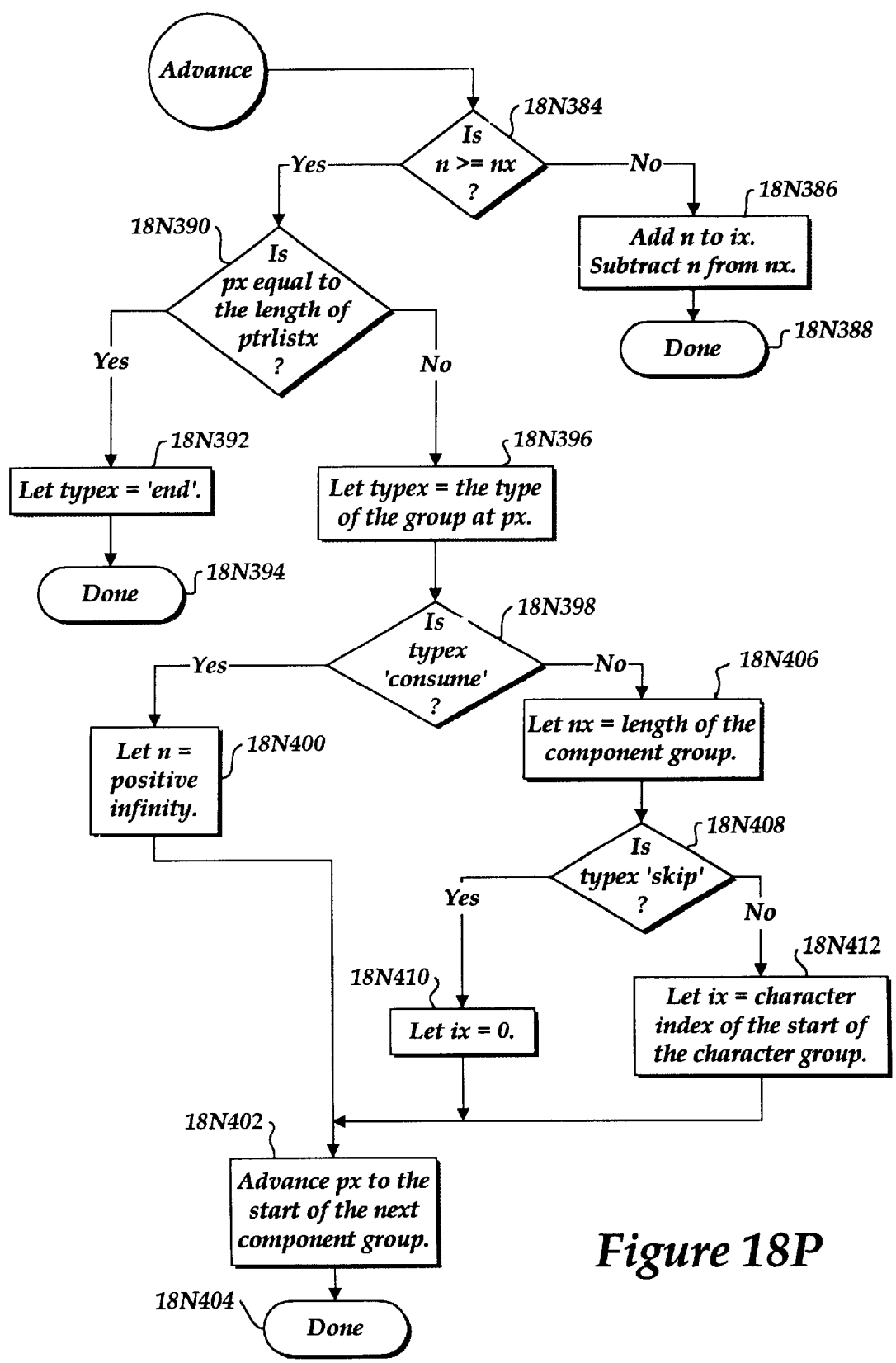

FIG. 18P describes the process of adjusting variables in the current state of the process to skip all of or part of the current component group.

FIGS. 18Q–18U describe the process of merging component groups from the two expressions up to a point where consumption occurred. Two components are merged by selected the "more specific" of the two. For example, a MATCH component is selected over a CONSUME or SKIP component.

Figure 18Q:
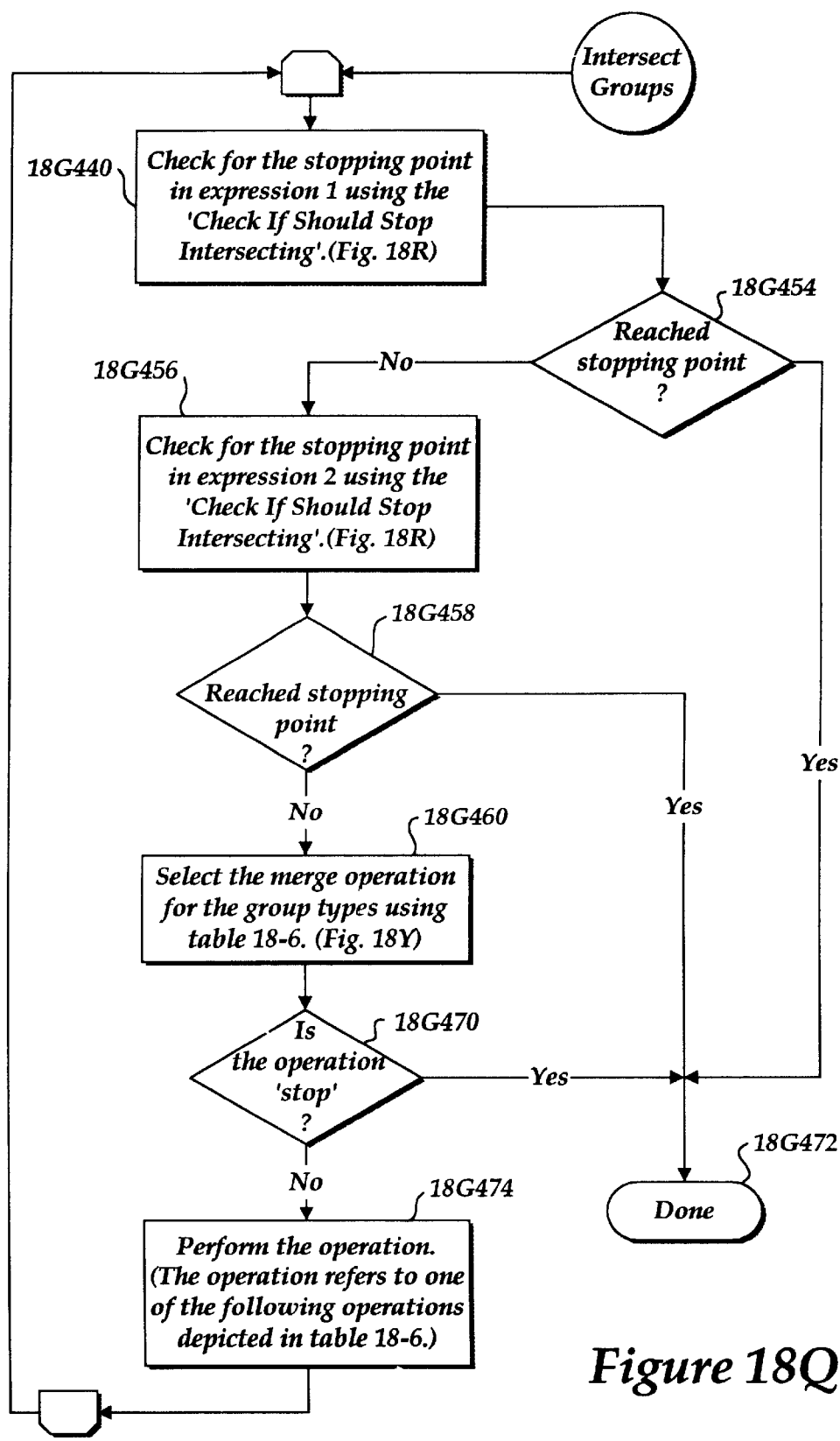
Figure 18R:
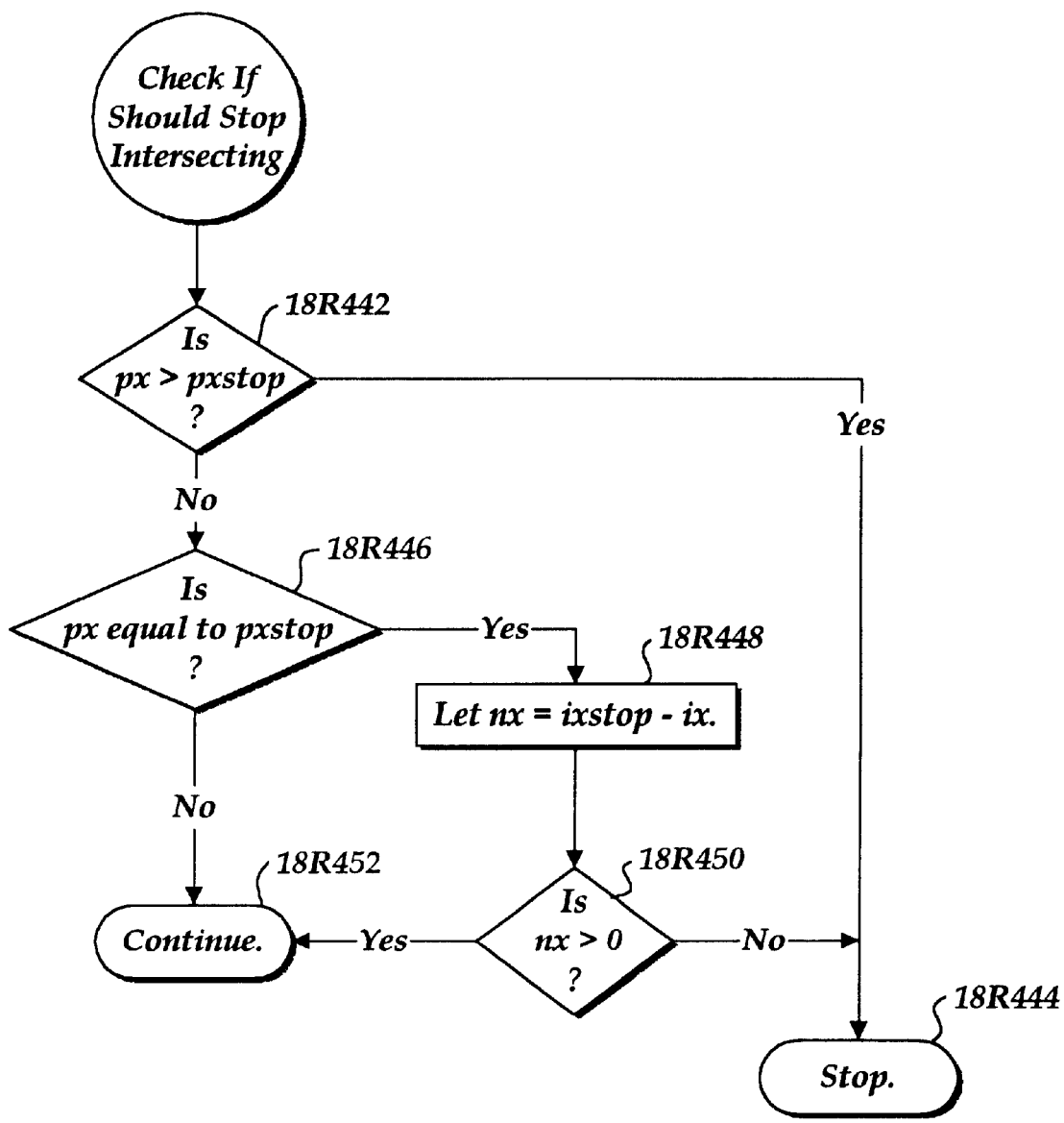
Figure 18S:
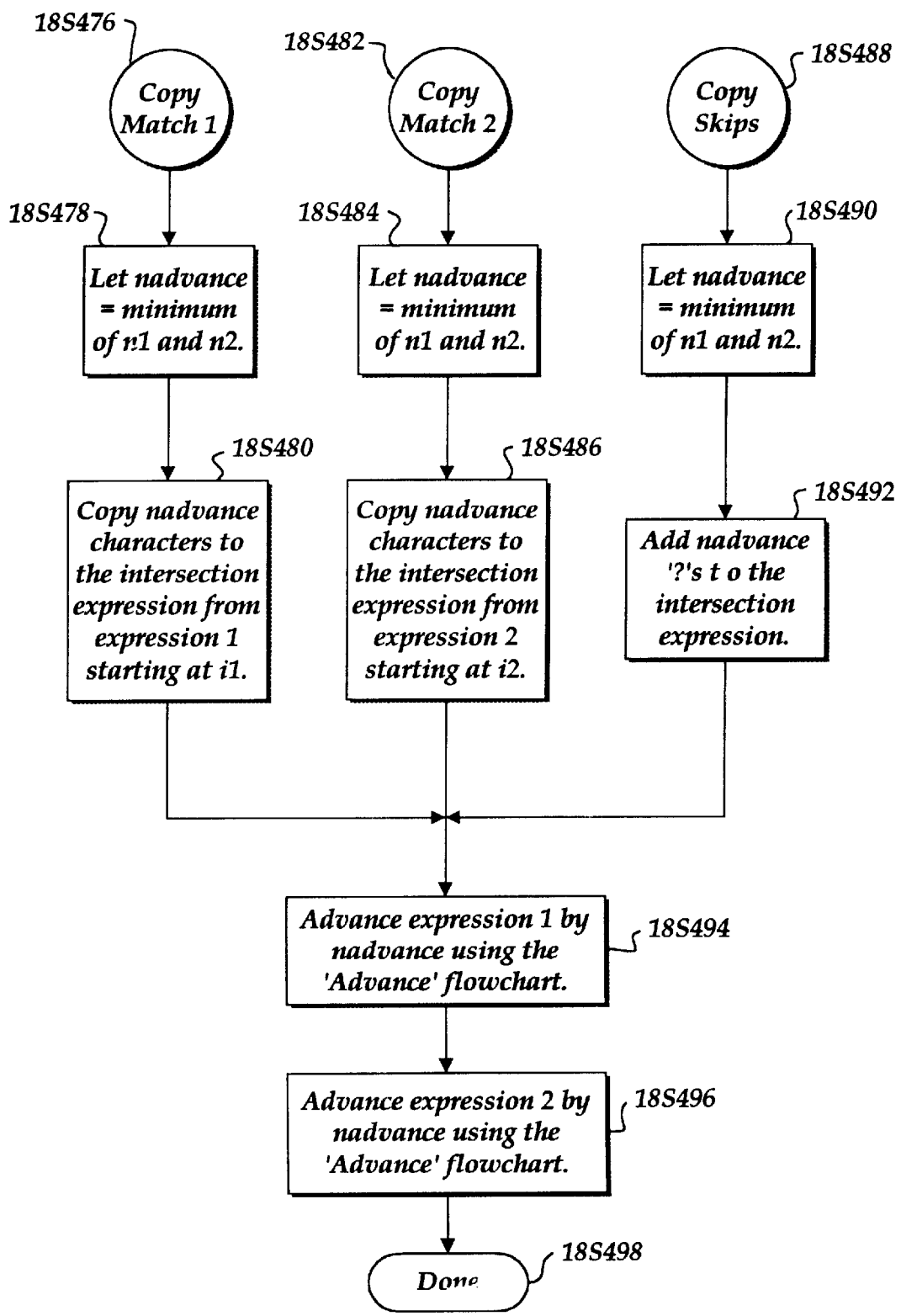
Figure 18T:
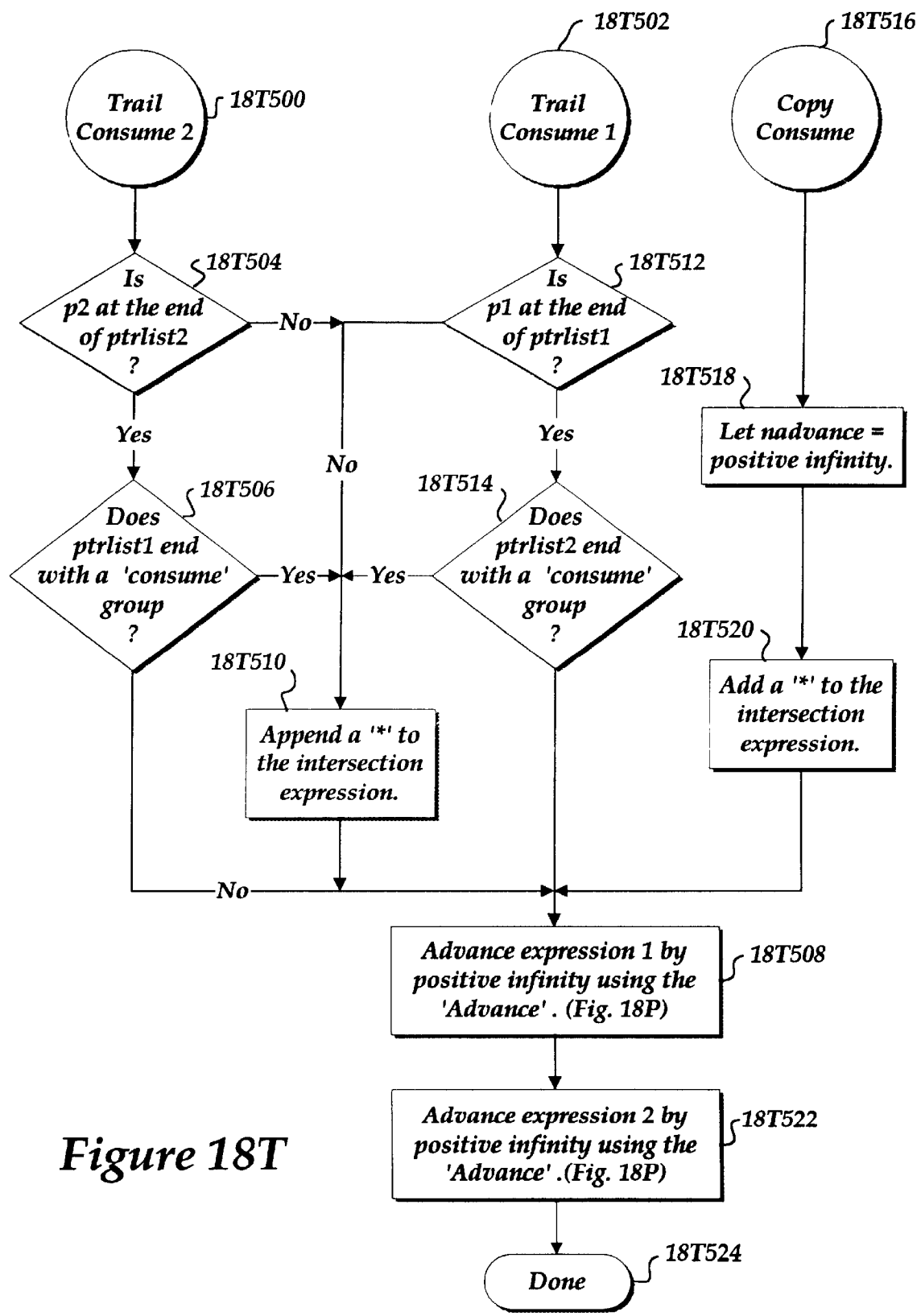
Figure 18U:
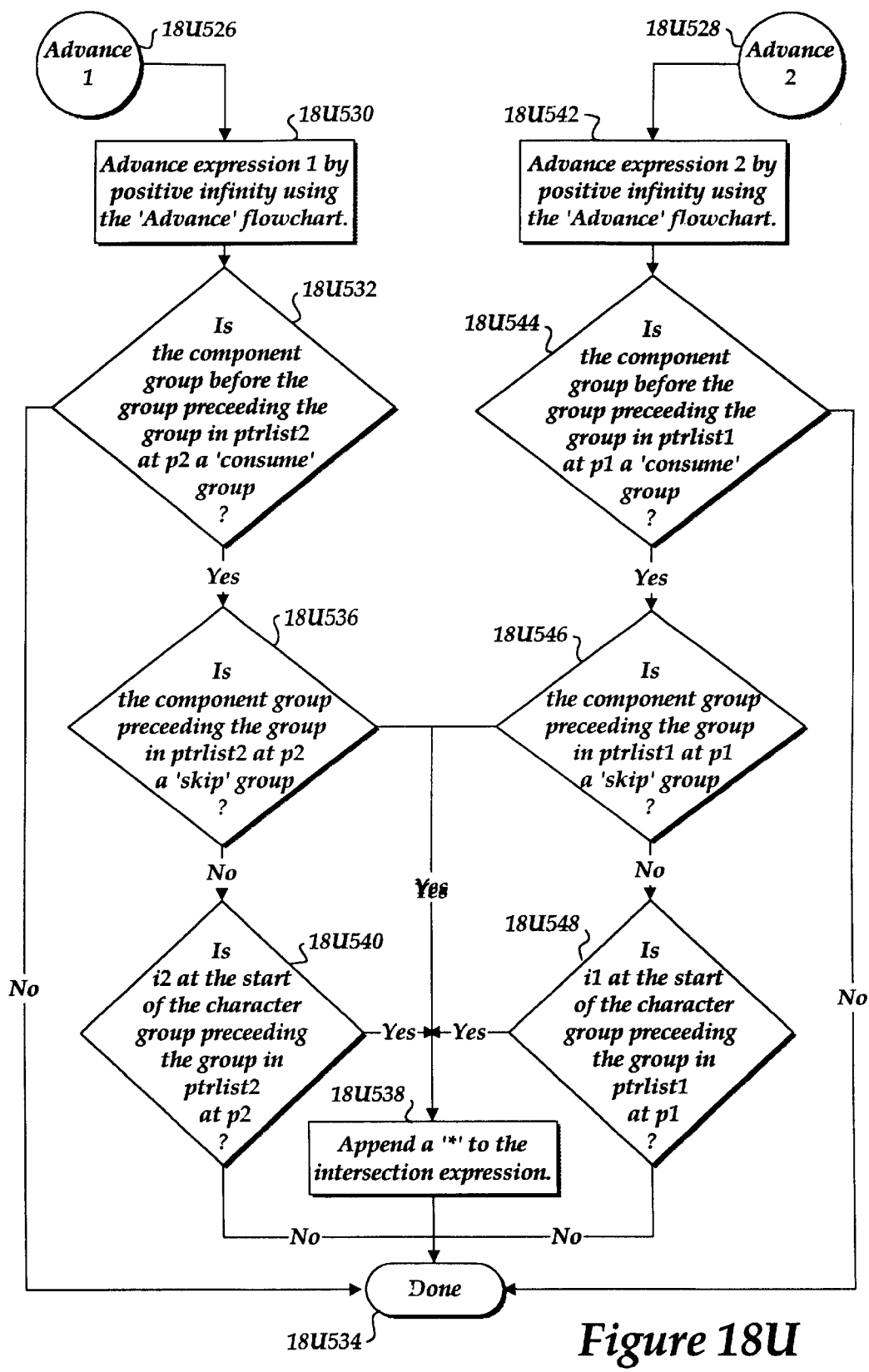
Figure 18V:
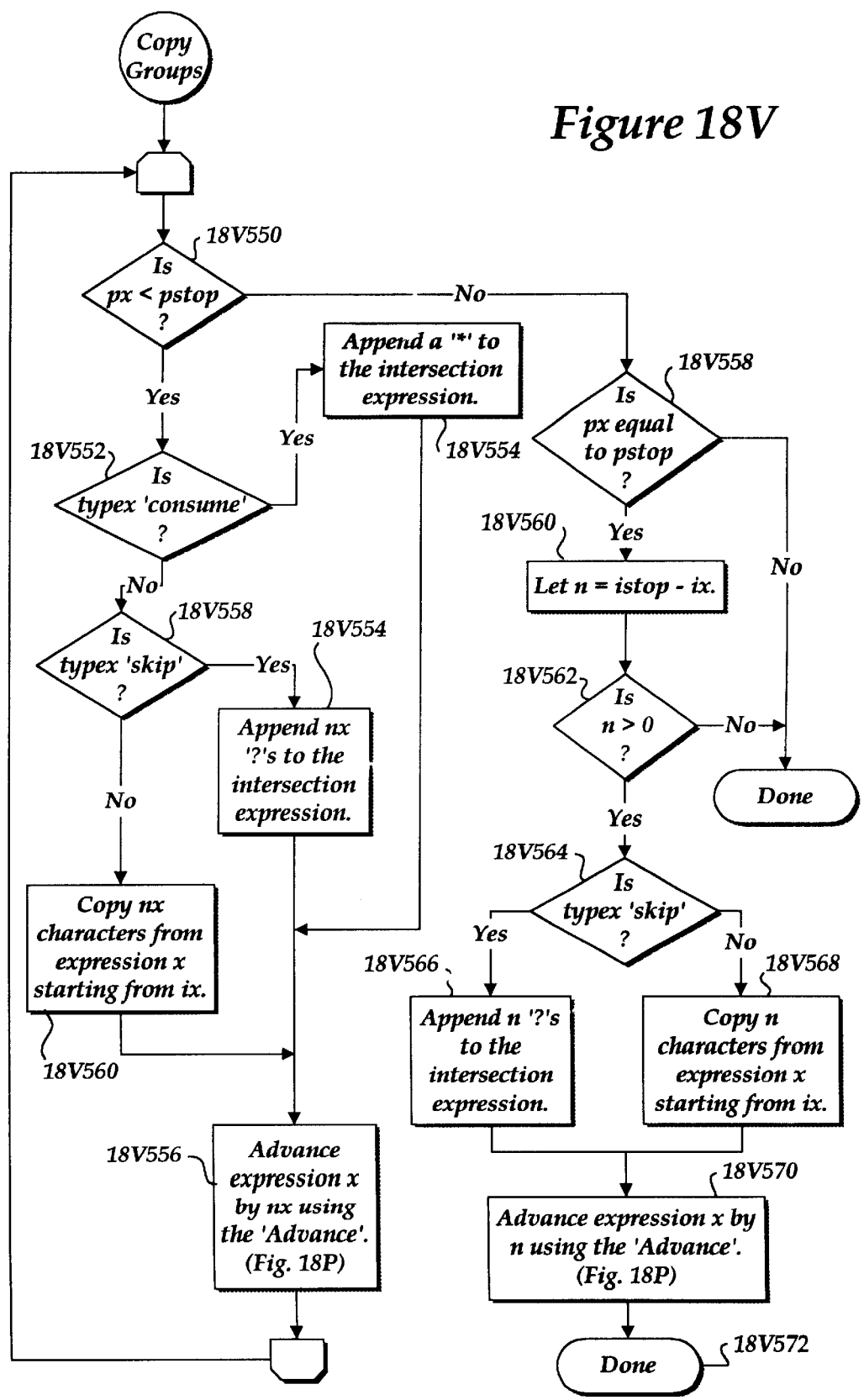

FIG. 18V describes the process of copying consumed components from an expression, up to the point where consumption stopped.

Referring to FIG. 18K, the IntersectExpressions process begins by normalizing EXPRESSION1 using the NormalizeExpressionInSeparateGroups process (block 18K350) illustrated in FIG. 18B and described in detail above. The array of component group descriptor codes returned by the NormalizeExpressionInSeparate-Component-Groups process is assigned the identifier PTRLIST1. Thus, PTRLIST1 contains an array of the component group descriptor codes for EXPRESSION1. The array of individual characters for EXPRESSION1 is assigned the identifier EXPR1.

EXPRESSION2 is normalized and separated into component groups using the NormalizeExpressionInSeparateGroups process (block 18K352). The array of component group descriptor codes returned by the NormalizeExpressionAndSeparateComponentGroups process is assigned to the identifier PTRLIST2. Thus, PTRL- IST2 contains an array of component group descriptor codes for EXPRESSION2. The array of individual characters for EXPRESSION2 is assigned the identifier EXPR2.

After EXPRESSION1 and EXPRESSION2 have been normalized, a variable identifier called CURISECTPTR is initialized to zero (block 18K354). CURISECTPTR is used to track the current location in an intersection notation buffer, reference being made to the NoteConsuming process (FIG. 18L) and the prior description thereof for more details. After CURISECTPTR is initialized (block 18K354), PTRLIST1 and PTRLIST2 are then compared using the CompareComponentGroups process (block 18K356) with the value of CNS1 initialized to false, P1 initialized to 0, CNS2 initialized to false, P2 initialized to 0 and RESULT initialized to EQUAL. The CompareComponentGroups process is illustrated in FIG. 18D, and described in detail above. If the expressions have extra data associated with them, the extra data is compared (block 18K358). The result of the extra data comparison is merged with the expression comparison result returned from the CompareComponentGroups process (block 18K356) using Table 18-7 shown in FIG. 18Y. The operation of Table 18-7 is discussed above.

Next a test (block 18K360) is made to determine if the merged comparison result (block 18K358) is DISJOINT. If the merged comparison result is DISJOINT, the intersection is an empty expression. As a result, the intersection is returned (block 18K364).

If the merged comparison result is not DISJOINT, an intersection is constructed using the ConstructIntersections process (block 18K366) illustrated in flowchart form in FIG. 18N.

Referring to FIG. 18N, the ConstructIntersections process constructs a new expression for the intersection of the two original expressions by interpreting the notations made by the NoteConsuming process (FIG. 18L) during the comparison discussed above. The ConstructIntersections process begins by initializing (block 18N368) an empty expression for the intersection. The procedure next removes identical intersection notation buffers from the intersection list (block 18N368). In this regard, it has been determined empirically that attempting to "memorize" comparison results and intersection notations from commonly reprocessed locations is not worthwhile, since it impedes the comparison process and the redundant notations are relatively inexpensive (in terms of memory) to keep anyway. As one skilled in the art will recognize, "memorize" is a computer science term. It means to save computation results to avoid performing the computation again, at the expense of having to look up results before performing a computation and saving (some of) the results afterwards. This approach typically is used for this type of algorithm, where computations are likely to repeat and are expensive in terms of computational resources. The ConstructIntersections procedure could be optimized by removing notations that have SUPERSET/SUBSET relationships. However, this is expensive relative to the cost of creating the redundant expressions in the final intersection. In an actual embodiment of this invention this has not been done because these cases are unlikely to occur.

After identical intersection notation buffers have been removed from the intersection list, a processing loop is entered. The processing loop begins with a test (block 18N372) that determines if there are any more intersection notation buffers in the list. If the answer is a yes, the next intersection notation buffer is retrieved (block 18N374) from the list. Then an intersection expression is constructed (block 18N376) from the notations using the AddIntersection process illustrated in FIG. 18O.

The AddIntersection process illustrated in FIG. 18O begins by creating an empty expression (block 18O378) and initializing variables designated P1, N1, P2, I2, and N2 all to 0 (block 18O380). EXPRESSION1 and EXPRESSION2 are advanced (blocks 18O382 and 18O383) by positive infinity using the Advance process illustrated in FIG. 18P.

The advance process (FIG. 18P) uses a variable N to refer to the number of components to advance as specified by the referring process, i.e., the process calling the Advance process. The variables used within the Advance process are of the form Ix, which refers to either I1 or I2, depending on the referring flowchart. This could alternatively be expressed by first swapping the orientation, performing the Advance process, and then reswapping the orientation. For brevity, these steps have been omitted in favor of the foregoing.

The first step in the Advance process is a test (block 18N384) to determine if N is greater or equal to Nx (i.e., N1 or N2 as the case may be). This test checks to see if the length of the current group has been exhausted. The value of N or Nx may be positive infinity. For the purposes of the Advance process, if both N and Nx are positive infinity, N and Nx are considered equal. In one implementation of the invention, positive infinity is replaced with a value that is larger than the longest possible expression character length, so that advancing by this amount forces this flowchart to skip to the next component group. In an actual embodiment of the invention, this value is the Java constant java/lang/Integer.MAX_VALUE.

If N is not greater than or equal to Nx (block 18N384), then the Advance process advances within a group by adding N to Ix and subtracting N from Nx (block 18N386). The processing then returns (block 18N388) to the process calling or instituting the Advance process (i.e., block 18O382 in FIG. 18O).

If N is greater than or equal to Nx (block 18N384), the Advance process determines if all of the groups in the expression have been exhausted. First a test (block 18N390) is made to determine if Px is equal to the length of the PTRLISTx. If the answer is yes, a variable designated TYPEx is set to the value END (block 18N392) and processing returns to the process calling or instituting the Advance process.

If Px is not equal to the length of the PTRLISTx, the Advance process advances to the next group by setting TYPEx to the type of group at Px (block 18N396). Next a test is made to determine if TYPEx is CONSUME. If TYPEx is CONSUME, N is set equal to positive infinity (block 18N400). The value of Px is then advanced to the start of the next component group (block 18N402), the Advance process ends (block 18N404) and processing returns to the process that called or initiated the Advance process.

If TYPEx is not CONSUME (block 18N398), Nx is set equal to the length of the component group (block 18N406). Then a test (block 18N408) is made to determine if TYPEx is SKIP. If TYPEx is SKIP, Ix is set equal to 0 (block 18N410). If TYPEx is not SKIP, Ix is set equal to the value of the character index of the start of the character group (block 18N412). Following the setting of Ix (block 18N410 or block 18N412), Px is advanced to the start of the next component group (block 18N402), the Advance process ends and processing returns to the process that called or initiated the Advance process, e.g., the AddIntersection process (block 18O382, FIG. 18O).

Returning to the AddIntersection process (FIG. 18O), after EXPRESSION1 and EXPRESSION2 have been advanced by positive infinity using the Advance process, a test (block 18O383) is made to determine if there are any more notations to process. If there are no more notations to process, P1STOP, I1STOP, P2STOP, I2STOP are set equal to positive infinity (block 18O417) and the remaining groups are merged (block 18O419) using the IntersectGroups process (FIG. 18Q). The expression is then returned (block 18O418) to the process initiating or calling the AddIntersection process.

If there are more notations to process (block 18O416), the next notation is retrieved (block 18O420) along with CNSSTART, which is a variable representing the group index following the group that did the consuming, PSTOP, which is a variable representing the group index following the group that was consumed from, and ISTOP, which is a variable representing the index into the group where consumption stopped from the notation. Next a test (block 18O422) is made to determine if CNSSTART is greater than the length of PTRLIST1. If CNSSTART is greater than the length of PTRLIST1, SWAPPED is set to true (block 18O424). The length of PTRLIST1 is then subtracted from CNSSTART (block 18O426), then a variable designated P2STOP is set equal to CNSSTART and a variable designated I2STOP is set equal to 0 (block 18O428). Thereafter the value of a variable designated P1STOP is set equal to PSTOP and the value of a variably designated I1 STOP is set equal to ISTOP (block 18O430).

If CNSSTART is not greater than the length of the PTRLIST1 (block 18O422), SWAPPED is set to false (block 18O432). Then P1STOP is set equal to CNSSTART and I1STOP is set equal to 0 (block 18O434). Next, P2STOP is set equal to PSTOP and I2STOP is set equal to ISTOP (block 18O436). After the final settings have occurred (block 18O430 or block 18O436), the groups are merged up to the point of consumption using the IntersectGroups process illustrated in flowchart form in FIG. 18Q (block 18O438). After the IntersectGroups process is completed, a test is made (block 18O900) to determine if SWAPPED is true. If SWAPPED is true, the consumed groups from EXPRESSION1 are copied (18O492) using the CopyGroups process (FIG. 18V). If SWAPPED is false, the consumed groups from EXPRESSION2 are copied (18O492) using the CopyGroups process (FIG. 18V). After the consumed groups are copied (block 18O492 or 18O494), the process cycles to the any more notations test (18O416).

The IntersectGroups process (FIG. 18Q) begins by checking EXPRESSION1 for a stopping point using the CheckIfShouldStopIntersecting process illustrated in flowchart form in FIG. 18R (block 18Q440). The CheckIfShouldStopIntersecting process (FIG. 18R) uses variables in the form of Ix, meaning either I1 or I2. The variable used is actually determined by the referring process. This could also be expressed by first swapping the orientation of the expression, performing the CheckIfShouldStopIntersecting process, and then reswapping the orientation. For brevity, these alternative steps have not been included. The notations used in the CheckIfShouldStopIntersecting process indicate complete consumption of a group with I+N, where I is set to 0 for SKIP groups or for character groups is the starting character index of the group. In the CheckIfShouldStopIntersecting process described here, the process will already have advanced to the next group when the group's length is exhausted.

The CheckIfShouldStopIntersecting process begins with a test (block 18R442) that determines if Px is greater than PxSTOP. If Px is greater than PxSTOP, a stop message is returned (block 18R442) to the process that called or initiated the CheckIfShouldStopIntersecting process.

If Px is not greater then PxSTOP (block 18R442), a test (block 18R446) is made to determine if Px is equal to PxSTOP. If Px is equal to PxSTOP, a variable designated Nx is set equal to the value of IxSTOP minus the value of Ix (block 18R442). Next a test (block 18R450) is made to determine if Nx is greater than 0. If Nx is not greater than 0, the stop message is returned (block 18R442) to the process that called the CheckIfShouldStopIntersecting process. If Nx is greater than 0, or if Px is not equal to PxSTOP, a continue message is returned (block 18R452) to the process that called or initiated the CheckIfShouldStopIntersecting process.

Returning to FIG. 18Q, after EXPRESSION1 has been checked for a stopping point using the CheckIfShouldStopIntersecting process (block 18Q440), a test (block 18Q454) is made to determine if a stopping point has been reached. If a continue message was received from the CheckIfShouldStopIntersecting process, EXPRESSION2 is checked (block 18Q456) for a stopping point using the CheckIfShouldStopIntersecting process illustrated in FIG. 18R and described above. Thereafter a test (block 18Q458) is made to determine if the message returned from the CheckIfShouldStopIntersecting process is stop or continue. If the returned message was continue, the group types are merged (block 18Q460) using Table 18-6, illustrated in FIG. 18Y.

After the group types have been merged (block 18Q460), a test (18Q470) is made to determine if the result of the merger is stop merging. If the result of the merger is stop merging (block 18Q470) or if stopping points are reached when EXPRESSION1 or EXPRESSION2 were checked for stopping points (block 18Q454 or block 18Q458), the IntersectGroups process ends and processing returns to the process that called or initialized the IntersectGroups process. If the merger return is not Stop merging (block 18Q470), then the operation listed in Table 18-6 resulting from the merger is performed (block 18Q474).

Three of the processes listed in Table 18-6 are illustrated in FIG. 18S. These are CopyMatch1, CopyMatch2 and CopySkips. CopyMatch1 (block 18S476) begins by setting a variable designated NADVANCE (block 18S478) to the minimum of N1 and N2. Thereafter the NADVANCE characters are copied to the intersection expression from EXPRESSION1 starting at I1 (block 18S480). CopyMatch2 (block 18S482) begins by setting NADVANCE to the minimum of N1 and N2. Thereafter the NADVANCE characters are copied to the intersection expression from EXPRESSION2 starting at I2 (block 18S486). CopySkips (block 18S488) begins by setting NADVANCE to the minimum of N1 and N2 (block 18S490). Then a number of "?" characters equal to NADVANCE are added to the intersection expression (block 18S492).

Following the appropriate one of the foregoing operations (blocks 18S480, 18S486 or 18S492), EXPRESSION1 is advanced (block 18S494) by NADVANCE using the Advance process illustrated in FIG. 18P and discussed above. EXPRESSION2 is then advanced (block 18S496) by NADVANCE using the Advance process illustrated in FIG. 18P and discussed above. The related process then ends and processing returns (block 18S498) to the calling or initiating process, i.e., the IntersectGroups process shown in FIG. 18Q and described above.

Three of the processes listed in Table 18-6 are illustrated in FIG. 18T. They are TrailConsume1, TrailConsume2, and CopyConsume. TrailConsume2 (block 18T500) begins with a test (block 18T504) to determine if P2 is at the end of PTRLIST2. If P2 is at the end of PTRLIST2, a test (block 18T506) is made to determine if PTRLIST1 ends with a CONSUME group. If PTRLIST1 does not end with a CONSUME group, then EXPRESSION1 is advanced (block 18T508) by positive infinity using the Advance process illustrated in FIG. 18P and described above. If P2 is not at the end of PTRLIST2 (block 18T504) or if PTRLIST1 does not end with a consume group (block 18T506), a "*" is appended (block 18T510) to the intersection expression and EXPRESSION1 is advanced by positive infinity using the Advance process (block 18T508).

TrailConsume1 (block 18T502) begins with a test (block 18T512) to determine whether P1 is at the end of PTRLIST1. At this point, if there is trailing consumer, a trailing "*" is not coded if EXPRESSION2 does not have a trailing "*". This case happens because trailing consumption is not indicated by the notations from the CompareComponents process (FIG. 18D) and the FindComponents process (FIG. 18E) because these processes stop at trailing consumers. (A similar case exists for EXPRESSION1 in the TrailConsume2 process described above).

If P1 is at the end of PTRLIST1 (block 18T512), a test (block 18T514) is made to determine if PTRLIST2 ends with a consume group. If PTRLIST2 does not end with a consume group, EXPRESSION1 is advanced by positive infinity using the Advance process (block 18T508). If P1 is not at the end of PTRLIST1 (block 18T512), or if PTRLIST2 does end with a consume group (block 18T514) a "*" is appended to the intersection expression (block 18T510) and EXPRESSION1 is advanced by infinity using the Advance process (block 18T508).

Copy Consume (block 18T516) begins by setting NADVANCE equal to positive infinity (block 18T518). A "*" is then added to the intersection expression (block 18T520) and EXPRESSION1 is advanced by positive infinity using the Advance process (block 18T508).

After EXPRESSION1 is advanced to positive infinity using the Advance process (block 18T508), EXPRESSION2 is advanced by positive infinity using the Advance process illustrated in FIG. 18P and described above. After EXPRESSION1 and EXPRESSION2 have been advanced to positive infinity processing returns to the process that initiated or called to selected one of the process shown in FIG. 18T, i.e., the IntersectGroups process (FIG. 18Q).

FIG. 18U illustrates the Advance1 (block 18U526) and the Advance2 (block 18U528) processes listed in Table 18-6. Advance1 begins by advancing (block 18U530) EXPRESSION1 by positive infinity using the Advance process (FIG. 18P), which is described above. At this point, if the comparison is "*" versus "?", or "*" versus a character, a "*" is inserted if the "?" group is preceded by a "* " or if the character group is at the beginning and is preceded by a "*". This is done first conducting a test (block 18U532) to determine if the component group before the group preceding the group in the PTRLIST2 at P2 is a consume group. If this group is not a consume group, the Advance1 process ends and processing returns to the process that called or initiated the Advance1 process, i.e., the IntersectGroups process. If this group is a consume group (block 18U532), a test (block 18U536) is made to determine if the component group preceding the group in PTRLIST2 at P2 is a skip group. If this group is a skip group, a "*" is appended (block 18U538) to the intersection expression and processing returns to the process that called or initiated the Advance1 process. If this group is not a skip group (block 18U536), a test (block 18U540) is made to determine if I2 is at the start of the character group preceding the group in PTRLIST2 at P2. If the answer is yes, a "*" is added to the intersection expression and processing returns to the process that called the Advance1 process. If the answer is no, processing returns to the process that called the Advance1 process.

The Advance2 process (block 18U528) is very similar to the Advance1 process (block 18U526) and done for similar reasons. First, EXPRESSION2 is advanced (block 18U542) by positive infinity using the Advance process (FIG. 18P). Next, a test (block 18U544) is made to determine if the component group before the group preceding the group in PTRLIST1 at P1 is a consume group. If the answer is no, processing returns (block 18U534) to the process that initiated or called the Advance2 process, i.e., the IntersectGroups process (FIG. 18Q). If the answer is yes, a test (block 18U546) is made to determine if the component group preceding the group in PTRLIST1 at P1 is a skip group. If the answer is yes, a "*" is appended to the intersection expression (block 18U538) and processing returns to the process that called the Advance2 process (block 18U534). If the answer is no, a test (block 18U548) is made to determine if I1 is at the start of the character group preceding the group in PTRLIST1 at P1. If the answer is yes, a "*" is appended to the intersection expression (block 18U538) and processing returns to the process that called the Advance2 process (block 18U534). If the answer is no, processing returns to the process that called the Advance2 process (block 18U534).

The CopyGroups process is illustrated in FIG. 18V. The variables used in FIG. 18V are in the form of "Ix", meaning either I1 or I2. The variable to use is determined by the expression being processed. This could also be expressed by first swapping the orientation, performing the CopyGroups process, and then reswapping the orientation. The first step in the CopyGroups process is a test (block 18V550) to determine if the variable Px is less than the variable PSTOP. If Px is less than PSTOP, a test (block 18V552) is made to determine if TYPEx is CONSUME. If TYPEx is CONSUME, a "*" is appended (block 18V554) to the intersection expression and EXPRESSIONx is advanced (block 18V556) using the Advance process illustrated in FIG. 18P and discussed above. If TYPEx is not CONSUME (block 18V552), then a test (block 18V558) is made to determine if TYPEx is SKIP. If TYPEx is not SKIP, then Nx characters are copied from EXPRESSIONx (block 18V560) starting at the position Ix. Thereafter, EXPRESSIONx is advanced by the value of Nx using the Advance process shown in FIG. 18P. If TYPEx is SKIP, then Nx "?" characters are appended (block 18V562) to the intersection expression and then EXPRESSIONx is advanced (block 18V556) by the value of the variable Nx using the Advance process shown in FIG. 18P. After the EXPRESSIONx is Advanced, the process repeats, starting at the Px less than PSTOP test (block 18V550).

If Px is not less than PSTOP (block 18V550), a test (block 18V558) is made to determine if Px is equal to PSTOP. (This portion of the CopyGroups process copies the starting portion of the partially consumed group.) If Px is equal to PSTOP, the variable N is set equal to the value of ISTOP minus Ix (block 18V560). N is then tested to see if it is greater than 0 (block 18V562).

If Px is not equal to PSTOP (block 18V558) or N is not greater than 0 (block 18V562), the CopyGroups process ends and processing returns to the process that called the CopyGroups process.

If N is greater than 0 (block 18V562), a test is performed to determine if TYPEx is SKIP (block 18V564). If TYPEx is SKIP, N "?" characters are appended (block 18V566) to the intersection expression. If TYPEx is not SKIP, N characters are copied from EXPRESSIONx starting from Ix (block 18V568). Thereafter EXPRESSIONx is advanced (block 18V570) by the value of N using the Advance process shown in FIG. 18P and processing returns (block 18V572) to the process that called the CopyGroups process.

Compare Two Lists of Wildcards

Figure 18W:
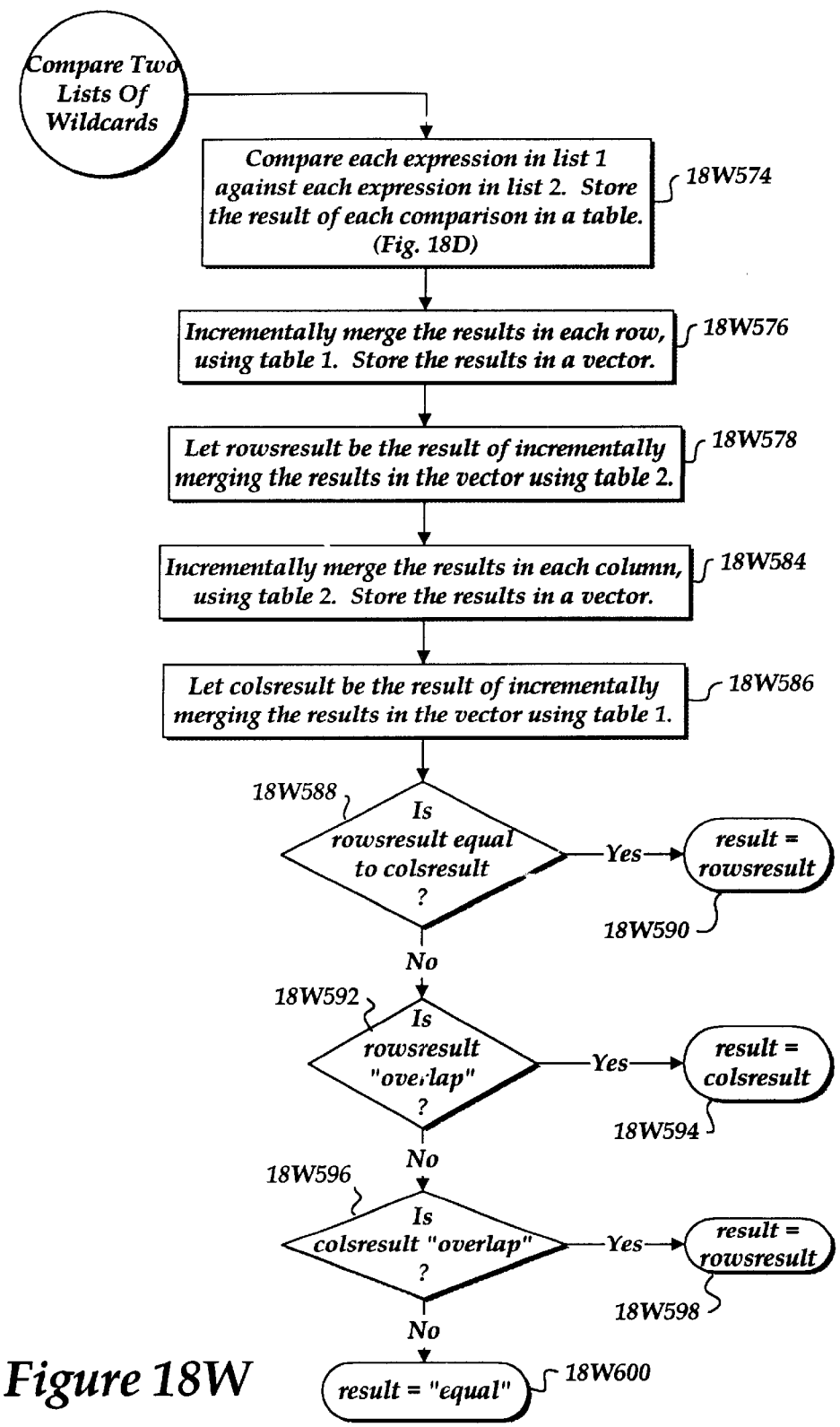

The process for comparing wildcards included in the sets of permissions being evaluated, i.e., the requested permission set and the user permission set is illustrated in functional flow form in FIG. 18W. Note that this process must be used instead of the process described by FIG. 14D, since two wildcards may have overlapping values. First, each expression in one set of permissions, e.g., LIST1, is compared (block 18W574) against each expression in the other set of permissions, e.g., LIST2, using the CompareComponentsGroups process illustrated in FIG. 18D and described above. The results in each row are then incrementally merged (block 18W576) using Table 18-1 (FIG. 18X). The results of the merge operation are then stored in a vector (block 18W576). Next, a variable designated ROWSRESULT is assigned (block 18W578) to the result of incrementally merging the results in the vector using Table 18-2 (FIG. 18X). Next, the results in each column are then incrementally merged (block 18W584) using Table 18-2 (FIG. 18X). The result of this incremental merge are stored in a vector (block 18W584). Next, a variable designated COLSRESULT is assigned (block 18W586) to the result of incrementally merging the results in a vector using Table 18-1 FIG. 18X). Then, a test is made (block 18W588) to determine if ROWSRESULT is equal to COLSRESULT. If ROWSRESULT equals COLSRESULT, a variable designated RESULT is set equal to ROWSRESULT (block 18W390). If ROWSRESULT does not equal COLSRESULT, a test (block 18W592) is made to determine if ROWSRESULT is OVERLAP. If ROWSRESULT is OVERLAP, RESULT is set equal to COLSRESULT (block 18W594). If ROWSRESULT is not OVERLAP, a test (block 18W596) is made to determine if COLSRESULT is OVERLAP. If the COLSRESULT is OVERLAP, RESULT is set equal to ROWSRESULT (block 18W578). If COLSRESULT is not OVERLAP, RESULT is set equal to EQUAL (block 18W600).

Example comparisons and intersections according to the method illustrated in FIGS. 18A–18Y are shown in Table 18-8 FIGS. 18Z–AA). DISJOINT expressions do not have intersections. Otherwise, where an intersection has been omitted, the comparison result is either EQUAL, SUPERSET, or SUBSET, in which case the intersection is the "lesser" of the two expressions. Semi-colons delimit expression lists.

Comparison of Include/Exclude Set Primitives

The preferred method employed by the invention for comparing primitives of the include/exclude pair type is illustrated in functional flow diagram form in FIGS. 19A–19I. Include/exclude pairs are discussed above with reference to FIG. 9H. Briefly, an include/exclude pair consists of an include expression and a paired exclude expression. The include expression defines a set of things from which a subset of things defined by the exclude expression is taken away. For instance, if an include expression defined a set of things a, b, c, and the exclude expression defined a subset of things b, then the include/exclude pair results in a subset a, c. In the Include/Exclude Sets primitive process shown in FIGS. 19A–19I, the variables I1 and E1 represent the include/exclude pair from a first permission set, and the variables I2 and E2 represent the include/exclude pair from a second permission set. While the method illustrated in FIGS. 19A–19I can be used to compare any two sets, in the context of the present invention, the I1/E1 include/exclude pair can be thought of as being part of the requested permission set, and the I2/E2 include/exclude pair can be thought of as part of the user permission set.

Figure 19A:
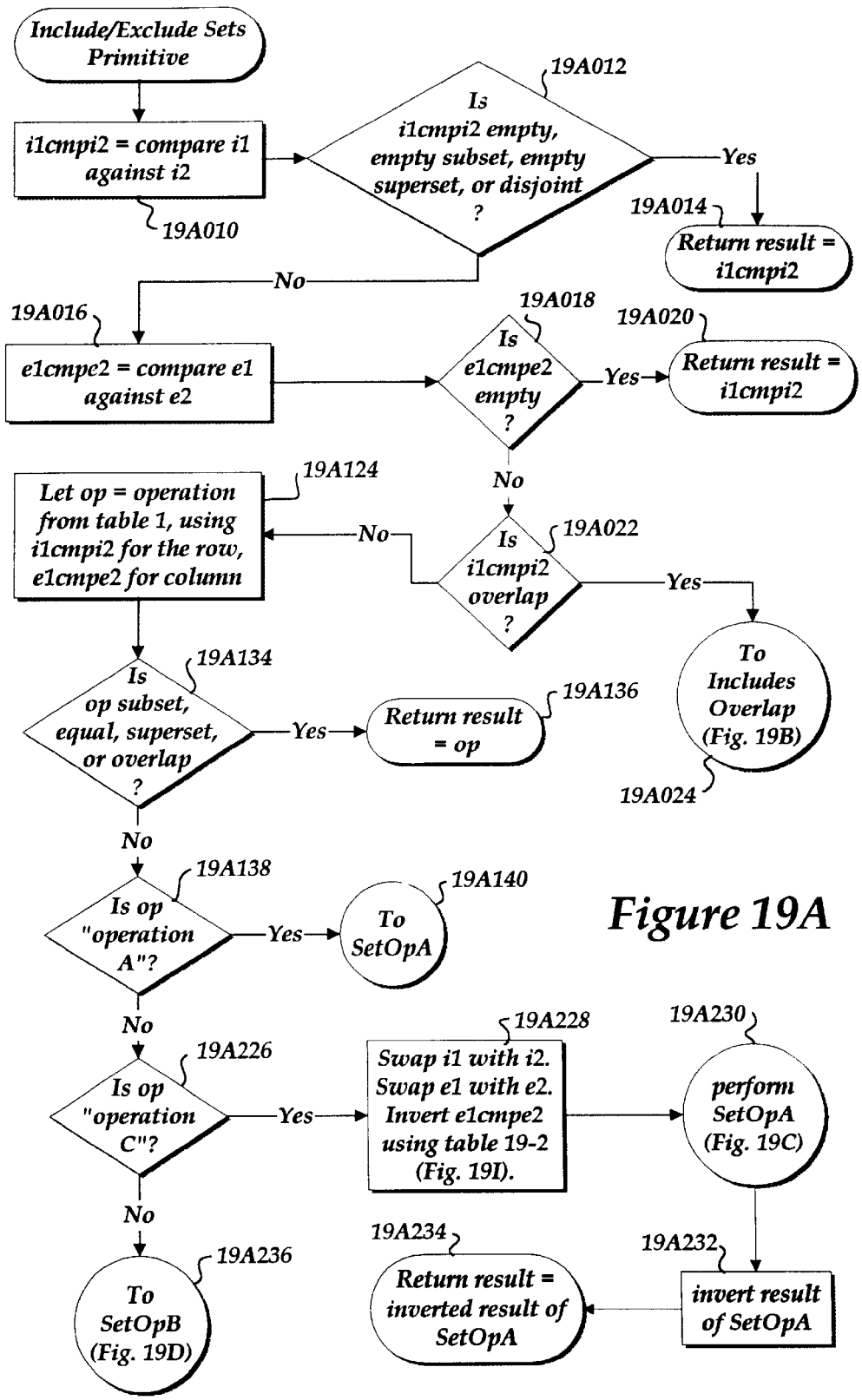

FIG. 19A begins by comparing (block 19 A010) I1 against I2. The expression I1 and I2 can be any of the primitive types discussed above. The comparison of I1 against I2 is specific to the type of primitive and uses the method described above for each primitive type. For instance, regular expressions are commonly used in include/exclude pairs to define sets of files. The include expression could be something such as "*.txt" and the exclude expression could be "mydoc.txt" which would define a set of files that includes all files with the last four characters ".txt" except the file "mydoc.txt". The second set could include a corresponding include/exclude pair that defines the include as "*.txt" and the exclude expression as "mydoc*.txt". In this example, while the include expressions are equal, it is apparent that the exclude expression of the second set defines many more documents than the exclude expression of the first set. The method and system of comparison illustrated in FIGS. 19A–I provide a directional comparison result in situations such as this.

Figure 19B:
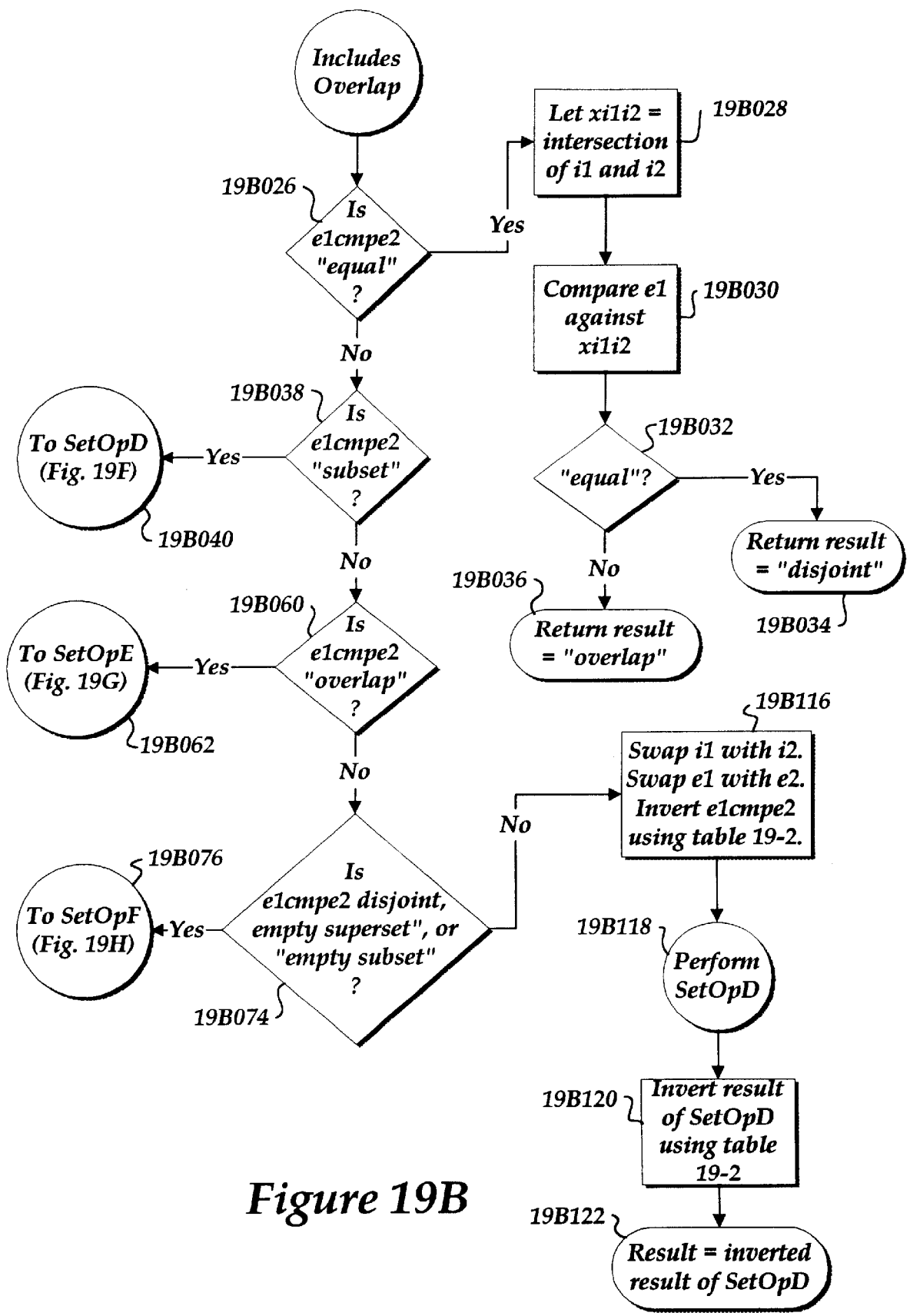

A variable designated I1CMPI2 is set equal to the result of the comparison of I1 against I2 using the comparison method discussed above for the constituent primitives (block 19A010). Thereafter, a test (block 19A012) is made to determine if I1CMPI2 is EMPTY, EMPTY SUBSET, EMPTY SUPERSET, or DISJOINT. If the answer is yes, I1CMPI2, i.e., EMPTY, EMPTY SUBSET, EMPTY SUPERSET, or DISJOINT is returned (block 19A014) to the process calling the Include/Exclude Sets primitive process. If I1CMPI2 is not EMPTY, EMPTY SUBSET, EMPTY SUPERSET, or DISJOINT, E1 is compared against E2 and the variable designated E1CMPE2 is set equal to the result of the comparison (block 19A016). Then a test (block 19A018) is made to determine if E1CMPE2 is EMPTY. If E1CMPE2 is EMPTY, I1CMPI2 is returned (block 19A020) to the process calling Include/Exclude Sets primitive process calling. If E1CMPE2 is not EMPTY (block 19A018), then a test (block 19A022) is made to determine if I1CMPI2 is OVERLAP. If I1CMPI2 is OVERLAP, the IncludesOverlap process illustrated in functional flow form in FIG. 19B is performed (block 19A024).

The IncludesOverlap process begins with a test (block 19B026) to determine if E1CMPE2 is EQUAL. If E1CMPE2 is EQUAL, a variable designated XI1I2 is set equal to the intersection of I1 and I2 (block 19B028). Computing the intersection of the expression is specific to the constituent primitive. For instance, if I1 and I2 are regular expressions, the intersection is computed in the manner illustrated in FIG. 18K and related figures described above. Next, E1 is compared against XI1I2 (block 19B030). Then a test (block 19B032) is made to determine if the result of the comparison is EQUAL. If the result of the comparison is EQUAL, DISJOINT is returned (block 19B034) to the process calling the IncludesOverlap process. If the result of the comparison is not EQUAL, OVERLAP is returned (block 19B036) to the calling process.

If E1CMPE2 is not EQUAL (block 19B026), a test (block 19B038) is made to determine if E1CMPE2 is SUBSET. If E1CMPE2 is SUBSET, a SetOpD process illustrated in functional flow diagram form in FIG. 19F is performed (block 19B040).

Figure 19C:
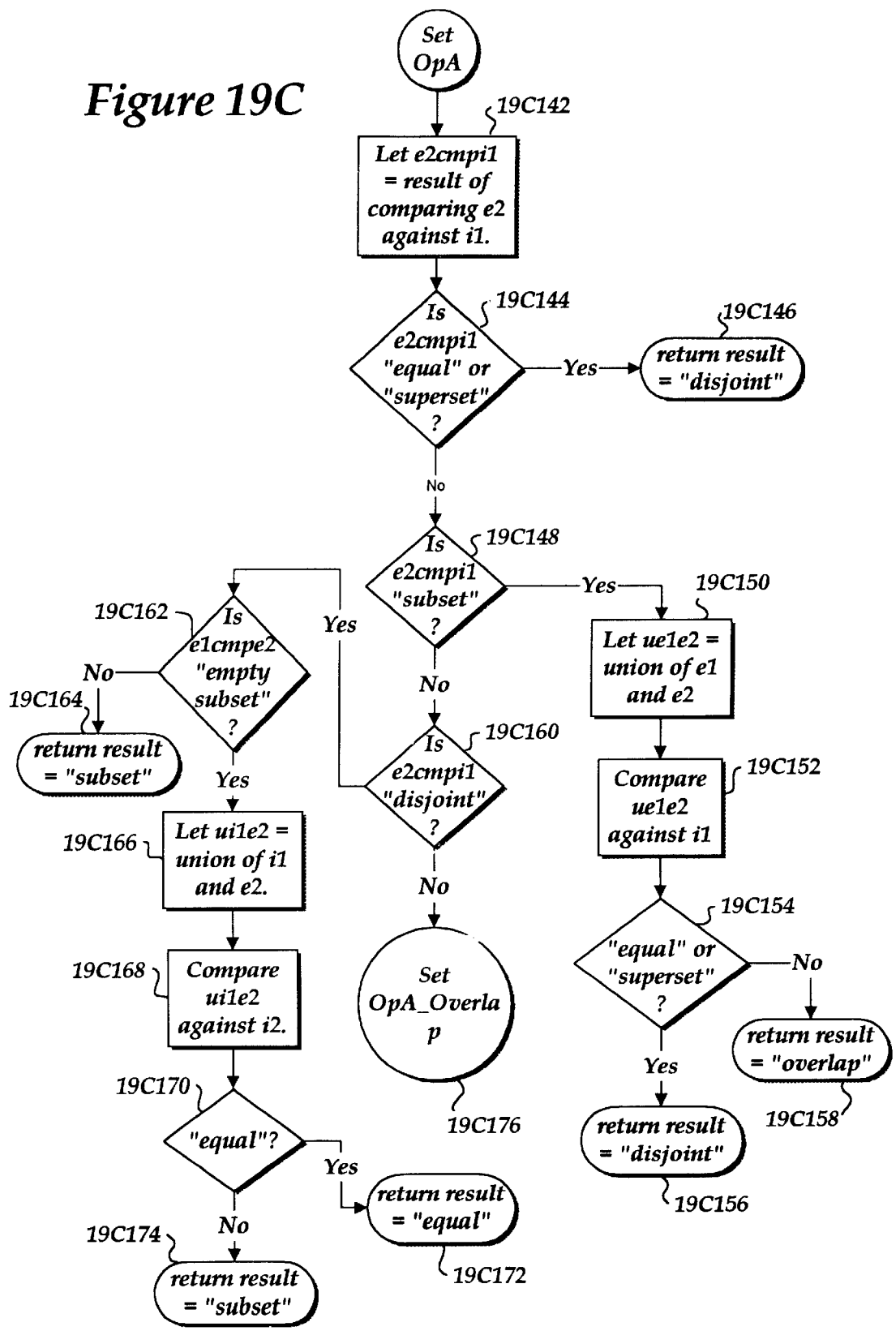
Figure 19D:
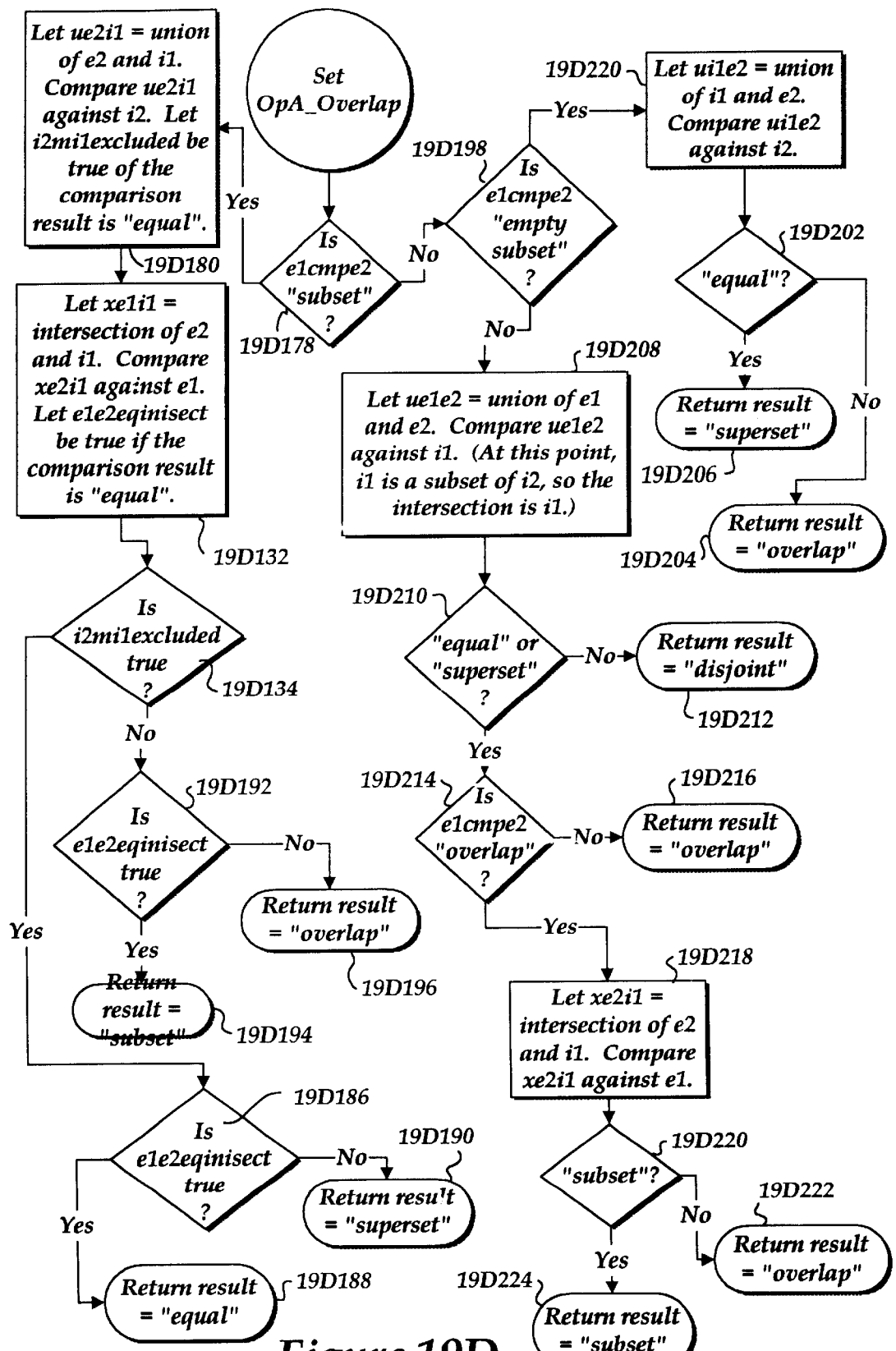
Figure 19E:
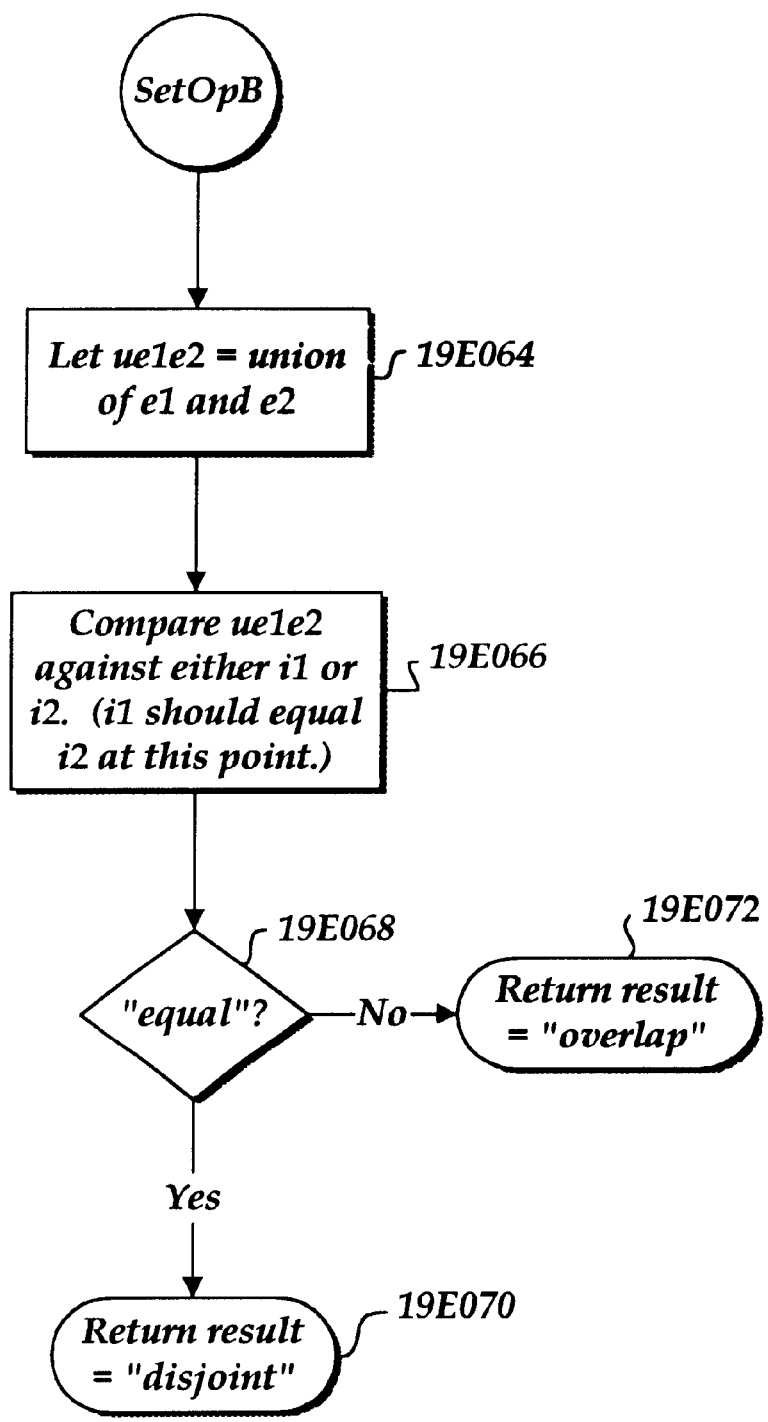
Figure 19F:
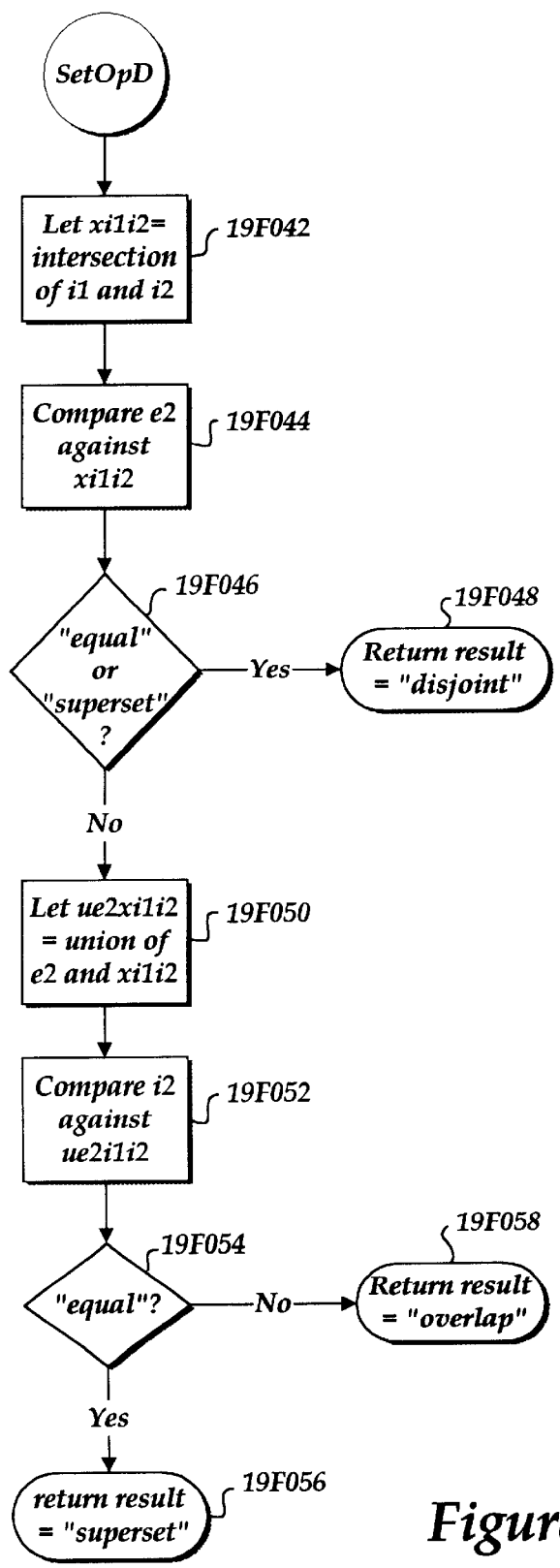

The first step in the SetOpD process illustrated in FIG. 19F is to set XI1I2 to the intersection of I1 and I2 (block 19F042). Then E2 is compared against XI1I2 (block 19F044). Then a test (block 19F046) is made to determine if the result of the comparison is EQUAL or SUPERSET. If the result of the comparison is EQUAL or SUPERSET, DISJOINT is returned (block 19F048) to the process calling the SetOpD process. If the result of the comparison is not EQUAL or SUPERSET, a variable designated UE2XI1I2 is set equal to the union of E2 and XI1I2 (block 19F050). The union represents an aggregation of the set of things contained in the E2 expression and the set of things contained in the XI1I2 expression. Next I2 is compared against UE2I1I2 (block 19F052). Then a test (block 19F054) is made to determine whether the result of the comparison is EQUAL. If the result of the comparison is EQUAL, SUPERSET is returned (block 19F056) to the calling process. If the result of the comparison is not EQUAL, OVERLAP is returned (block 19F058) to the calling process.

Returning to FIG. 19B, if E1CMPE2 is not SUBSET (block 19B038), a test (block 19B060) is made to determine if E1CMPE2 is OVERLAP. If E1CMPE2 is OVERLAP, a SetOpE process illustrated in functional flow diagram from FIG. 19G is performed (block 19B062).

Figures 1, 19G:
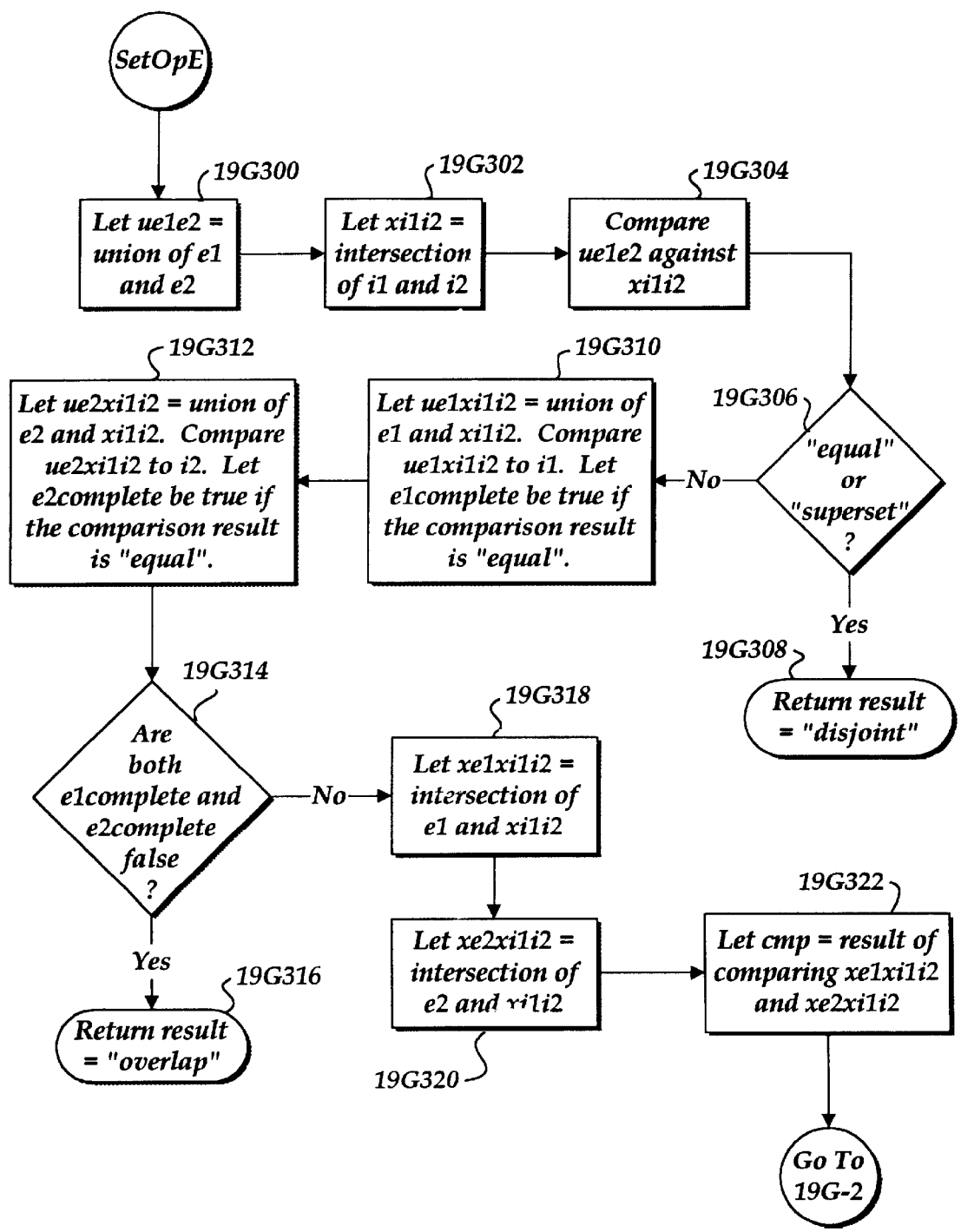
Figures 2, 19G:
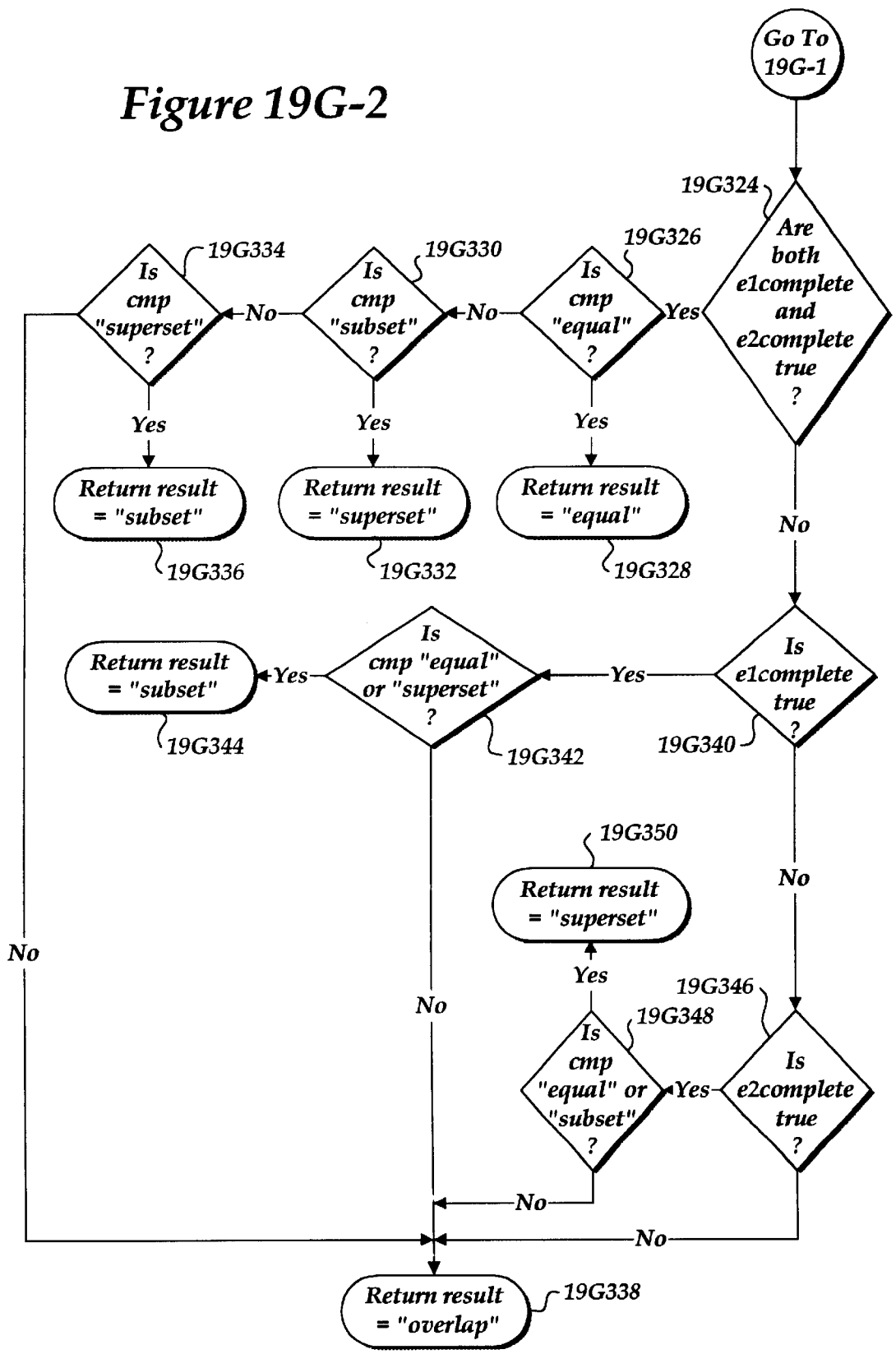

The first step of the SetOpE process illustrated in FIG. 19G is to set a variable designated UE1E2 equal to the union of E1 and E2 (block 19G300). The next step is to set XI1I2 equal to the intersection of I1 and I2 (block 19G302). Then UE1E2 is compared against the value of the variable XI1I2 (block 19G304). If the result of the comparison is EQUAL or SUPERSET (block 19G306), DISJOINT is returned (block 19G308) to the process calling the SetOpE process. If the result of the comparison is not EQUAL or SUPERSET, a variable designated UE1XI1I2 is set equal to the union of E1 and XI1I2, UE1XI1I2 is compared to I1; and a variable designated E1COMPLETE is set to true if the result of the comparison is EQUAL (block 19G310). Next, a variable designated UE2XI1I2 is set equal to the union of E2 and XI1I2; UE2XI1I2 is compared to I2; and a variable designated E2 COMPLETE is set to true if the result of the comparison is EQUAL (block 19G312).

Next, a test (block 19G314) is made to determine if both E1COMPLETE and E2COMPLETE are false. If E1COMPLETE and E2COMPLETE are both false, OVERLAP is returned to the calling process (block 19G316). If E1COMPLETE and E2COMPLETE are not both false, a variable designated XE1XI1I2 is set equal to the intersection of E1 and XI1I2 (block 19G318). Then, a variable designated XE2XI1I2 is set equal to the intersection of E2 and XI1I2 (block 320). Thereafter, a variable designated CMP is set equal to the result of comparing XE1XI1I2 and XE2XI1I2 (block 19G322). Next, a test (block 19G324) is made to determine if both E1COMPLETE and E2COMPLETE are true, if both E1COMPLETE and E2COMPLETE are true, a test (block 19G326) is made to determine if CMP is EQUAL. If CMP is EQUAL, EQUAL is returned to the calling process (block 19G328). If CMP is not EQUAL, a test (block 19F330) is made to determine if CMP is SUBSET. If CMP is SUBSET, SUPERSET is returned to the calling process (block 19G322). If CMP is not SUBSET, a test is made to determine if CMP is SUPERSET (block 19G334). If CMP is SUPERSET, SUBSET is returned to the calling process (block 19G336). If CMP is not SUPERSET, OVERLAP is returned to the calling process (block 19G338).

If both E1COMPLETE and E2COMPLETE are not true (block 19G324), a test (block 19G340) is made to determine if E1COMPLETE is true. If E1COMPLETE is true, a test (block 19G342) is made to determine if CMP is EQUAL or SUPERSET. If CMP is EQUAL or SUPERSET, SUBSET is returned to the calling process (block 19G344). If CMP is not EQUAL or SUPERSET, OVERLAP is returned to the calling process (block 19G338). If E1COMPLETE is false (block 19G340), a test (block 19G346) is made to determine if E2COMPLETE is true. If E2COMPLETE is true, a test (block 19G348) is made to determine if CMP is EQUAL or SUBSET. If CMP is EQUAL or SUBSET, SUPERSET is returned to the calling process (block 19G350). If either E2COMPLETE is false (block 19G346) or CMP is not EQUAL or SUBSET (block 19G348), OVERLAP is returned to the calling process (block 19G338).

Returning to FIG. 19B, if E1CMPE2 is not OVERLAP (block 19B060), a test (block 19B074) is made to determine if E1CMPE2 is DISJOINT, EMPTY SUPERSET, or EMPTY SUBSET. If E1CMPE2 is DISJOINT, EMPTY SUPERSET or EMPTY SUBSET, a SetOpF process illustrated in functional flow diagram form in FIG. 19H is performed (block 19B076).

Figure 19H:
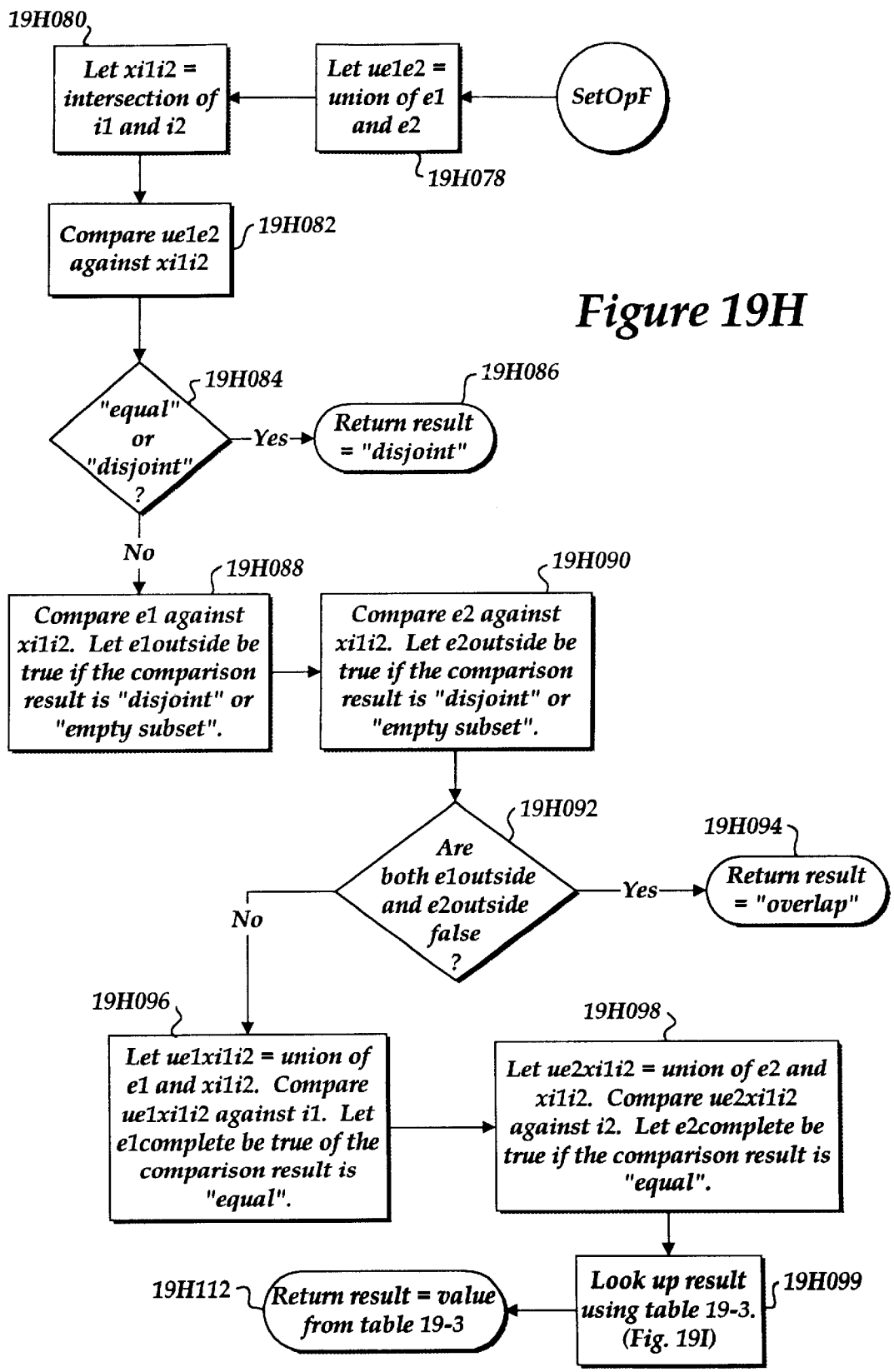

The first step of the SetOpF process is illustrated in FIG. 19H is to set UE1E2 equal to the union of E1 and E2 (block 19H078). Then, XI1I2 is set equal to the intersection of I1 and I2 (block 19H080). Next, UE1E2 is compared to XI1I2 (block 19H082). Then a test (block 19H084) is made to determine if the result of the comparison is EQUAL or DISJOINT. If the result of the comparison is EQUAL or DISJOINT, DISJOINT is returned to the calling process (block 19H086). If the result of the comparison is not EQUAL or DISJOINT (block 19H084) E1 is compared to XI1I2 and a variable designated E1OUTSIDE is set to true if the result of the comparison is DISJOINT or EMPTY SUBSET (block 19H088). Then, E2 is compared to XI1I2 and a variable designated E2OUTSIDE is set true is the result of the comparison is DISJOINT or EMPTY SUBSET. Next, a test (block 19H092) is made to determine if both E1OUTSIDE and E2OUTSIDE are false. If both E1OUTSIDE and E2OUTSIDE are false, OVERLAP is returned to the calling process (block 19H094).

If both E1OUTSIDE and E2OUTSIDE are not false, UE1X1I1I2 is set to the union of E1 and XI1I2; UE1XI1I2 is compared against I1; and E1COMPLETE is set to true if the result of the comparison is EQUAL (block 19H096). Next UE2X1I1I2 is set to the union of E2 and XI1I2; UE2XI1I2 is compared against I2; and E2COMPLETE is set true if the result of the comparison is EQUAL (block 19H098). Then E1OUTSIDE (block 19H088), E2OUTSIDE (block 19H090) E1COMPLETE (block 19H096) and E2COMPLETE (block 19H098), are used to determine the result of the SetOpF process from Table 19-3 (FIG. 19I). For instance, if E1OUTSIDE is true (cell 19I102), E1COMPLETE is false (cell 19I104), E2OUTSIDE is true (cell 19I106) and E2COMPLETE is true (cell 19I108), the result is SUPERSET (cell 19I110). Returning to FIG. 19H, the value obtained from Table 19-3 is returned to the calling process (block 19H112).

Returning to FIG. 19B, if E1CMPE2 is not DISJOINT, EMPTY SUPERSET, or EMPTY SUBSET (block 19B074), I1 is swapped with I2, E1 is swapped with E2 and E1CMPE2 is inverted using Table 19-2 (FIG. 19I) (block 19B116). Next, the SetOpD process illustrated in FIG. 19F and described above is performed (block 19B118). The result returned by the SetOpD process is inverted (block 19B120) using Table 19-2 FIG. 19I). The inverted result is returned to the calling process (block 19B122).

Returning to FIG. 19A if I1CMPI2 is not OVERLAP (block 19A022), a variable designated OP is set to a value obtained from Table 19-1 FIG. 19I using I1CMPI2 for the row value and E1CMPE2 for the column value. For instance, if I1CMPI2 is SUPERSET (cell 19I128) and E1CMPE2 is DISJOINT (cell 19I130), OP is set to Operation C (cell 19I132).

Next a test (block 19A134) is made to determine if OP is SUBSET, EQUAL, SUPERSET, or OVERLAP. If OP is SUBSET, EQUAL, SUPERSET or OVERLAP, OP is returned to the calling process (block 19A136). If OP is not SUBSET, EQUAL, SUPERSET or OVERLAP, a test (block 19A138) is made to determine if OP is operation A. If OP is Operation A, the SetOpA process illustrated in functional flow form in FIG. 19C is performed (block 19A140).

The first step in the SetOpA process (FIG. 19C) is to set a variable designated E2CMPI1 to the result of comparing E2 against I1 (block 19C142). Then a test (block 19C144) is made to determine if E2CMPI1 is EQUAL or SUPERSET. If E2CMPI1 is EQUAL or SUPERSET, DISJOINT is returned to the calling process (block 19C146). If E2CMPI1 is not EQUAL or SUPERSET, a test (block 19C148) is made to determine if E2CMPI1 is SUBSET.

If E2CMPI1 is SUBSET, UE1E2 is set to the union of E1 and E2 (block 19C150). Then UE1E2 is compared against I1 (block 19C152). If the result of the comparison is EQUAL or SUPERSET (block 19C154), DISJOINT is returned to the calling process (block 19C156). If the result of the comparison is not EQUAL or SUPERSET, OVERLAP is returned to the calling process (block 19C158).

If E2CMPI1 is not SUBSET (block 19C148), a test (block 19C160) is made to determine if E2CMPI1 is DISJOINT. If E2CMPI1 is DISJOINT, a test (block 19C162) is made to determine if E1CMPE2 is EMPTY SUBSET. If E1CMPE2 is not EMPTY SUBSET, SUBSET is returned to the calling process (block 19C164).

If E1CMPE2 is EMPTY SUBSET, UI1E1 is set to the union of I1 and E2 (block 19C166). Then UI1E2 is compared against the value of I2 (block 19C168). Thereafter a test (block 19C170) is made to determine if the result of the comparison is EQUAL. If the result of the comparison is EQUAL, EQUAL is returned to the calling process (block 19C172). If the result of the comparison is not EQUAL, SUBSET is returned to the calling process (block 19C174).

If E2CMPI1 is not equal to DISJOINT (block 19C160), the SetOpA-overlap process illustrated in flow diagram form in FIG. 19D is performed (block 19C176). The first step in the SetOpA-Overlap process (block 19D178) is to determine if E1CMPE2 equals SUBSET. If E1CMPE2 is SUBSET, UE2I1 is set to the union of E2 and I1; UE2I1 is compared against I2; and a variable designated I2MI1EXCLUDED is true if the result of the comparison is EQUAL (block 19D180). Next, XE1I1 is set to the intersection of E2 and I1; XE2I1 is compared against E1; and a variable designated E1E2EQINISECT is set true if the result of the comparison is EQUAL (block 19D182). Then a test (block 19D184) is made to determine if I2MI1EXCLUDED is true. If I2MI1EXCLUDED is true, and a test (block 19D186) is made to determine if E1E2EQINISECT is true. If E1E2EQINISECT is true, EQUAL is returned to the calling process (block 19D188). If E1E2EQINISECT is not true, SUPERSET is returned to the calling process (block 19D190).

If I2MI1EXCLUDED is not true (block 19D184), a test (block 19D192) is made to determine if E1E2EQINISECT is true. If E1E2EQINISECT is true, SUBSET is returned to the calling process (block 19D194). If E1E2EQINISECT is not true, OVERLAP is returned to the calling process (block 19D196).

If E1CMPE2 is not SUBSET (block 19D178), a test (block 19D198) is made to determine if E1CMPE2 is EMPTY SUBSET. If E1CMPE2 is EMPTY SUBSET, UI1E2 is set to the union of I1 and E2 and UI1E2 is compared against I2 (block 19D200). Then a test (block 19D202) is made to determine if the result of the comparison is EQUAL. If the result of the comparison is EQUAL, SUPERSET is returned to the calling process (block 19D204). If the result of the comparison is not EQUAL, OVERLAP is returned to the calling process (block 19D206).

If E1CMPE2 is not EMPTY SUBSET (block 19D198), UE1E2 is set to the union of E1 and E2, and UE1E2 is compared against I1 (block 19D208). At this point, I1 is a SUBSET of I2, so that the intersection is I1. Next, a test (block 19D210) is made to determine if the result of the comparison is EQUAL or SUPERSET. If the result of the comparison is not EQUAL or SUPERSET, DISJOINT is returned to the calling process (block 19D212). If the result of the comparison is EQUAL or SUPERSET, a test (block 19D214) is made to determine if E1CMPE2 is OVERLAP. If E1CMPE2 is not OVERLAP, OVERLAP is returned to the calling process (block 19D216). If E1CMPE2 is OVERLAP, XE2I1 is set to the intersection of E2 and I1, and XE2I1 is compared against E1 (block 19D218). Then a test (block 19D220) is made to determine if the result of the comparison is SUBSET. If the result of the comparison is not SUBSET, OVERLAP is returned to the calling process (block 19D222). If the result of the comparison is SUBSET, SUBSET is returned to the calling process (block 19D224).

Referring to FIG. 19A, if OP is Operation C (block 19D226), I1 is swapped with I2 and E1 is swapped with E2 (block 19A228); and E1CMPE2 is inverted using Table 19-2 illustrated in FIG. 19I. Then the SetOpA process illustrated in FIG. 19C and discussed above is performed using the swapped and inverted values (block 19A230). The result returned from the SetOpA process is then inverted (block 19A232) using Table 19-2 shown in FIG. 19I and the result is returned to the calling process (block 19A234). If OP is not Operation C (block 19A226), the SetOpB process illustrated in flow diagram form in FIG. 19E is performed (block 19A236).

The first step in the SetOpB process (FIG. 19E) is to set UE1E2 to the union of E1 and E2; then UE1E2 is compared (block 19E066) against either I1 or I2 (I1 should equal I2 at this point). Then a test (block 19E068) is made to determine if the result of the comparison is EQUAL. If the result of the comparison is EQUAL, DISJOINT is returned to the calling process (block 19E070). If the result of the comparison is not EQUAL, OVERLAP is returned to the calling process (block 19E072).

Running a Class That Requests a Protected Operation

As discussed above with reference to FIGS. 13A–C, a class (or other active content) is not allowed to run on a user's machine until a set of permissions are granted and the granted permissions are stored with the class (block 1318). Permissions are active code (code that runs) that acts as an intermediary between the class and a protected operation on the host system. In an actual embodiment of the invention, permissions are modeled as objects that are stored together with the class for which they have been granted. The classes and permissions may be either stored temporarily in the system RAM 125 and discarded following their use or the class and permissions may be persisted on the host system for use at a later time. In either circumstance, once the permissions are granted and attached to the class, there is no need to compare those permissions against those defined by the user for the system. This speeds access to the class and removes a potential impediment while it runs.

Figure 22:
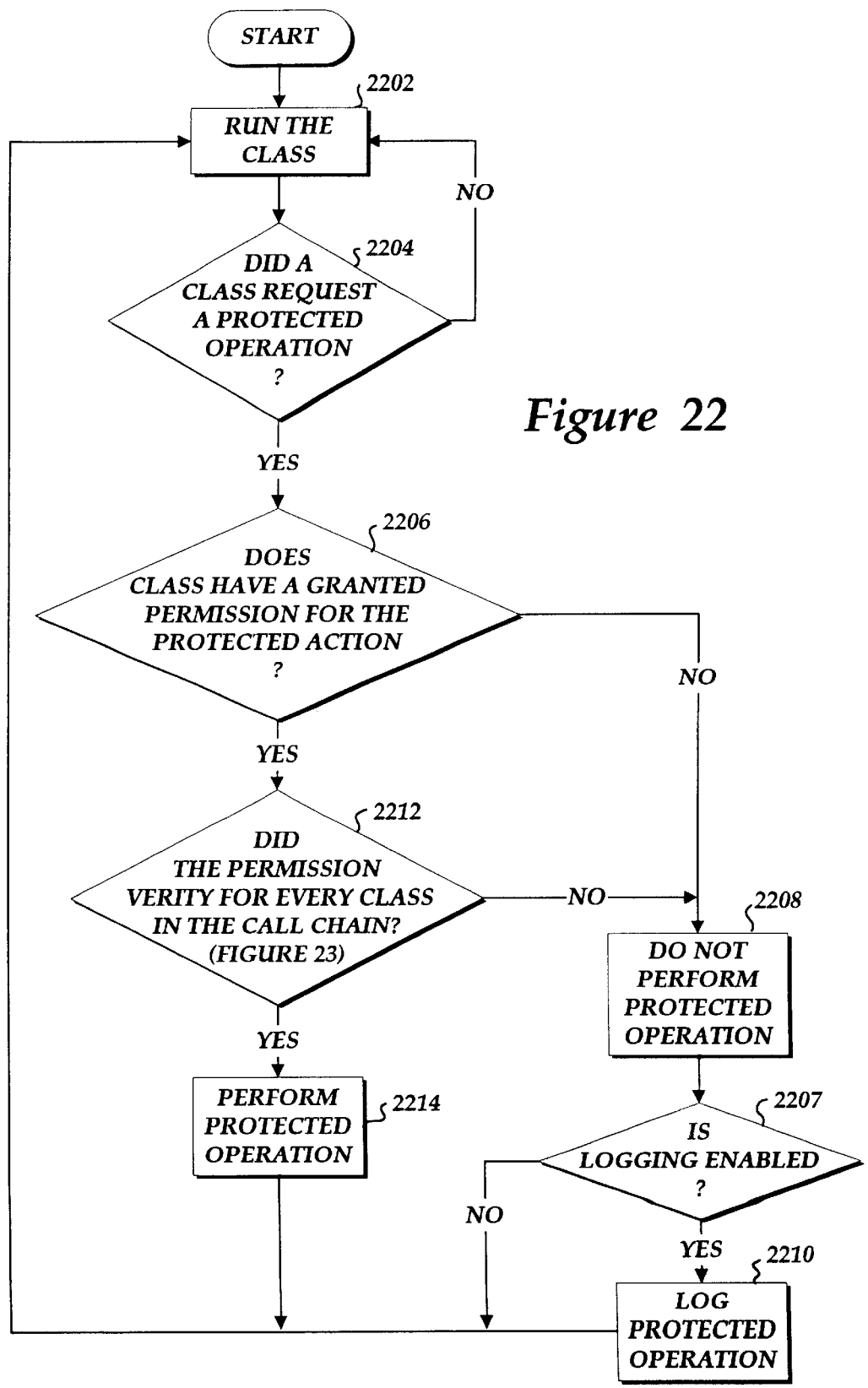
FIG. 22 is a functional flow diagram illustrating the process of running active content and validating permissions for protected operations in accordance with the present invention.

As illustrated in FIG. 22 when a class is run (block 2202) the test is made to determine if the class has requested a protected operation (block 2204). If a request for a protected operation is detected, a test (block 2206) is made to determine whether the class has a granted permission for the protected action. If the class does not have a granted permission for the protected action the protected operation is not performed (block 2208). If a test determines that logging has been enabled (block 2207), the failure to perform the protected operation is noted (block 2210) in a protected operation log. If logging has not been enabled, the process cycles back to wait for the next request for a protected operation (blocks 2202 and 2204).

In an actual embodiment of the invention, the Java classes have methods which can initiate security checks when they are called. For example, the actual embodiment exposes a public class called 'java.io.File' which contains a public method called 'delete' which can be used to delete files. When this 'delete' method is called, a security check is initiated to ascertain that the caller(s) actually possess the correct permissions to delete the specified file.

Figure 23:
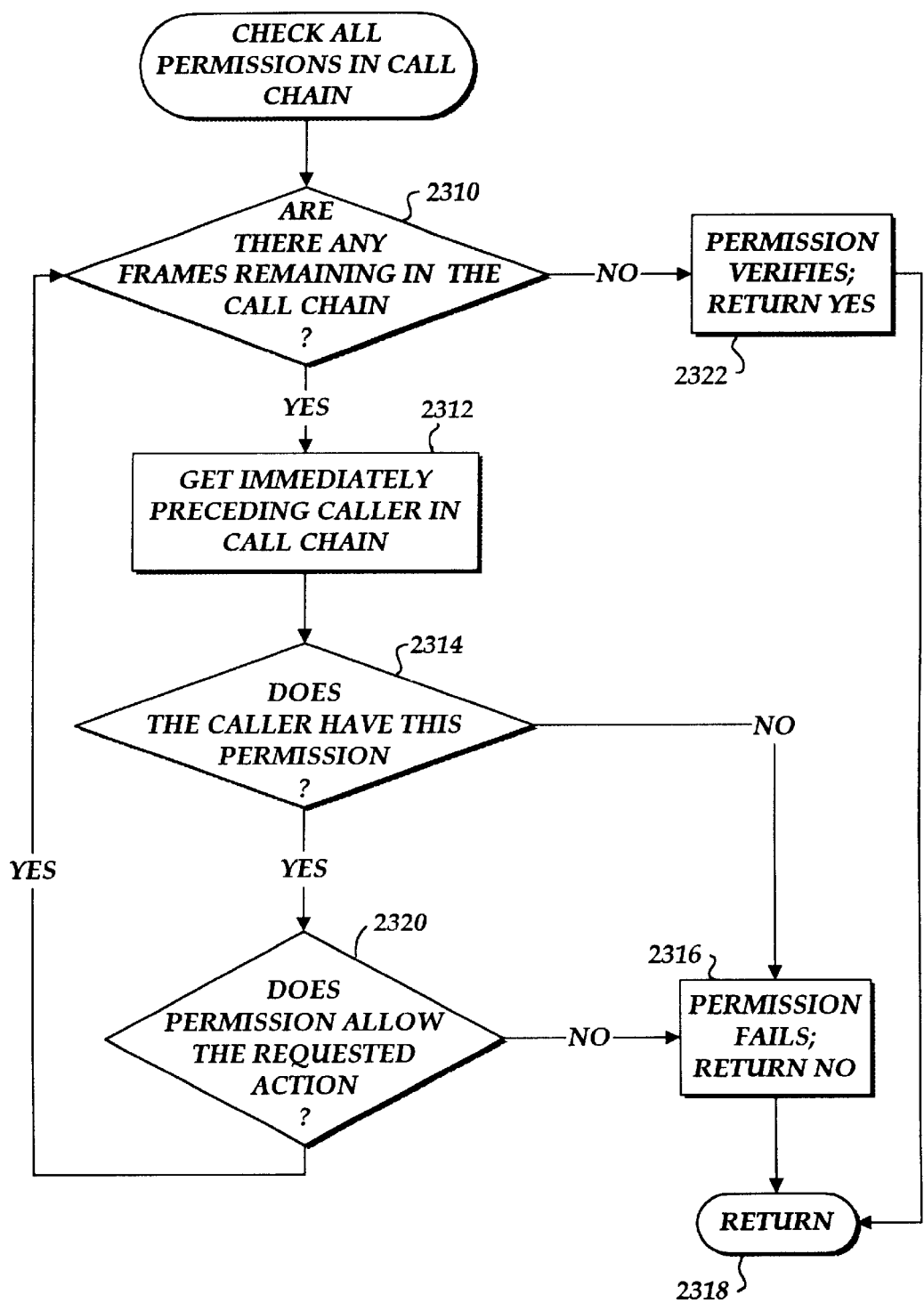
FIG. 23 is a functional flow diagram illustrating the process of verifying that the permission to be used has been granted to of each class in a call chain, in accordance with the present invention.

If the class does have a granted permission for the protected action then a test (block 2212) is made to verify that every class in the call chain also has the permission. FIG. 23 illustrates in flow diagram form how the test is conducted. The purpose of verifying that all classes in the call chain possess the permission requested is to prevent a security loophole often referred to as "luring". Luring occurs when a class that does not have a permission for a protected operation calls another class that does have the permission for the protected operation and tries to trick that class into doing something that the calling class is not permitted to do. The procedure illustrated in FIG. 23 screens for luring by verifying that every class that has called another class in a class call chain has the permission to perform the protected operation.

The first step in the verification test (FIG. 23) is a test (block 2310) to determine if there are any frames remaining in the call chain. Each frame represents a call from one class to another. For instance, Class A can call Class B which calls Class C which calls Class B. The call chain would be B C B A.

If there are remaining frames in the call chain (block 2310), the immediately preceding caller in the call chain is retrieved (block 2312). Then a test (block 2314) is made to verify that the retrieved caller has the permission being analyzed. If the caller does not have the permission, the permission fails (block 2316) and a NO decision (block 2316) is returned (block 2318). The returned NO decision prevents the protected operation from being performed (block 2208; FIG. 22).

Returning to FIG. 23, if the caller has the permission (block 2314), a test (block 2320) is made to determine if the permission allows the requested action. If not, the permission fails an a not is returned. If the permission is allowed, the next stack frame is checked (block 2310) and processing continues until either the permission fails (block 2316) or the last stack frame is reached and processed. When the last stack frame is reached (block 2310), the permission is verified and a YES (block 2322) is returned (block 2318). While an actual embodiment of the invention employs the "stack crawl" described in FIG. 23, alternate methods could be used that will be apparent to one skilled in the art.

Returning to FIG. 22, if the permission is verified (block 2212), the protected operation is performed (block 2214) and the process cycles back to wait for another protected operation request (blocks 2202 and 2204).

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-based method for providing security during a network browsing session between a client computer and a server computer, the method comprising:

receiving a document from the server computer at the client computer;

in response to receiving a request to perform an operation pertaining to the document, determining whether the requested operation is a protected operation;

if a protected operation is requested, determining a security setting corresponding to the protected operation and the server computer, wherein the security setting comprises:

at least one permission, the permission defining the access granted to the document on the client computer; and selectively performing the protected operation based on the security setting.

2. A computer-implemented method for providing security on a host computer system by selectively restricting access by active content downloaded from a computer network to a protected system resource provided by the host computer system, the method comprising:

associating a permission with the protected system resource that regulates the access of the active content to the protected system resource;

providing a permission specification that defines how the permission associated with the protected system resource regulates access by the active content to the protected system resource;

detecting an attempt by the active content to access the protected system resource provided by the host computer system; and granting the permission associated with the protected system resource to the active content if the attempt by the active content to access to the protected system resource falls within the permission specification.

3. The method of claim 2, further comprising denying the permission associated with the protected system resource to the active content if the attempt by the active content to access to) the protected system resource does not fall within the permission specification.

4. The method of claim 2, wherein if the permission associated with the protected system resource is granted to the active content, a granted permission for the system resource is associated with the active content such that access to the protected system resource is granted upon subsequent access attempts by the active content without again having to determine if the attempt by the active content to access to the protected system resource falls within the permission specification.

5. The method of claim 4, further comprising persisting the granted permission with the active content.

6. The method of claim 5, wherein the granted permission for the system resource is an object associated with the active content.

7. The method of claim 4, wherein the active content has a procedure that calls another procedure forming a call chain, the method further comprising:
   permitting the active content to access the protected system resource if each procedure in the call chain has the granted permission for the protected system resource; and
   prohibiting the active content from accessing the protected system resource if each procedure in the call chain does not have the granted permission for the protected system resource.

8. The method of claim 2, wherein the permission specification includes a parameter specification that defines a restriction on an action that may be taken when accessing the protected system resource.

9. The method of claim 8, wherein the parameter specification includes a primitive specification that further defines the restriction on an action that may be taken when accessing the protected system resource.

10. The method of claim 9, wherein the primitive specification is defined by an include/exclude pair of expressions.

11. The method of claim 9, wherein primitive specification is defined by a inclusive Boolean expression.

12. The method of claim 9, wherein the primitive specification is defined by an exclusive Boolean expression.

13. The method of claim 9, wherein the primitive specification is defined by a numerical limit expression.

14. The method of claim 9, wherein the primitive specification is defined by a regular expression.

15. The method of claim 14, wherein the regular expression includes a wildcard expression.

16. The method of claim 15, wherein the wildcard expression may be placed at any position in the regular expression.

17. The method of claim 2, further comprising a security policy that includes a plurality of permission specifications with each permission specification defining how a corresponding permission associated with a protected system resource regulates access by the active content to the corresponding protected system resource.

18. The method of claim 17, further comprising:
   associating a digital signature with the security policy;
   determining if a digital signature of the active content corresponds to the digital signature associated with the security policy; and
   granting the permission associated with the protected system resource to the active content if the digital signature of the active content corresponds to the digital signature associated with the security policy and if the attempt by the active content to access the protected system resource falls within a permission specification in the security policy.

19. The method of claim 18, wherein there are a plurality of security policies provided for the host computer system, the method further comprising granting the permission associated with the protected system resource to the active content if the attempt by the active content to access the protected system resource falls within a permission specification in the security policy associated with the digital signature borne by the active content.

20. The method of claim 17, further comprising:
   associating a network address with the security policy;
   determining if a network address from which the active content originates corresponds to the network address associated with the security policy;
   granting the permission associated with the protected system resource to the active content if the network address of the active content corresponds to the network address associated with the security policy and if the attempt by the active content to access the protected system resource falls within a permission specification in the security policy.

21. The method of claim 20, wherein there are a plurality of security policies provided for the host computer system, the method further comprising granting the permission associated with the protected system resource to the active content if the attempt by the active content to access the protected system resource falls within a permission specification in the security policy associated with the network address from which the active content originates.

22. The method of claim 21, further comprising:
   associating a digital signature with the security policy;
   determining if a digital signature of the active content corresponds to the digital signature associated with the security policy; and
   granting the permission associated with the protected system resource to the active content if the digital signature of the active content corresponds to the digital signature associated with the security policy and if the attempt by the active content to access the protected system resource falls within a permission specification in the security policy.

23. The method of claim 22, wherein there are a plurality of security policies provided for the host computer system, the method further comprising granting the permission associated with the protected system resource to the active content if the attempt by the active content to access, the protected system resource falls within a permission specification in the security policy associated with the digital signature borne by the active content.

24. The method of claim 23, wherein the permission specification includes a parameter specification that defines a restriction on an action that may be taken when accessing the protected system resource.

25. The method of claim 24, wherein the parameter specification includes a primitive specification that defines a set of items that may be acted on by an action that may be taken when accessing the protected system resource.

26. The method of claim 25, further comprising a computer readable medium having computer-executable instructions for performing the preceding method.

27. The method of claim 25, wherein the primitive specification is defined by an include/exclude pair of expressions.

28. The method of claim 25, wherein primitive specification is defined by a inclusive Boolean expression.

29. The method of claim 25, wherein the primitive specification is defined by an exclusive Boolean expression.

30. The method of claim 25, wherein the primitive specification is defined by a numerical limit expression.

31. The method of claim 25, wherein the primitive specification is defined by a regular expression.

32. The method of claim 31, wherein the regular expression includes a wildcard expression.

33. The method of claim 32, wherein the wildcard expression may be placed at any position in the regular expression.

34. A computer-implemented method for selectively restricting access by active content originating from a computer network to a protected operation on a host computer system, comprising:

associating a security zone with at least one network address on the computer network;

specifying a security policy for the security zone;

configuring a permission specification in the security policy, the permission specification defining a permitted access by active content having a network address associated with the security zone to the protected operation on the host computer system;

receiving a permission request associated with the active content, the permission request specifying a requested access that the active content seeks to the protected operation on the host computer system; and granting a permission associated with the protected operation on the host computer system to the active content if the permission request falls within the permission specification.

35. The method of claim 34, wherein a permission set is associated with the security zone, the permission set including a plurality of permission specifications.

36. The method of claim 35, wherein the permission set is a granted permission set, the method further comprising:

comparing the permission request to a corresponding permission specification in the granted permission set; and assigning a granted permission to the active content if the permission request falls within the permission specification included in the granted permission set.

37. The method of claim 36, wherein the granted permission is only assigned to the active content if each of a plurality of permission requests fall within corresponding permission specifications included in the granted permission set.

38. The method of claim 36, wherein the permission specification includes a parameter specification that defines a restriction on actions that the corresponding protected operation may perform on behalf of the active content.

39. The method of claim 38, wherein the parameter specification includes a primitive specification that defines a set of items that the protected operation may take action upon on behalf of the active content.

40. A computer readable medium having computer-executable instructions for performing the method in any one of claims 34–39.

41. The method of claim 39, wherein the primitive specification is defined by an include/exclude pair of expressions.

42. The method of claim 39, wherein primitive specification is defined by a inclusive Boolean expression.

43. The method of claim 39, wherein the primitive specification is defined by an exclusive Boolean expression.

44. The method of claim 39, wherein the primitive specification is defined by a numerical limit expression.

45. The method of claim 39, wherein the primitive specification is defined by a regular expression.

46. The method of claim 45, wherein the regular expression includes a wildcard expression.

47. The method of claim 46, wherein the wildcard expression may be placed at any position in the regular expression.

48. The method of claim 35, wherein the permission set is a denied permission set, the method further comprising:

comparing the permission request to a corresponding permission specification in the denied permission set; and denying a granted permission to the active content if the permission request intersects the corresponding permission specification in the denied permission set.

49. The method of claim 48, wherein the active content is denied any granted permission if any permission request associated with the active content intersects the denied permission set.

50. The method of claim 35, wherein the permission set is a query permission set, the method further comprising:

comparing the permission request to a corresponding permission specification in the query permission set; and querying for an instruction whether to assign a granted permission to the active content if the permission request falls within the corresponding permission specification included in the query permission set.

51. The method of claim 50, wherein the security zone includes a denied permission set and the active content is denied any granted permission if any permission request associated with the active content intersects the denied permission set.

52. The method of claim 50, wherein the granted permission is only assigned to the active content if each of a plurality of permission requests fall within each corresponding permission specifications included in the query permission set and the instruction whether to assign a granted permission to the active content is affirmative for each of the plurality of permission requests.

53. The method of claim 50, wherein the permission specification includes a parameter specification that defines a restriction on an action that the corresponding protected operation may perform on behalf of the active content.

54. The method of claim 53, wherein the parameter specification includes a primitive specification that defines a set of items that the protected operation may take action upon on behalf of the active content.

55. A computer readable medium having computer-executable instructions for performing the method in any one of claims 48–54.

56. The method of claim 54, wherein the primitive specification is defined by an include/exclude pair of expressions.

57. The method of claim 54, wherein the primitive specification is defined by a inclusive Boolean expression.

58. The method of claim 54, wherein the primitive specification is defined by an exclusive Boolean expression.

59. The method of claim 54, wherein the primitive specification is defined by a numerical limit expression.

60. The method of claim 54, wherein the primitive specification is defined by a regular expression.

61. The method of claim 60, wherein the regular expression includes a wildcard expression.

62. The method of claim 61, wherein the wildcard expression may be placed at any position in the regular expression.

63. A computer-implemented method for providing security on a host computer system to protect the host computer system against unauthorized access by foreign active content to a protected operation on the host computer system, comprising:

associating a security zone with at least one network address on the computer network;

defining a zone trust level for the security zone that includes at least one permission specification configured to reflect a level of trust that will be given to foreign active content from the network address associated with the security zone;

determining a permission request that specifies an access to the protected operation on the host computer system that the foreign active content desires in order to run on the host computer system; and comparing the permission request to a corresponding permission specification included in the zone trust level to determine a permission that controls access by the foreign active content to the protected operation on the host computer system.

64. The method of claim 63, wherein there are a plurality of zone trust levels that are selectable to set a level of trust for the security zone.

65. The method of claim 64, wherein one of the plurality of zone trust levels is a high security zone trust level that includes at least one permission specification configured to permit very restricted access to a corresponding protected operation provided by the host computer system.

66. The method of claim 65, wherein one of the plurality of zone trust levels is a low security zone trust level that includes at least one permission specification configured to permit liberal access to a corresponding protected operation provided by the host computer system.

67. The method of claim 66, wherein one of the zone trust level is a medium security zone trust level that includes at least one permission specification configured to permit moderately restricted access to a corresponding protected operation provided by the host computer system.

68. The method of claim 63, wherein a plurality of permission specifications included in the zone trust level are grouped into permission sets.

69. The method of claim 68, wherein the zone trust level includes a signed trusted permission set and the foreign active content is granted a permission to the protected operation on the host computer system commensurate with the permission request if the foreign active content has been digitally signed by a trusted publisher and the permission request falls within a corresponding permission specification in the signed trusted permission set.

70. The method of claim 69, further comprising:
configuring a permission specification to restrict the access of the foreign active content to the protected operation on the host computer system in accordance with a predefined permission trust level;
determining a permission request that specifies an access to the system resource on the host computer system required by the foreign active content in order to operate on the host computer system; and
comparing the permission request to the permission specification to create the permission that regulates the access by foreign active content to the system resource on the host computer system.

71. The method of claim 70, wherein the permission specification includes a parameter specification that defines an action within the scope of the permission, the method further comprising:
configuring the parameter specification to restrict the action in accordance with a predefined parameter trust level;
determining from the permission request a parameter request; and
comparing the parameter request to the parameter specification to determine a permitted action to include with the permission.

72. A computer readable medium having computer-executable instructions for performing the method in any one of claims 63–71.

73. The method of claim 68, wherein the zone trust level includes a signed untrusted permission set configured as a deny permission set and the foreign active content is denied a permission to the protected operation on the host computer system if the foreign active content has been digitally signed by an untrusted publisher and the permission request intersects with a corresponding permission specification in the signed untrusted permission set.

74. The method of claim 73, further comprising:
configuring a permission specification to restrict the access of the foreign active content to the protected operation on the host computer system in accordance with a predefined permission trust level;
determining a permission request that specifies an access to the system resource on the host computer system required by the foreign active content in order to operate on the host computer system; and
comparing the permission request to the permission specification to create the permission that regulates the access by foreign active content to the system resource on the host computer system.

75. The method of claim 74, wherein the permission specification includes a parameter specification that defines an action within the scope of the permission, the method further comprising:
configuring the parameter specification to restrict the action in accordance with a predefined parameter trust level;
determining from the permission request a parameter request; and
comparing the parameter request to the parameter specification to determine a permitted action to include with the permission.

76. A computer readable medium having computer-executable instructions for performing the method in any one of claims 73–75.

77. The method of claim 68, wherein the security zone trust level includes a signed untrusted permission set configured as a query permission set and a user is queried for an instruction whether to grant a permission to the protected operation on the host computer system if the foreign active content has been digitally signed by an untrusted publisher and the permission request falls within a corresponding permission specification in the signed untrusted permission set, the querying of the user comprising:
displaying a user interface requesting the instruction indicative of whether to grant a permission to the protected operation on the host computer system;
receiving the instruction indicative of whether to grant a permission to the protected operation on the host computer system; and
if the instruction indicative of whether to grant a permission to the protected operation on the host computer system is to grant the permission request, assigning a granted permission commensurate with to the permission request to the foreign active content; and
if the instruction indicative of whether to grant a permission to the protected operation on the host computer system is to deny the permission request, not assigning a granted permission to the foreign active content.

78. The method of claim 77, further comprising:
configuring a permission specification to restrict the access of the foreign active content to the protected operation on the host computer system in accordance with a predefined permission trust level;
determining a permission request that specifies an access to the system resource on the host computer system required by the foreign active content in order to operate on the host computer system; and
comparing the permission request to the permission specification to create the permission that regulates the access by foreign active content to the system resource on the host computer system.

79. The method of claim 78, wherein the permission specification includes a parameter specification that defines an action within the scope of the permission, the method further comprising:
configuring the parameter specification to restrict the action in accordance with a predefined parameter trust level;
determining from the permission request a parameter request; and
comparing the parameter request to the parameter specification to determine a permitted action to include with the permission.

80. A computer readable medium having computer-executable instructions for performing the method of any one of claims 77–79.

81. The method of claim 68, wherein the zone trust level includes a unsigned permission set that specifies a set of default permissions that are granted to the foreign active content if the foreign active content has not been digitally signed by an active content publisher.

82. A computer-implemented method for protecting a system resource on a host computer system with a permission that regulates the access by foreign active content to the system resource on the host computer system, comprising:
providing a permission specification configured to restrict the access of the foreign active content to the system resource on the host computer system in accordance with a predefined permission trust level;
determining a permission request that specifies an access to the system resource on the host computer system required by the foreign active content in order to operate on the host computer system; and
comparing the permission request to the permission specification to create the permission that regulates the access by foreign active content to the system resource on the host computer system.

83. The method of claim 82, wherein a plurality of predefined permission trust levels are user-selectable for the permission specification.

84. The method of claim 83, wherein the plurality of predefined permission trust levels includes a high security permission trust level that is configured to provide very restricted access by the foreign active content to use the system resource on the host system.

85. The method of claim 83, wherein the plurality of predefined permission trust levels includes a medium security permission trust level that is configured to provide a moderately restricted access by the foreign active content to use the system resource on the host system.

86. The method of claim 83, wherein the plurality of predefined permission trust levels includes a low security permission trust level that is configured to provide a liberal access by the foreign active content to use the system resource on the host system.

87. The method of claim 83, wherein the plurality of predefined permission trust levels includes a custom security permission trust level that is user-configurable to define an access by the foreign active content to use the system resource on the host system.

88. The method of claim 82, wherein the permission specification includes a parameter specification that defines an action within the scope of the permission, the method further comprising:
configuring the parameter specification to restrict the action in accordance with a predefined parameter trust level;
determining from the permission request a parameter request; and
comparing the parameter request to the parameter specification to determine a permitted action to include with the permission.

89. A computer readable medium having computer-executable instructions for performing the method of any one of claims 81–88.

90. The method of claim 89, wherein a plurality of predefined parameter trust levels are user-selectable for the parameter specification.

91. The method of claim 90, wherein the plurality of predefined parameter trust levels includes a high security parameter trust level that is configured to provide very restricted access by the foreign active content to use the system resource on the host system.

92. The method of claim 90, wherein the plurality of predefined parameter trust levels includes a medium security parameter trust level that is configured to provide a moderately restricted access by the foreign active content to use the system resource on the host system.

93. The method of claim 90, wherein the plurality of predefined parameter trust levels includes a low security parameter trust level that is configured to provide a liberal access by the foreign active content to use the system resource on the host system.

94. The method of claim 90, wherein the plurality of predefined parameter trust levels includes a custom security parameter trust level that is user-configurable to define an access by the foreign active content to use the system resource on the host system.

95. The method of claim 94, wherein the parameter specification includes a primitive specification that is defined by an include/exclude pair of expressions.

96. The method of claim 94, wherein the parameter specification includes a primitive specification that is defined by a inclusive Boolean expression.

97. The method of claim 94, wherein the parameter specification includes a primitive specification that is defined by an exclusive Boolean expression.

98. The method of claim 94, wherein the parameter specification includes a primitive specification that is defined by a numerical limit expression.

99. The method of claim 94, wherein the parameter specification includes a primitive specification that is defined by a regular expression.

100. The method of claim 99, wherein the regular expression contains a wildcard expression.

101. The method of claim 99, further wherein the regular expression contains a wildcard expression at any position in the regular expression.

102. A system for providing security on a computer system, comprising:
a permission object that controls the access of a computer program to a protected operation on the computer system;
a permission set including a permission specification that corresponds to the permission object and that defines an action that the permission object is allowed to take on behalf of the computer program;
a permission request that defines an action that the computer program requests that the permission object be allowed to take on behalf of the computer program; and
a security manager for constructing the permission object based on a comparison of the permission request to the permission specification.

103. The system of claim 102, wherein the security manager compares the permission request to a corresponding permission specification included in a signed trusted permission set and the permission is constructed matching the permission request if the foreign active content has been digitally signed by a trusted publisher and the permission request falls within a corresponding permission specification in the signed trusted permission set.

104. The system of claim 103, wherein the permission specification includes a parameter specification that defines an action within the scope of the permission and the security manager compares a parameter request to a parameter specification to construct the permission object with a parameter matching that specified in the permission request.

105. The system of claim 104, wherein if the permission request is not digitally signed, the security manager constructs the permission object matching a corresponding permission specification in an a unsigned permission set.

106. The system of claim 105, wherein if the permission request is digitally signed by an untrusted publisher, the security manager compares the permission request to a corresponding permission specification included in a signed untrusted permission set that has been configured as a deny permission set and the permission is not constructed if the permission request intersects a corresponding permission specification in the signed untrusted permission set.

107. The system of claim 106, wherein the permission specification includes a parameter specification that defines an action within the scope of the permission and the security manager compares a parameter request to a parameter specification to determine whether to construct the permission object.

108. The system of claim 103, wherein if the permission request is digitally signed by an untrusted publisher, the security manager compares the permission request to a corresponding permission specification included in a signed untrusted permission set that has been configured as a query permission set and the permission object is constructed matching the permission request only if a response to the query indicates that the permission object is allowed.

109. The system of claim 108, wherein the permission specification includes a parameter specification that defines an action within the scope of the permission and the security manager compares a parameter request to a parameter specification to determine whether to construct the permission object.

\* \* \* \* \*

UNITED STATES PATENT AND TRADEMARK OFFICE
CERTIFICATE OF CORRECTION

PATENT NO.     : 6,321,334 B1
DATED          : November 20, 2001
INVENTOR(S)    : M.S. Jerger et al.

It is certified that error appears in the above-identified patent and that said Letters Patent is hereby corrected as shown below:

Column 77,
Line 19, "a unsigned" should read -- an unsigned --

Column 78,
Line 37, "a inclusive" should read -- an inclusive --

Column 79,
Line 18, "in an a" should read -- in an --

Signed and Sealed this

Sixth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,321,334 B1
DATED         : November 20, 2001
INVENTOR(S)   : M.S. Jerger et al.

It is certified that error appears in the above-identified patent and that said Letters Patent is hereby corrected as shown below:

<u>Title page,</u>
Item [57], ABSTRACT,
Line 11, "A protected operations" should read -- A protected operation --

<u>Column 2,</u>
Line 59, "that then to stored" should read -- then stored --

<u>Column 3,</u>
Line 1, "provides a way" should read -- provide a way --

<u>Column 4,</u>
Line 7, "and a "low" security" should read -- and "low" security --
Line 20, "contexts," should read -- contexts; --

<u>Column 6,</u>
Line 3, "package is identical" should read -- package are identical --
Line 49, "set.." should read -- set. --

<u>Column 7,</u>
Line 13, "of directional nature" should read -- of the directional nature --

<u>Column 8,</u>
Line 37, "a "Internet" should read -- an "Internet --
Line 54, "window dialog" should read -- dialog window --

<u>Column 9,</u>
Line 46, "lookup" should read -- look-up --
Line 61, "to of each class" should read -- to each class --

<u>Column 10,</u>
Line 1, "a users computer" should read -- a user's computer --
Line 38, "Increasing," should read -- Increasingly, --

UNITED STATES PATENT AND TRADEMARK OFFICE
CERTIFICATE OF CORRECTION

PATENT NO.   : 6,321,334 B1
DATED        : November 20, 2001
INVENTOR(S)  : M.S. Jerger et al.

It is certified that error appears in the above-identified patent and that said Letters Patent is hereby corrected as shown below:

Column 11,
Line 42, "network Process," should read -- network process, --
Line 62, "routines that helps" should read -- routines that help --

Column 12,
Line 2, "CD ROM" should read -- CD-ROM --
Line 22, "RAM 25," should read -- RAM 125, --

Column 13,
Line 33, "that exclude" should read -- that excludes --
Line 53, "browser 204" should read -- browser 204, --

Column 15,
Line 39, "example, addition" should read -- example, in addition --

Column 16,
Line 60, "control 404" should read -- control 404, --

Column 17,
Line 29, "path/ie/plus/default.htm." should read -- path /ie/plus/default.htm. --
Line 42, "For instance" should read -- For instance, --

Column 19,
Line 15, "interface, 226" should read -- interface 226 --

Column 20,
Line 21, "or whether to proceed" should read -- on whether to proceed --

Column 21,
Line 40, "set 618" should read -- set 618, --

Column 22,
Line 11, "1)." should read -- 1.) --
Lines 22-23,    "(
                www.microsoft.com)" should not break

UNITED STATES PATENT AND TRADEMARK OFFICE
CERTIFICATE OF CORRECTION

PATENT NO. : 6,321,334 B1
DATED : November 20, 2001
INVENTOR(S) : M.S. Jerger et al.

It is certified that error appears in the above-identified patent and that said Letters Patent is hereby corrected as shown below:

Column 24,
Line 10, "in a high security," should read -- in high security, --
Line 25, "is illustrated" should read -- are illustrated --
Line 35, "button 728 and 730" should read -- buttons 728 and 730 --
Line 58, "interfaces 226" should read -- interface 226 --
Line 67, "define a set" should read -- defines a set --

Column 25,
Line 11, "offer the user" should read -- offering the user --
Line 16, "content from that the user" should read -- content that the user --
Line 35, "Alternately, " should read -- Alternatively, --
Line 61, "(a)." should read -- (a.) --

Column 26,
Line 1, "set is shown" should read -- set are shown --
Line 28, "type is defined" should read -- type are defined --
Line 64, "set is represented" should read -- set are represented --
Line 67, "In effect" should read -- In effect, --

Column 28,
Line 2, "clients services" should read -- client services --
Line 53, "automatically been" should read -- automatically be --

Column 31,
Line 9, "in order to charge" should read -- in order to change --
Line 21, "by certificate holder," should read -- by a certificate holder, --
Line 29, "can not" should read -- cannot --

Column 33,
Line 23, "While actual" should read -- While an actual --

Column 34,
Line 3, "class intercepts" should read -- class intercept --
Line 19, "and to the untrusted signed" should read -- and the untrusted signed --
Line 46, "FIGS. 9*a-g*)" should read -- (FIGS. 9A-G) --

UNITED STATES PATENT AND TRADEMARK OFFICE
CERTIFICATE OF CORRECTION

PATENT NO. : 6,321,334 B1
DATED : November 20, 2001
INVENTOR(S) : M.S. Jerger et al.

It is certified that error appears in the above-identified patent and that said Letters Patent is hereby corrected as shown below:

Column 35,
Line 63, delete second occurrence of "has a"

Column 36,
Line 16, Table, line 4, "There is no items" should read -- There are no items --
Line 44, "13*b*)" should read -- 13B) --

Column 37,
Line 4, "from user defined set" should read -- from the user defined set --
Line 59, "are repeated." should read -- is repeated. --
Line 56, "14*d*)" should read -- 14D) --

Column 39,
Line 61, "described above" should read -- described above. --

Column 40,
Line 16, "(FIGS. 14B)" should read -- (FIG. 14B) --
Line 32, "FIGS. 14B and" should read -- FIG. 14B and --
Line 43, "The process for is" should read -- The process is --

Column 43,
Line 5, "1640, 1640" should read -- 1640, 1650 --

Column 47,
Line 5, "which is array" should read -- which is an array --
Lines 28-29, "PTRL-
         IST1" should break -- PTR-
         LIST1 --

Column 48,
Lines 50-51, "PTRL-
         IST2" should break -- PTR-
         LIST2 --

Column 49,
Line 19, "18I," should read -- 18H, --
Line 32, "FIG. 18X)." should read -- (FIG. 18X). --

UNITED STATES PATENT AND TRADEMARK OFFICE
CERTIFICATE OF CORRECTION

PATENT NO.    : 6,321,334 B1
DATED         : November 20, 2001
INVENTOR(S)   : M.S. Jerger et al.

It is certified that error appears in the above-identified patent and that said Letters Patent is hereby corrected as shown below:

Column 50,
Line 20, "starting at position" should read -- starting at the position --
Lines 29-30, "PTRL-
      IST2" should break -- PTR-
      LIST2 --
Line 42, "Further" should read -- Further, --

Column 51,
Line 28, "CompareSingle-Components" should read -- CompareSingleComponents --
Lines 58-59, "CompareS-
      ingleComponents" should break -- Compare-
      SingleComponents --

Column 52,
Line 49, "lengthy" should read -- length --

Column 54,
Line 14, "intersecting a FoundIntersection" should read -- intersecting, a FoundIntersection --
Lines 34-35 "PTRL-
      IST1" should break -- PTR-
      LIST1 --
Lines 38-39, "PTRL-
      IST1" should break -- PTR-
      LIST1 --

Column 55,
Line 66, "process. i.e.," should read -- process; i.e., --

Column 56,
Line 7, "process shown" should read -- process is shown --
Line 46, "selected" should read -- selecting --
Line 57, "Separate-Component-Groups" should not be hyphenated
Line 67, "PTRL-" should read -- PTR- --

UNITED STATES PATENT AND TRADEMARK OFFICE
CERTIFICATE OF CORRECTION

8PATENT NO. : 6,321,334 B1
DATED : November 20, 2001
INVENTOR(S) : M.S. Jerger et al.

It is certified that error appears in the above-identified patent and that said Letters Patent is hereby corrected as shown below:

Column 57,
Line 1, "IST2" should read -- LIST2 --

Column 59,
Line 6, "18O419" should read -- 18O419 --
Line 58, "groups is the starting" should read -- groups in the starting --

Column 61,
Lines 13-14, "PTRL-
  IST1. " should break --PTR-
  LIST1. --
Lines 28-29, "PTRL-
  IST2" should break -- PTR-
  LIST2 --
Line 54, "done first conducting" should read -- done by first conducting --

Column 63,
Line 13, "set is illustrated" should read -- set, is illustrated --

Column 64,
Line 11, "19 A010)" should read -- 19A010) --

Column 65,
Line 25, "diagram from" should read -- diagram form --
Line 42, "E2 COMPLETE" should read -- E2COMPLETE --
Line 56, "true," should read -- true; --

Column 66,
Line 23, "is illustrated" should read -- as illustrated --
Line 36, "true is" should read -- true if --
Line 50, "19H090)" should read -- 19H090), --

UNITED STATES PATENT AND TRADEMARK OFFICE
CERTIFICATE OF CORRECTION

PATENT NO.     : 6,321,334 B1
DATED          : November 20, 2001
INVENTOR(S)    : M.S. Jerger et al.

It is certified that error appears in the above-identified patent and that said Letters Patent is hereby corrected as shown below:

Column 67,
Line 3, "Table 19-1 FIG." should read -- TABLE 19-1 in FIG. --
Line 47, "SetOpA-overlap" should read -- SetOpA-Overlap --
Line 59, "and a test" should read -- a test --

Column 69,
Line 3, "class and permissions" should read -- classes and permissions --
Line 64, "fails an a not" should read -- fails and a NO --

Column 70,
Line 57, "access to)" should read -- access to --

Column 71,
Lines 29, "a inclusive" should read -- an inclusive --

Column 72,
Line 3, "policy;" should read -- policy; and --
Line 35, "access, the" should read -- access the --
Line 52, "wherein primitive" should read -- wherein the primitive --
Line 53, "a inclusive" should read -- an inclusive --

Column 73,
Line 46, "wherein primitive" should read -- wherein the primitive --
Line 47, "a inclusive" should read -- an inclusive --

Column 74,
Line 38, "a inclusive" should read -- an inclusive --

Column 75,
Line 18, "level is" should read -- levels is --

Column 77,
Line 19, "a unsigned" should read -- an unsigned --

UNITED STATES PATENT AND TRADEMARK OFFICE
CERTIFICATE OF CORRECTION

PATENT NO.     : 6,321,334 B1
DATED          : November 20, 2001
INVENTOR(S)    : M.S. Jerger et al.

It is certified that error appears in the above-identified patent and that said Letters Patent is hereby corrected as shown below:

Column 78,
Line 37, "a inclusive" should read -- an inclusive --

Column 79,
Line 18, "in an a" should read -- in an --

Signed and Sealed this

Twenty-fourth Day of June, 2003

JAMES E. ROGAN
*Director of the United States Patent and Trademark Office*